US012205387B2

(12) United States Patent
O'Neill

(10) Patent No.: US 12,205,387 B2
(45) Date of Patent: Jan. 21, 2025

(54) SYSTEM AND METHOD FOR USING ARTIFICIAL INTELLIGENCE (AI) TO ANALYZE SOCIAL MEDIA CONTENT

(71) Applicant: Social Voice Ltd., Carlow (IE)

(72) Inventor: Allen O'Neill, Carlow (IE)

(73) Assignee: Social Voice Ltd., Carlow (IE)

( * ) Notice: Subject to any disclaimer, the term of this patent is extended or adjusted under 35 U.S.C. 154(b) by 0 days.

(21) Appl. No.: 18/429,066

(22) Filed: Jan. 31, 2024

(65) Prior Publication Data
US 2024/0412542 A1 Dec. 12, 2024

Related U.S. Application Data

(60) Provisional application No. 63/442,168, filed on Jan. 31, 2023.

(51) Int. Cl.
G06K 9/72 (2006.01)
G06V 10/25 (2022.01)
(Continued)

(52) U.S. Cl.
CPC .............. *G06V 30/10* (2022.01); *G06V 10/25* (2022.01); *G06V 20/49* (2022.01); *G06V 2201/07* (2022.01)

(58) Field of Classification Search
None
See application file for complete search history.

(56) References Cited

U.S. PATENT DOCUMENTS 8,379,101 B2 * 2/2013 Mathe ............... G06V 40/23
348/222.1
8,896,721 B2 * 11/2014 Mathe ............... G06V 10/26
348/222.1
(Continued)

FOREIGN PATENT DOCUMENTS

WO WO-2020034672 A1 * 2/2020 ......... G06K 9/00718

OTHER PUBLICATIONS

Li et al., "DIGMN: Dynamic Intent Guided Meta Network for Differentiated User Engagement Forecasting in Online Professional Social Platforms." arXiv preprint arXiv:2210.12402 (2022). (Year: 2022).*

(Continued)

*Primary Examiner* — Feng Niu
(74) *Attorney, Agent, or Firm* — THE MARBURY LAW GROUP, PLLC

(57) ABSTRACT

Systems and methods for determining attributes in media content. A computing device may be configured to obtain the media content based on a received media content identifier and segment the media content into scenes. The computing device may analyze viewer engagement metrics to identify a scene associated with a viewer engagement score that exceeds a threshold, select video frames from the identified scene, and identify primary objects in the series of images in the scene. The computing device may add a bounding box around the identified primary objects in one or more selected frames and perform text extraction within the bounding box. The computing device may determine object attributes of the identified primary objects, querying a database to identify topics of interest (ToIs) based on the extracted text and the determined object attributes, and performing a responsive action in response to identifying the one or more ToIs.

15 Claims, 87 Drawing Sheets

(51) Int. Cl.
*G06V 20/40* (2022.01)
*G06V 30/10* (2022.01)

(56) References Cited

U.S. PATENT DOCUMENTS

| | | | | |
|---|---|---|---|---|
| 9,934,223 | B2* | 4/2018 | Houh | G06F 16/7844 |
| 10,417,879 | B2* | 9/2019 | Moussette | H04M 1/72454 |
| 11,221,671 | B2* | 1/2022 | Stent | G06F 3/013 |
| 11,244,167 | B2* | 2/2022 | Zhao | G06N 3/08 |
| 11,341,185 | B1 | 5/2022 | Hamid | |
| 11,399,264 | B2* | 7/2022 | Zaltzman | H04W 4/23 |
| 11,416,002 | B1* | 8/2022 | Day | G08B 13/19621 |
| 11,983,913 | B2* | 5/2024 | Eswara | G06T 7/11 |
| 12,014,562 | B2* | 6/2024 | Proschowsky | G06V 20/49 |
| 2007/0118873 | A1* | 5/2007 | Houh | G06F 16/68 725/135 |
| 2015/0378998 | A1 | 12/2015 | Houh et al. | |
| 2016/0062464 | A1* | 3/2016 | Moussette | H04M 1/72454 |
| 2016/0224869 | A1* | 8/2016 | Clark-Polner | G06Q 50/00 |
| 2017/0213243 | A1* | 7/2017 | Dollard | G06Q 30/0249 |
| 2018/0286272 | A1* | 10/2018 | McDermott | G09B 5/06 |
| 2020/0249753 | A1* | 8/2020 | Stent | G06V 10/82 |
| 2021/0136537 | A1* | 5/2021 | Zaltzman | G06Q 50/14 |
| 2021/0248376 | A1* | 8/2021 | Zhao | G06V 20/49 |
| 2022/0269882 | A1* | 8/2022 | Proschowsky | G06V 40/10 |
| 2022/0342930 | A1 | 10/2022 | Chandrashekar et al. | |
| 2022/0360847 | A1* | 11/2022 | Chukoskie | H04N 21/44218 |
| 2022/0366665 | A1* | 11/2022 | Eswara | G06T 7/11 |
| 2024/0045558 | A1* | 2/2024 | Sarkar | G06F 3/04842 |

OTHER PUBLICATIONS

Chang et al., Using machine learning to extract insights from consumer data. (2022). Encyclopaedia of Data Science and Machine Learning. 1-17. (Year: 2022).*
Yang et al., Mining Chinese social media UGC: a big-data framework for analyzing Douban movie reviews. Journal of Big Data 3, 3 (2016). https://doi.org/10.1186/s40537-015-0037-9 (Year: 2016).*
Hanafi et al., "Deep Learning for Recommender System Based on Application Domain Classification Perspective: a Review." Journal of Theoretical & Applied Information Technology 96, No. 14 (2018). (Year: 2018).*
Liu et al., "Crystalline: Lowering the Cost for Developers to Collect and Organize Information for Decision Making." In Proceedings of the 2022 CHI Conference on Human Factors in Computing Systems, pp. 1-16. 2022. (Year: 2022).*
European Patent Office, "International Search Report and Written Opinion", issued in related International Patent Application No. PCT/IB2024/050897, mail date Apr. 8, 2024. (12 pages).

* cited by examiner

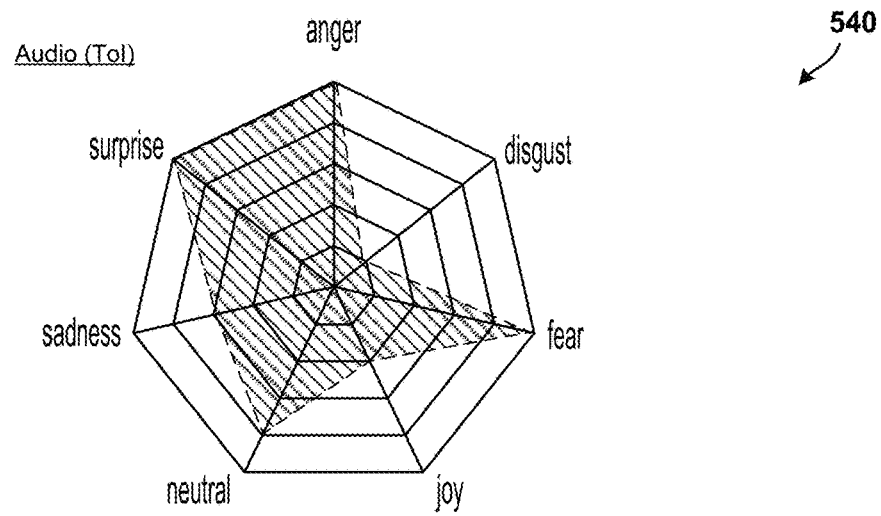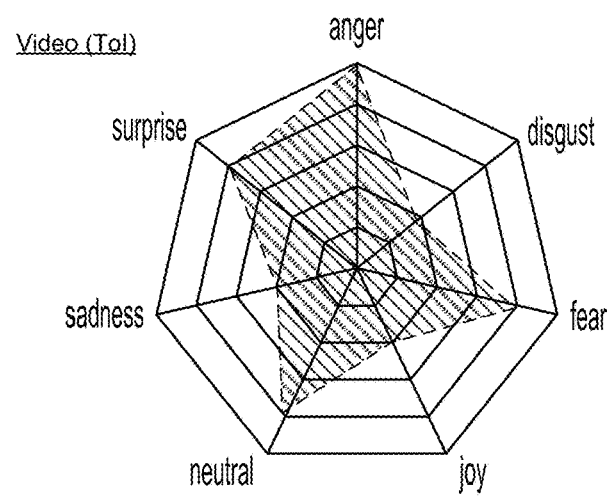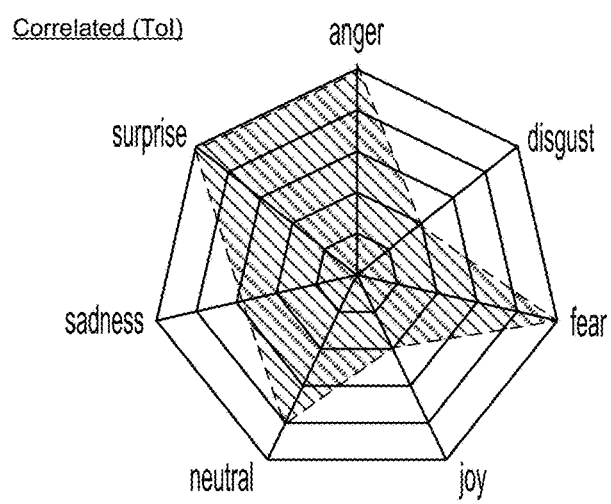
FIG. 5C

900

| ID | | |
|---|---|---|
| 902 | General Media Content | |
| 904 | What Media Content Currently Has A High Media Impact Score? | 1. Useful For Media Content Creators To Get Inspiration For Media Content Creation<br><br>2. Useful For Product Owners To Decide Where To Place Advertisements |
| | ... | ... |
| 916 | Specific Media Content | |
| 918 | Is Media Content X Consistent With Media Content Created By Media Content Creator Y? | Useful For Indicating If Media Content Creator Is Not Creating The Media Content (e.g., Instead Using A Ghost Writer, Generative AI, Etc.) |
| 920 | What Is Media Content X's Media Impact Score? | Useful For Product Owners To Decide Where To Place Advertisements |
| 922 | What Media Content Is Similar To Media Content X? | Useful For Product Owners To Determine The Uniqueness Of Media Content |
| | ... | ... |

| ID | | |
|---|---|---|
| 932 | General Media Content Creator | |
| 934 | Which Media Content Creators Create Media Content Relating To Product, Brand, Or Product Owner Z? | Useful For Media Content Creators To Identify Other Media Content Creators With Whom To Collaborate |
| | ... | ... |
| 946 | Specific Media Content Creator | |
| 948 | Is Media Content Creator Y Consistent? | 1. Consistency May Be Measured Across All Properties Associated With X<br>2. Consistency May Be Specific To A Single Media Content Publisher |
| 950 | What Is Media Content Creator Y's Current Media Impact Score? | Useful For Media Content Creators To Measure Their Performance |
| 952 | What Is Media Content Creator Y's Predicted Media Impact Score At Future Time T? | 1. Useful For Media Content Creators To Measure Their Performance<br>2. Useful For Product Owner To Identify Upcoming Media Content Creators |
| 954 | Which Media Content Creators Are Similar To Media Content Creator Y? | 1. Useful For Media Content Creators To Identify Other Media Content Creators With Whom To Collaborate<br>2. Useful For Product Owners To Identify Alternative Media Content Creators With Whom To Partner |
| | ... | ... |

FIG. 9B

| ID | | |
|---|---|---|
| 962 | General Product/Brand/Product Owner | |
| 964 | What Product/Brand/Product Owner Current Has A High Media Impact Score? | Useful For Product Owners To Identify Other Product Owners For Making Partnerships |
| | ... | ... |
| 976 | Specific Product/Brand/Product Owner | |
| 978 | Is The Media Impact Score For Product, Brand, Or Product Owner Z Currently Above A Threshold? | Useful For Product Owners To Automatically Manage Stock Levels (e.g., An Increased Amount Of Stock Can Be Manufactured, Bought, Or Distributed If The Product Is Featuring In A Lot Of Media Content, Etc.) |
| 980 | Which Media Content Creators Are Currently Creating Media Content Relating To A Product, Brand, Or Product Owner Z? | 1) Useful For Product Owners To Understand What Is Being Said About A Specific Product, Brand Or Product Owner (e.g., Their Own Or A Competitors) <br><br> 2) Useful For Product Owners To Identify Promotional Opportunities (e.g., By Automatically Commenting On The Media Content, Etc.) |
| 982 | Is There Any Current Media Content With A Negative Sentiment That Relates To A Product, Brand, Or Product Owner Z? | Useful For Product Owners To Counter Negative Opinions (e.g., By Sending Free Samples To The Media Content Creator For A More Complete Review, By Engaging With Another Media Content Creator In Order To Generate Positive Sentiment, Etc.) |
| 984 | Is There Any Current Media Content With A Positive Sentiment That Relates To A Product, Brand Or Product Owner Z? | 1) Useful For Product Owners To Identify Partners <br> 2) Useful For Product Owners To Identify Promotional Opportunities (e.g., By Sending Different Samples To The Media Content Creator For Review, By Donating Competition Prizes To The Media Content Creator, Etc.) <br><br> 3) Useful For Product Owners To Identify Promotional Material That Can Be Reused (e.g., By Re-Posting Or Re-Sharing It Using Its Own Media Content Publisher, Etc.) |
| 986 | Is There Any Current Media Content Associated With An Inappropriate Topic That Relates To A Product, Brand, Or Product Owner Z? | Useful For Product Owners To Automatically Issue Takedown Requests |
| | ... | ... |

FIG. 9C

NEW SKIN CARE AT STORE 🛒 SHOP WITH ME 👤 DERMATOLOGIST @DD 104K  222K  5.5K  517  22 minutes 31 seconds  16/05/2022

2260

| Video Summary | Profile | Content Analysis | Sentiment | Context | Transcript |

2262a → 05:08  Are they trying to compete with :soap:?
2262b → 05:10  Remember :soap: was always about their one quart
2262c → 05:48  Here we have the :soap: sensitive skin,
2262d → 06:35  That's important because sendent bars like :soap:.
2262e → 06:40  the :soap: fragrance three beauty bar.
2262f → 08:02  So we've got a four pack of :soap: antiperspirant

Save Search

*Detail    Search*

2502 — Name of search  [                    ]

2504 — Notes  [                    ]

[Cancel]  [Save]

FIG. 25A

Create alert

*Detail    Search*

2552 — Name of alert  [                    ]

2554 — Notes  [                    ]

2556 — Alert type    [ x ]  email    [ ]  whatsapp    [ ]  teams    [ ]  telegram 2558 — When          [ x ]  immediately    [ ]  weekly report    [ ]  daily report

[Cancel]  [Save]

| 2702 | List Of My Brands/Products | List Of Competitor Brands/Products | |
|---|---|---|---|
| 2704 | (Brand 1 Family -> 'Beauty & Wellbeing', 'Personal Care') | Brand A, Brand B, Brand C, ... | 2712 |
| 2706 | Brand 1, Brand 2, Brand 3, ... | List Of Things I Am Nervous About | |
| 2708 | List Of Topics I Am Interested In | Animal cruelty, Peta, XPhobia, Toxicity, Negative reviews, Modern Slavery, Populist extremism, Quality | 2714 |
| | Skin care, beauty, Makeup, Dermatology, Dry skin, Healthcare, Women's health, Hair care, Deodorants | List Of Values That Are Important To Me | |
| 2710 | Territories & Languages UK & Ireland, Spain, Italy English, Spanish, Italian | Honesty, Inclusivity, Diversity, Animal welfare, Equal rights, Accountability, Fairness | 2716 |

FIG. 27A

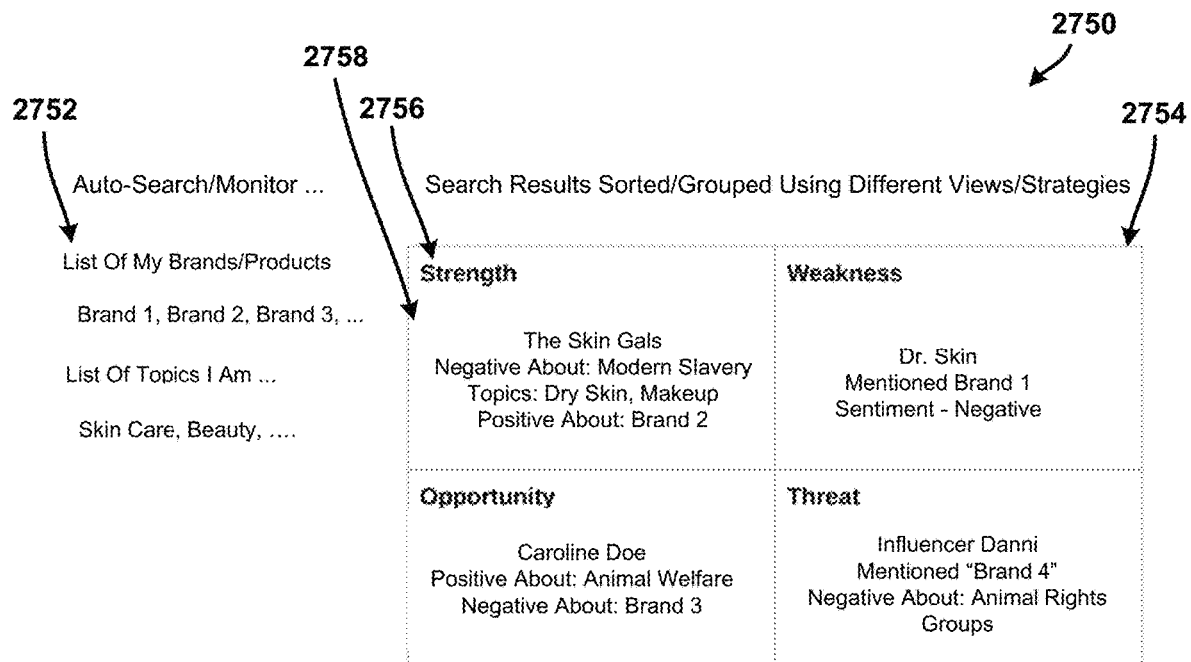

FIG. 27B

Influencer Integrity Report

Jane Doe Beauty Stylist

- Summary
- Most Recent Videos
- Platform analysis
- Engagement
- Emotional voice
- Content
- Brand mentions
- Brand safety
- Affiliate & sponsorship

Summary

| Location | US |
|---|---|
| Language | EN |
| Age group | 30-40 |
| Main categories | beauty   personal care |
| Active Since | 19/09/2016 |

| Followers | Engagement rate |
|---|---|
| 2.6M | 2.36 % |
| ○ Good | ● Above average |

| Total videos | Post frequency |
|---|---|
| 3.8K | Weekly |
| ● Above average | ○ Average |

Trust Score
★ ★ ★ ★ ★

| Consistency | ★ ★ ★ ★ |
| Empathy | ★ ★ ★ ★ |
| Authenticity | ★ ★ ★ ★ |
| Profanity | ★ ★ ★ ★ |
| Toxicity | ★ ★ ★ ★ |
| Red Flag Content | ★ ★ ★ ★ |

Creator self introduction

Summary analysis of content

Report meta-data

| Date | 13/06/2023 |
|---|---|
| Video analyzed | 3865 |
| Video Hours | 873.92 |
| Last Video Date | 12/06/2023 |
| Report Date Range | 19/09/2016 - 12/06/2023 |
| Report ID | 648997ea7d0027f38a817f0fc |

Most Recent Videos

| WebVideo |
|---|

Insights per platform - YTD
Sharemedia
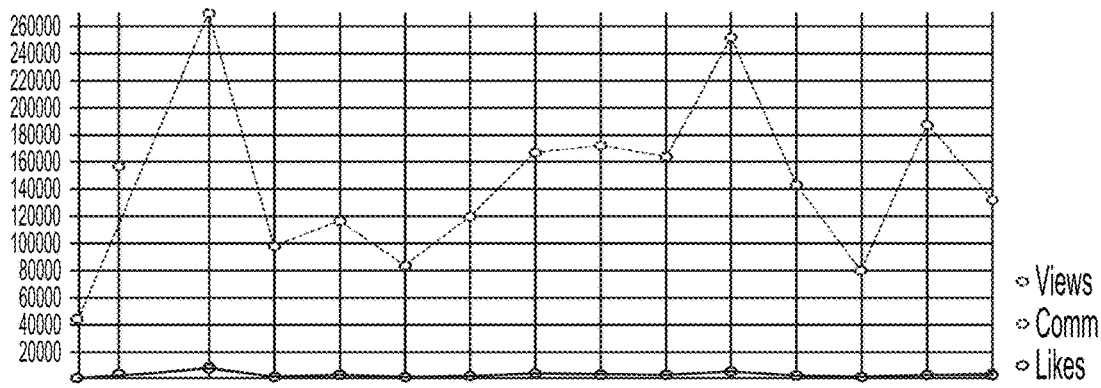
Quickflick
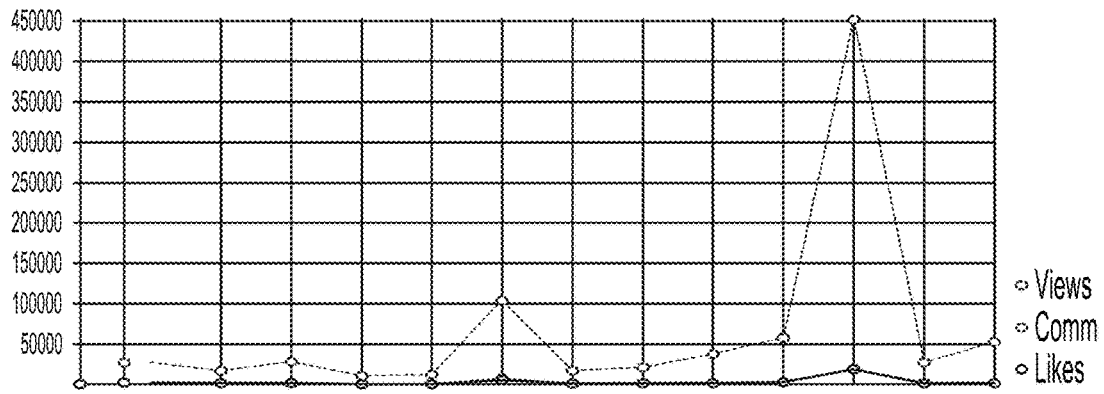
WebVideo
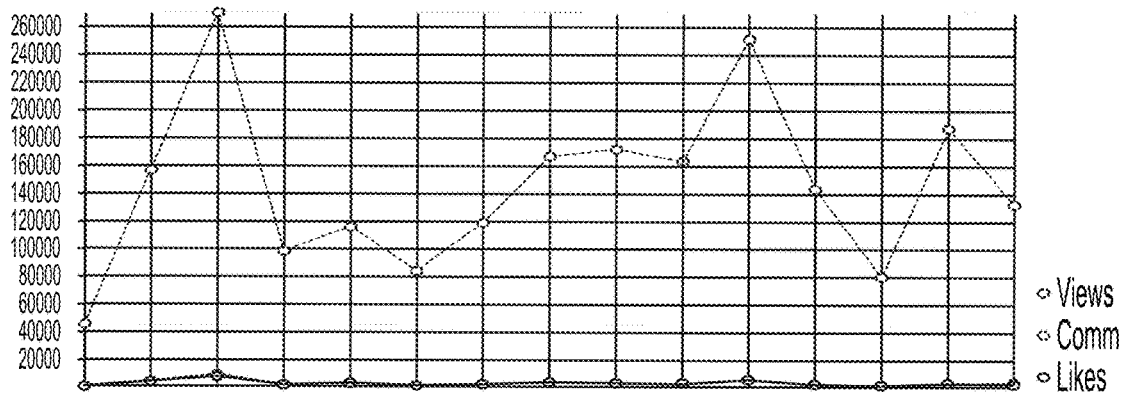
FIG. 33C

Audience Engagement

All platforms

Comment Rate
@creator receives comments from <0.07% of their audience
○ <0.07% Excellent comments activity

Like-Comment Ratio
@creator receives 8.85 comments per 100 likes
● Good

Likes spread
spread in likes between posts in 50.88%
● Good

Top Performing videos all time

WebVideo

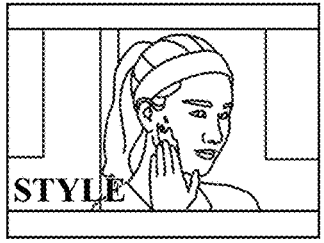  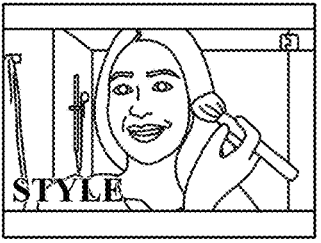

| SKIN CARE ROUTINE | EVERYTHING NIGHTIME... | Skincare guide |
| --- | --- | --- |
| 👁 21K  ♡ 1.7K | 👁 22K  ♡ 1.7K | 👁 30K  ♡ 1.9K |

Sharemedia

 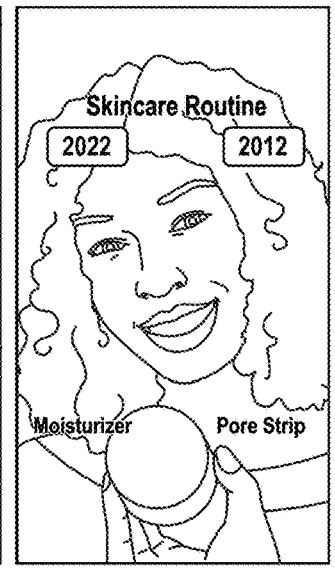 

| 10 stages of skin care... | Skincare routine 2022/2012 | |
| --- | --- | --- |
| 👁 43K  ♡ 888 | 👁 152K  ♡ 4.5K | 👁 261K  ♡ 8.1K |

FIG. 33D

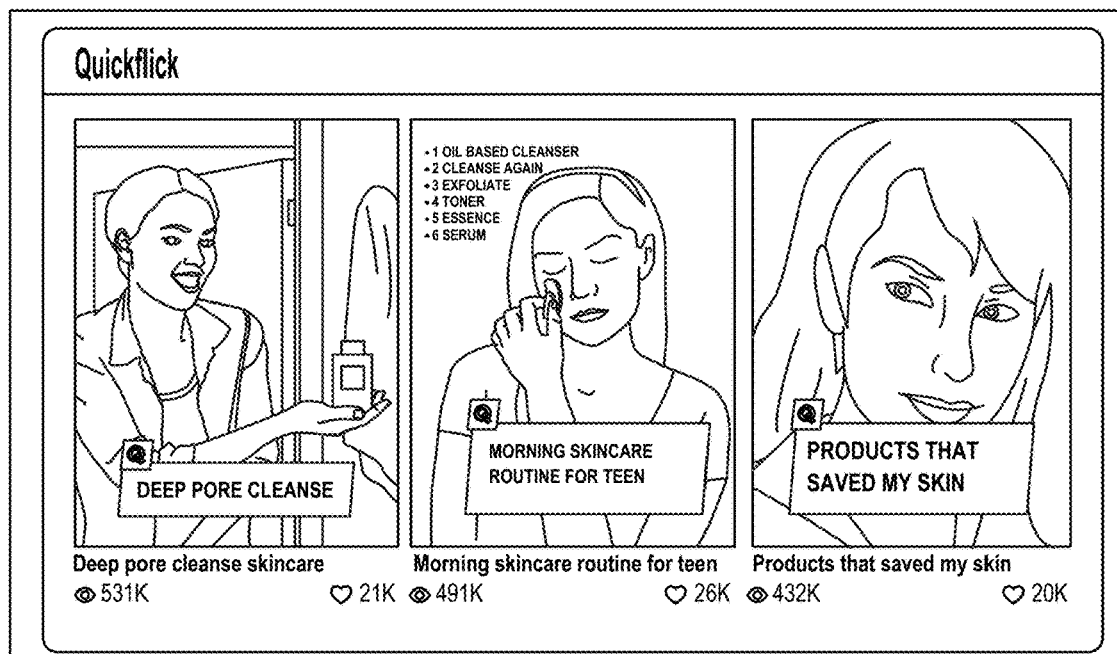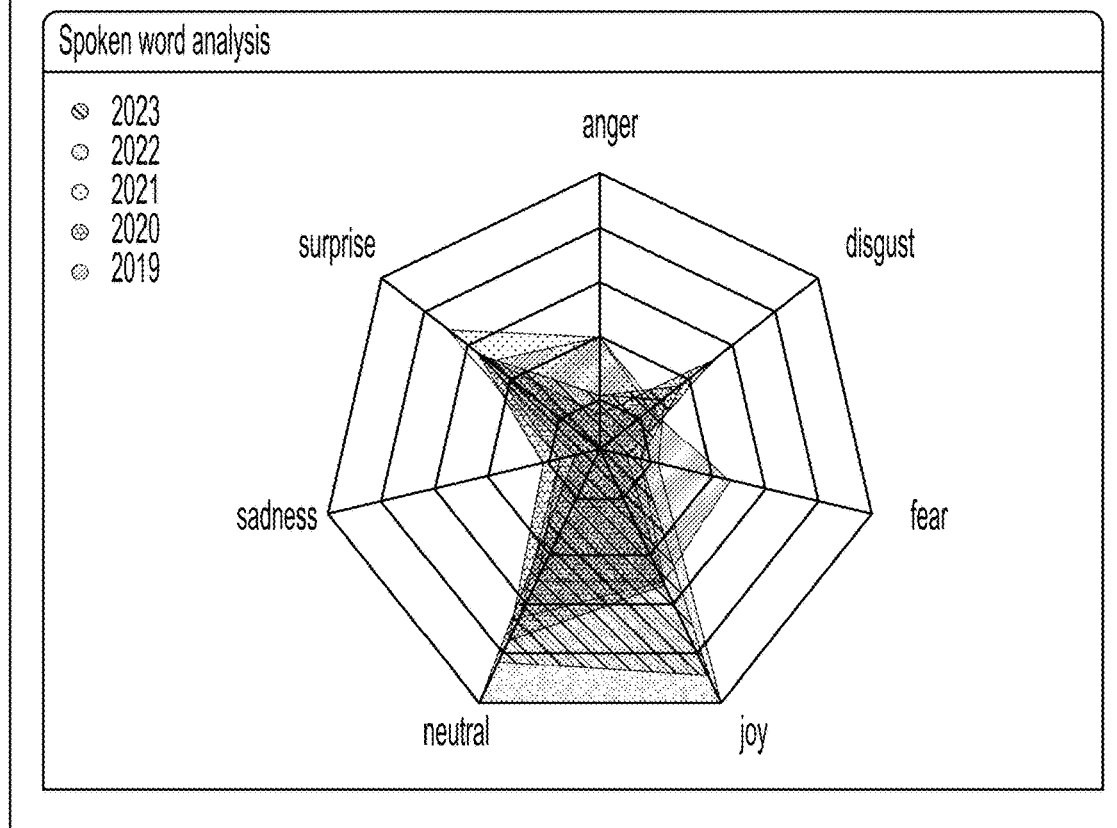
FIG. 33E

Personality type

ESTP: 42
INFP: 26
ENFJ: 13

ESTP (Extroverted, Observant, Thinking, and Prospecting) is someone with the entrepreneur personality traits. They tend to be ...

INFP (introversion, intuition, feeling, perception) is a four-letter abbreviation for one of the 16 personality types identified by the Myers-Briggs Type Indicator. 1 The INFP personality type is often described as ...

ENFJ (extroverted, intuitive, feeling, and judging). People with ENFJ personality type are often described as ....

Focus & tone

| Tone of spoken word | Leaning | Direction of Focus |
|---|---|---|
| 85% Personal / 15% Corporate | 97% Liberal / 3% Conservative | 83% Extrovert / 17% Introvert |

Existence Values

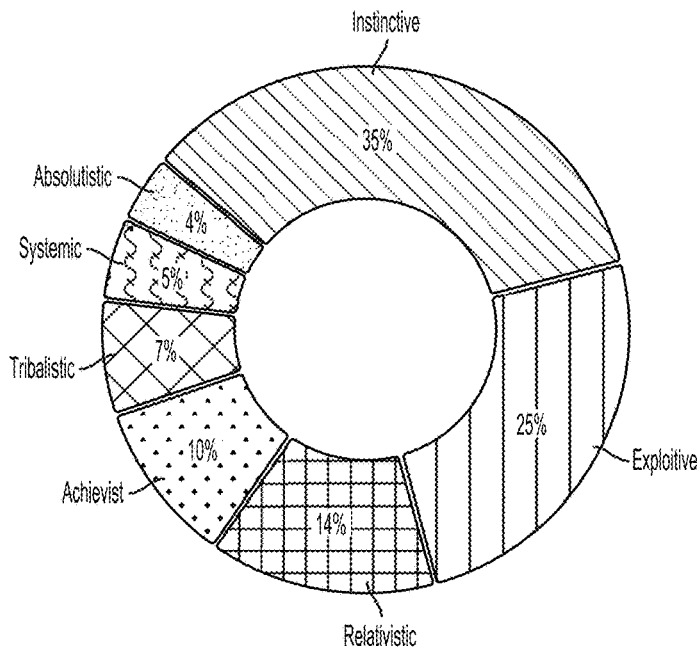

FIG. 33F

Sound analysis
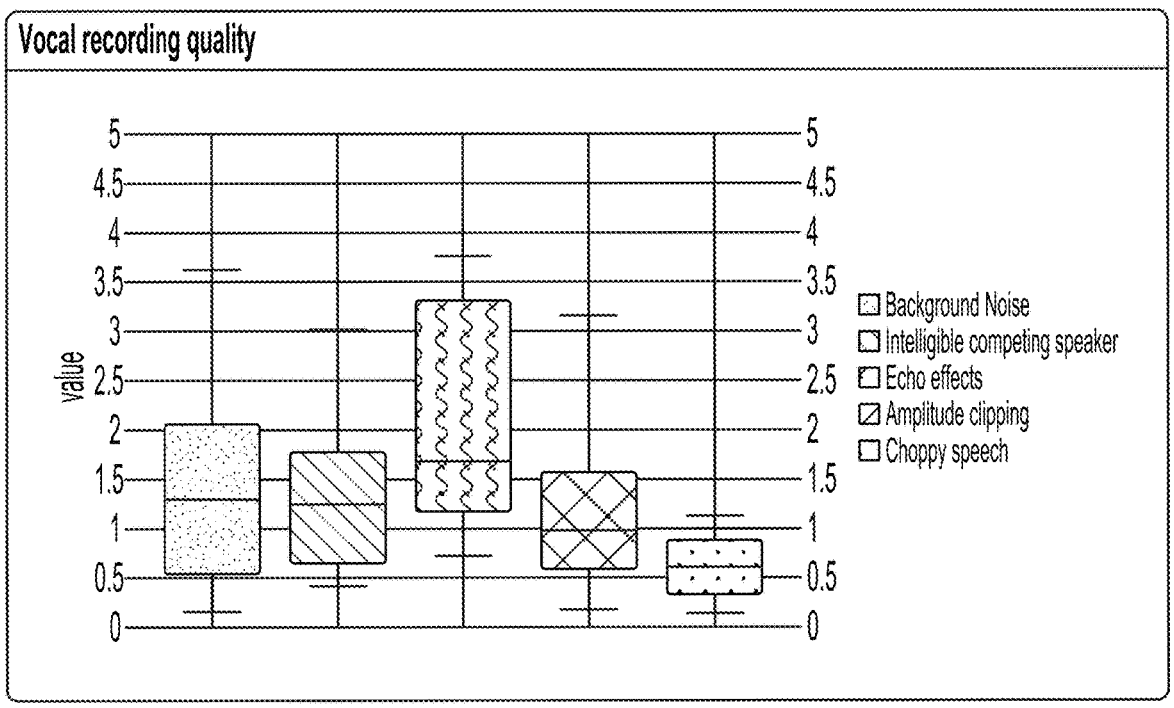
Content topic analysis
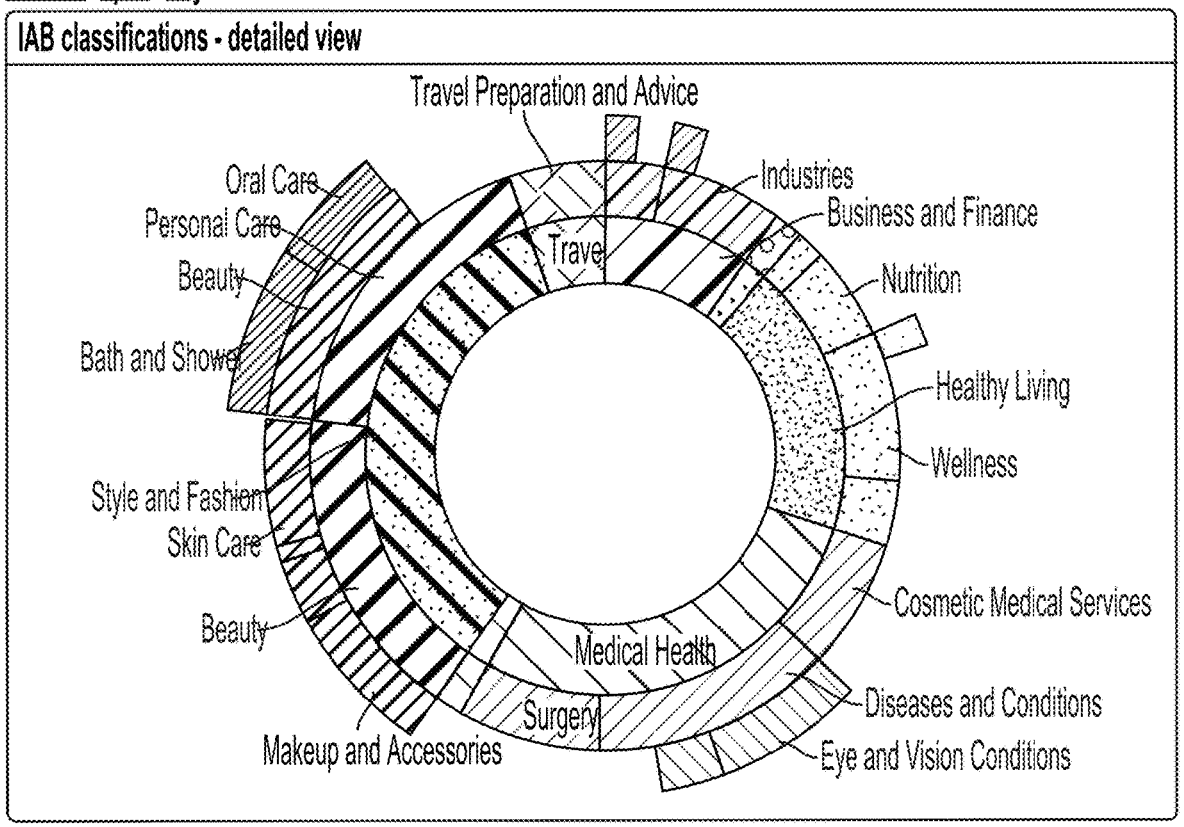
FIG. 33G

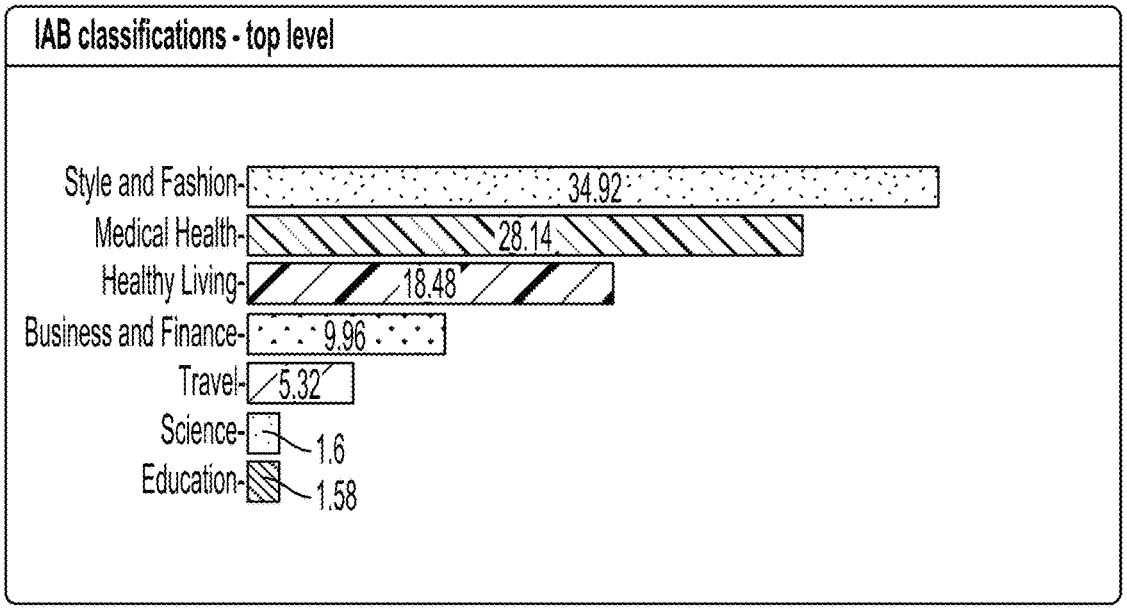
Topic drift over time
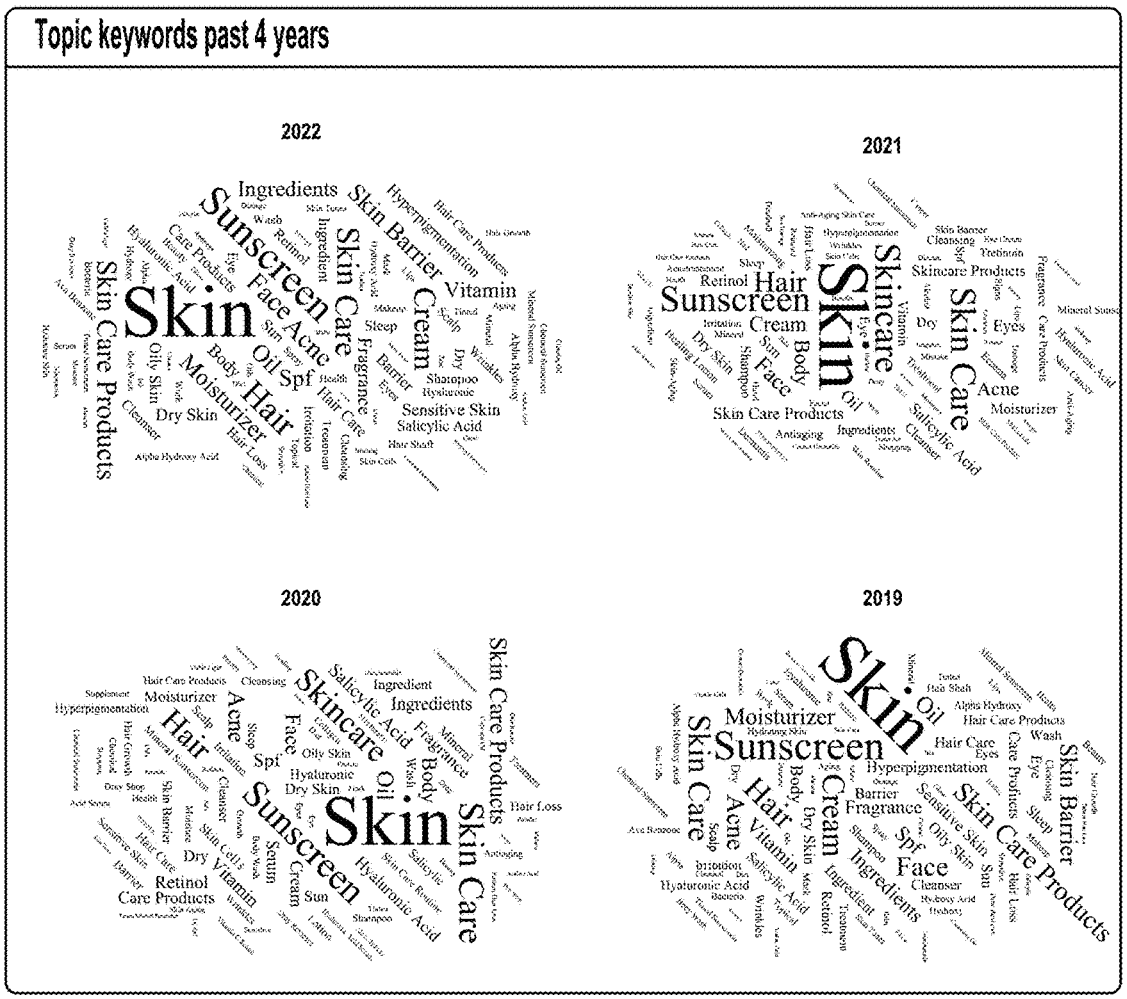
FIG. 33H

Brands word cloud - YTD

Brands safety

Brands Safety analysis
- Safe
  0 of 9 negative content patterns found

Negative content background check

- Alcohol
- Negative sentiment
- Crime related content

- Toxic content
- Offensive content
- Adult content

- Religious content
- Political content
- Pranks

*Content gaps*

🚦 No content gaps or anomalies found

GARM Brand Safety Floor Analysis

GARM Global Allied Responsible

⊘ No GARM risk identified

| Content category | High Risk | Medium Risk | Low Risk | Instances identified |
|---|---|---|---|---|
| Adult content | | | ✓ | 0 |
| Arms and ammunition | | | ✓ | 0 |
| Crime & harmful acts | | | ✓ | 0 |
| Death or conflict | | | ✓ | 0 |
| Online piracy | | | ✓ | 0 |
| Hate speech | | | ✓ | 0 |
| Obscenity & Profanity | | | ✓ | 0 |
| Drugs & Tobacco | | | ✓ | 0 |
| Hateful content | | | ✓ | 0 |
| Terrorism | | | ✓ | 0 |
| Sensitive social issues | | | ✓ | 0 |
| Misinformation | | | ✓ | 0 |

FIG. 33M

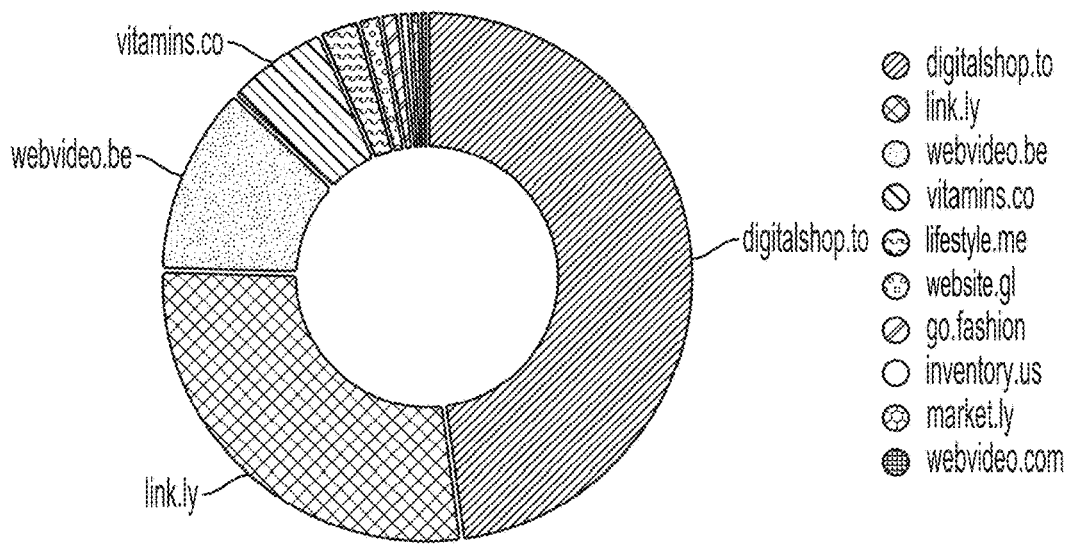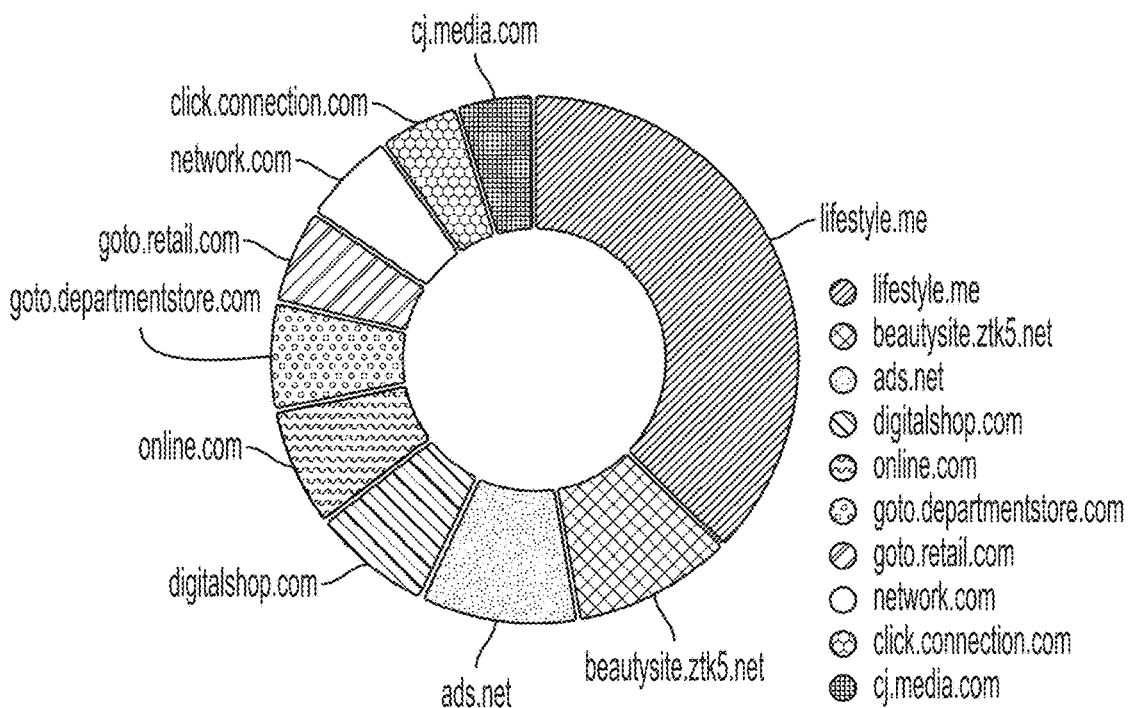
FIG. 33O

SYSTEM AND METHOD FOR USING ARTIFICIAL INTELLIGENCE (AI) TO ANALYZE SOCIAL MEDIA CONTENT

RELATED APPLICATIONS

This application claims the benefit of priority to U.S. Provisional Patent Application No. 63/442,168 entitled "System and Method for Determining a Trend Score for a Product or Media Content Publisher" filed on Jan. 31, 2023, the entire contents of which are hereby incorporated by reference for all purposes.

BACKGROUND

Product manufacturers, product distributors, product retailers, and service providers have always had an interest in understanding how their products and services (and often their competitors' products and services) are perceived in the market. Traditionally, this might have involved looking for product and service reviews in magazines and industry journals, commissioning market research, and conducting focus groups. The motivation for doing this typically involves determining the good points and the bad points relating to the product or service, understanding why these are so, and understanding the demographics of the product or service reviewers. All of this information can then feed back into product and service development and promotion.

The Internet and the world wide web have changed from being niche research projects to global eCommerce platforms in a remarkably small number of years. Many traditional retail businesses (now often referred to as "bricks and mortar" or "highstreet" businesses) have moved online and created Internet-based sales channels. Similarly, many product manufacturers and service providers have bypassed or complemented traditional distribution and reseller channels by selling directly to consumers online. Further, many global businesses were founded within the last few years that only sell online. Many of these businesses are household names, and some of them also act as online marketplaces where third parties sell their goods (e.g., Amazon, etc.). It is probably now possible to buy online anything that was sold by a traditional business, and in many cases, the choice and availability online is far greater. For these and other reasons, more people are buying larger volumes and more types of products online from eCommerce websites than ever before, and all of the indications are that this trend is likely to continue.

Regardless of this radical transition to eCommerce platforms and online sales, product and service reviews initially came from a relatively small number of online sources (e.g., the eCommerce website selling the product or service), and the medium and format of the reviews were typically formally structured text. Therefore, it was relatively easy for product manufacturers, product distributors, product retailers, and service providers to track and analyze these online reviews without using any automation tools and using existing text-based tools.

A more recent phenomenon has been the explosion of media content publishers (e.g., "content creators," "influencers," etc.) that review products and services using new media formats (e.g., audio and video media in podcasts and vlogs), often on social media platforms. These media content publishers range from enthusiastic individuals to entire websites dedicated to performing product and service reviews, and they often have significant numbers of followers from specific and focused demographics.

Unfortunately, the proliferation of product and service reviews, combined with the use of new media formats, makes it extremely challenging for product manufacturers, product distributors, product retailers, and service providers to track and analyze these reviews using existing technology.

Further, the proliferation of product and service reviews, combined with the use of new media formats, provides product manufacturers, product distributors, product retailers, and service providers many more options for promoting and advertising their products and services (e.g., as part of a paid review, by placing advertisements in proximity to the new media formats).

SUMMARY

The various aspects include methods of reducing a search space by determining attributes in media content, which may include receiving a media content identifier, obtaining the media content based on the received media content identifier, segmenting the media content into scenes based on visual and audio cues (each scene including a series of images), analyzing viewer engagement metrics across scenes to identify a scene associated with a viewer engagement score that exceeds a threshold, selecting video frames from the identified scene, identifying primary objects in each selected frame that occur across the timespan of the series of images in the scene, adding a bounding box around the identified primary objects in one or more selected frame, performing text extraction within the bounding box, determining object attributes of the identified primary objects, querying a database to identify topics of interest (ToIs) based on the extracted text and the determined object attributes, an performing a responsive action in response to identifying the one or more ToIs.

In some aspects, identifying the primary objects in each selected frame that occur across the timespan of the series of images in the scene may include using a convolutional neural network (CNN) model to identify the primary objects in each selected frame. In some aspects, performing the text extraction within the bounding box may include using optical character recognition (OCR) to perform text extraction within the bounding box.

Some aspects may include using a large generative artificial intelligence model (LXM) or another natural language processing (NLP) technique to covert non-Latin characters in the extracted text and complete incomplete data. Some aspects may include using predictive text and word completion techniques for a partially obscured or incomplete text in the extracted text. Some aspects may include retrieving external data from an external source for product identification, in which querying the database to identify the ToIs based on the extracted text and the determined object attributes includes querying the database to identify the ToIs based on the extracted text, the determined object attributes, and the retrieved external data. Some aspects may include generating signatures for ToIs with non-textual or obscure labels and using signatures to search and update a ToI knowledge repository.

Further aspects may include a computing device having at least one processor or processing system configured with processor-executable instructions to perform various operations corresponding to the methods discussed above. Further aspects may include a computing device having various means for performing functions corresponding to the method operations discussed above. Further aspects may include a non-transitory processor-readable storage medium having stored thereon processor-executable instructions configured to cause at least one processor or processing system to perform various operations corresponding to the method operations discussed above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

FIGS. 5A-5C illustrate example graph stacking information structures that may be used to correlate and/or evaluate various attributes in accordance with some embodiments.

FIG. 9A-9C illustrate example table information structures that include concise, query-centric insights that may be used for strategic decision-making by entities and/or the media analytic platform in accordance with some embodiments.

FIGS. 22A-22G are component diagrams that illustrate search results and media content analysis in accordance with some embodiments.

FIGS. 25A and 25B are component diagrams that illustrate how searches may be saved, and alerts created, in accordance with some embodiments.

FIGS. 27A and 27B are component diagrams that illustrate the creation of various rules relating to media content in accordance with some embodiments.

DESCRIPTION

Figure 1:
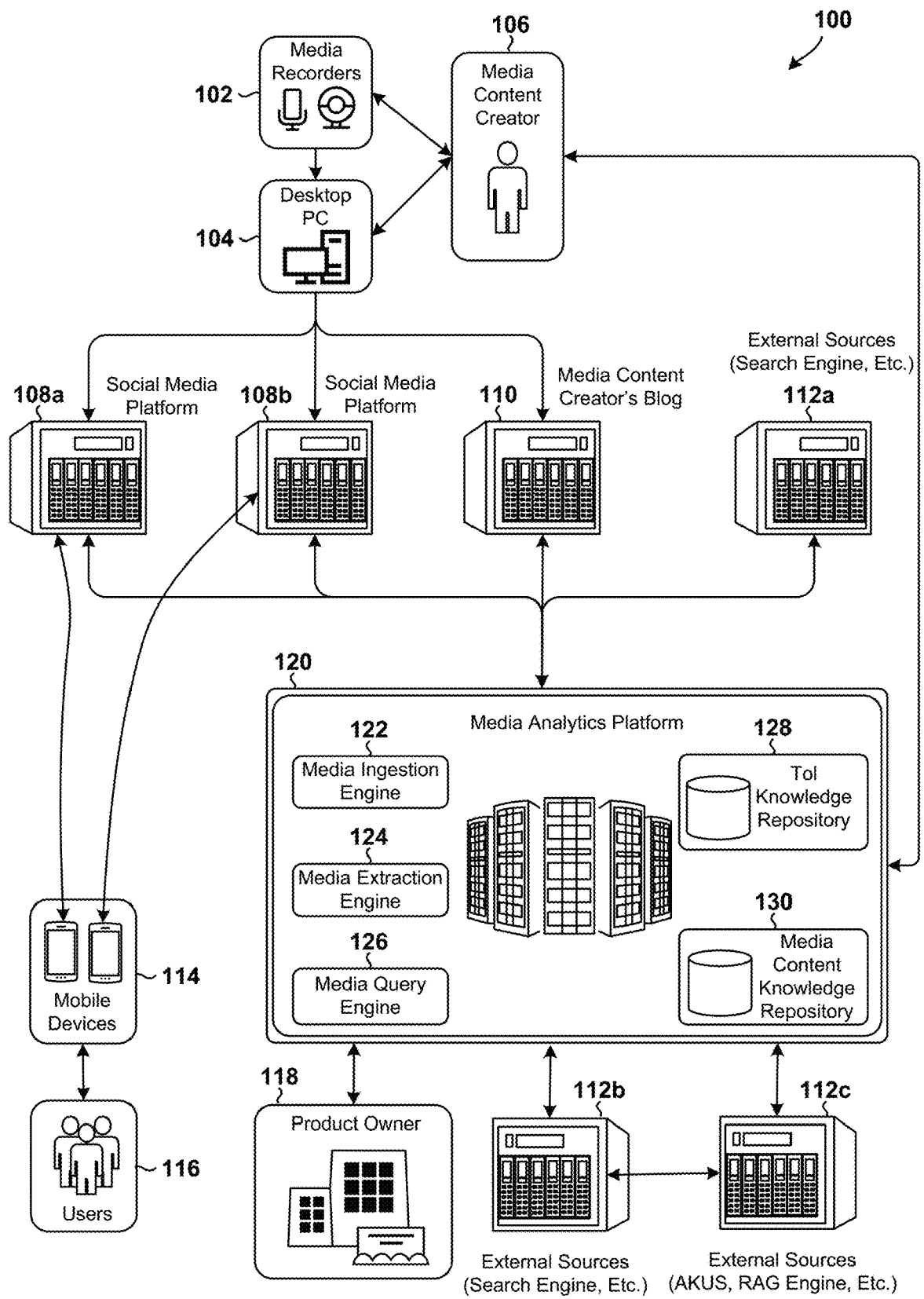
FIG. 1 is a system diagram illustrating various components in a system configured to implement a media analytics platform that uses ML/AI to evaluate media content in accordance with the various embodiments.

The various embodiments may be described in detail with reference to the accompanying drawings. Wherever possible, the same reference numbers may be used throughout the drawings to refer to the same or like parts. References made to particular examples and implementations are for illustrative purposes and are not intended to limit the scope of the invention or the claims.

The word "exemplary" may be used herein to mean "serving as an example, instance, or illustration". Any implementation described herein as "exemplary" is not necessarily to be construed as preferred or advantageous over other implementations.

For the sake of clarity and ease of presentation, the methods herein (e.g., 400, 450, 600, 670, 700, 750, 770, 800, 850, etc.) are presented as separate embodiments. While each method is delineated for illustrative purposes, it should be clear to those skilled in the art that various combinations or omissions of these methods, blocks, operations, etc. could be used to achieve a desired result or a specific outcome. It should also be understood that the descriptions herein do not preclude the integration or adaptation of different embodiments of the methods, blocks, operations, etc. to produce a modified or alternative result or solution. The presentation of individual methods, blocks, operations, etc. should not be interpreted as mutually exclusive, limiting, or as being required unless expressly recited as such in the claims.

The term "computing device" may be used herein to refer to any or all of server computing devices, personal computing devices, desktop computers, workstations, laptops, netbooks, Ultrabooks, tablets, smartphones, personal data assistants (PDAs), palm-top computers, wearable devices (e.g., smartwatches, fitness trackers, AR glasses, head-mounted displays, earbuds, smart clothing, etc.), multimedia-enabled mobile devices, Internet of Things (IoT) devices (e.g., smart TVs, speakers, locks, lighting systems, switches, doorbell cameras, and security systems, etc.), connected vehicles, audio devices (e.g., HomePod™, Echo™, etc.), gaming systems (e.g., PlayStation™, Xbox™, Nintendo Switch™, etc.), media players (e.g., Roku™, Apple TV™, etc.) digital video recorders (DVRs), and other similar devices that include a memory and programmable processor for providing the functionality described herein.

The term "processing system" may be used herein to refer to one or more processors, including multi-core processors, that are organized and configured to perform various computing functions. Various embodiment methods may be implemented in one or more of multiple processors within a processing system as described herein.

The term "web browser" may be used herein to refer to a software and/or hardware client on a computing device that is configured to retrieve web resources from a web server. As an example, a web browser may be a mobile or desktop software application operating on a processor of a computing device that utilizes a display for user interaction. As further examples, a web browser may be a component embedded within a mobile or desktop application on the computing device, or a software module running on a server without any display capabilities in a data center (often referred to as an "automated web browser," a "headless browser" or a "headless server"). A web browser may be an audio device that retrieves web resources from a web server and subsequently presents the information included in the web resources to a user in an audio format (e.g., by reading parts of the web resources, etc.). The audio device may be capable of receiving voice instructions from a user, and subsequently converting these into a format that can be sent to the web server. Examples of such web browsers/clients include Apple's Siri on HomePod, Amazon's Alexa on Echo, and Google Assist on Nest. In some embodiments, a web browser may be part of a vehicle, and it may interact with the driver using the vehicle's existing hardware (e.g., information may be presented to the driver using a heads-up display, the driver may provide instructions using buttons on the steering wheel, etc.). The web browser may be a headset device (e.g., smart glasses) that is used to present the user with an augmented reality (AR) environment and/or a virtual reality (VR) environment. Such headset devices are becoming increasingly popular in the context of eCommerce (e.g., AR may be used to digitally place a piece of furniture into a real scene so that the potential purchaser can see how it will look, VR may be used to allow a user to inspect a life-size model of a new car, etc.). In some embodiments, a web browser may be a software application that emulates any of the web browser types described herein. In some embodiments, the web browser may include a website analysis system.

The terms "machine learning algorithm," "artificial intelligence model" and the like may be used herein to refer to any of a variety of information structures that may be used by a computing device to perform a computation or evaluate a specific condition, feature, factor, dataset, or behavior on a device. Examples of machine learning (ML) algorithms include network models, neural network models, inference models, neuron models, classifiers, random forest models, spiking neural network (SNN) models, convolutional neural network (CNN) models, recurrent neural network (RNN) models, deep neural network (DNN) models, generative network models, ensemble networks, generative adversarial networks, and genetic algorithm models. In some embodiments, a machine learning algorithm may include an architectural definition (e.g., the neural network architecture, etc.) and one or more weights (e.g., neural network weights, etc.).

The term "neural network" may be used herein to refer to an interconnected group of processing nodes (or neuron models) that collectively operate as a software application or process that controls a function of a computing device and/or generates an overall inference result as output. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and output data. A neural network may learn to perform new tasks over time by adjusting these weight values. In some cases, the overall structure of the neural network and/or the operations of the processing nodes do not change as the neural network learns a task. Rather, learning is accomplished during a "training" process in which the values of the weights in each layer are determined. As an example, the training process may include causing the neural network to process a task for which an expected/desired output is known, comparing the activations generated by the neural network to the expected/desired output, and determining the values of the weights in each layer based on the comparison results. After the training process is complete, the neural network may begin "inference" to process a new task with the determined weights.

The term "inference" may be used herein to refer to a process that is performed at runtime or during execution of the software application program corresponding to the machine learning algorithm. Inference may include traversing the processing nodes in a network (e.g., neural network, etc.) along a forward path (which may include some backwards traversals) to produce one or more values as an overall activation or overall "inference result".

The term "deep neural network" may be used herein to refer to a neural network that implements a layered architecture in which the output/activation of a first layer of nodes becomes an input to a second layer of nodes, the output/activation of a second layer of nodes becomes an input to a third layer of nodes, and so on. As such, computations in a deep neural network may be distributed over a population of processing nodes that make up a computational chain. Deep neural networks may also include activation functions and sub-functions between the layers. The first layer of nodes of a multilayered or deep neural network may be referred to as an input layer. The final layer of nodes may be referred to as an output layer. The layers in-between the input and final layer may be referred to as intermediate layers.

The term "convolutional neural network" (CNN) may be used herein to refer to a deep neural network in which the computation in at least one layer is structured as a convolution. A convolutional neural network may also include multiple convolution-based layers, which allows the neural network to employ a very deep hierarchy of layers. In convolutional neural networks, the weighted sum for each output activation is computed based on a batch of inputs, and the same matrices of weights (called "filters") are applied to every output. These networks may also implement a fixed feedforward structure in which all the processing nodes that make up a computational chain are used to process every task, regardless of the inputs. In such feed-forward neural networks, all of the computations are performed as a sequence of operations on the outputs of a previous layer. The final set of operations may generate the overall inference result of the neural network, such as a probability that an image contains a specific object (e.g., a person, cat, watch, edge, etc.) or information indicating that a proposed action should be taken.

The term "recurrent neural network" (RNN) may be used herein to refer to a class of neural networks particularly well-suited for sequence data processing. Unlike feedforward neural networks, RNNs may include cycles or loops within the network that allow information to persist. This enables RNNs to maintain a "memory" of previous inputs in the sequence, which may be beneficial for tasks in which temporal dynamics and the context in which data appears are relevant.

The term "long short-term memory network" (LSTM) may be used herein to refer to a specific type of RNN that addresses some of the limitations of basic RNNs, particularly the vanishing gradient problem. LSTMs include a more complex recurrent unit that allows for the easier flow of gradients during backpropagation. This facilitates the model's ability to learn from long sequences and remember over extended periods, making it apt for tasks such as language modeling, machine translation, and other sequence-to-sequence tasks.

The term "transformer" may be used herein to refer to a specific type of neural network that includes an encoder and/or a decoder and is particularly well-suited for sequence data processing. Transformers may use multiple self-attention components to process input data in parallel rather than sequentially. The self-attention components may be configured to weigh different parts of an input sequence when producing an output sequence. Unlike solutions that focus on the relationship between elements in two different sequences, self-attention components may operate on a single input sequence. The self-attention components may compute a weighted sum of all positions in the input sequence for each position, which may allow the model to consider other parts of the sequence when encoding each element. This may offer advantages in tasks that benefit from understanding the contextual relationships between elements in a sequence, such as sentence completion, translation, and summarization. The weights may be learned during the training phase, allowing the model to focus on the most contextually relevant parts of the input for the task at hand. Transformers, with their specialized architecture for handling sequence data and their capacity for parallel computation, often serve as foundational elements in constructing large generative AI models (LXM).

The term "large generative AI model" (LXM) may be used herein to refer to an advanced computational framework that includes any of a variety of specialized AI models including, but not limited to, large language models (LLMs), large speech models (LSMs), large/language vision models (LVMs), vision language models (VLMs)), hybrid models, multi-modal models, and large positioning models (LPMs). LPMs may be particularly useful for media technologies that operate in multidimensional spaces such as extended reality (XR), which includes virtual reality (VR), augmented reality (AR), and mixed reality (MR). LPMs may extend beyond traditional two-dimensional frameworks by incorporating additional axes for analysis, including spatial positioning and interaction within virtual environments.

An LXM may include multiple layers of neural networks (e.g., RNN, LSTM, transformer, etc.) with millions or billions of parameters. Unlike traditional systems that translate user prompts into a series of correlated files or web pages for navigation, LXMs support dialogic interactions and encapsulate expansive knowledge in an internal structure. As a result, rather than merely serving a list of relevant websites, LXMs are capable of providing direct answers and/or are otherwise adept at various tasks, such as text summarization, translation, complex question-answering, conversational agents, etc. In various embodiments, LXMs may operate independently as standalone units, may be integrated into more comprehensive systems and/or into other computational units (e.g., those found in a SoC or SIP, etc.), and/or may interface with specialized hardware accelerators to improve performance metrics such as latency and throughput. In some embodiments, the LXM component may be enhanced with or configured to perform an adaptive algorithm that allows the LXM to better understand context information, spatial positioning and interaction within virtual environments, evaluating weights of connections between nodes in a feature graph, etc. In some embodiments, the adaptive algorithms may be performed by the same processing system that manages the core functionality of the LXM and/or may be distributed across multiple independent processing systems.

The terms "contextualized query" and "contextualized query response" may be used herein to refer to a query or query response that has been augmented with additional contextual data or metadata to improve the relevance and specificity of information contained therein. For example, some embodiments may include components configured to generate and send a contextualized query to an external system (e.g., knowledge database, LXM, etc.) to receive a contextualized query response.

The term "relevance model" may be used herein to refer to a computational unit or LXM trained to evaluate the importance or pertinence of various elements within a given set of data.

The term "feature space" may be used herein to refer to a multi-dimensional space or information structure in which each dimension represents a specific feature or attribute of the data being analyzed. Each data point (e.g., object, event, observation, etc.) may be represented as a vector in this multi-dimensional space/structure. The dimensions of the feature space may correspond to the features of the dataset, which may include various properties or characteristics of the data points. For example, in a dataset of images, features might include color histograms, texture, shape descriptors, etc.

The term "feature graph" may be used herein to refer to a sophisticated information structure that represents the relationships and interactions between different data points and their features as nodes and edges in a graph. The nodes typically represent data points or features, and edges represent the relationships or dependencies between them. A feature graph may represent the relationships and interactions between different data points and features and may be particularly useful in complex data sets in which the relationships between features are as important as the features themselves. Some embodiments may include components configured to use neural networks to analyze and interpret the relationships and attributes of data within a multidimensional feature space, and then use a feature graph to represent and understand the complex interactions between these data points.

The term "embedding layer" may be used herein to refer to a specialized layer within a neural network, typically at the input stage, that transforms continuous or discrete categorical values or tokens into feature spaces or continuous, high-dimensional vectors. An embedding layer may also transform high-dimensional data into low-dimensional vectors (e.g., using "dimensionality reduction" techniques, etc.), which may be particularly useful when the original data is complex or too large to handle efficiently. In some embodiments, the embedding layer may convert tokens (typically low-dimensional entities) into high-dimensional vectors, feature spaces, and/or feature graphs. An embedding layer may operate as a lookup table in which each unique token or category is mapped to a point in a continuous vector space. The vectors may be refined during the model's training phase to encapsulate the characteristics or attributes of the tokens in a manner that is conducive to the tasks the model is configured to perform.

The term "token" may be used herein to refer to a unit of information that an LXM may read as a single input during training and inference. Each token may represent any of a variety of different data types. For example, in text-centric models such as in LLMs, each token may represent a one or more textual element such as a paragraph(s), sentence(s), clause(s), word(s), sub-word(s), character(s), etc. In models designed for auditory data, such as LSMs, each token may represent a feature extracted from audio signals, such as a phoneme, spectrogram, temporal dependency, Mel-frequency cepstral coefficients (MFCCs) that represent small segments of an audio waveform, etc. In visual models such as LVM, each token may correspond to a portion of an image (e.g., pixel blocks), sequences of video frames, etc. In hybrid systems that combine multiple modalities (text, speech, vision, etc.), each token may be a complex data structure that encapsulates information from various sources. For example, a token may include both textual and visual information, each of which independently contributes to the token's overall representation in the model.

Each token may be converted into a numerical vector via the embedding layer. Each vector component (e.g., numerical value, parameter, etc.) may encode an attribute, quality, or characteristic of the original token. The vector components may be adjustable parameters that are iteratively refined during the model training phase to improve the model's performance during subsequent operational phases. The numerical vectors may be high-dimensional space vectors (e.g., containing more than 300 dimensions, etc.) in which each dimension in the vector captures a unique attribute, quality, or characteristic of the token. For example, dimension 1 of the numerical vector may encode the frequency of a word's occurrence in a corpus of data, dimension 2 may represent the pitch or intensity of the sound of the word at its utterance, dimension 3 may represent the sentiment value of the word, etc. Such intricate representation in high-dimensional space may help the LXM understand the semantic and syntactic subtleties of its inputs. During the operational phase, the tokens may be processed sequentially through layers of the LXM or neural network, which may include structures or networks appropriate for sequence data processing, such as transformer architectures, recurrent neural networks (RNNs), or long short-term memory networks (LSTMs).

The term "sequence data processing" may be used herein to refer to techniques or technologies for handling ordered sets of tokens in a manner that preserves their original sequential relationships and captures dependencies between various elements within the sequence. The resulting output may be a probabilistic distribution or a set of probability values, each corresponding to a "possible succeeding token" in the existing sequence. For example, in text completion tasks, the LXM may suggest the possible succeeding token determined to have the highest probability of completing the text sequence. For text generation tasks, the LXM may choose the token with the highest determined probability value to augment the existing sequence, which may subsequently be fed back into the model for further text production.

The term "weak supervision" may be used herein to refer to a machine learning technique that uses noisy, limited, or imprecise sources of training data (as opposed to strong supervision techniques that require large sets of accurately labelled data). Systems that use weak supervision may learn from (and generate AI/ML models using) datasets that are less detailed, partially labelled, or otherwise not comprehensive or fully annotated. Some embodiments may include components (e.g., media analytics platform, etc.) configured to perform weak supervision operations, which may include constructing a training dataset based on weak, incomplete, or imprecise data and data sources (e.g., heuristic rules, approximate labels, data from related tasks, etc.). The components may perform weak supervision operations to, for example, learn from a wide array of preloaded images and brand associations that are not exhaustively labelled but may be used to extract valuable information for training the AI models.

The term "topic-of-interest" (ToI) may be used herein to refer to refer to a wide array of subjects that attract consumer or public attention, including a "product" or any of a variety of different types of goods (e.g., pet food, cosmetics, buildering materials, etc.), tangible objects (e.g., pets, fruit, models, etc.), services (e.g., eye tests, train journeys, etc.), topics (e.g., current affairs such as "Covid," significant events such as the "World Cup final," specific interests such as "Valentine's Day gifts for him," etc.), public figures and celebrities (e.g., musicians, athletes, actors, etc.), events of global or local significance (e.g., reaction to a speech by a world leader, a natural disaster, etc.), information (e.g., news articles, academic papers, etc.) that may be offered to consumers, lifestyle and cultural trends, health and wellness topics, technological advancements and innovations, educational content, entertainment content (e.g., movies, TV shows, online streaming series, books, theatre productions, etc.). These ToIs may be referred to by generic names (e.g., "mobile phone," "chewing gum," "electric car," etc.) or specific brand names (e.g., "iPhone," "Wrigley's Spearmint," "Tesla Model S," etc.) as they appear in consumer discussions and media content.

For ease of reference, to improve readability, and to focus the discussion on the most relevant features, some of the embodiments below are discussed with reference to a "product," which encompasses goods and tangible objects as well as services, topics, public figures and celebrities, events of global or local significance, information, etc. As such, it should be understood that the embodiments are applicable to any of a wide variety of content elements, topics-of-interest, services, etc. Accordingly, nothing in this application should be used to limit the claims to physical products, goods, tangible objects, etc. unless expressly recited as such in the body of the claims.

The terms "ToI knowledge repository" and "product knowledge repository" may be used herein to refer to one or more data structures that collectively store information relating to ToIs or products. This information may include ToI/product attributes, metadata relating to the creation of the ToI/product information, and relationships between products and/or ToIs.

The term "media content" may be used herein to refer to any audio content, video content, or mixed media content. Audio content may include any content that includes auditory elements. Examples of audio content include Podcasts, streaming music, audio broadcasts (e.g., radio, etc.), audio-books, music recordings, walkie-talkie type communications such as push-to-talk clips, HTML5 audio elements, etc. Video content may include any content that includes visual elements. Examples of video and mixed media content include images image frames, movies, television shows, streaming content on platforms such as Netflix®, Hulu®, YouTube®, Instagram®, and TikTok®, social media posts, "Unboxing" videos, tutorials, how-to guides, Vlogs, personal video diaries, music videos, news clips and broadcasts, webinars, live streamed events (e.g., concerts, sports matches, etc.), video game streams, extended reality (XR) media, virtual reality (VR) simulations, augmented reality (AR) experiences, etc. Each of these types of media content may be subjected to analysis in terms of audience engagement, content trends, thematic elements, technical quality, etc. making them relevant subjects in the realm of media analytics. Examples of media content technologies include advanced audio coding (AAC), waveform audio file format (WAV), MPEG-2 Audio Layer III (MP3), WebM, joint photographic expert group (JPEG), moving picture expert group (MPEG), audio video interleave (AVI), MPEG-4 Part 14 (MP4), flash video (FLV), advanced systems format (ASF), etc.

Figure 2A:
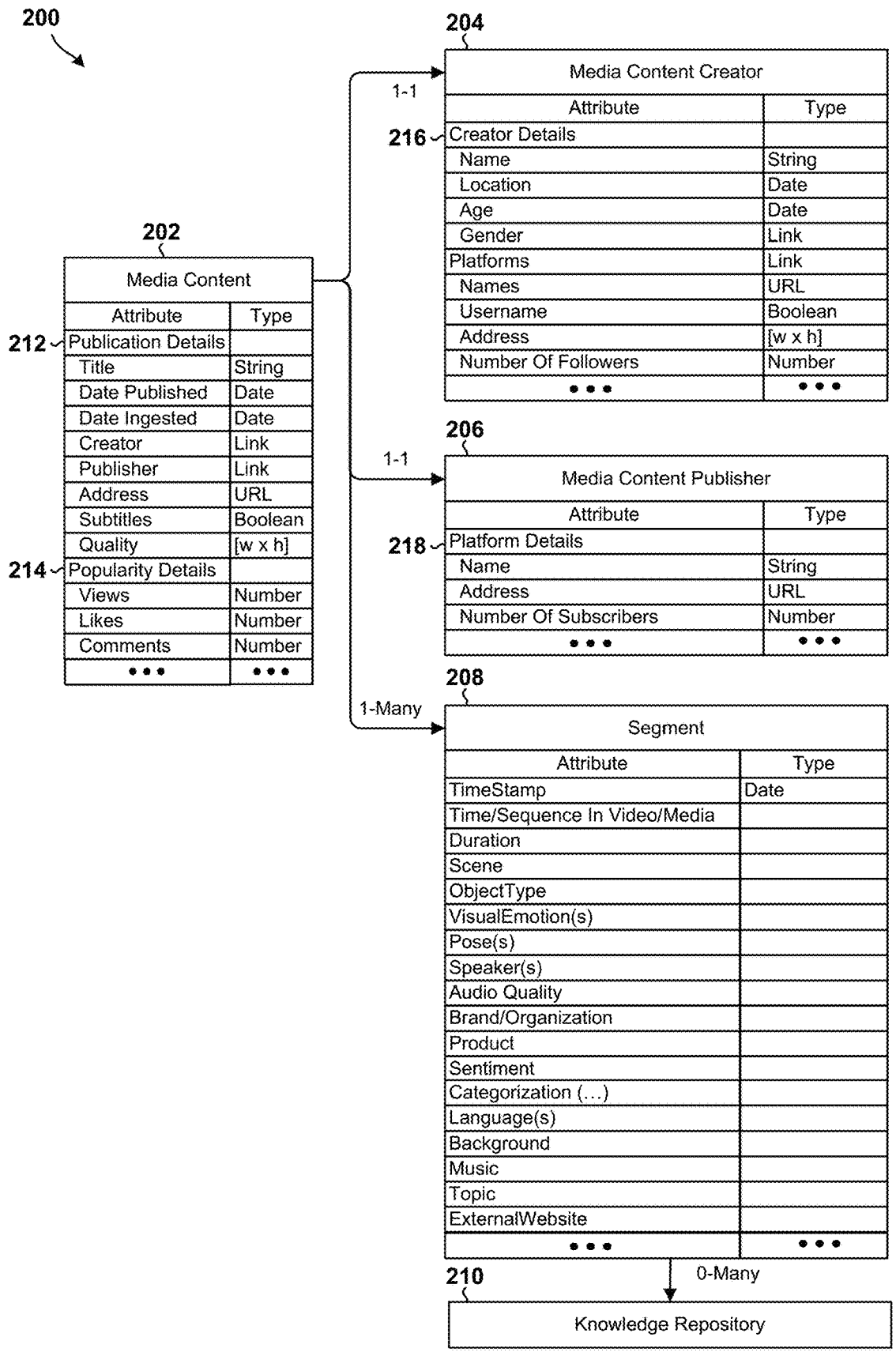
FIGS. 2A and 2B are block diagrams that illustrate example information structures that could be generated and used by the media analytics platform to implement various embodiments.

The term "media content details" may be used herein to refer to information or details related to a distinct pieces of media content and/or which are suitable for inclusion in a media content record (e.g., the media content record 202 as illustrated in FIG. 2A, etc.). Media content details may include information for various elements and attributes such as origin, publication specifics, creator and publisher identity, hosting location, availability of subtitles, and resolution quality. The media content details may be used to profile and/or determine the characteristics of each section, subsection, or frame in a media content.

The term "media content metadata" may be used herein to refer to auxiliary information associated with media content that could be used for its identification, analysis, categorization, contextualization, etc. Media content metadata may include, but is not limited to, data regarding the date of publication, content popularity metrics (e.g., views, likes, comments, etc.), engagement statistics, and any tags or keywords associated with the content. Media content metadata may be used, for example, to analyze and quantify the public reception and interaction with the media content. As another example, a media analytics platform may use media content metadata for the aggregation and analysis of media impacts or trends.

The terms "media segment" and "media content segment" may be used herein to refer to discrete portions of media content, such as a section of a video, an audio clip within a podcast, or a frame within a movie. Media segments may be characterized by distinct attributes such as timestamps, sequence order, duration, and specific content elements (e.g., products, objects, scene settings, visual emotions, etc.). Media segments may be used to narrow the search space and/or to focus on analysis of specific aspects, features, characteristics, content elements, etc. of the media content.

The term "segment content" may be used herein to refer to the actual content within a media content or media content segment. Segment content may be or may include visual imagery, spoken words, background audio, and any other sensory elements present in a media segment. Some embodiments may include components configured to analyze and use the segment content to, for example, identify key features, brand mentions, product placements, specific messages conveyed, determine the thematic and emotional tone of the segment, etc.

The term "common parts" may be used herein to refer to recurring themes, subjects, patterns, or elements found across different media segments or pieces of media content. Common parts may include repeated visual symbols, audio motifs, narrative themes, or stylistic elements that provide insight into the overarching message, branding strategy, or stylistic approach of the media content.

The term "video component" may be used herein to refer to the visual elements of media content, including all imagery, text, and graphics displayed. Some embodiments may include components configured to analyze the video component to determine, for example, the visual appeal, message conveyance, and audience engagement associated with a media content. Analysis of the video component may include examining visual clarity, color composition, object recognition, and scene analysis.

The term "audio component" may be used herein to refer to the auditory elements of media content, including spoken dialogue, background music, sound effects, and ambient sounds. Some embodiments may include components configured to analyze the audio component to determine, for example, its impact on mood, number of speakers present, clarity of its auditory communication, etc. Analysis of the audio component may include speech recognition, audio quality assessment, music identification, and emotional tone analysis.

The term "scene" may be used herein to refer to a collection of images or other media or objects that exhibit an identifiable pattern, which may be used to identify objects or elements persisting across the timespan of a series of images. Scene analysis may include techniques such as pattern recognition, object tracking, and thematic clustering to identify and categorize scenes across different media segments or frames. Some embodiments may include components configured to identify, generate, and/or use scenes for contextual analysis of media content, for tracking the presence and evolution of specific objects, characters, or themes across different media segments, determining the narrative, thematic development, or visual storytelling of the media content, etc. A scene may include a visual backdrop and/or a continuity or a thematic consistency within a sequence of media content. For example, a scene may be characterized by recurring visual themes such as a specific landscape, architectural style, or consistent colour scheme in a dataset that includes multiple images or video frames, or by recurrent sound patterns, musical themes, or ambient noises that persist over time in audio or mixed media content.

The term "media content publisher" may be used herein to refer to any entity that makes media content available on the Internet (e.g., "influencers," etc.). Generally, media content publishers may publish their media content on their websites (e.g., eCommerce websites) or one or more social media platforms (e.g., TikTok, Instagram, BeReal). Examples of such media content publishers include individual bloggers who post articles and videos on their websites, eCommerce platforms showcasing product-related content, companies sharing promotional or informational content on their corporate sites, social media influencers and content creators on platforms such as YouTube®, TikTok®, Instagram®, etc. who produce and share a variety of content ranging from lifestyle to educational materials. Each of these entities, for example, disseminates content across various digital channels and/or directly engages their audiences, and thus is subjected to analysis in terms of audience engagement, content trends, etc. Accordingly, some embodiments may include components configured to generate and/or use media content publisher information structures (e.g., database records, vectors, etc.) that characterize the media content publisher via a plurality of attributes, attribute values, and/or attribute-value-pairs.

The terms "media content producer" and "media content creator" may be used herein to refer to any entity that creates media content, and may include a wide range of influencers, sponsored individuals, social media users, and other influential figures. These media content producers, who often double as publishers, may play an important role in shaping consumer behaviour and opinions across various platforms. Media content producers may include influencers on social media platforms such as Instagram®, TikTok®, and YouTube®, who engage in brand partnerships and content creation that resonates with specific audiences. Sponsored individuals, such as athletes endorsed by brands like Nike, may produce content that integrates personal experiences with products, lending authenticity to their media. Celebrities also contribute by extending their influence beyond their primary fields into content creation. Additionally, ordinary social media users and creators of viral videos may significantly impact product sales and trends, even without a large follower base, by producing content that resonates with specific communities or becomes widely shared. Each of these entities, for example, is involved with the conceptualization, creation, and/or production of media content and thus may be analyzed for audience engagement, content trends, and other similar factors. Accordingly, some embodiments may include components configured to generate and/or use media content creator information structures (e.g., database records, vectors, etc.) that characterize a media content producer/creator via a plurality of attributes, attribute values, and/or attribute-value-pairs.

The term "contextual distance" may be used herein to refer to a relative metric that quantifies the similarity between two pieces, portions, or segments of media content. Some embodiments may include components configured to compute a contextual distance value using a weighted combination of various factors. These factors may include the time elapsed between the creation or publication of the content, the geographical distances between the locations of the content publishers, whether the same social media platform was used for publishing, the language of the media content, etc.

For example, the component may calculate the contextual distance by first assessing the time gap between the publication dates of two pieces of content. A shorter interval typically suggests greater similarity, especially if the content pertains to trending topics. The component may also evaluate the geographical proximity of the publishers. Closer locations may imply a shared cultural or regional influence, and thus greater similarity. The component may also evaluate the platform used for publication. Content published on the same platform may cater to similar audiences and indicate a closer contextual relationship, and thus may suggest greater similarity. The component may also evaluate the language used. Content in the same language suggests greater similarity than content in different languages. The component may assign weights to each of these factors based on their relevance and combine them to generate a final contextual distance value that quantitatively represents how closely related two pieces of media content are in context.

The term "sentiment" may be used herein to refer to a metric or relative score for a ToI (e.g., product, etc.) that indicates how much the product is "liked" or the degree to which a product is regarded positively or negatively in the media content (e.g., by the media content publisher who is reviewing the product, etc.). For example, a sentiment value may quantify and/or assess public perceptions and reactions to a product or the level of approval or disapproval expressed by a media content publisher reviewing the product. Some embodiments may include components configured to determine the sentiment value based on various elements within the content, such as the language used, tone, and/or non-verbal cues in visual media. In some embodiments, the sentiment value may be "positive," "negative," or "neutral."

The term "media impact score" may be used herein to refer to an information structure or metric that includes or combines a trend score and a trust score of the media content. The media impact score may provide a holistic or full assessment of the current popularity of the media content and its consistency or authenticity relative to similar content. Some embodiments include components configured to generate and/or use the media impact score to determine how well the media content aligns with both current market trends and established content patterns. As such, the media impact score may be an important and powerful resource for understanding the broader impact and reliability of media content in various contexts.

The term "trend score" may be used herein to refer to an information structure or a metric that quantifies the popularity or market awareness of a ToI (e.g., product, topic, media content creator, publisher, etc.). For example, a product trend score may measure or indicate the popularity of the product (e.g., are there many media content publishers currently producing media content that refers to the product?). As another example, a media content publisher trend score may measure or indicate the level of market awareness or influence of the media content publisher (e.g., is the media content publisher a "leader" that publishes media content that refers to products before other media content publishers or is the media content publisher a "follower" that publishes media content that refers to products after other media content publishers?). Some embodiments may include components configured to determine the trend score based on quantitative indicators such as the number of views, likes, reposts, and replies. A high trend score may indicate, for example, a significant level of public interest or engagement with the content. As such, the trend score may be an important and powerful resource for identifying current trends, influential topics, popular media content creators, etc.

The terms "trust score," "authenticity signature," "authenticity score," and "fingerprint" may be used herein to refer to an information structure or metric that quantifies the consistency or authenticity of media content in relation to a group of related contents. The trust score may measure how closely a new piece of media content adheres to the style, themes, and quality of previous content from the same creator or within the same category. The trust score may also provide insights into the reliability and genuineness of the content. A high trust score may indicate a strong alignment with established patterns and a high probability of authenticity and consistency. On the other hand, a low trust score may indicate or identify deviations or anomalies that could impact the content's perceived credibility, authenticity, consistency, reliability, etc.

The terms "product owner," "product manufacturer," "distributor," "reseller," and "retailer" may be used herein to refer to entities or components that are vested or have an interest in the representation and perception of their products, as well as those of their competitors, within various forms of media content. All these components or entities may be interested in promoting and advertising their products and services (e.g., as part of a paid review, by placing advertisements in proximity to the new media formats). For example, a product owner may be an entity that holds the rights or ownership of a product and is generally primarily concerned with how their product is perceived in the market and/or understanding the portrayal and reception of their product in media content. A product manufacturer may be an entity that is responsible for producing the physical product and is generally primarily interested in gauging public opinion, the visibility of their products in media, and other factors that could influence manufacturing decisions and marketing strategies. A distributor may be an entity that operates as an intermediary that moves products from manufacturers to the market and is generally primarily interested in understanding market trends, demand patterns, the effectiveness of marketing strategies across different channels, etc. A reseller may be an entity that purchases products to sell to the end consumer and is generally primarily interested in gauging consumer interests and preferences to inform their purchasing and sales strategies. A retailer may be an entity that sells products directly to consumers and is generally primarily interested in how products (including those of their competitors) are represented in media and understanding consumer perceptions and trends to optimize sales and marketing efforts. Each of these entities may, for example, gain valuable insights into consumer behaviour, market trends, the competitive landscape, etc. by analysing media content and thus may benefit from the various embodiments. Some embodiments may include components configured to generate and/or use product owner, product manufacturer, distributor, reseller, and/or retailer information structures (e.g., database records, vectors, etc.) that characterize their corresponding entity via a plurality of attributes, attribute values, and/or attribute-value-pairs.

The term "extended reality (XR)" may be used herein to refer to any of a variety of sense-enhancing technologies, including virtual reality (VR), augmented reality (AR), mixed reality (MR), and other technologies for processing, manipulating or presenting digital output (e.g., images, text, sounds, haptic feedback, tactile output, etc.) in two or three dimensions. For example, an XR application may be a virtual reality application that simulates a user's physical presence in a virtual environment, incorporating the temporal dimension and spatial positioning within that environment. An XR application may also be an augmented reality application that combines real-world images from a user's physical environment with computer-generated imagery, presenting images and information about people and/or objects to the user superimposed on the visual world as an augmented scene (and adding a spatial dimension). As yet another example, an XR software application may be a mixed reality application that merges real and virtual worlds to produce new environments and visualizations in which physical and digital objects co-exist and interact in real time (and including both temporal and spatial dimensions).

For ease of reference, to improve readability, and to focus the discussion on the most relevant features, some of the embodiments below are discussed with reference to "video" or "media," which encompasses XR and traditional two-dimensional media. However, it should be understood that the embodiments are applicable to a wide variety of media technologies, including those that operate in multidimensional spaces such as VR, AR, and MR. These technologies extend beyond traditional two-dimensional frameworks by introducing additional axes for analysis, such as spatial positioning and interaction in virtual environments. Accordingly, nothing in this application should be used to limit the claims to videos unless expressly recited as such in the body of the claims.

The various embodiments include computing devices equipped with components configured to monitor and search media content published by media content publishers to determine media impact scores for products and/or media content publishers. This enables product owners to answer questions like the following: who has talked about the product in the last 14 days?; were good things said about the product?; what was said about the product in the media content that generated the most discussion?; what is the current media impact score for the type of product?; what other products were discussed in the media content that contained negative comments about the product?; which media content publisher, who has previously produced media content relating to similar products, has the highest media impact score?; which media content publisher has the largest audience?; is the media content publisher affiliated with websites associated with competitors; is the media content publisher associated with topics and/or demographics that are damaging to the product?; what is the best time (e.g., hour in day, day in week, week in year, etc.) to publish new media content relating to a product?; and which media content publishers create media content with positive sentiments?

For example, the components may be configured to determine and evaluate recent discussions, quality of mentions, impactful media content, current trend/trust score, context of negative comments, influential publishers, publisher audience size, publisher affiliations, publisher associations, optimal timing for content release, positive sentiment publishers, etc. As a more detailed example, the components may identify who has mentioned the product in the last 14 days, determine whether the product received positive reviews or feedback in these discussions, determine and evaluate what was said in the most discussed media content about the product, determine the present media impact score for the product type, determine and evaluate other products mentioned in content that contained negative remarks about the product, identify media content publishers with a history of discussing similar products that have the highest media impact scores, determine which media content publisher has the largest audience, determine whether the media content publisher is linked with websites associated with competitors, determine whether the publisher is connected with topics or demographics potentially harmful to the product, determine the best time (hour, day, week, etc.) to publish new media content about the product, and/or identify media content publishers who generally create content with positive sentiments about products.

In some embodiments, the components may be configured to analyze products to recognize logos and identify brands.

For example, in some embodiments, the components may be configured to receive or capture an image of a product, use convolutional neural networks (CNNs) to analyze the captured image and determine the product's shape, categorize the product's shape into predefined categories (e.g., box, carton, bottle, etc.), use optical character recognition (OCR) algorithms to detect and interpret text on the product's packaging or shape, and query a database of known shape-brand correlations using the categorized product shape and/or identified text as search parameters that filter out potential brand matches that do not align with the categorized product shape and/or otherwise reduce the number of records examined in the shape-brand correlations database. The components may use image recognition techniques that target the remaining subset of potential logos to detect the presence or likelihood of a logo on the product (even if partially obscured), capture a high-resolution image of a detected logo, input the captured logo image into a search engine (general or specialized for logo recognition), retrieve search results related to the input logo image, apply advanced image processing techniques on the search results (e.g., convert images to grayscale, normalize colors, and apply edge detection algorithms to emphasize shapes and defining features, etc.), use pattern recognition algorithms to identify recurring shapes or elements in the logos from search results, select the logo with the clearest representation of common features across variations, select the most distinctive version of the logo (e.g., based on the frequency and clarity of the common feature present in various logo iterations, etc.), use AI models trained on a large dataset of brand logos to confirm the brand associated with the product, and use the identified distinctive features to handle variations and/or partial obstructions in logos. The components may generate an output that includes the categorized shape of the product, detected text (if any) and its interpretation, the identified brand based on shape-brand correlation, the confirmed brand based on logo recognition and analysis, and any additional relevant information derived from the analysis.

In some embodiments, the components may use image recognition techniques (pattern recognition, geometric analysis, etc.) to compare the observed shape of the product against a predefined list of shapes and/or categorize the basic form of the product into a predefined shape. Examples of the predefined shapes include, but are not limited to, a bell, bottle, box, capsule, carton, cone, cube, cylinder, diamond, ellipsoid, heart, heptagon, hexagon, horseshoe, octagon, parallelogram, pentagon, pyramid, rhombus, sphere, trapezoid, triangle (e.g., isosceles, equilateral, right, acute, obtuse, etc.), animal shapes (e.g., fish, bird, cat, etc.), furniture shapes (e.g., chair, table, lamp), and vehicle shapes (e.g., car, airplane, ship, etc.).

In some embodiments, the components may be configured to query a database of known shape-brand correlations that catalogs correlations between specific product shapes and their associated brands, such as beverage brands known for uniquely shaped bottles or electronics brands with characteristic box designs. The components may use the shape and/or text identified on the product as search criteria, effectively filtering out irrelevant brand matches that do not align with these parameters. Such filtering may allow for targeted querying that allows for focusing solely on the records that are linked to brands associated with identified product shapes. Such targeted querying may significantly reduce the search space and allow a more efficient and accurate identification of potential brand matches by concentrating on a narrower and more pertinent set of database entries.

In some embodiments, the components may be configured to apply advanced image processing techniques to the query and/or search results. These image processing techniques may include performing grayscale conversion, color normalization, and edge detection algorithms that adjust image characteristics to emphasize shapes and defining features of the logos and enhance the logo's distinctive and/or distinguishing features for more accurate comparison. In some embodiments, the components may be configured to use pattern recognition algorithms to identify recurring shapes or elements in the logos obtained from search results and select the logo with the clearest representation of common features across variations.

In some embodiments, the components may be configured to select the most distinctive version of the logo based on the frequency and clarity of the common feature(s) present in multiple logo iterations (e.g., included in the search results, etc.). In some embodiments, the selection of the most distinctive version of the logo may include analyzing the consistency of a common feature in multiple logo iterations.

In some embodiments, the components may be configured to use AI models that are trained on a large dataset of brand logos to identify, confirm, and differentiate logos.

In some embodiments, the components may be configured to use weak supervision techniques for enhanced logo recognition operations. In some embodiments, the components may be configured to combine weak supervision with proactive data retrieval and AI techniques to reduce web searches and emphasize distinctive product features to more efficiently identify and categorize logos and brands across a wide range of product types and categories.

In some embodiments the components may be configured to load machine learning models and image processing libraries, initialize a vector database for storing product images and logos, preload the database using weak supervision, define product categories (e.g., lipsticks, supplements, DIY tools), scrape the web for clean images of products within the categories to extract both product names and brands, store the images in the database with associated brand and product information, use machine learning algorithms to process scraped images (e.g., remove background noise, standardize image format, enhance image clarity and focus on the product and its logo, etc.), analyze each product image to determine whether it contains additional relevant or irrelevant elements (e.g., product alone vs. product with a model), store only relevant images or extract the essential parts of the image for the database, and periodically re-scrape websites to capture any new or updated products and logo and regularly update the database with new categories and products, query the database in response to detecting a new product image to determine whether the database includes similar images or logos, use the stored information for quick logo recognition in response to determining that the database includes similar images or logos, and perform a web search for logo recognition in response to determining that the database does not include similar images or logos. In some embodiments, the components may be configured to analyze the packaging or container of the product for distinctive features and use these features as additional data points for narrowing down the search and improving recognition accuracy.

In some embodiments, the components may be configured to perform retrieval augmentation operations for categories with insufficient data. For example, the components may automatically scrape and process images from the web to retrieve and clean high-quality images for inclusion in the database.

In some embodiments, the components may be configured to generate an output report that includes the identified logo, brand name, and other relevant information and update the database with any new findings for future reference. In some embodiments, the components may be configured to continuously monitor system performance and accuracy and update machine learning models and scraping parameters based on feedback and new data trends.

As mentioned above, the components may be configured to preload the database using weak supervision. Preloading the database with a wide spectrum of clean, well-defined images of various products and their associated brands may reduce the necessity for frequent web searches and substantially reduce the search space. In some embodiments, the components may be configured to populate the database using web scraping techniques, which may include systematically collecting product names and brands from specific categories on websites (e.g., lipsticks, iron tablets, DIY tools, etc.). Examples of such web scraping techniques are described in U.S. Patent Application No. 17/867,358, entitled "System and Method for Efficiently Identifying and Segmenting Product Webpages on an eCommerce Website" filed Jul. 18, 2022, the entire contents of which are hereby incorporated by reference for all purposes.

In some embodiments, the components may be configured to store the scraped and processed images in a vector database (e.g., known shape-brand correlation database, etc.) that serves as a comprehensive repository and a primary reference for future logo recognition operations. Since the scraped images are not manually labeled with the same precision as in traditional datasets, the ability to learn from this broad range of less structured data is a form of weak supervision.

In some embodiments, the components may be configured to use AI techniques to improve the quality of the product images and enhance the efficacy of subsequent image analysis operations. For example, the components may be configured to use AI techniques to eliminate cluttered backgrounds from product images (a common occurrence on online retail platforms) to ensure that products are displayed against a clean, uniform background.

In some embodiments, the components may be configured to differentiate between relevant product images and extraneous content. The components may use AI techniques to determine whether additional products are relevant or unrelated to the product being evaluated. Such differentiation may be particularly useful in complex product presentations (e.g., a makeup palette accompanied by images demonstrating the makeup application, etc.).

In some embodiments, the components may be configured to perform retrieval augmentation operations that include integrating automatically scraped and processed images into the database to proactively retrieve and augment data in categories in which the database is determined to be deficient.

In some embodiments, the components may be configured to analyze features other than logos and brand names. For example, as mentioned above, the components may be configured to evaluate the packaging or container of the product to recognize distinctive packaging shapes and styles and use the packaging shapes and styles to further reduce the search space.

In some embodiments, the components may be configured to use image analysis techniques and parameters (e.g., resolution data, pixel count, text readability, etc.) to estimate the size and distance of objects in a video (or other media such as XR, etc.).

In some embodiments, the components may be configured to load video analysis and image processing libraries, initialize various image parameters and variables (e.g., for camera resolution, object identification, pixel density measurements, etc.), extract individual frames from the video for analysis, use AI techniques (e.g., object detection techniques, etc.) to identify the object of interest (e.g., a bottle, box, etc.) for each frame, determine the resolution of the camera used (e.g., HD, 4K) to understand the baseline pixel density, calculate or estimate the pixel count within the object's boundary for frames in which the object is visible (i.e., higher pixel counts may indicate that the object is closer to the camera), analyze frames for text visibility on the object, compare frames in which text is readable versus frames in which it is not to infer distance changes, estimate the object's relative size and distance from the camera based on the pixel count and text readability, and use comparative analysis if reference objects (e.g., a known bottle size, etc.) are present in the video. In some embodiments, the components may be configured to use additional context information (e.g., known room dimensions or other reference objects) to refine the size and distance estimates. In some embodiments, the components may be configured to generate a report identifying the estimated size and distance of the object in various frames and the associated confidence scores or ranges for the estimated size and distance. In some embodiments, the components may be configured to update the AI models based on new data and feedback to improve future estimations.

In some embodiments, the components may be configured to maintain privacy in video (or other media such as XR, etc.) analysis to comply with various digital privacy and "right to be forgotten" laws, rules, or regulations. In some embodiments, the components may be configured to use hashing for video tracking and periodic checks to ensure the removal of data that is no longer publicly available.

In some embodiments, the components may be configured to load video processing and hashing libraries, initialize a database for storing video data (which may include hash signatures, timestamps, etc.), generate a hash signature for a video file, store hash signature along with its source URL and other metadata in the database. The hash signature may capture the entirety of the video's content in a single hash value that may be used to ensures that any change in any part of the video, including variations in Quality of Service (QOS) that may affect the video's integrity, will result in a different hash. The components may partition the video into individual frames and audio components/segments, assign timestamps to each segment for precise identification, individually analyze the specific segments, periodically verify the availability of each video stored in the database by determining whether the video is still present at the source URL and comparing the current hash of the online video with the stored hash to detect any changes or removal of the video, and automatically delete any data or analysis derived from that video from the database in response to determining that the video has been removed or altered (i.e., in response to determining that current hash of the online video does not match the stored hash), and update any reports or outputs that include information associated with the removed video. In some embodiments, the components may be configured to regenerate previously generated reports to exclude information from removed videos.

In some embodiments, the components may be configured to use contextual relevance, multimodality, and user profiling to reduce the search space for content analysis involving product and brand mentions.

In some embodiments, the components may be configured to load machine learning models for content analysis and natural language processing (NLP), initialize databases for storing user profiles and product/brand information, receive or retrieve relevant text and audiovisual content (e.g., influencer video), analyze the content to identify the primary topic (e.g., skincare, DIY, music, etc.), narrow down the relevant product and brand categories based on the identified topic, narrow down the relevant product and brand categories and exclude unrelated categories from the search (e.g., exclude DIY tools in skincare-related content, etc.), analyze various data types within the content (e.g., identify visible products or brands in the visual data, identify specific sounds or spoken words related to products in the audio data, process spoken or written mentions of products/brands in the textual data, etc.), combine results from these different modalities (e.g., visual, audio, and text data, etc.) to enhance search precision (e.g., in response to determining that the confidence values associated with data from a single modality are low, etc.), access user profiles to gather context (e.g., interests, typical attire, etc.), use this contextual information to further refine search accuracy, automatically scrape and process additional relevant information from external sources, update the database with the new data (e.g., to improve future searches, etc.), and/or generate a report summarizing the identified products/brands, their context, confidence scores, etc. In some embodiments, the components may be configured to regularly update machine learning models, user profiles, product databases, etc. based on recent trends and results of the content analysis.

In some embodiments, the components may be configured to implement and use pose detection in video (or other media such as XR, etc.) analysis to identify specific actions, objects, and events. In some embodiments, the components may be configured to use movement axes analysis, object detection, and frame-by-frame analysis to infer actions and consequences within a video.

In some embodiments, the components may be configured to load machine learning models for pose detection and object recognition, load video processing libraries for frame extraction and analysis, receive or retrieve a video, partition the video into scenes by identifying general overall patterns of the high level low resolution shapes and colors of combined images, partition the video/scenes into individual frames to isolate themes more accurately and in discrete blocks of time, apply the pose detection algorithm to identify the positions and movements of subjects (e.g., people, animals, etc.) for each frame, determine the axes of movement for each subject and classify their poses (e.g., standing, pointing, running, etc.), use object recognition techniques to identify items that subjects may be interacting with (e.g., an apple, a gun, a tool, etc.), determine the context and potential actions depicted in each frame or each sequence of frames, analyze the sequence of frames to observe changes in pose and context (e.g., track movements and actions of subjects across frames, note significant changes such as a subject falling or an object being used, etc.), determine potential actions and events based on pose transitions and object interactions (e.g., if a person is pointing an object in one frame and in the next, another individual is on the ground, infer a potential violent interaction, look for additional cues such as flashes of light indicating gunfire to corroborate inferred actions, etc.), identify scenes depicting violence or other specific actions for content flagging, filtering or moderation, and generate a report or metadata that include the identified poses, actions, and inferred events within the video as well as timestamps and frame references for precise location of events. In some embodiments, the component may be configured to continuously or repeatedly update the pose detection and object recognition models based on new data, feedback, and analysis outcomes to improve future accuracy.

In some embodiments, the components may be configured to dynamically analyze video content and update AI models based on changing global contexts and trends.

In some embodiments, the components may be configured to load natural language processing (NLP) and video analysis libraries, initialize a dynamic database for storing trending topics and contextually relevant terms, access reliable and current external sources for trend monitoring, extract audio and textual content from one or more video streams or files, analyze the extracted content to identify primary themes and keywords, cross-reference these themes with a pre-existing database of contextually relevant terms, scan external sources (e.g., news, social media, etc.) for emerging trends and topics, update the database with new trends, topics and associations, integrate the newly identified trends and topics into the analysis models, update, refine, or fine tune the models to recognize and correctly interpret the new terms within the video content, apply the updated models to analyze the content for each new video, apply the updated models to analyze the content, identify and categorize themes and subjects based on current global contexts, classify video content based on evolving definitions and understandings of key terms (e.g., "armed conflict," etc.), and adjust the classifications as global contexts and terminology evolve or change. In some embodiments, the components may be configured to generate reports or summaries of the analyzed video content highlighting key themes and contextually relevant information.

In some embodiments, the components may be configured to implement and use a feedback system to evaluate the accuracy of video analysis and/or to further refine and update the models based on user-generated feedback.

In some embodiments, the components may be configured to continuously or repeatedly tune the models based on updates from global trends and emerging topics and/or otherwise ensure the models remain relevant and exclude outdated information.

In some embodiments, the components may be configured to implement and use automated content categorization, multimodal data processing, temporal analysis, and weak supervision in machine learning for comprehensive video analysis.

In some embodiments, the components may be configured to load machine learning models for natural language processing (NLP), object recognition, and sentiment analysis, load video processing libraries for frame extraction and audio transcription, receive or retrieve a video file, partition the video into individual frames and extract audio components, apply predefine rules for identifying specific elements (e.g., brands such as "Dove®," etc.) to automatically categorize content in the video and flag brand mentions and associated sentiments, analyze each frame for visual content (e.g., to identify objects, logos, emotional expressions, etc.), process audio data to detect background sounds, determine speaker identity, transcribe spoken words, etc., associate the analyzed data with its corresponding timestamp in the video, monitor the evolution of the identified elements (e.g., objects, sentiments, speech, etc.) over the course of the video, combine the extracted data (e.g., visual, audio, textual, etc.) to create multi-modal embeddings that represent the video's content over time, use the multi-modal embeddings to generate detailed descriptions of the video content, describe detected elements and their changes at specific time intervals, and generate a report or summary that outlines the video content, object identifications, sentiment analysis, temporal changes, etc.

In some embodiments, the components may be configured to use the analyzed patterns and elements to predict or generate similar content (e.g., creative content generation or predictive modeling based on the video's theme.

In some embodiments, the components may be configured to continuously or repeatedly update the rules and models based on new data and trends to maintain accuracy and relevance, incorporate feedback to refine the weak supervision operations, etc.

FIG. 1 is a system block diagram illustrating an example system 100 suitable for implementing various embodiments. In the example illustrated in FIG. 1, the system 100 includes media recorders 102, a PC (desktop or laptop) 104, a media content creator 106, social media platform servers 108a, 108b, a media content creator's blog server 110, external sources 112a, 112b, 112c, mobile devices 114, users 116, a product owner 118, and a media analytics platform 120. The media analytics platform 120 may include a media ingestion engine 122, a media extraction engine 124, a media query engine 126, a topic-of-interest (ToI) knowledge repository 128, and a media content knowledge repository 130. In some embodiments, the ToI knowledge repository 128 may include a product knowledge repository.

The media recorders 102 may be configured to capture audio and visual media, generate primary media content, and provide raw audio/visual content for analysis and dissemination. Examples of media recorders 102 include, but are not limited to, audio interface devices (e.g., USB audio interface devices, etc.), camcorder, camera (e.g., webcam, digital camera, DSLR camera, action cameras such as GoPros, etc.), dash cam, Dictaphone, digital audio workstation, drone camera, microphone, smartphone (with built-in cameras and microphones, etc.), tablet, three-dimensional space measuring device (e.g., 3D scanners that capture the spatial attributes of environments or objects to create digital models, etc.), voice recorder, and wearable camera. The media recorders 102 may be communicatively coupled to a PC 104 and a media content creator 106. The PC 104 may be a personal computing device for capturing and editing media, creating content, and interacting with other system components (e.g., social media platform servers 108, media content creator's blog server 110, etc.). The media content creator 106 may be an entity or component responsible for creating, editing, and publishing media content. The entity or component may represent individuals or organizations involved in content generation.

The social media platform servers 108a, 108b may be configured to host social media content and distribute media content to a broad audience such as a multitude of mobile devices 114 associated with a multitude of users 116. The media content creator's blog server 110 may be configured to host a blog for the media content creator 106 and/or provide a platform for publishing and sharing content with a targeted audience.

The external sources 112a, 112b, 112c may include search engines, automated knowledge update system (AKUS), real-time analytics and gathering (RAG) engine, and/or other similar components that may be used to broaden the scope and depth of analysis performed by the media analytics platform 120 and/or to otherwise augment the capabilities of the media analytics platform 120. For example, search engines may provide a wide variety of information from the internet (e.g., current news articles, scholarly papers, blogs, forum discussions, etc.). An AKUS system may provide access to advanced databases that automatically update themselves with the latest information in specific fields. For example, the media analytics platform 120 may access an external AKUS system that provides the latest data on emerging technologies or trends in consumer electronics products when it is analyzing a video related to a new high-tech consumer electronics product. As a result, the media analytics platform 120 may be able to better contextualize the media content. As another example, the media analytics platform 120 may query a RAG engine that is configured to continuously collect and interpret user interactions, trends, and behavioral patterns on various social media platforms. In response, the media analytics platform 120 may receive real-time data from the RAG engine that may be used to evaluate how the audience is responding to certain media content, what aspects of the media content are resonating with them, how reception of the media content is evolving over time, etc.

Thus, the external sources 112a, 112b, 112c may include search engines and third-party databases that may be queried by the media analytics platform 120 to extend its data reach. The external sources 112a, 112b, 112c may provide additional information or content (e.g., news feeds, databases, search engine results, etc.) that may be integrated into or used by the media analytics platform 120 to contextualize the media content.

The product owner 118 (or product manufacturer, distributor, reseller, retailer, etc.) may be a component or entity associated with the products or services featured or analyzed within the media content. As such, the product owner 118 may be a stakeholder in how the media content impacts their product's reputation and market performance.

The media ingestion engine 122 may be configured to serve as the gateway or entry point through which all media content enters the media analytics platform 120. The media ingestion engine 122 may be responsible for the collection and processing of various forms of media (e.g., videos, images, audio files, text, etc.) from different sources and preparing them for further processing and analysis.

The media extraction engine 124 may be configured to extract and analyze the media content collected by the media ingestion engine 122 and add detailed data to the media content knowledge repository 130. In some embodiments, the media extraction engine 124 may be configured to isolate specific elements from the media, such as text from videos, speech from audio files, audio transcriptions, metadata from images, etc. For example, the media extraction engine 124 may extract product images from a video advertisement, transcribe spoken words into text, identify background music for a more granular analysis of the media components, etc. The extracted data may be stored in the media content knowledge repository 130, which may include records, information structures, and/or a comprehensive graph of all media-related information.

The media query engine 126 may serve to operate as a search and retrieval system that allows for the querying of media content based on specific parameters or criteria (e.g., keywords, date ranges, media types, etc.) and/or for filtering and extracting relevant media data for analysis. For example, the media analytics platform may use the media query engine 126 to search the media content knowledge repository 130 for all media mentioning a particular product within the last month.

The media analytics platform 120 may include various ToI knowledge repositories 128 that store detailed information on specific topics of interest such as products, services, well-known persons, brands, companies, or places. The media analytics platform 120 may use the information stored in the ToI knowledge repositories 128 for contextual analysis and enhancing the understanding of the media content. The media content knowledge repository 130 may store media content and their associated metadata and analytical data. The media analytics platform 120 may use the information stored in the media content knowledge repository 130 for understanding the content, context, and implications of the media being analyzed within the system.

Figure 2B:
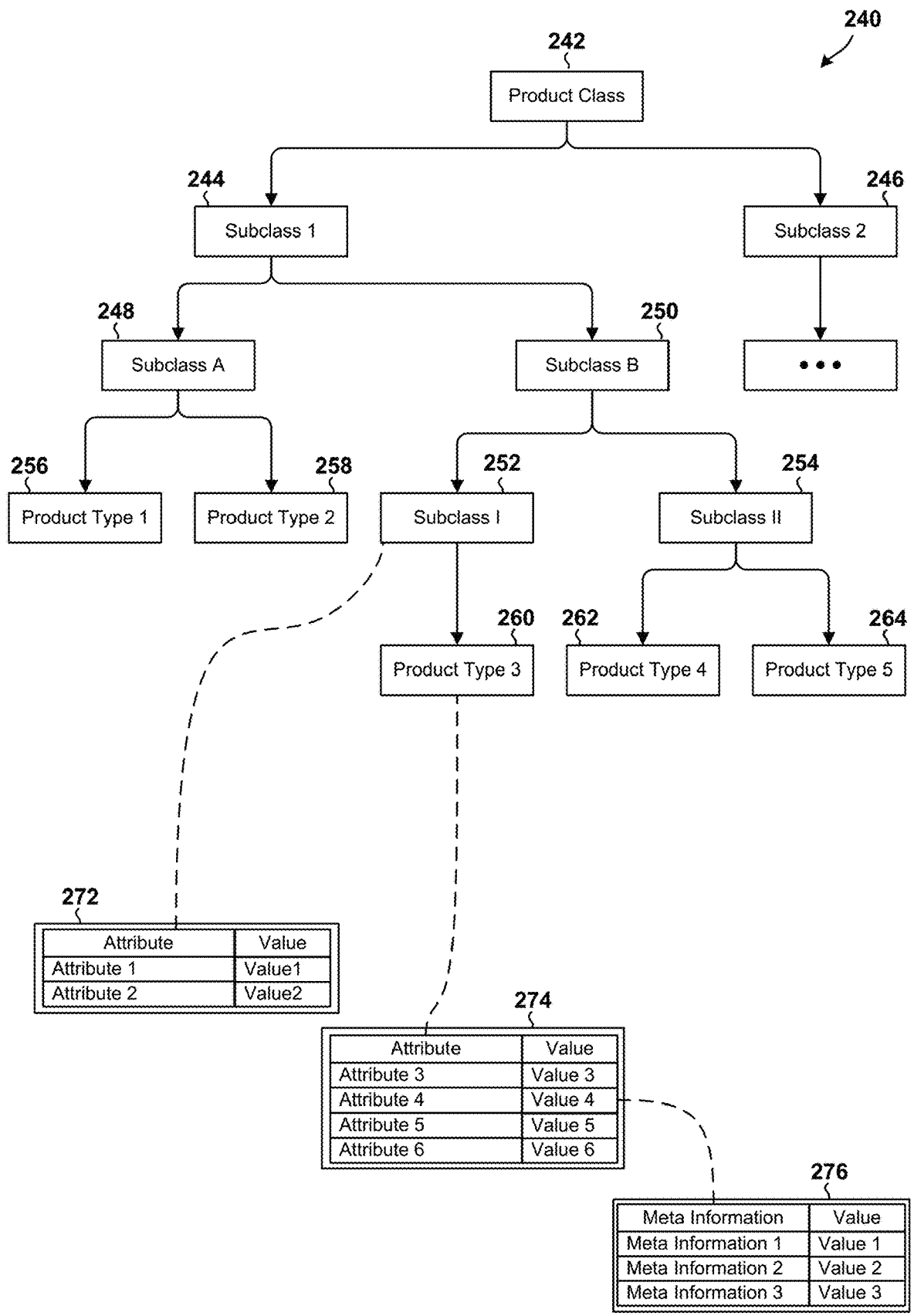

FIGS. 2A and 2B illustrate example information structures that could be generated and used by the media analytics platform 120 to implement various embodiments. In particular, FIG. 2A illustrates a database 200 that is structured to include various interrelated records relevant to media content management and analysis. In the example illustrated in FIG. 2A, the database 200 includes a media content record 202, a media content creator record 204, a media content publisher record 206, a segment record 208, and a knowledge repository 210 (e.g., ToI knowledge repository 128, etc.). Each record 202-208 may include various attributes, attribute values, and attributes types. There may be a one-to-one relationship between the media content record 202 and each of the media content creator 204 and media content publisher 206 records. There may be a one-to-many relationship between the media content record 202 and the segment record 208. There may be a zero-to-many relationship between the segment record 208 and the knowledge repository 210.

In some embodiments, the database 200 may include attribute groups 212, 214, 216, 218. Individual attributes (and attribute groups) may repeat under specific conditions. For example, the popularity details attribute group 214 may repeat each time the media content is scanned to capture evolving aspects of the content. Similarly, the platform details attribute group 218 may repeat for each platform used by the media content creator to provide a robust view of the creator's engagement across various mediums/platforms.

In some embodiments, each attribute group, attribute, or attribute value may be associated with a significance or weight value. The database 200 may be configured to dynamically update the significance or weight values as new information is introduced and integrated. In some embodiments, the database 200 and/or the processor may be configured to implement automatic or generative semantic connections between nodes based on the observed strength of connections over time. The processor may adaptively re-weight attributes and relationships to emphasize the most current and relevant connections for the media content management and analysis operations.

The media content record 202 may store information about individual media assets or individual pieces of media content. In some embodiments, the media content record 202 may be a central element of the database model that links to other records that provide additional context and details about the media. In the example illustrated in FIG. 2A, the media content record 202 includes a publication details attribute group 212 and a popularity details attribute group 214, each of which may include various attributes suitable for creating a comprehensive profile of each section, subsection, or frame of the media content (e.g., identifying its origins, characteristics, public interaction, etc.). Each of the attributes may be associated with an attribute data type (e.g., string, data, link, URL, Boolean, number, etc.).

For example, the publication details attribute group 212 may include attributes such as title, date published, data ingested, creator, publisher, address, subtitled, and quality. The title attribute may store the name of the media content. The date published attribute may store when the media content was made available to the public. The date ingested attribute may store the date the content was added to the platform for analysis. The creator attribute may store a link to the record of the individual or entity that created the media content. The publisher attribute may store a link to the record of the individual or entity that published or distributed the media content. The address attribute may store a URL or the web location where the media content is hosted. The subtitles attribute may indicate whether subtitles are available or not (true/false). The quality attribute may store the visual resolution of the media content, usually denoted in width×height format.

The popularity details attribute group 214 may include attributes such as views, likes, comments, etc. that provide insight into the audience's engagement with the media content. The views attribute may store the number of times the media content has been viewed. The likes attribute may store the number of positive endorsements the content has received. The comments attribute may store the count of user comments on the media content.

The media content creator record 204 may store information about the creators of the media content. The media content creator record 204 may include various elements and attributes, such as a creator details attribute group 216 that includes a name attribute that stores the name of the media content creator, a location attribute that stores the geographic location of the creator, an age attribute that stores the age or the period since the creator has been active, a gender attribute that stores the gender of the creator, a platform attribute that stores various platforms on which the creator is active, a names attribute that stores possible aliases or other names used by the creator across platforms, a username attribute that stores a unique identifier for the creator on the platforms, an address attribute that stores contact or physical address of the creator, and a number of followers attribute that stores a count of individuals following the creator across platforms.

The media content publisher record 206 may store details about the publishers that are responsible for distributing the media content. The media content publisher record 206 may include various elements and attributes, such as a platform details attribute group 218 that includes a name attribute that stores the name of the publishing entity or service, an address attribute that stores a web address or URL of the publisher, and a number of subscribers attribute that stores the total number of subscribers to the publisher's content.

The segment record 208 may store information that represents a portion (e.g., section, subsection, frame, etc.) of the media content. The segment record 208 may include various elements and attributes, such as a timestamp attribute that stores the specific time a segment occurs within the media content, a time/sequence in video/media attribute that stores the order of the segment in the timeline of the media, a duration attribute that stores the length of time the segment runs, a scene attribute that stores the setting or scene depicted in the segment, an ObjectType attribute that stores the types of objects present in the segment, a VisualEmotion(s) attribute that stores the emotions conveyed visually within the segment, a pose(s) attribute that stores the specific poses or positions of subjects within the segment, a speaker(s) attribute that stores the identities of individuals speaking in the segment, an audio quality attribute that stores the clarity or production quality of the audio in the segment, a brand/organization attribute that stores the brands or organizations featured or mentioned in the segment, a product specific attribute that stores the products highlighted or used in the segment, a sentiment attribute that stores the overall emotional tone or attitude conveyed in the segment, a categorization attribute that stores the genre or classification of the segment content, a language(s) attribute that stores the languages spoken or present in the segment, a background attribute that stores background information relevant to the segment, a music attribute that stores the music or soundtrack details in the segment, and a topic attribute that stores the main subject or theme of the segment.

The knowledge repository 210 may store detailed information about various topics of interest related to the media content 202, including products, services, brands, etc. For example, in some embodiments, the knowledge repository 210 may include a TOI knowledge repository, a product knowledge repository, and/or a media content knowledge repository.

In some embodiments, the database 200 and/or the processor may be configured to facilitate dynamic semantic connections between nodes, which are adjusted automatically based on the observed strength of these connections over time, to adaptively prioritize attributes and relationships. For example, the media content 202, media content creator 204, and media content publisher 206 records and their respective attributes may be represented as nodes in a graph structure. Relationships between these entities may be represented as edges connecting the nodes. For example, a connection between a media content node and a creator node may be established through an edge that represents their relationship. The processor may observe and record the frequency and nature of these interactions or relationships over time, such as by tracking the association frequency of certain media contents with specific publishers or monitoring the regularity with which certain content types are linked to particular audience segments. The processor may evaluate the strength of these connections based on a variety of factors, such as the frequency of association, metrics of audience engagement, and the similarity in content attributes. The processor may update the graph structure in accordance with the determined strength of connections. Connections that are observed to be stronger may prompt the creation of new edges or the strengthening of existing ones. Connections that exhibit weaker associations may lead to a reduction in the prominence of certain edges or their complete removal.

FIG. 2B is a hierarchical block diagram that illustrates an example knowledge repository that could be used to implement the various embodiments. For ease of reference, the example illustrated in FIG. 2B is described with reference to product knowledge repository 240. However, it should be understood that other knowledge repositories (e.g., ToI knowledge repository 128, etc.) may include the same or similar components, structures, relationships, nodes, attributes, attribute values, etc.

With reference to FIG. 2B, the product knowledge repository 240 may include information relating to one or more product classes 242, each product class 242 may include one or more subclasses 244-254 arranged hierarchically, and each subclass 244-254 may include one or more product types 256-264. The subclasses 244-254 may represent different sub-types or sub-classifications of products. Each product class 242 and subclass 244-254 may have one or more product fields 272, 274 that include one or more attributes and corresponding values (e.g., the product class may have a product field "Created" representing when the product instance was created, a product field "Modified" representing when the product instance was last modified, etc.).

In some embodiments, the product knowledge repository 240 may categorize product types representing a wide variety of consumer products or topics of interest. Numerous instances of a product (each potentially unique) may correspond to a single product type. In some embodiments, the products and product categorizations may be structured as a taxonomy and/or a tree data structure. Each product type may inherit the characteristics defined by its product fields from all the ancestor subclasses and the overarching product class. For example, the Product Type 3 260 node may inherit the product fields established by the subclass I 252 node, the subclass B 250 node, the subclass 1 240 node, and the product class 242 node.

The product field 274 may be associated with meta information 276 that includes attributes and corresponding values. The meta information 276 may include details such as the value type or type of data each field represents (e.g., a Boolean, integer, string, attribute-value pairs, etc.), value constraints (e.g., maximum numerical values, pre-defined string enumerations, etc.), the source of the value, the methods for obtaining the value, a timestamp indicating when the value was captured or retrieved, etc. In some embodiments, the meta information 276 may include an attribute-value pair that includes a list of synonyms (or alternative representations) for the product field attributes. Similarly, another attribute-value pair in the meta-information 276 may be used to store a list of synonyms (or alternative representations) for the product field values. Some product fields 272, 274 may only be needed based upon the values in some other product fields 272, 274. The meta information 276 may identify such relationships and dependencies.

Thus, in some embodiments, the meta information 276 may include lists of synonyms that provide alternative names for the attributes and their corresponding values. The meta information 276 may also include information identifying the dependencies and relationships between the product fields and values present in other fields (e.g., certain product fields may be contingent upon the values present in other fields, etc.).

The product knowledge repository 240 may also include information identifying non-hierarchical connections and relationships between subclasses 244-254, product types 256-264, and product fields 272, 274. For example, a singular manufacturer may be linked to various different product types 256-264 that are scattered across seemingly unrelated subclasses 244-254. In some embodiments, these and other complex relationships may be structured, modeled, and/or represented as an ontology. In some embodiments, the ontology may be an information structure that identifies the nature and the nuances of a domain and/or allows for more sophisticated querying, analysis, and reasoning about the data contained within the system. In some embodiments, the ontology information structure may include one or more concepts within a domain, the relationships between those concepts, and a set of rules and axioms.

For example, in some embodiments, the ontology information structure may include a class/concept information element (IE) that identifies groups or collections of entities or things, an instances/individuals IE that identifies specific elements within each class, an attributes/properties IE that describes the features and characteristics of the classes, a relationship IE that defines how classes and instances are related to each other, and a restrictions IE that includes rules that provide constraints on some aspect of the ontology (e.g., by limiting the range of possible values for an attribute, etc.).

Figure 3A:
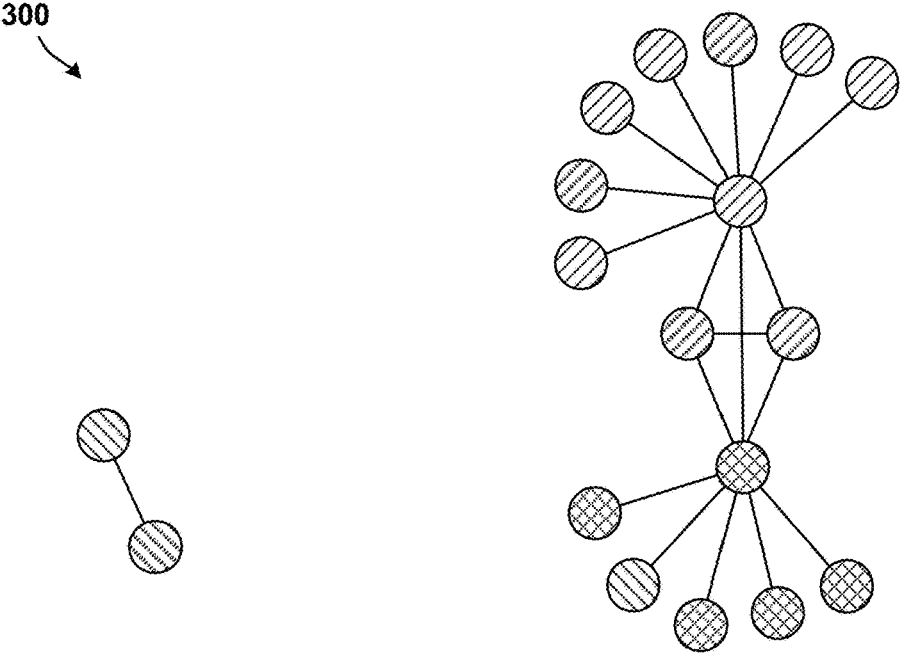
FIGS. 3A-3C illustrate example information structures that may be used to represent the complex relationships and interconnections between classes, subclasses, product types, and product fields of a knowledge repository so as to reduce the search space and improve device response times in accordance with some embodiments.
Figure 3B:
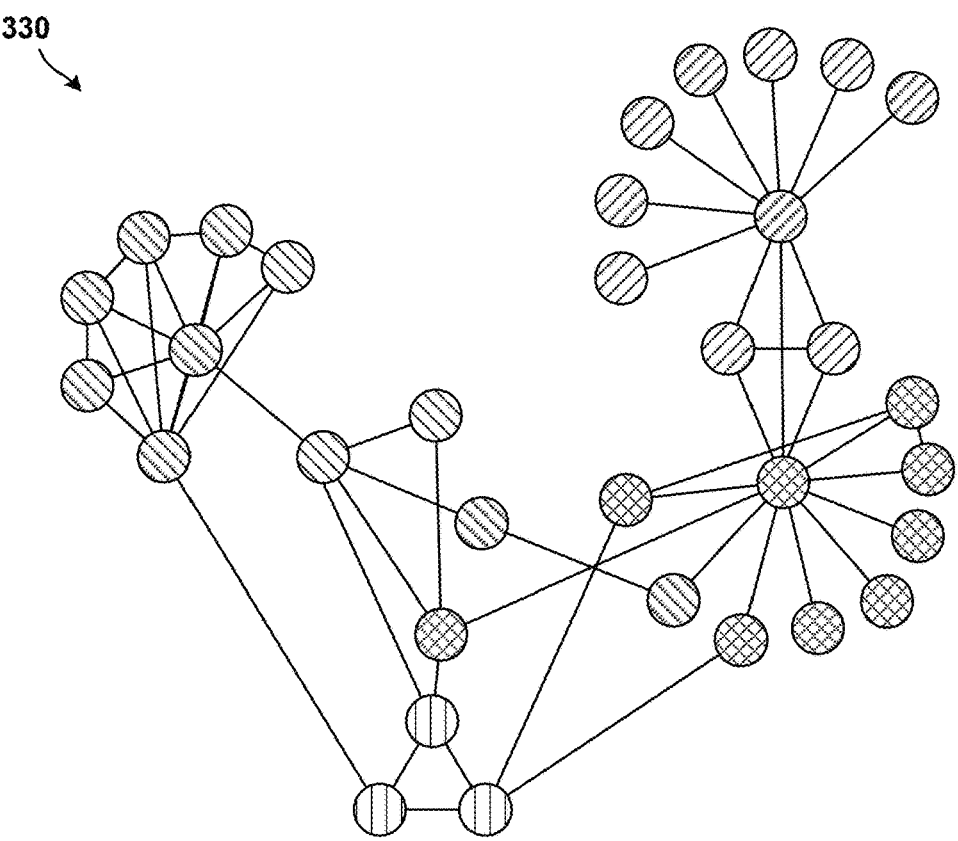
Figure 3C:
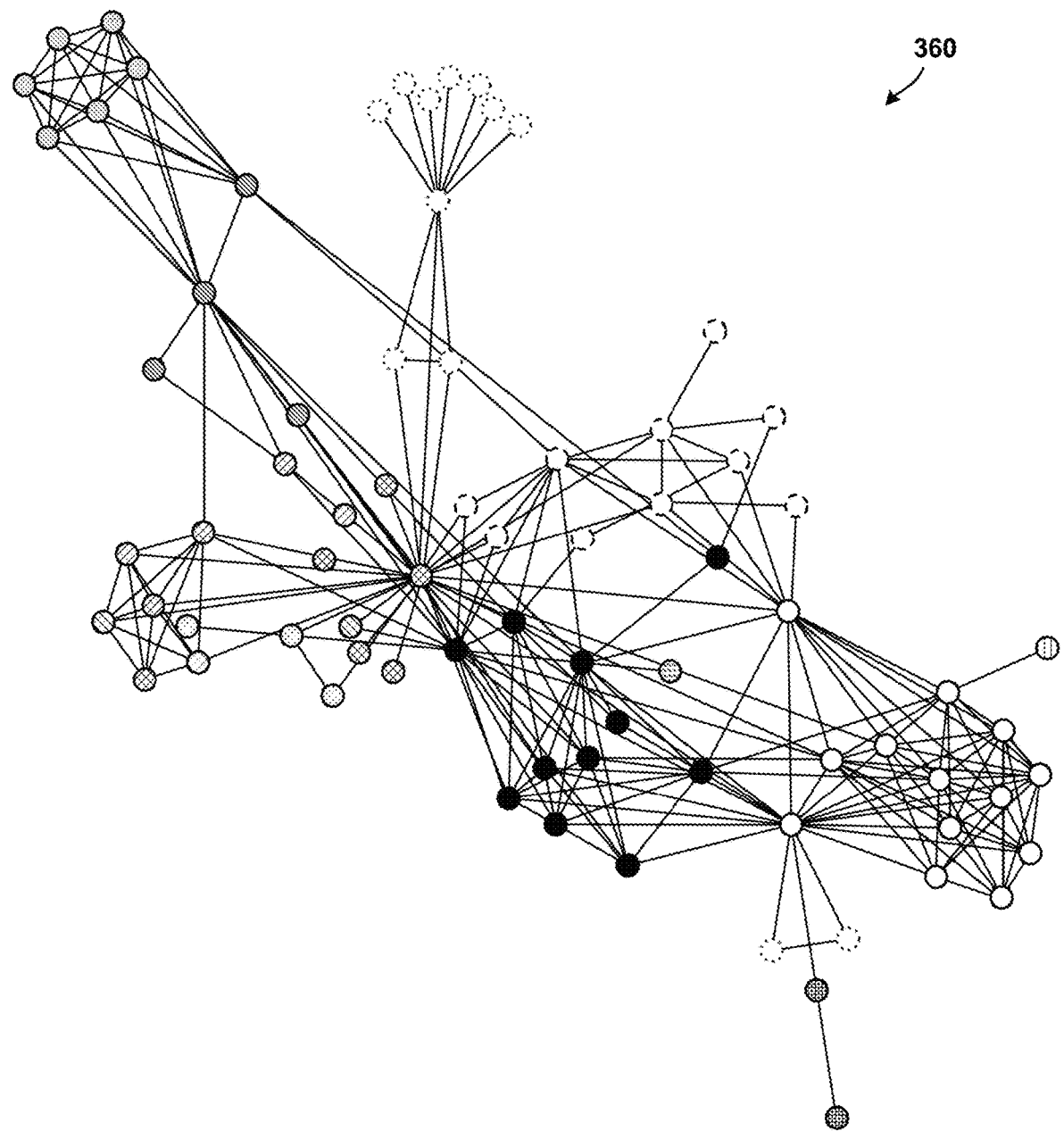

FIGS. 3A-3C illustrate example information structures 300, 330, 360, representing feature graphs/spaces, that may be used to represent the complex relationships and interconnections between classes, subclasses, product types, and product fields of a knowledge repository in accordance with some embodiments. The information structure 300 illustrated in FIG. 3A may be a semantic feature graph/space that represents the current state of these relationships. The information structure 330 illustrated in FIG. 3B may be a semantic feature graph/space that represents near future predictions. The information structure 360 illustrated in FIG. 3C may be a semantic feature graph/space that represents far future predictions. These predictions may be generated based on AI/ML algorithms and/or configured to support potential data evolutions within the knowledge repository.

As discussed above, a feature space may be a multi-dimensional space or information structure where each dimension represents a specific feature or attribute of the data being analyzed. Data points (e.g., objects, events, observations, etc.) may be represented as vectors within this multi-dimensional structure, with dimensions corresponding to the dataset's features, including properties or characteristics such as color histograms, texture, or shape descriptors in an image dataset. As also discussed above, a feature graph may be an advanced information structure that represents the relationships and interactions between different data points and their features as nodes and edges in a graph. The nodes represent data points or features, while edges symbolize the relationships or dependencies between them.

Some embodiments may include a semantic relationship engine configured to automatically update the weights of connections, re-evaluate connections, and establish new connections between nodes over time as new data is continuously added to the semantic graph. In some embodiments, the semantic relationship engine may be configured to use neural networks for analyzing and interpreting the relationships and attributes within a multidimensional feature space and/or to use a feature graph to represent the complex interactions between the data points.

FIGS. 4A-4D are process flow diagrams that illustrate a method 400 of processing media in accordance with some embodiments. Method 400 may be performed by a processing system or at least one processor in a computing device that includes or implements all or portions of a media analytics platform (e.g., the media analytics platform 120 illustrated in FIG. 1, etc.).

In block 402, the processor may receive a request to add media content to a media content knowledge repository (e.g., media content knowledge repository 130 illustrated in FIG. 1, etc.). As mentioned above, the media content knowledge repository may store media content, their associated metadata, and analytical data. The media content knowledge repository may be used by a media analytics platform (e.g., media analytics platform 120) for analyzing, interpreting, and understanding the content, context, and implications of the media being analyzed within the system.

In some embodiments, request message received in block 402 may explicitly identify the media content (e.g., via a URL, etc.). In some embodiments, the received request message may identify the media content in relative terms (e.g., the x most recent videos for a media content creator on Instagram®, the top n videos on YouTube® today, etc.).

In some embodiments, a human operator may initiate the request to add media content via user input (e.g., clicking through options in a graphical user interface (GUI), typing commands into a command line, using voice commands in a voice recognition system, etc.). In some embodiments, the processor may receive the request through an application programming interface (API) that allows other devices and components to request that the media content be added to the repository. For example, in some embodiments, the processor may receive a request from a content management system (CMS) that is configured to automatically send a request to update the knowledge repository in response to the CMS detecting that a new influencer video has been uploaded to a social media platform.

In some embodiments, the system may be configured to periodically trigger the requests to add media content (e.g., check daily for new media content created by X, etc.). In some embodiments, the system may be configured to trigger the requests to add media content at regular intervals and/or to autonomously seek out new content to be added to the media content knowledge repository. For example, the system may be configured to perform daily searches for content created by a particular influencer or on a specific topic. As part of these operations, the system may scan various popular social media platforms (e.g., YouTube®, Instagram®, etc.) for new posts tagged with relevant keywords or hashtags and issue requests to add media content in response to detecting new posts tagged with relevant keywords or hashtags and/or which otherwise meet predefined criteria.

In block 404, the processor may identify the media content based on the information included in the received request message. For example, the processor may parse a URL included in the received request message to locate a specific video uploaded by an influencer on a content platform (e.g., YouTube®, etc.). As another example, the processor may analyze and use relative terms included in the received request messages to select the top trending videos of the day on a content platform (e.g., TikTok®, etc.), extract the latest series of social media posts (e.g., Instagram® posts, etc.) under a certain hashtag, or perform other similar operations. In some embodiments, the processor may be configured to use natural language processing (NLP), AI/ML models, and/or an LXM to interpret the information included in the received request message (e.g., "Find the most recent makeup tutorial videos from influencer X with over 10,000 views posted last week," etc.). In some embodiments, the processor may be configured to apply temporal filters, analyze count parameters, perform content-specific searches, query a local or remote LXM, and/or perform other similar operations to identify and locate relevant media content.

In some embodiments, as part of the operations in block 404, the processor may perform the operations illustrated and described with reference to FIG. 4B. For example, in determination block 406 the processor may determine whether the media content may be identified using an identifier that is included in the received request message or stored on or otherwise accessible to the device.

In response to determining that the media content may not be identified using the identifier (i.e., determination block 406="No"), the processor may query an external system (e.g., social media platform, etc.) to retrieve relevant identifier(s) in block 408. That is, if the processor is unable to identify media content using existing identifiers in block 406, it may seek additional information from an external system in block 408. For example, the processor may use an API provided by a social media platform to retrieve a unique identifier for a recently uploaded video by an influencer. To accomplish this, the processor may send a query with specific parameters and/or details (e.g., the influencer's username, the date the video was uploaded, etc.) that allow the external system to accurately pinpoint and retrieve the correct identifier for the targeted media content.

Figure 4A:
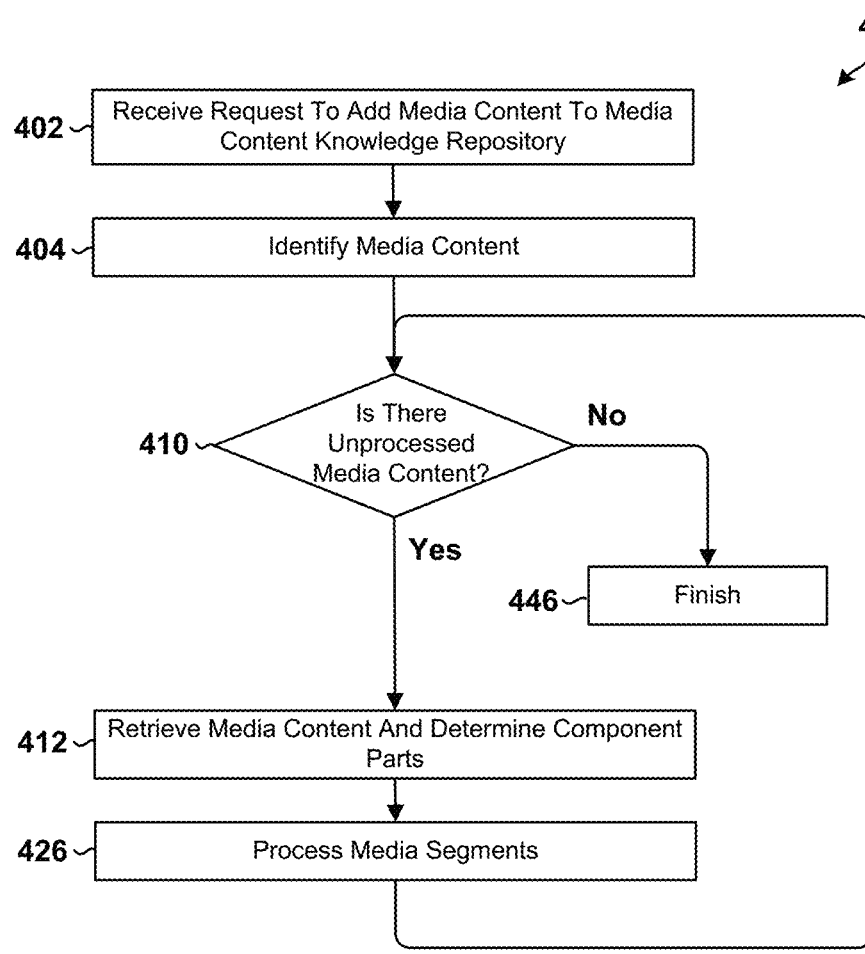
FIGS. 4A-4D are process flow diagrams that illustrate a method of processing media in accordance with some embodiments.
Figure 4B:
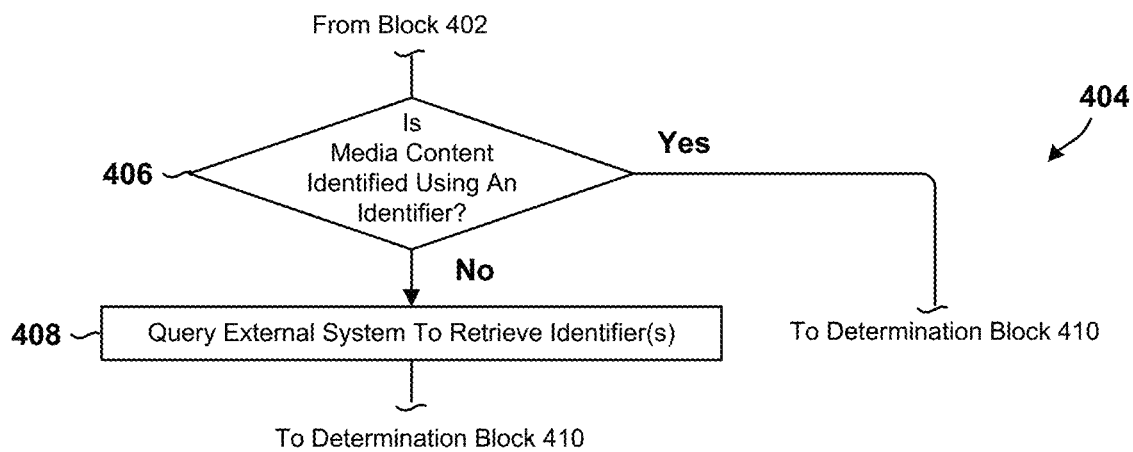

With reference to FIG. 4A, in determination block 410, the processor may determine whether there is any unprocessed media content. In response to determining that there is unprocessed media content (i.e., determination block 410="Yes"), the processor may retrieve media content and determine component parts in block 412. In some embodiments, as part of the operation in block 412, the processor (or the semantic graph engine) may observe a change in weight of connections and determine to carry out further processing independently to investigate or propose new semantic connections or negate them or change their meaning or strength or overall usefulness.

In some embodiments, the processor may retrieve the media component and determine common parts within the media content. For example, the processor may receive (e.g., download, stream, load, etc.) the identified media content and begin analyzing it for recurrent themes, subjects, patterns, etc. As part of these operations, the processor may parse the video and audio streams to identify recurring visual elements (e.g., logos, faces, etc.) and/or recurring auditory elements (e.g., specific phrases, background music, etc.). In some embodiments, the processor may use machine learning algorithms to detect and categorize these elements, to determine their frequency and context within the media content, determine the relationships and/or weights of the nodes in the feature graph, etc. In some embodiments, the processor may segment the content into smaller media content segments (e.g., scenes in a video, etc.) and partition the segments into audio and visual components. In some embodiments, as part of the operations in block 412, the processor may perform the operations illustrated and described with reference to FIG. 4C.

Figure 4C:
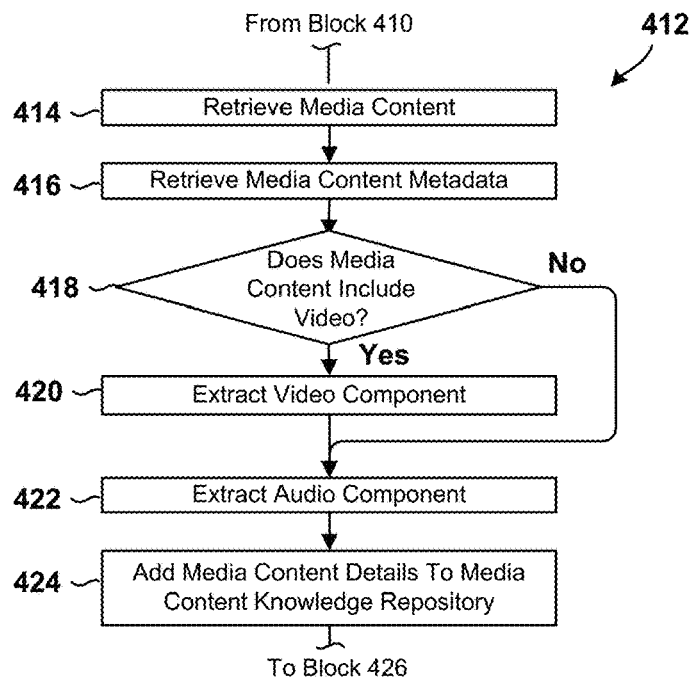

With reference to FIG. 4C, the processor may retrieve media content in block 414. For example, the processor may access and receive (e.g., download, etc.) specific media files from various online sources such as social media platforms, content delivery networks, or directly from media content creator servers. As part of these operations, the processor may use various APIs or web scraping techniques to access the content. The processor may also parse URLs, media IDs, or other identifiers to locate and retrieve the media files.

In block 416, processor may retrieve media content metadata. For example, the processor may access ancillary data associated with the media files, such as publication dates, content creator details, viewer engagement metrics (e.g., views, likes, shares, etc.), tags, keywords, etc. The processor may extract metadata embedded within the media files and/or query metadata repositories of the platforms hosting the media.

In determination block 418 the processor may determine whether the retrieved media content includes video. For example, the processor may analyze the file type, content headers, or perform a preliminary scan of the file contents to identify video streams or visual data. In some embodiments, the processor may analyze the file to differentiate different media types, such as a pure audio file from a video file or identify a multimedia file that includes both audio and video streams.

In response to determining that the content component includes video (i.e., determination block 418="Yes"), the processor may extract a video component from the media content in block 420. For example, the processor may decode the video stream, extract image frames, and perform other similar operations to isolate the video stream from the multimedia content using video processing software or algorithms. The processor may also preliminary analyze the video to determine resolution, frame rate, encoding type, and other similar information that could be added to a knowledge repository and subsequently used for analysis.

In block 422, the processor may extract an audio component from the media content. For example, the processor may isolate and separate the audio stream from a multimedia file and convert it into a format suitable for analysis. As part of these operations, the processor may decode the audio, normalize volume levels, and otherwise prepare the audio data for processes such as speech recognition, sentiment analysis, or background noise evaluation.

In block 424, the processor may add media content details to the media content knowledge repository. For example, the processor may create a structured database record that encapsulates all relevant details about the media content, including extracted metadata, segmented content descriptions, the results of preliminary analyzes (e.g., video and audio content characteristics), etc. The processor may also establish relational links between the new record and existing records or data within the repository. In some embodiments, in block 424 the processor may generate, populate, and add a media content record 202 (illustrated in FIG. 2A) to media content knowledge repository 130 (illustrated in FIG. 1).

In some embodiments, as part of the operations in block 414, the processor may determine whether the media content is already in the media content knowledge repository. In some embodiments, the processor may be configured to retrieve only metadata associated with the media content (e.g., to see how it is trending, etc.) in response to determining that the media content is already in the media content knowledge repository. Retrieving only the metadata may improve the efficiency, performance, and functioning of the system by significantly reducing the processing load and time required for analysis. For example, the processor may access metadata that includes the number of recent views, likes, shares, and comments on a video to quickly obtain a snapshot of the content's current performance and popularity without processing the full media content. The processor may also retrieve and use timestamp metadata to track how engagement metrics have evolved since the media content was first published and determine the current popularity and relevance of the content without reprocessing the entire content.

The processor may also perform similar comparisons based on the data from when the media content was last scanned to generate cumulative values representing the performance of the content over time. The processor may use the results of repeated analysis to build a comprehensive representation of the engagement trajectory of the content over time.

The processor may also use the accumulated engagement metrics over time to form new connections or adjust the weights of existing connections in the semantic feature graph. The processor may interpret signals about the popularity of the content and dynamically update the representation of the relationships and relevance of the content in the semantic feature graph.

In some embodiments, the processor may determine whether the media content should be updated or reprocessed in response to determining that the media content is already in the media content knowledge repository. For example, a fashion-related video relevant to the prior season's trends may require reprocessing to reflect current fashion trends and styles. The processor may evaluate changes in fashion trends over time (e.g., shifts in popular colors, patterns, styles, etc.) to determine whether the existing content in the repository needs to be updated to maintain its relevance and accuracy in the context of the current fashion landscape. The processor may update the media content knowledge repository so that it stays up-to-date, relevant, and reflective of the current trends.

With reference to FIG. 4A, in block 426, the processor may process media content segments. In some embodiments, as part of the operations in block 426, the processor may perform the operations illustrated and described with reference to FIG. 4D. For example, in determination block 428, the processor may determine whether there is an unprocessed media content segment. Examples of media content segments include an action sequence in a film in which a timestamp attribute marks its occurrence in the film and a scene attribute that describes the setting depicted in the segment as an intense emotional setting; a portion of a how-to video in which a duration attribute identifies the length of the instructional portion and a topic attribute identifies the specific skill or task being taught; a subsection of a news report covering a specific story in which a speaker(s) attributes identifies the reporter and a background attribute provides context about the news event; an important play in a sports broadcast in which a duration attribute identifies the length of the play and a sentiment attribute identifies the excitement or tension in the game. Each of these media content segments may be distinct and/or may require specific analysis to understand its context, content, and relevance within the larger media content.

In response to determining that there are unprocessed media content segments (i.e., determination block 428="Yes"), the processor may select the next media content segment in block 430. In block 432, the processor may determine attributes in the audio component of the selected media content segment. For example, the processor may determine any or all of the attributes of the segment record 208 discussed above with reference to FIG. 2A (e.g., a duration attribute, a music attribute, speaker(s) attribute, languages attribute, etc.). As further examples, the processor may use any of a variety of audio analysis techniques or technologies to identify and categorize elements such as speech, music, background noise, and sound effects. As further examples, the processor may use speech recognition technology to transcribe spoken words, use sentiment analysis algorithms to determine the emotional tone conveyed in the audio, analyze the audio quality to identify factors such as volume levels, clarity, and distortions or artifacts. In some embodiments, the processor may detect and categorize specific sounds or music and link them with a database for contextual analysis (e.g., identify a song, identify sounds as being from a particular environment.

In block 434, the processor may determine attributes in the video component of the selected media content segment. For example, the processor may determine any or all of the attributes of the segment record 208 discussed above with reference to FIG. 2A (e.g., a duration attribute, a scene attribute, an ObjectType attribute, a VisualEmotion(s) attribute, etc.). As further examples, the processor may use image recognition techniques to identify objects, faces, text, and scenes within the video, determine visual quality (e.g., resolution, frame rate, etc.), evaluate the visual composition (e.g., color balance, lighting, camera movement, etc.), detect and categorize actions or events depicted in the video, and recognize brand logos or products. In some embodiments, the processor may be configured to perform sentiment analysis based on facial expressions and body language of individuals in the video and use motion detection algorithms to track movement patterns or highlight significant actions within the segment to detect and categorize actions or events depicted in the video.

The above described quality factors, including background noise, audio quality elements such as volume levels, clarity, and distortions or artifacts, as well as visual quality aspects like resolution, frame rate, and visual composition (encompassing color balance, lighting, camera movement, etc.), may be particularly important in the context of potential collaborations between product owners and media content creators. The quality factors may be used to align media content with the specific preferences and requirements of product owners. For example, a premium wine producer may seek to collaborate with media content creators who specialize in producing content with clear audio and steady video. This preference may be driven by the need to convey a sense of sophistication and quality that aligns with the brand image and customer expectations. In contrast, a sports brand may prefer to work with media content creators whose videos are characterized by dynamic noise and extensive camera movement that capture the essence of action and energy typical of sports environments. Such videos may resonate with the brand's target audience, who are likely to be drawn to the excitement depicted in these action-packed environments.

It should be understood that the operations in blocks 432 and 434, like any or all of the other operations discussed in this application, may be performed in sequence, in series, in parallel, deferred for processing until a later stage/block, or skipped.

In block 438, the processor may correlate attributes of media content segments. For example, the processor may compare and analyze the relationships between different attributes within and across two or more media content segments. As part of these operations, processor may align audio attributes with corresponding video attributes to gain insights into how visual elements and audio elements complement or contrast each other, identify patterns (e.g., recurrent themes or motifs, etc.) by correlating similar objects, scenes, or audio cues in two or more media content segments, link emotional tones detected in the audio component with visual sentiment cues to determine the overall emotional impact of the media content, and/or perform other similar operations.

In block 440, the processor may determine objective attributes. For example, the processor may analyze and quantify concrete, measurable elements of the media content, which may include determining the resolution and quality of video, identifying and counting the number of occurrences of specific objects or brands, calculating the duration of scenes, and transcribing spoken words. The processor may evaluate technical aspects such as audio levels, video bitrate, and frame rate.

In block 442, the processor may determine subjective attributes (e.g., emotion, sentiment, etc.). For example, the processor may use LXMs, advanced natural language processing, and/or image recognition techniques to infer emotional tones and sentiments conveyed in both audio and video components, which may include analyzing speech patterns, word choices, and vocal tones in the audio for emotional cues, as well as interpreting facial expressions, body language, and visual context in the video. The processor may also determine the overall mood of the media segment by considering factors such as music choice, lighting, and color palette.

In block 444, the processor may add the media content segment attributes (e.g., any or all of the attributes of segment 208 illustrated and described with reference to FIG. 2A, etc.) to the media content knowledge repository. In block 446, the processor may optionally perform a responsive action (e.g., to improve media content strategies, enhance brand engagement, etc.). Examples of responsive actions include promoting specific posts on brand channels to increase their visibility and reach (e.g., when the content aligns well with the brand's marketing objectives, etc.), publishing tailored content aimed at engaging influencers (to use their significant follower bases for broader dissemination of the brand's message), identifying appropriate content creators or platforms where the product advertisement could yield maximum impact, generating and sending offers for product sponsorship, generating offers for product reviews and sending the offers to content creators that are determined to be well-versed in the product, generating and sending content designed to alter or enhance an influencer's viewpoint on a specific ToI or brand, reviewing published content to ensure it does not inadvertently result from product sponsorship, identify and monitor influencers whose viewpoints may not align with the brand, placing select influencers on a watchlist for future reference, etc. The processor may repeatedly perform the operations in blocks 428-446 until the processor determines that there are no unprocessed media content segments left (i.e., determination block 428="No").

As mentioned above, in various embodiments the processor may be configured to perform a responsive action (e.g., in block 446, etc.). Further examples of responsive actions include the processor launching advertising campaigns tailored to specific audience segments identified through media content analysis, updating or adjusting a content strategy based on the analysis of media content segment, using the determined attributes from the media content segments to personalize content for users on a platform, screening new media content segments for compliance with regulatory standards or platform guidelines, identifying and communicating potential collaborations between brands and content creators based on matching attributes, analyzing media content to generate keywords and tags that would improve the content's visibility and ranking on search engines and within the platform's search function, generating and sending feedback or suggestions for improvement to content creators based on the analysis of their content's performance, generating and publishing user engagement features or interactive elements for media content based on the content's theme and audience engagement patterns, publish or broadcast select media content across various platforms or networks to increase its reach and impact, and triggering an alert for immediate crisis management response detecting negative sentiment or controversial content associated with a brand or topic.

With reference to FIG. 4A, the processor may then perform the operations in block 410-426 repeatedly or continuously until the processor determines that all of the media content has been processed. In response to determining that there is no unprocessed media content (i.e., determination block 410="No"), the processor may finish and exit the method in block 446.

Figure 4D:
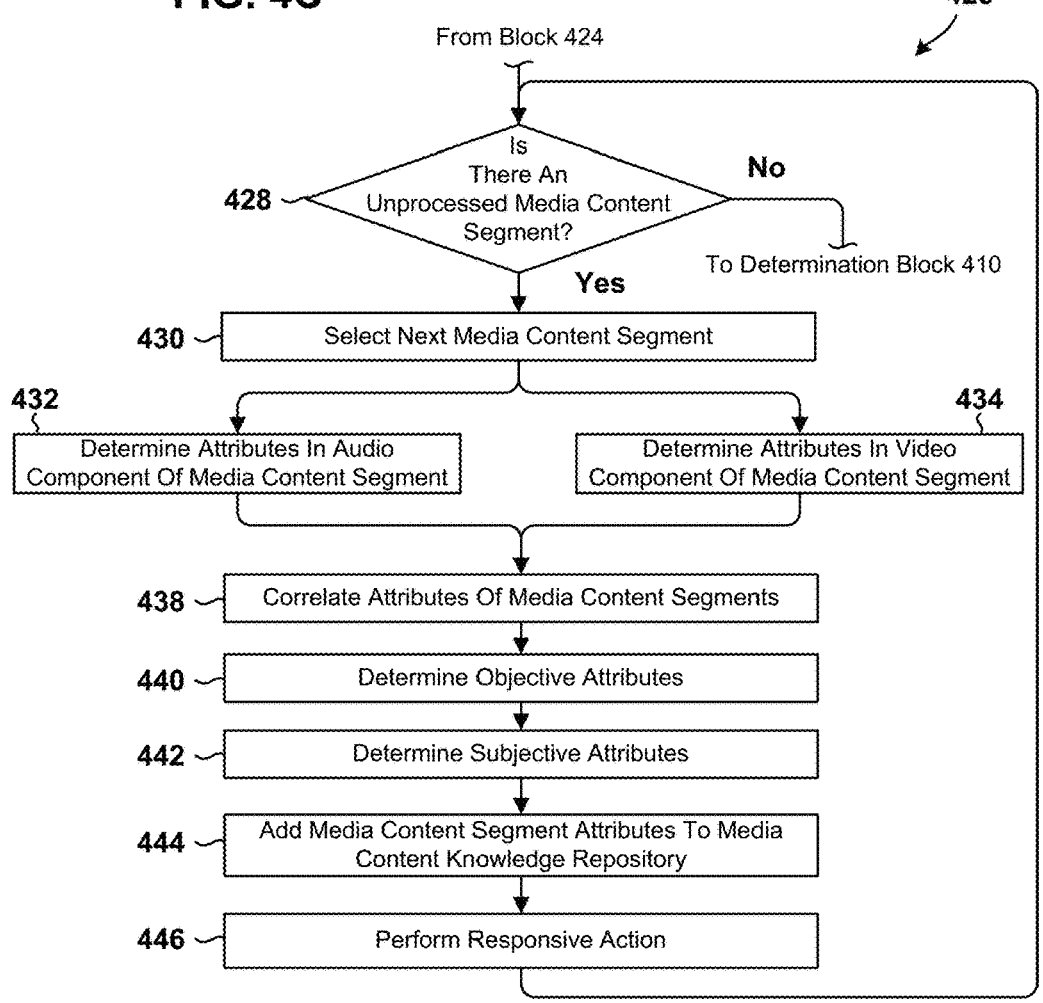
Figure 4E:
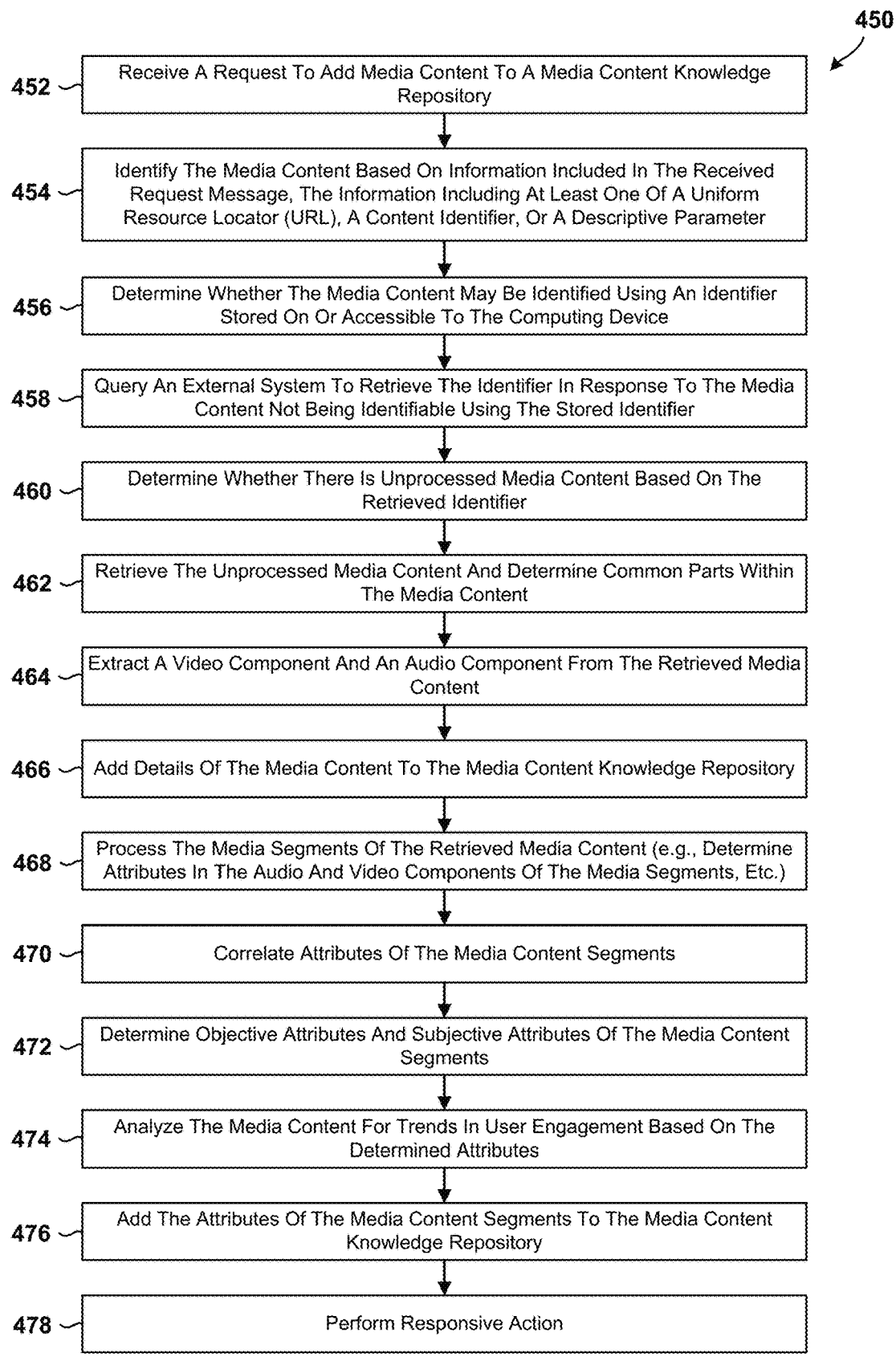
FIG. 4E is a process flow diagram that illustrates another method of processing media content segments within a computing device in accordance with some embodiments.

FIG. 4E is a process flow diagram that illustrates a method 450 of processing media content segments within a computing device in accordance with some embodiments. Method 450 may be performed by at least one processor or a processing system in a computing device that includes or implements all or portions of a media analytics platform (e.g., the media analytics platform 120 illustrated in FIG. 1, etc.).

For the sake of clarity and ease of presentation, methods 400, 404, 412, 426, and 450 are presented as separate embodiments. While each method is delineated for illustrative purposes, it should be clear to those skilled in the art that various combinations or omissions of these methods, blocks, operations, etc. could be used to achieve a desired result or a specific outcome. It should also be understood that the descriptions herein do not preclude the integration or adaptation of different embodiments of the methods, blocks, operations, etc. to produce a modified or alternative result or solution. The presentation of individual methods, blocks, operations, etc. should not be interpreted as mutually exclusive, limiting, or as being required unless expressly recited as such in the claims.

In block 452, the processor may receive a request to add media content to a media content knowledge repository. In some embodiments, in block 452, the processor may perform any or all of the operations discussed above with reference to block 402 in FIG. 4A. In some embodiments, the processor may be configured to periodically receive requests to add media content based on a predetermined schedule. In some embodiments, the request to add media content may be triggered by an event associated with the uploading of media content by a user on a social media platform.

In block 454, the processor may identify the media content based on information included in the received request message. The information may identify media content explicitly via a content identifier (e.g., via a uniform resource locator (URL), etc.) or in relative terms via a descriptive parameter (e.g., "most recent videos of a specific content creator," etc.). In some embodiments, in block 454, the processor may perform any or all of the operations discussed above with reference to block 404 in FIG. 4A.

In block 456, the processor may determine whether the identified media content is associated with an identifier stored on or accessible to the computing device. For example, the processor may cross-reference the identifier (e.g., a digital fingerprint, unique media ID, etc.) against a local or cloud-based database to find a matching record and retrieve the associated media content if the identifier is found. If the identifier is not found, the processor may initiate a search across connected network resources or request additional information from the source of the query to resolve the ambiguity and accurately locate the media content. In some embodiments, in block 456, the processor may perform any or all of the operations discussed above with reference to block 406 in FIG. 4B.

In block 458, the processor may query an external system to retrieve the identifier in response to the media content not being identifiable using the stored identifier. For example, the processor may send a request to an external content identification service that uses algorithms to analyze media content features (e.g., audio waveforms, image patterns, etc.) to find a match in a database. In some embodiments, the processor may also use metadata (e.g., timestamps, uploader information, content descriptions, etc.) and/or web scraping techniques to search for the media content across various social media platforms. The processor may use API calls to media platforms or content delivery networks to verify the media content's authenticity and retrieve the correct identifier in response to detecting a potential match. In some embodiments, in block 458, the processor may perform any or all of the operations discussed above with reference to block 408 in FIG. 4B.

In block 460, the processor may determine whether there is unprocessed media content based on the retrieved identifier. For example, the processor may cross-reference the retrieved identifier against records in the media content knowledge repository to determine whether the associated media content has already been analyzed and processed. The processor may flag the media content as unprocessed in response to determining that it is not included in the repository. In some embodiments, the processor may also evaluate the metadata associated with the identifier (e.g., the date of upload or last modification, etc.) to determine whether the content is newer than the latest entries in the knowledge repository. The processor may queue up the new content for processing in response to determining that the content is newer than the latest entries in the knowledge repository. In some embodiments, in block 460, the processor may perform any or all of the operations discussed above with reference to block 410 in FIG. 4A.

In block 462, the processor may retrieve the unprocessed media content and determine common parts within the media content. For example, the processor may receive (e.g., download, stream, etc.) the identified media content and begin analyzing it for recurrent themes, subjects, patterns, etc. As part of these operations, the processor may parse the video and audio streams to identify recurring visual elements (e.g., logos, faces, etc.) and auditory elements (e.g., specific phrases, background music, etc.). In some embodiments, the processor may use machine learning algorithms to detect and categorize these elements and/or to determine their frequency and context within the content. In some embodiments, the processor may partition the content into smaller media content segments (e.g., scenes in a video, etc.) and analyze each segment for commonalities or deviations from the overall content theme. In some embodiments, in block 462, the processor may perform any or all of the operations discussed above with reference to block 412 in FIG. 4A.

In block 464, the processor may extract a video component and an audio component from the retrieved media content or media content segment. For example, the processor may use digital signal processing techniques to separate the video stream from the audio stream within the media file. The processor may decode the media file format and isolate the visual and auditory data into distinct tracks or portions. The video extraction process may include capturing visual elements (e.g., frame rate, resolution, color schemes, motion patterns, etc.). The audio extraction may include isolating audio elements (e.g., spoken words, background music, sound effects, ambient noise, etc.). In some embodiments, the processor may analyze these components for quality, clarity, and any other attributes relevant to the overall analysis of the media content. The processor may partition the media into primary components and prepare the content for more granular analysis (e.g., scene recognition in the video, speech-to-text conversion in the audio, etc.). In some embodiments, in block 464, the processor may perform any or all of the operations discussed above with reference to blocks 420 and 422 in FIG. 4C.

In block 466, the processor may add details of the media content to the media content knowledge repository. In some embodiments, the details of the media content added to the media content knowledge repository may include metadata associated with the media content. For example, the processor may compile and store a range of metadata elements such as the title, length, resolution, format of the media content, date of creation, source of upload, content tags or keywords, etc. In some embodiments, the processor may also store extracted data from the video and audio analysis (e.g., scene descriptions, transcriptions of dialogues, identified objects or persons in the video, key auditory elements, etc.). In some embodiments, in block 466, the processor may perform any or all of the operations discussed above with reference to block 424 in FIG. 4C.

In block 468, the processor may process the media content segments of the retrieved media content, which may include determining attributes in the audio and video components of the media content segments. For example, the processor may analyze the video component for visual attributes such as lighting conditions, color palettes, object presence, facial expressions, and scene transitions. The processor may use image recognition algorithms to identify key visual elements or track movement patterns within the video. Concurrently, the processor may analyze the audio component and evaluate attributes such as speech clarity, language, background noise levels, music genres, and emotional tone. In some embodiments, the processor may use speech recognition techniques to transcribe dialogues and sound analysis tools to classify non-speech audio elements. In various embodiments, the processor may extract meaningful insights from the media content segments, identify the predominant themes, evaluate the quality of the content, determine the context and narrative structure of the media content, etc. In some embodiments, in block 468, the processor may perform any or all of the operations discussed above with reference to blocks 432 and 434 in FIG. 4D.

In block 470, the processor may correlate attributes of the media content segments. For example, the processor may compare and analyze the relationship between visual and auditory elements to determine how they complement or contrast with each other. The processor may align the timing of specific visual events (e.g., scene changes, the appearance of an object, etc.) with key moments in the audio track (e.g., changes in music tempo, start of a dialogue, etc.) and/or evaluate the synchronization between audio and video. The processor may use such correlations to, for example, determine how the visual elements correspond with shifts in the emotional tone in the audio elements. The processor may also use the correlations to detect various patterns, such as recurring combinations of visual and audio elements that signify a particular style or theme. In some embodiments, in block 470, the processor may perform any or all of the operations discussed above with reference to block 438 in FIG. 4D.

In block 472, the processor may determine objective attributes and subjective attributes of the media content segments. For example, the processor may identify objective attributes (e.g., duration of each segment, the resolution of the video, relative audio levels, the number of spoken words, etc.) that represent quantifiable or measurable aspects of the content. The processor may also identify subjective attributes (e.g., the perceived mood or tone of the audio, the aesthetic appeal of the visuals, the emotional impact of the content based on visual cues and auditory tone, etc.). In some embodiments, in block 472, the processor may perform any or all of the operations discussed above with reference to blocks 440 and 442 in FIG. 4D.

In some embodiments, as part of the operations in block 472, the processor may identify the ToIs included in (e.g., discussed, shown, etc.) in the media content. The processor may extract and analyze ToI details (e.g., by determining that the ToI name is contained in the extracted text, by determining that one of the extracted objects is a product associated with the ToI, etc.), perform character recognition to identify objects as ToIs (e.g., a bottle of "River Fresh Water" will have its name displayed prominently on it), identify ToIs using an external product identifier that is a recognized standardized identifier (e.g., a stock keeping unit (SKU), a global trade item number (GTIN), an Amazon standard identification number (ASIN)) or an identifier for a brand or manufacturer and/or which unambiguously identifies the ToI and may be used to associate the ToI with all of its attributes. In some embodiments, the processor may assign an internal ToI identifier to the ToI in response to determining that it is unable to identify the ToI using an external ToI identifier (e.g., because there is no ToI with similar ToI attributes in the ToI knowledge repository). This may, for example, allow the processor to proceed with determining a sentiment for the ToI. The processor may update and complete the existing ToI information in the knowledge repository if the processor identifies the ToI again using the internal ToI identifier (e.g., in another media content). The processor may convert the internal ToI identifier for a ToI to an external ToI identifier at some future time (e.g., as a result of receiving additional extracted ToI details, if the ToI knowledge repository is updated).

In block 474, the processor may analyze the media content for trends in user engagement based on the determined attributes. For example, the processor may evaluate how certain attributes (e.g., specific visual scenes, audio cues, the overall sentiment of segments, etc.) correlate with user engagement metrics (e.g., likes, shares, comments, view durations, etc.). In some embodiments, the processor may use statistical analysis to identify various patterns (e.g., a spike in viewer engagement during segments with high emotional intensity, etc.). In some embodiments, the processor may determine the styles or themes that resonate most with the audience by tracking and comparing changes in engagement over time to different types of content releases.

In block 476, the processor may add the attributes of the media content segments to the media content knowledge repository. For example, the processor may compile and store a robust dataset for each media content segment (including the objective and subjective attributes, etc.). As a further example, the processor may create detailed records in the repository that encapsulate information such as segment length, audio and video quality metrics, thematic elements, mood scores, sentiment analysis results, etc. In some embodiments, in block 476, the processor may perform any or all of the operations discussed above with reference to block 444 in FIG. 4D.

In block 478, the processor may optionally perform a responsive action. In some embodiments, in block 476, the processor may perform any or all of the operations discussed above with reference to block 446 in FIG. 4D. For example, the processor may generate and send content that has a high probably of causing a particular influencer to change his or her viewpoint on a specific ToI, etc. The processor may repeat the operations of 460-478 until all media content segments are processed and terminate method 450 in response to determining that all media content has been processed.

Figure 5A:
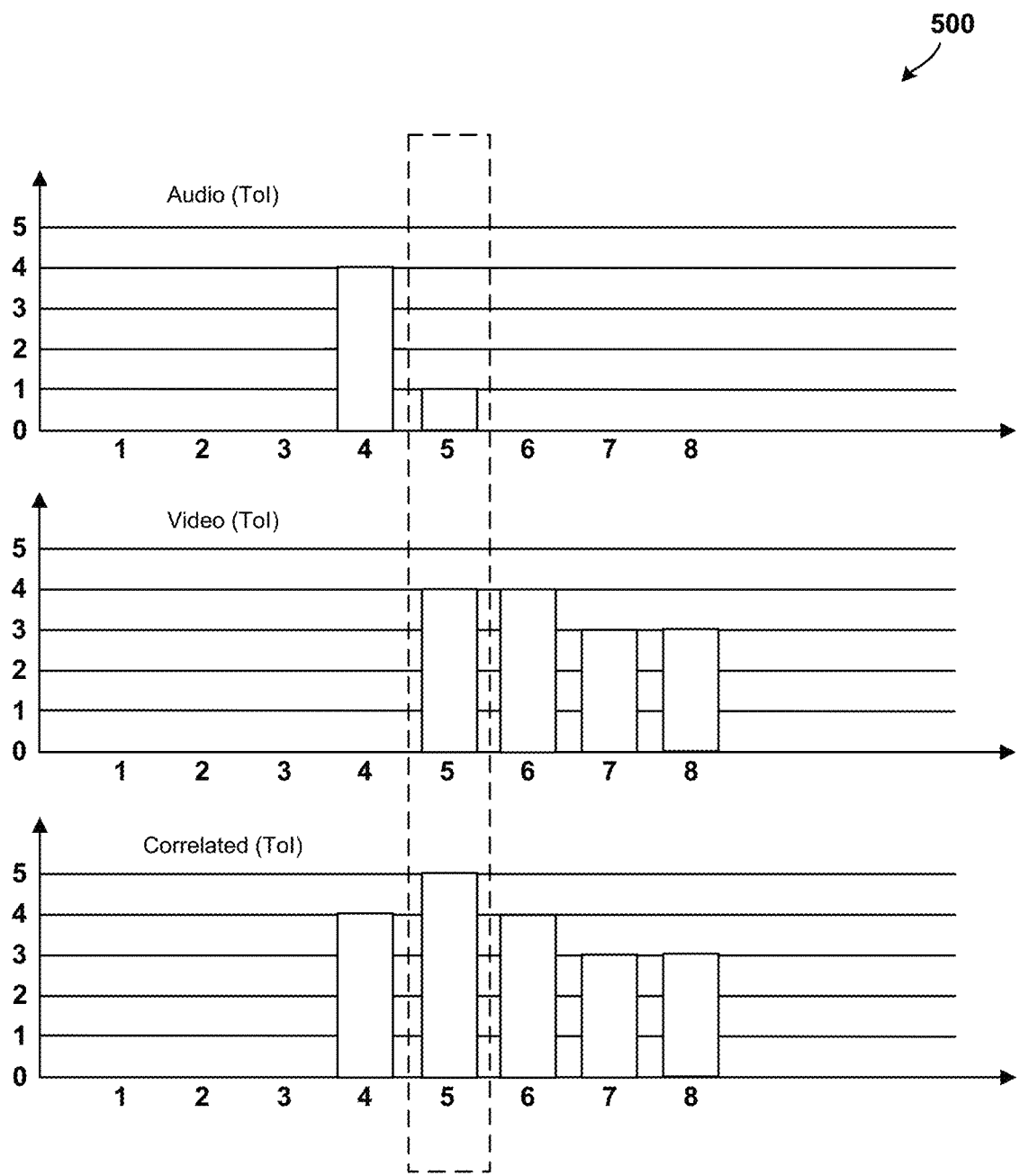
Figure 5B:
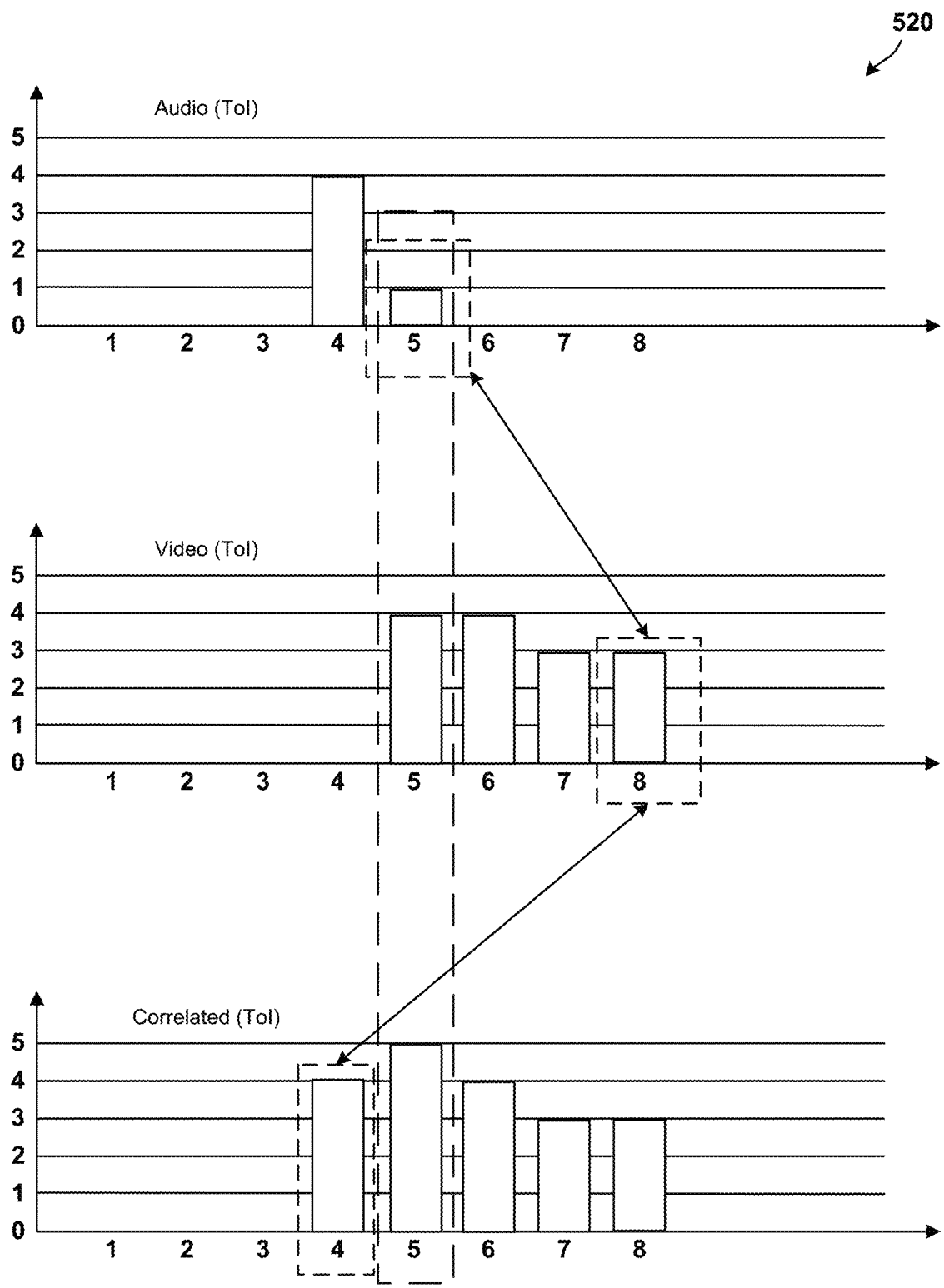

FIGS. 5A-5C illustrate example graph stacking information structures 500, 520, 540 that may be used to correlate and/or evaluate various attributes in accordance with some embodiments. That is, as discussed above (e.g., with reference to blocks 438-444 in FIG. 4D, etc.) in some embodiments the processor may correlate attributes of media content segments, determine objective attributes, determine subjective attributes (e.g., emotion, sentiment, etc.), and add the media content segment attributes to the media content knowledge repository. As also discussed above (e.g., with reference to segment 208 in FIG. 2A, etc.) the media content segment attributes may include a timestamp attribute, a time/sequence in video/media attribute, a duration attribute, a scene attribute, an ObjectType attribute, a VisualEmotion(s) attribute, etc. The graph stacking information structures illustrated in FIGS. 5A-5c may be used to correlate and/or evaluate these and other attributes and metrics (e.g., as part of the operations in block 438, etc.).

FIGS. 5A and 5B are bar charts that illustrate the relationships between ToIs (e.g., products, etc.) within the audio and video components of media content alongside their correlated and/or aggregated versions. For example, FIG. 5A illustrates how different modal elements (e.g., audio, video, etc.) may be analyzed independently and/or vertically correlated within a time segment to enhance the understanding of each segment. As a further example, FIG. 5A may demonstrate how the media content creator initially discusses the product in the audio track (i.e., in segment 4) before the product is visually revealed in the video (i.e., in segment 5). This sequential representation may highlight the anticipation that is built through the audio before the product's visual introduction.

FIG. 5B illustrates that the system may query and correlate data not only vertically within a given time segment, but also horizontally across different time segments. This approach may allow the system to extract more nuanced meanings and patterns from the multi-modal elements. For example, FIG. 5B may demonstrate a shift in the content's focus. The product is actively discussed in segment 4 and then is merely present visually on a table from segments 5 to 8. This transition from an active audio mention to a passive visual presence may underscore the nuanced ways in which the product or ToI may be featured in media content and how audience attention may be directed or redirected. As another example, a product may be introduced in an early segment (in audio and/or video), then disappear (e.g., the reviewer stops naming it, and it goes off screen, influencer puts it in in her shopping bag, etc.), and there is a positive sentiment. The positive sentiment may be correlated to the product mention even though the product mention occurred several segments beforehand.

FIG. 5C is a spider web chart iteration of the bar charts in FIGS. 5A and 5B. FIG. 5C introduces an additional layer of complexity by allowing for the representation of multiple attributes within a single segment. For example, a range of emotional or thematic attributes (e.g., joy, surprise, etc.) may be identified concurrently in any given segment of the media content. The spider web format may effectively visualize the coexistence and interplay of these multiple attributes, offering a more detailed and comprehensive view of the emotional and thematic landscape of the media content. These and other spider web charts may allow for an insightful understanding of how different elements within a segment collectively contribute to the overall narrative and audience engagement.

Figure 6A:
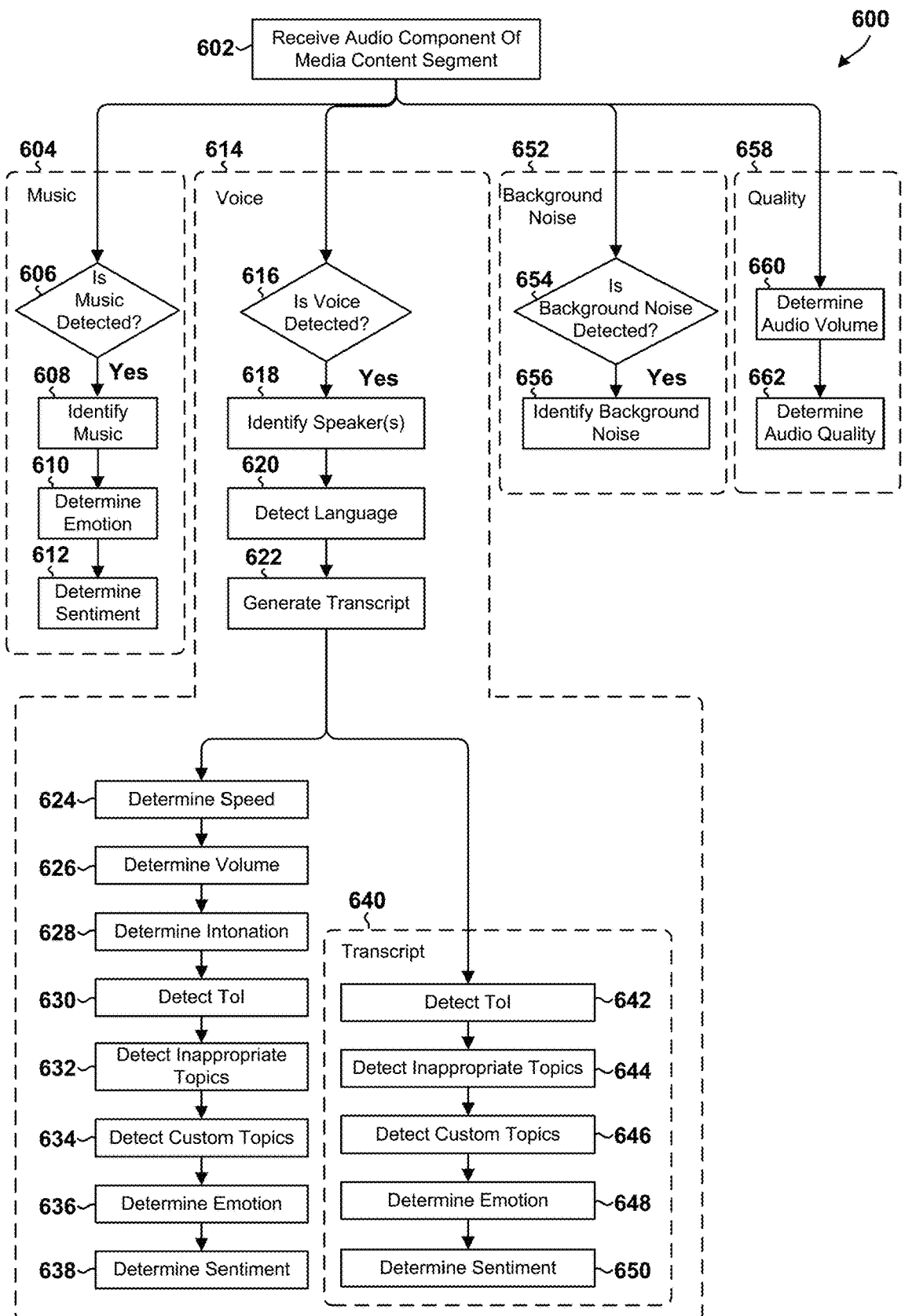
FIGS. 6A and 6B are process flow diagrams that illustrate methods for determining attributes in the audio component of the selected media content segment in accordance with some embodiments.

FIG. 6A illustrates a method 600 for determining attributes in the audio component of the selected media content segment (e.g., as part of block 432 in FIG. 4D, etc.) in accordance with some embodiments. Method 600 may be performed by at least one processor or a processing system in a computing device that includes or implements all or portions of a media analytics platform (e.g., the media analytics platform 120 illustrated in FIG. 1, etc.).

In block 602, the processor may receive an audio component of the media content segment. For example, the processor may receive an audio file or extract an audio track from a multimedia file and prepare the audio data for further analysis (e.g., decompressing the file, normalizing the audio levels, converting it into a format suitable for the subsequent processing steps, etc.).

In response to receiving the audio component, the processor may perform any or all of the operations in blocks 604, 614, 652, and 658 sequentially or in parallel. The operations in block 604 may include any or all of the operations in blocks 606-612, the operations in block 614 may include any or all of the operations in blocks 616-650, the operations in block 652 may include any or all of the operations in blocks 654 and 656, and the operations in block 658 may include any or all of the operations in blocks 660 and 662. In addition, it should be understood that, as with all the operations in all the blocks discussed in this application, the results of an operations in one block may be used as an input to the operations of another block (e.g., the language detection in block 620 may influence the voice-to-text engine used in block 622, etc.).

In determination block 606, the processor may determine whether music was detected. For example, the processor may use audio recognition algorithms to scan the audio component for characteristics typical of music (e.g., melody, rhythm, harmony, etc.). As another example, the processor may compare the audio component to a database of known music tracks to determine whether there are any matches.

The processor may exit block 604 in response to determining that music was not detected (i.e., determination block 606="No") and proceed to analyze other elements of the audio track (e.g., voice, speech, background noise, ambient sounds, etc.).

In response to determining that music was detected (i.e., determination block 606="Yes"), the processor may identify the detected music in block 608. For example, the processor may use music identification services or databases to pinpoint the specific song, genre, or artist associated with the audio. The processor may also analyze the beat, tempo, and instrumentation to classify the music style (which may be useful for understanding the mood or setting of the media content, etc.).

In block 610, the processor may determine emotion. For example, the processor may analyze the tone, pitch, and rhythm of the audio to infer emotional cues. In some embodiments, the processor may use machine learning models trained on various audio samples to identify emotions such as happiness, sadness, anger, or excitement expressed in the audio component.

In block 612, the processor may determine sentiment. For example, the processor may use sentiment analysis algorithms to evaluate song lyrics or other spoken words in the audio track. The processor may analyze language patterns and speech intonations to determine whether the overall sentiment conveyed is positive, negative, or neutral.

In determination block 616, the processor may determine whether voice was detected. For example, the processor may use voice recognition algorithms to analyze the audio waveform for patterns characteristic of human speech. The processor may also distinguish spoken words from other sounds in the audio track and determine whether the segment contains discernible dialogue or vocalizations.

The processor may exit block 614 in response to determining that voice was not detected (i.e., determination block 616="No") and proceed to analyze other audio elements such as music, background noises, quality, etc.

In response to determining that voice was detected (i.e., determination block 616="Yes"), the processor may identify speaker(s) in block 618. For example, the processor may use speaker recognition technology to distinguish between multiple voices or different speakers in the audio. The processor may analyze unique vocal characteristics (e.g., pitch, timbre, speaking style, etc.) to associate spoken parts to individual speakers.

In block 620, the processor may detect language. For example, the processor may use language detection techniques to identify the language spoken in the audio segment, which may include analyzing phonetic patterns, syntax, and common phrases to determine the primary language or multiple languages present in a dialogue in the audio component.

In block 622, the processor may generate transcript. For example, the processor may use automatic speech recognition (ASR) or another speech-to-text technology to convert spoken words into written text.

In block 624, the processor may determine speed. For example, the processor may analyze the tempo of speech in the audio component, measure the rate of word delivery in words per minute, detect pauses, determine the duration of words, determine the overall rhythm of speech, etc.

In block 626, the processor may determine volume. For example, the processor may measure the loudness of the audio component in relative audio levels, evaluate the amplitude of the audio waveform to understand variations in volume that indicate anger, emphasis, excitement, etc.

In block 628, the processor may determine intonation. For example, the processor may analyze the pitch variations in the speaker's voice and identify patterns such as rising or falling inflections to determine questions, statements, or commands in the speech, determine context, determine the speaker's intent, etc.

In block 630, the processor may detect ToI. For example, the processor may use keyword recognition or semantic analysis to identify specific subjects or themes mentioned in the audio (e.g., product names, places, significant events, trending topics, etc.) that are relevant to the analysis of the media content.

In block 632, the processor may detect inappropriate topics. For example, the processor may use content moderation techniques to scan for and flag potentially offensive, sensitive, or age-inappropriate language and topics. In some embodiments, the processor may compare the speech against a database of flagged words or controversial subjects.

In block 634, the processor may detect custom topics. For example, the processor may be configured to recognize specific topics of interest to the user (e.g., industry-specific terminology, branded content, personalized themes, etc.) via custom keyword lists or machine learning models trained on specialized content.

In block 636, the processor may determine emotion. For example, the processor may analyze vocal cues (e.g., pitch, volume, speech rate, etc.) to determine emotions (e.g., happiness, anger, sadness, etc.) or the emotional tone of the audio content.

In block 638, the processor may determine sentiment. For example, the processor may use sentiment analysis techniques to analyze language patterns, word choices, the context in which words or phrases are used, the overall tone of the speech (e.g., positive, negative, neutral, etc.), etc.

In block 642, the processor may detect ToI based on the transcript. For example, the processor may query an LXM and/or use natural language processing (NLP) to scan the transcribed text for specific keywords or phrases that indicate subjects of relevance (e.g., product names, brand mentions, industry-specific terminology, etc.).

In block 644, the processor may detect inappropriate topics based on the transcript. For example, the processor may use content moderation techniques to identify and flag any language or topics within the transcript that may be considered offensive, sensitive, or inappropriate. In some embodiments, the processor may cross-reference the language or topics within the transcript against a database of flagged terms or use LXMs or machine learning to determine patterns that are indicative of controversial or unacceptable content.

In block 646, the processor may detect custom topics based on the transcript. For example, the processor may be configured to identify topics of interest based on a predefined set of criteria or keywords. In some embodiments, the processor may be configured to filter the transcript for mentions of niche subjects, industry-specific jargon, or any other specialized content that has been pre-configured into the system.

In block 648, the processor may determine emotion based on the transcript. For example, the processor may analyze the choice of words, phrases, and the overall context within the transcript to determine the underlying emotions conveyed in the speech. In some embodiments, the processor may use sentiment analysis techniques to recognize emotional cues in language (e.g., happiness, frustration, excitement, etc.).

In block 650, the processor may determine sentiment based on the transcript. For example, the processor may use text-based sentiment analysis techniques to evaluate the overall tone of the written speech. The processor may evaluate word choice, phrasing, and the construction of sentences to categorize the sentiment as positive, negative, or neutral.

In determination block 654, the processor may determine whether background noise was detected. For example, the processor may utilize audio analysis tools to scan the audio track for sounds that are inconsistent with the primary audio elements (e.g., speech, music, etc.) and/or distinguish ambient sounds (e.g., traffic noise, office chatter, environmental sounds, etc.) that are present in the background of the audio recording.

The processor may exit block 652 in response to determining that background noise was not detected (i.e., determination block 654="No"). In response to determining that background noise was detected (i.e., determination block 654="Yes"), the processor may identify the background noise in block 656. For example, the processor may use sound classification techniques to categorize the type of background noise (e.g., street noise, mechanical sounds, nature sounds, etc.). In some embodiments, the processor may be configured to evaluate the volume and consistency of the noise to enhance the clarity of the primary audio elements in the segment and/or for decisions regarding noise reduction or filtering strategies.

In block 660, the processor may determine audio volume. For example, the processor may analyze the audio waveform to measure its amplitude and evaluate the loudness levels throughout the audio track. As part of these operations, the processor may determine the average relative audio levels, identify instances of volume spikes or drops, detecting variations in loudness that could affect the listener's experience, etc.

In block 662, the processor may determine audio quality. For example, the processor may evaluate various aspects of the audio track (e.g., clarity, balance, the presence of any distortions or artifacts, bitrate, frequency range, the signal-to-noise ratio, etc.) to gauge the overall fidelity of the audio and/or to detect issues such as clipping, echo, feedback, etc.

Figure 6B:
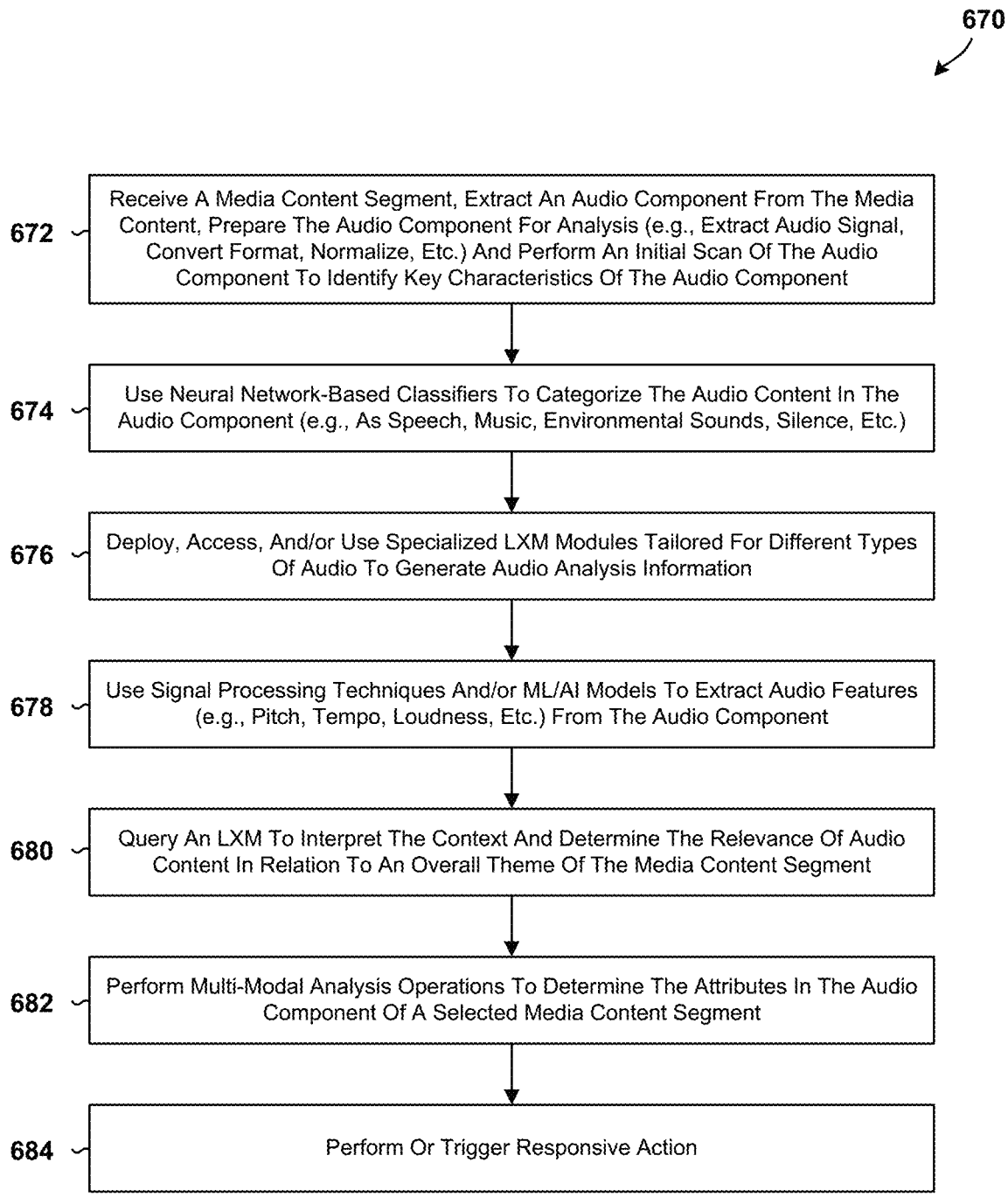

FIG. 6B illustrates another method 670 for determining attributes in the audio component of the selected media content segment (e.g., as part of block 432 in FIG. 4D, etc.) in accordance with some embodiments. Method 670 may be performed by at least one processor or a processing system in a computing device that includes or implements all or portions of a media analytics platform (e.g., the media analytics platform 120 illustrated in FIG. 1, etc.). As with any or all of the other operations discussed in this application, in various embodiments any or all of the operations in method 670 may be performed in sequence, out of sequence, in series, in parallel, deferred for processing until a later stage/block, skipped, etc.

In block 672, the processor may receive a media content segment, extract an audio component from the media content, prepare the audio component for analysis (e.g., extract audio signal, convert format, normalize, etc.) and perform an initial scan of the audio component to identify key characteristics (e.g., presence of speech, music, environmental sounds, silence, etc.) of the audio component.

In block 674, the processor may use neural network-based classifiers to categorize the audio content in the audio component (e.g., as speech, music, environmental sounds, silence, etc.). For example, the processor may implement and use a neural network trained on a large dataset of a wide variety of audio types to distinguish between different categories such as speech, music, environmental noises, and silence. In some embodiments, the processor may categorize the audio content in the audio component based on a result analyzing the spectral and temporal features of the audio component. For example, the processor may use the neural network-based classifiers to detect speech in a segment by identifying unique patterns (e.g., phonemes and intonation typical of human speech, etc.). Similarly, the processor may use the neural network-based classifiers to detect music in a segment by identifying rhythmic patterns, harmonies, and specific instrumentation characteristics. The processor may use the neural network-based classifiers to detect environmental or background noise in a segment by identifying and categorizing common background sounds (e.g., traffic noise, nature sounds, office ambience, etc.). The processor may also use the neural network-based classifiers to filter out the identified background noises from the primary audio content to improve the clarity of the intended audio (e.g., a spoken dialogue, etc.) for subsequent or more detailed analyzes operations.

In block 676, the processor may deploy, access, and/or use specialized LXM modules tailored for different types of audio for comprehensive and precise audio analysis. For example, the processor may use large speech models (LSMs) for speech recognition, speaker identification, and language detection. The processor may use large language models (LLMs) for context understanding, sentiment analysis, transcript generation, and topic detection from speech. The processor may use large language/vision models (LVMs) for analyzing audio-visual content for which the audio component is coupled with visual data (e.g., in video segments). The processor may use large positioning models (LPMs) for analyzing media technologies that operate in multidimensional spaces such as XR, VR, AR, MR, etc. The processor may use hybrid models for complex scenarios in which the audio contains overlapping elements (e.g., speech over music or in noisy environments, etc.). In some embodiments, the processor may be configured to use specialized ML/AI models that are trained on a focused dataset to detect emotion from tonal variations, classify ambient sounds, and other similar nuanced analysis.

In block 678, the processor may use signal processing techniques and/or ML/AI models to extract audio features (e.g., pitch, tempo, loudness, etc.) from the audio component. The processor may analyze the extracted features for insights (e.g., emotional tone, speech dynamics, background context, etc.). For example, the processor may use Fast Fourier Transform (FFT) to decompose audio signals into their constituent frequencies and perform pitch analysis to determine the emotional tone or context within a piece of music or speech.

In some embodiments, the processor may use signal processing techniques that are enhanced with ML/AI models. For example, the processor may perform tempo analysis operations that include applying beat detection algorithms to identify the beats per minute (BPM) of a music track and use ML/AI models to correlate the BPM with specific genres or moods. The processor may perform volume or loudness analysis that includes measuring the amplitude of the audio waveform, use ML/AI models to detect patterns in volume changes, and use the detected patterns to determine emotional states or identify key moments in a narrative. In some embodiments, the processor may use the ML/AI models to analyze the combination of these audio features and generate insights based on the overall emotional tone of the content. For example, the processor may use the ML/AI models to detect excitement, calmness, or tension based on the interplay of pitch, tempo, and loudness. In some embodiments, the processor may use the ML/AI models to analyze speech dynamics. For example, the processor may analyze the rate and rhythm of speech and use AI models to interpret these characteristics for sentiment analysis or speaker profiling. As part of these operations, the processor may evaluate the speaker's confidence, stress level, etc. to detect nuanced emotional cues in conversation.

In block 680, the processor may query an LXM to interpret the context and determine the relevance of audio content in relation to an overall theme of the media content segment. In some embodiments, the processor may perform semantic analysis to understand the underlying messages or themes in the audio content. For example, the processor may analyze a series of product review videos on a social media platform, determine specific product features being discussed (e.g., "battery life" or "camera quality" in a smartphone review, etc.), and query an LXM to better understand the product features being discussed and align these features with the overall sentiment towards the product. The processor may generate insights into the opinions and biases of the reviewers by analyzing language nuances (e.g., tone, specific word choices, etc.) to identify key themes (e.g., user satisfaction, product reliability, value for money, etc.) of the product reviews and/or determine whether the reviews are predominantly positive, negative, neural, or mixed.

In block 682, the processor may perform multi-modal analysis operations to determine the attributes in the audio component of a selected media content segment. For example, in cases where audio is part of multi-modal content (e.g., audio-video), the processor may integrate audio analysis with visual and textual analysis for a more comprehensive understanding. In some embodiments, the processor may use multi-modal LXMs to correlate and synthesize insights from different content types.

The multi-modal analysis operations may allow the processor to capture nuances and subtleties that might be missed in a single-mode analysis. That is, audio elements in isolation might offer limited insights. For example, a speech in a video may convey a certain sentiment, but when combined with visual cues such as facial expressions or scene settings, the context might change entirely. For example, in a movie scene, the tone of the voice of a character may suggest sadness, but the visual context (e.g., a celebratory environment, etc.) may indicate sarcasm or suppressed emotions that changes the interpretation of the scene. In addition, the processor may generate much deeper insights by combining audio (what is being said about a product), video (how the product is being used), and text (brand names, etc.).

In some embodiments, the processor may perform multi-modal analysis operations to identify inconsistencies between different modes of information. For instance, a political speech might have a positive textual message, but the tone of voice and facial expressions may convey stress or insincerity.

In block 684, the processor may perform, initiate, or trigger any or all of the responsive actions discussed in this application (e.g., responsive actions discussed with reference to block 446 in FIG. 4D, etc.). For example, the processor may enhance brand engagement by promoting specific posts on brand channels that in alignment with marketing strategies and/or are tailored to the audience's engagement patterns, engage influencers by publishing personalized content aimed at using their follower base for wider dissemination of the brand's message, etc.

Figure 7A:
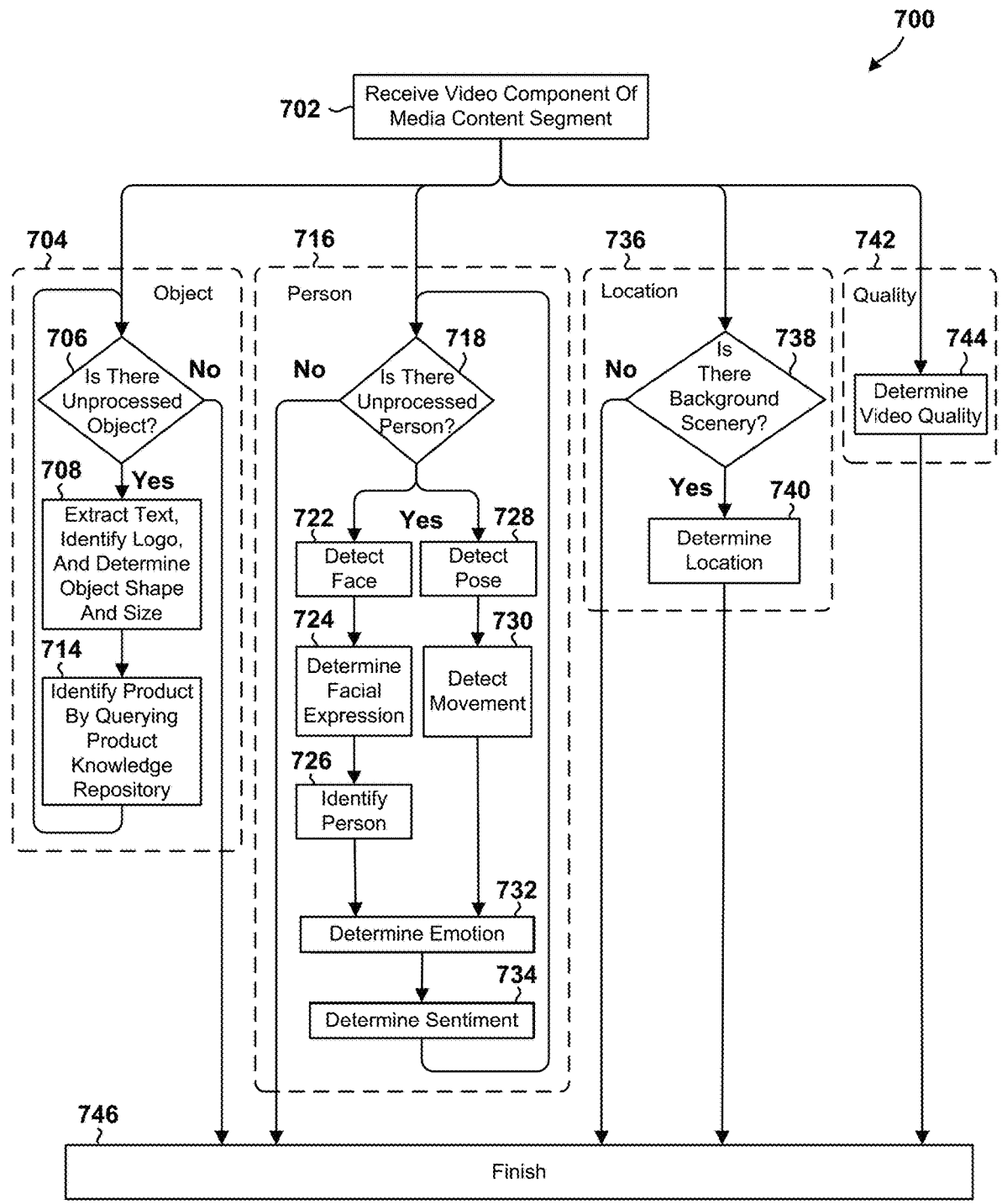
FIGS. 7A-7C are process flow diagrams that illustrate methods for determining attributes in the video component of the selected media content segment in accordance with some embodiments.
Figure 7B:
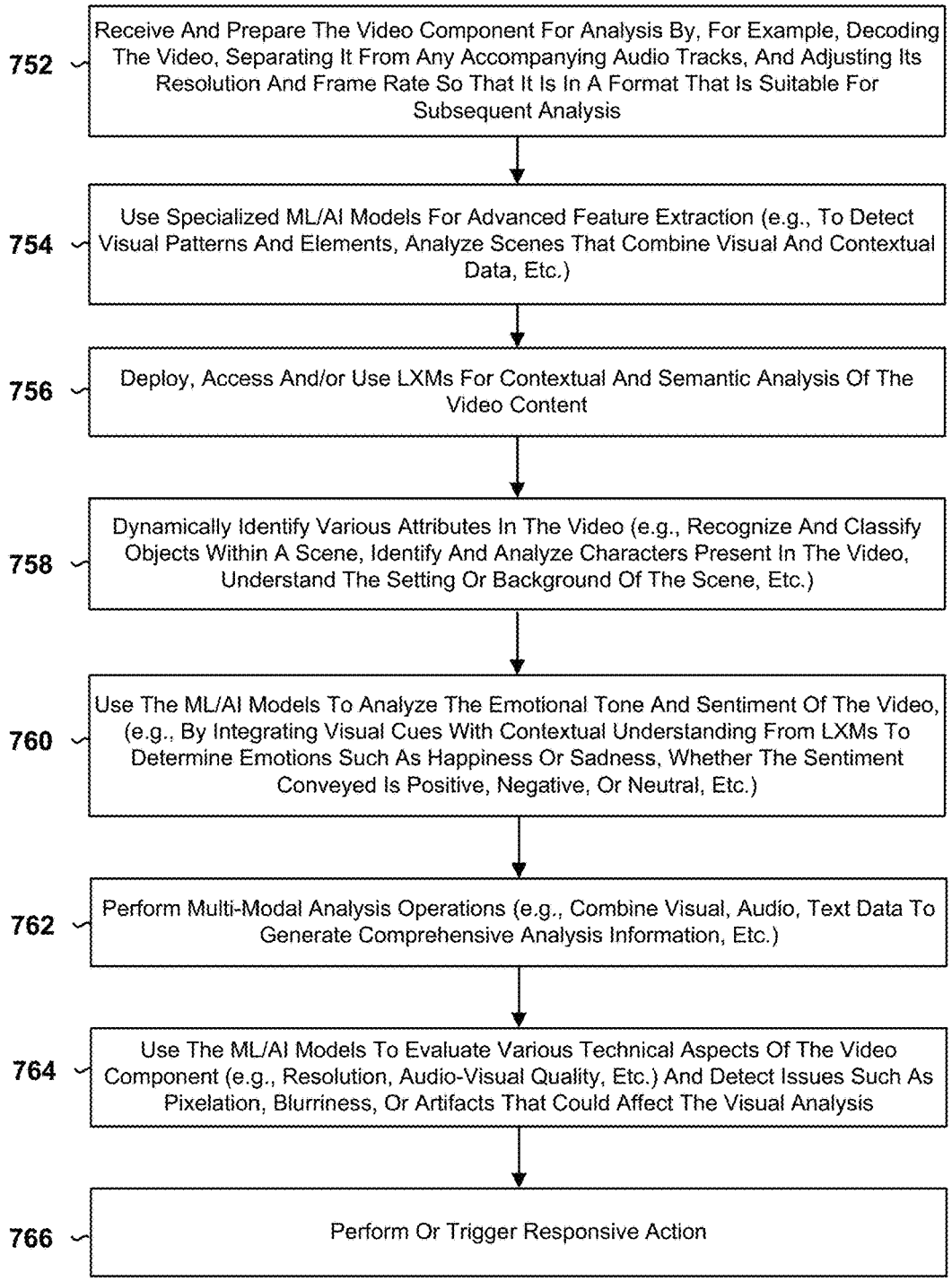
Figure 7C:
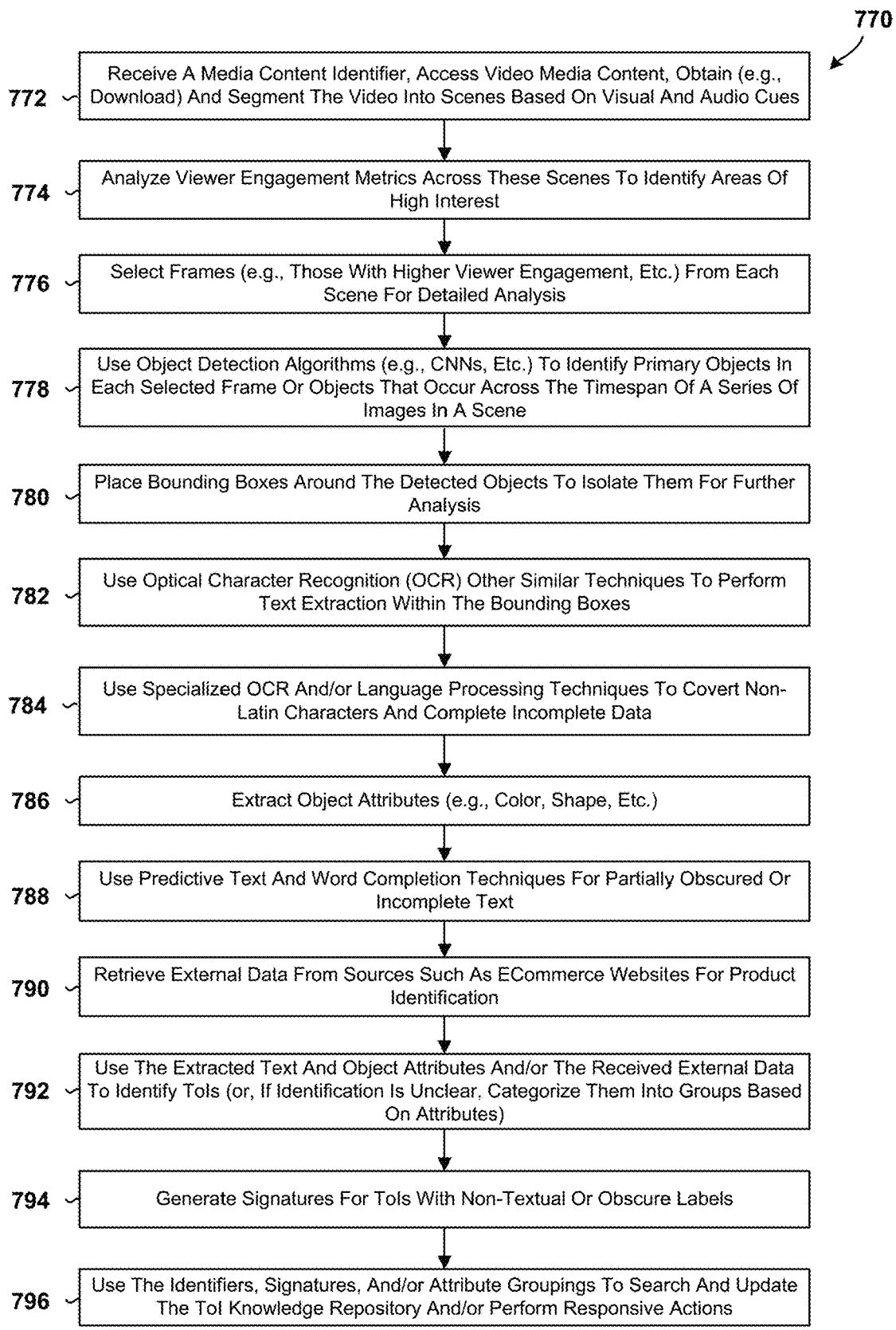

FIGS. 7A-C illustrate methods for determining attributes in the video component of the selected media content segment (e.g., as part of block 434 in FIG. 4D, etc.) in accordance with some embodiments. These embodiments, as well as the others the other discussed in the application, improve the performance and functioning of a computing device, particularly within the context of media analytics for which they significantly reduce the search space (and thus response times, etc.) and improve the understanding of video content to facilitate more precise analysis for various applications, such as facial recognition, emotion detection, scene analysis, analysing facial expressions, analysing body language, analysing context within the video, determining overall sentiment of the content, determining whether the content conveys positive, negative, or neutral emotions, understanding audience reactions to media content, scene analysis, geographic targeting, and context-aware applications.

FIG. 7A illustrates a method 700 for determining attributes in the video component of the selected media content segment (e.g., as part of block 434 in FIG. 4D, etc.) in accordance with some embodiments. Method 700 may be performed by at least one processor or a processing system in a computing device that includes or implements all or portions of a media analytics platform (e.g., the media analytics platform 120 illustrated in FIG. 1, etc.).

In block 702, the processor may receive the video component of the media content segment. For example, the processor may extract visual data from a multimedia file or accept a direct video input. As part of these operations, the processor may decode the video from its original format, separate it from any accompanying audio tracks, prepare the separated video for analysis, adjust the video resolution or frame rate, and/or perform other similar operations.

In response to receiving the video component, the processor may perform any or all of the operations in blocks 704, 716, 736, and 742 sequentially or in parallel. Block 704 may include blocks 706-714, block 716 may include blocks 718-734, block 736 may include blocks 738 and 740, and block 742 may include block 744.

In determination block 706, the processor may determine whether there are still unprocessed objects remaining. For example, the processor may use object recognition technologies and/or scan the video frame-by-frame to identify elements that have not yet been analyzed. As part of these operations, the processor may perform various operations to detect shapes, colors, or patterns that are indicative of objects within a visual field of the video.

In response to determining that there are unprocessed objects remaining (i.e., determination block 706="Yes"), the processor may extract text, identify logos, determine object shapes and sizes, and perform other similar operations in block 708. For example, the processor may use optical character recognition (OCR) to extract and digitize text appearing in the video, use image recognition techniques to identify logos and brand symbols and perform all or portions of one or more of the methods disclosed herein to measure the dimensions and analyze the geometry of various objects within the scene.

In block 714, the processor may identify the product (or ToI) by querying the product knowledge repository. For example, the processor may cross-reference the characteristics and features of detected objects (e.g., shape, colors, logos, etc.) against a product information database and/or otherwise match the visual data with product records to identify and classify the products appearing in the video. As part of these operations, the processor may determine the product types, brands, and other relevant details for any or all the identified products in the video segment.

The processor may perform the operations in blocks 706-714 repeatedly until it determines that no remaining unprocessed objects. In response to determining that there are no remaining unprocessed objects (i.e., determination block 706="No"), the processor may finish the process in block 746. In some embodiments, the processor may allocate the newly available resources to other video analysis systems (e.g., person analysis, facial recognition, location analysis, quality analysis, scene transition detection, motion analysis, etc.).

In determination block 718, the processor may determine whether there is an unprocessed person record or attribute (e.g., name, location, age, gender, etc.).

In response to determining that there is an unprocessed person remaining (i.e., determination block 718="Yes"), the processor may detect a face in block 722, determine a facial expression in block 724, and identify the person in block 726. The processor may detect pose in block 728 and detect movement in block 730.

It should be understood that the processor may perform any or all of the operations discussed in this application sequentially, in parallel, deferred until a later stage/block, etc. For example, in some embodiments, the processor may perform the operations in blocks 722-726 concurrently or in parallel with the operations in blocks 728-730. In other embodiments, the processor may perform the operations in blocks 722-726 and then perform the operations in blocks 728-730 or perform the operations in blocks 728-730 and then perform the operations in blocks 722-726 . . . . In addition, it should be understood that, as with all the operations in all the blocks discussed in this application, the results of an operations in one block may be used as an input to the operations of another block.

In block 732, the processor may determine emotion. For example, the processor may analyze facial expressions, body language, and other visual cues within the video segment, evaluate changes in facial muscle movements, eye movements, and gestures, and perform other similar operations to determine emotions such as happiness, sadness, anger, or surprise. The processor may also integrate context from the scene and dialogue to enhance the accuracy of emotion detection. For example, the processor may analyze an actor's expressions in a movie segment in conjunction with the surrounding scene's tone and dialogue to identify the portrayed emotion.

In block 734, the processor may determine sentiment. For example, the processor use sentiment analysis techniques to evaluate the overall tone and mood conveyed in the video segment. As part of these operations, the processor may analyze the context, visual cues, accompanying textual, and/or audio elements within the segment, evaluate thematic elements, color schemes, and body language of subjects in the video, and/or perform other similar operations to determine whether the sentiment is positive, negative, or neutral.

The processor may perform the operations in blocks 718-734 repeatedly until it determines that there are no unprocessed persons remaining. In response to determining that there are no unprocessed persons remaining (i.e., determination block 718="No"), the processor may finish the process in block 746 and, for example, allocate the newly available resources to analyzing other video elements.

In determination block 738, the processor may determine whether there is background scenery. For example, the processor may analyze the visual elements of the video segment to identify and distinguish the setting or environment in which the scene takes place, use image recognition techniques to detect natural landscapes, urban settings, indoor environments, or specific landmarks, and/or evaluate factors such as color patterns, spatial arrangements, and distinctive features such as buildings, trees, or furniture to identify the background scenery.

In response to determining that there is no background scenery (i.e., determination block 738="No"), the processor may finish the process in block 746 and, for example, allocate the newly available resources to analyzing other video elements.

In response to determining that there is background scenery (i.e., determination block 738="Yes"), the processor may determine the location in block 740 and then finish the process in block 746. For example, the processor may use geotagging data, scene recognition algorithms, landmark identification, and/or other similar technologies or techniques to determine the approximate geographical location shown in the video segment.

In block 744, the processor may determine video quality and then finish the process in block 746. For example, the processor may evaluate technical aspects of the video such as resolution, bitrate, color depth, and clarity, detect issues such as pixelation, blurriness, or artifacts that affect the overall visual experience, evaluate the audio-visual synchronization, determine whether there are any compression errors, and/or perform other similar operation.

FIG. 7B illustrates another method 750 for determining attributes in the video component of the selected media content segment (e.g., as part of block 434 in FIG. 4D, block 708 illustrated in FIG. 7A, etc.) in accordance with some embodiments. Method 750 may be performed by at least one processor or a processing system in a computing device that includes or implements all or portions of a media analytics platform (e.g., the media analytics platform 120 illustrated in FIG. 1, etc.). As with any or all of the other operations discussed in this application, in various embodiments any or all of the operations in method 750 may be performed in sequence, out of sequence, in series, in parallel, deferred for processing until a later stage/block, skipped, etc.

In block 752, the processor may receive and prepare the video component for analysis by, for example, decoding the video, separating it from any accompanying audio tracks, and adjusting its resolution and frame rate so that it is in a format that is suitable for subsequent analysis. The processor may use neural networks to perform an initial video analysis of the video component, which may include scanning the video to identify major elements or primary components of the video (e.g., prominent products, important subjects, key scenes, notable features, etc.).

In block 754, the processor may use specialized ML/AI models for advanced feature extraction, which may include using large vision models (LVMs) to detect visual patterns and elements and using hybrid models for analyzing scenes that combine visual and contextual data. For example, the processor may generate insights by analyzing a scene for visual content and underlying thematic elements and use the generated insights to better characterize the video.

In block 756, the processor may deploy, access and/or use LXMs for contextual and semantic analysis of the video content. In some embodiments, this may include interpreting the broader context and semantics of the video and analyzing narrative structures, themes, and overarching messages using language and vision models to generate insights that characterize the video.

In block 758, the processor may dynamically identify various attributes in the video. For example, the processor may use ML/AI models to recognize and classify objects within a scene, identify and analyze characters present in the video, understand the setting or background of the scene, and perform other similar operations.

In block 760, the processor may use the ML/AI models to analyze the emotional tone and sentiment of the video, which may include integrating visual cues with contextual understanding from LXMs to determine emotions such as happiness or sadness and/or whether the sentiment conveyed is positive, negative, or neutral. For example, the processor may analyze the facial expressions of a model or spokesmen in conjunction with the tone of the scene to identify the portrayed emotion.

In block 762, the processor may perform multi-modal analysis operations that include combining visual, audio, text data for a comprehensive understanding. In some embodiments, the perform multi-modal analysis operations may include analyzing the media content metadata (e.g., received in block 416, etc.), which may for example include hashtags or indicate that one part of the video is viewed significantly more times than any other part. In some embodiments, the processor may be configured to use multi-modal LXMs to correlate and synthesize insights from different content types. For example, the processor may integrate audio analysis with visual and textual analysis to gain a deeper understanding of a product review segment or scene.

In block 764, the processor may use the ML/AI models to evaluate various technical aspects of the video component (e.g., resolution, audio-visual quality, etc.) and detect issues such as pixelation, blurriness, or artifacts that could affect the visual analysis.

In block 766, the processor may perform, initiate, or trigger any or all of the responsive actions discussed in this application (e.g., responsive actions discussed with reference to block 446 in FIG. 4D, etc.).

FIG. 7C illustrates another method 770 for determining attributes in the video component of the selected media content segment (e.g., as part of block 434 in FIG. 4D, block 708 illustrated in FIG. 7A, etc.) in accordance with some embodiments. Method 770 may be performed by at least one processor or a processing system in a computing device that includes or implements all or portions of a media analytics platform (e.g., the media analytics platform 120 illustrated in FIG. 1, etc.).

In block 772, the processor may receive a media content identifier, access video media content, and obtain (e.g., download) and segment the video into scenes based on visual and audio cues. In block 774, the processor may analyze viewer engagement metrics across the scenes to identify areas of high interest. In block 776, the processor may select frames (e.g., those with higher viewer engagement, etc.) from each scene for detailed analysis. In block 778, the processor may use object detection algorithms (e.g., CNNs, etc.) to identify primary objects in each selected frame or objects that occur across the timespan of a series of images in a scene.

In some embodiments, the processor may extract objects (e.g., woman, hairband, tub, etc.), object attributes or features (e.g., smiling, in relation to the woman; blue, in relation to the tub, etc.), and object actions (e.g., rubbing, in relation to the woman and the face-cream, etc.) from media content for more comprehensive analysis of the content, sentiment analysis, contextual advertising, etc. For example, in block 780, the processor may place bounding boxes around the detected objects to isolate them for further analysis. In block 782, the processor may use optical character recognition (OCR) or other similar techniques to perform text extraction within the bounding boxes. In block 784, the processor may use specialized OCR and/or language processing techniques to covert non-Latin characters and complete incomplete data. In block 786, the processor may extract object attributes (e.g., color, shape, etc.). In block 788, the processor may use predictive text and word completion techniques for partially obscured or incomplete text. In block 790, the processor may retrieve external data from sources such as eCommerce websites for product identification.

In block 792, the processor may use the extracted text and object attributes and/or the received external data to identify ToIs (or, if identification is unclear, categorize them into groups based on attributes). In block 794, the processor may generate unique signatures for ToIs with non-textual or obscure labels (for aiding in their identification). In block 796, the processor may use the identifiers, signatures, and/or attribute groupings to search and update the ToI knowledge repository. The processor may also store all extracted details, metadata, and ToI information in a structured format for future reference and use (e.g., for future queries, trend analysis, etc.). In some embodiments, as part of the operations in block 796, the processor may perform, initiate, or trigger any or all of the responsive actions discussed in this application (e.g., responsive actions discussed with reference to block 446 in FIG. 4D, etc.), such as recommending related content, generating insights, triggering specific operations, or other similar actions are aimed at enhancing the overall user experience and/or improving the performance and functioning of the computing device.

FIGS. 8A-8D are process flow diagrams that illustrate a method 800 of querying a media content knowledge repository (e.g., media content knowledge repository 130 illustrated in FIG. 1, etc.) in accordance with some embodiments. Method 800 may be performed by a processing system or at least one processor in a computing device that includes or implements all or portions of a media analytics platform (e.g., the media analytics platform 120 illustrated in FIG. 1, etc.).

Figure 8A:
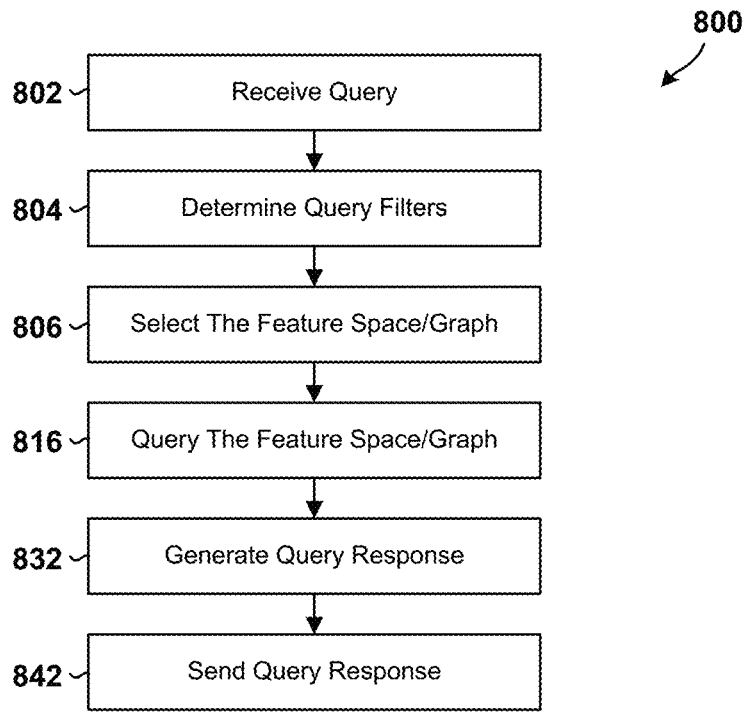
FIGS. 8A-8D are process flow diagrams that illustrate a method of querying a media content knowledge repository in accordance with some embodiments.

With reference to FIG. 8A, in block 802, the processor may receive a query message from a user, an automated system, or component requesting to retrieve information about a specific type of media content. For example, the processor may receive the query through a user interface that allows for users to input specific search terms, through an API from another computing device, through a remote procedure call from a component configured to track certain topics or trends, etc. The query may, for example, seek information about the latest discussions and sentiment surrounding new skincare trends (e.g., skin flooding, natural oils, under eye patches, face self-tanners, etc.).

In block 804, the processor may determine query filters (e.g., "eco-friendly skincare," "recent reviews," "customer sentiments," "social media mentions," etc.). For example, the processor may determine the query filters by analyzing the query message to determine and translate the query requirements into actionable data constraints that may be applied during the data retrieval operations. Each query filter may include rules, criteria, data parameters, and/or constraints that may be applied as part of the data retrieval operations to selectively isolate and extract relevant information from a broader dataset (e.g., the media content knowledge repository, etc.). The constraints may be based on various data parameters (e.g., numerical values, text patterns, date ranges, geographic locations, specific attributes inherent to the data being queried, etc.). The filters may be applied to select media content based on various criteria, such as date ranges (e.g., media content published in the last month, etc.), specific content types (e.g., blogs, videos, etc.), geographic regions (e.g., content originating from Europe, etc.), media types (e.g., audio, video, text, etc.), specific keywords of phrases in the content (e.g., "sustainable fashion," etc.), sentiment scores, etc. By determining and using these filters, the processor may effectively narrow the focus of the search and tailor the results to meet the precise requirements of the query.

In block 806, the processor may select a feature space and/or feature graph that stores and organizes media content information based on the nature of the query. The selected feature space/graph may be an information structure that maps various features of media content in a multidimensional space to allow for the analysis and interpretation of complex relationships and patterns within the data. For example, the processor may select a feature space/graph that is dedicated to skincare products and organizes its information (e.g., product reviews, social media discussions, influencer mentions, etc.) in a multidimensional space that allows for the analysis and interpretation of complex relationships and patterns within the data.

In some embodiments, the selected feature space/graph may be a product mention graph that characterizes or represents mentions of products in media content as a vector or graph that allows for a faster and more robust analysis of product presence and context in media discussions. In some embodiments, the selected feature space/graph may be a sentiment analysis embedding graph that uses embedding layers to transform categorical sentiment values (e.g., "positive," "negative," "neutral," etc.) into high-dimensional vectors that provide a more nuanced representation of sentiment across various media content. In some embodiments, the selected feature space/graph may be a trend analysis embedding graph in which embedding layers convert trending topics or products into vectors within a multidimensional space to provide a deeper understanding of how trends evolve and relate to each other over time. In some embodiments, the selected feature space/graph may be a categorization graph that represents different content types (e.g., news, tutorials, reviews, etc.) as vectors that capture complex relationships and patterns in audience engagement across various content categories. In some embodiments, the selected feature space/graph may be an influencer impact graph that uses high-dimension vectors to represent or characterize the influencers, their content, their impact on specific products, their connections to different content creators, etc.

Figure 8B:
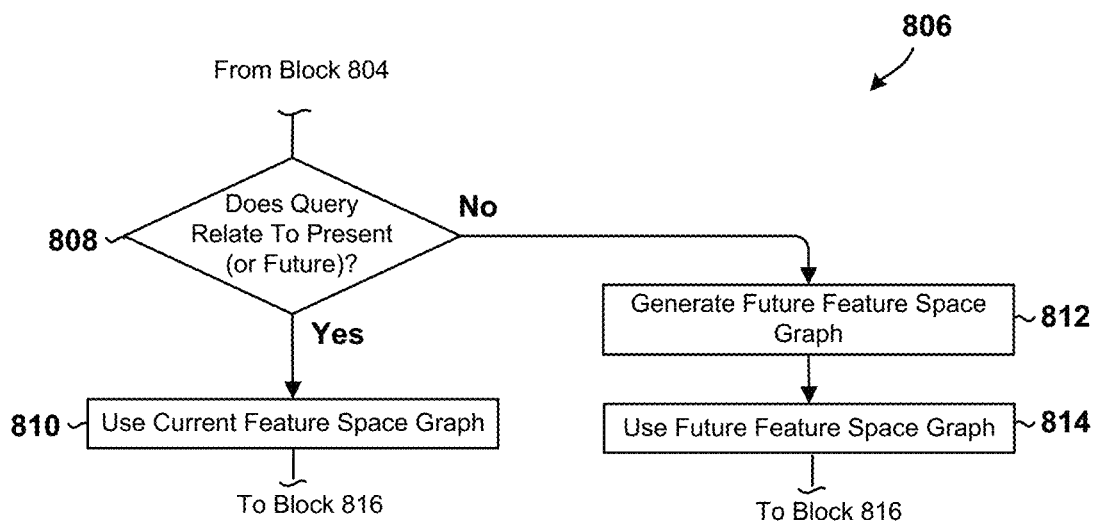
Figure 8C:
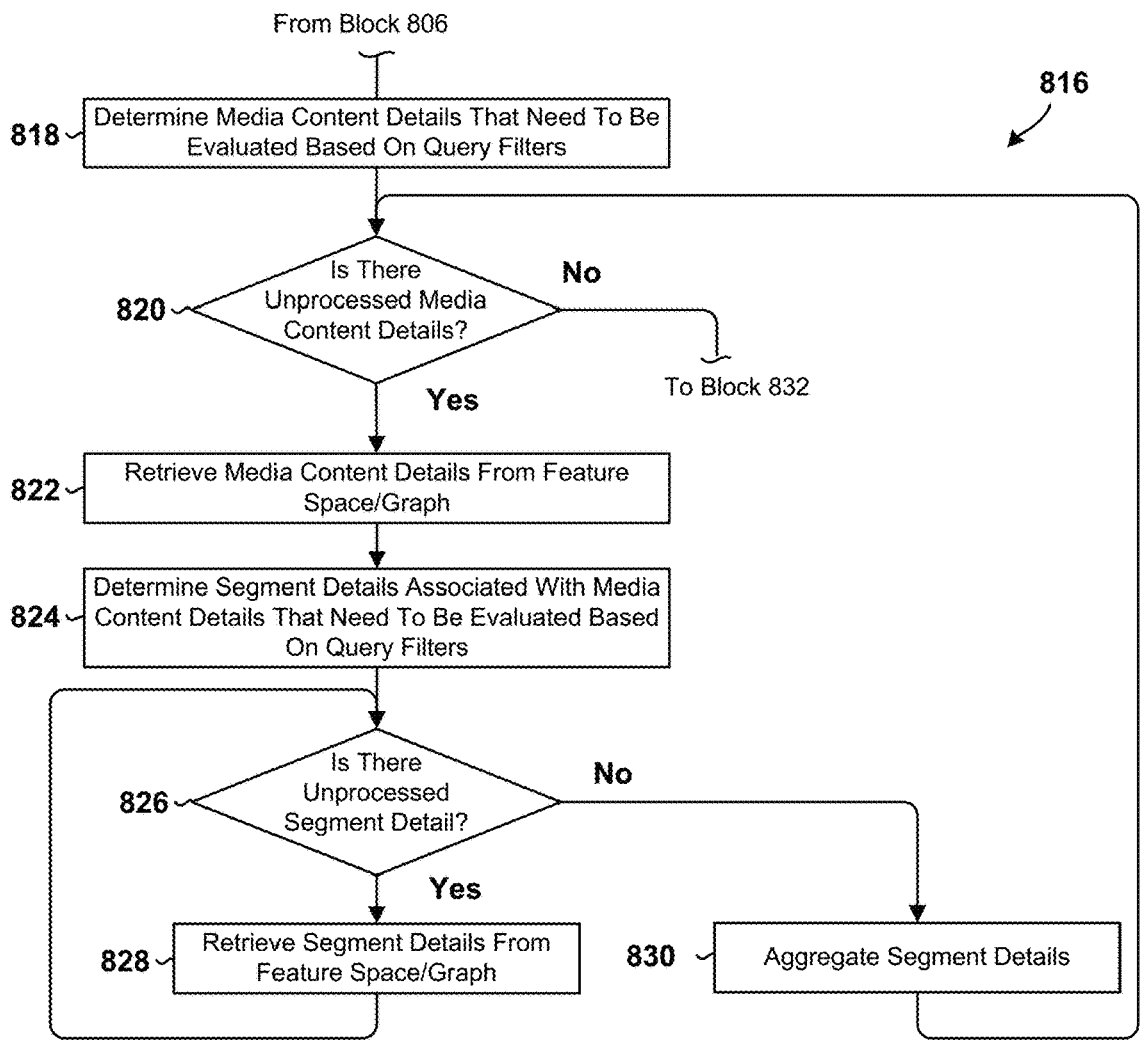

In some embodiments, as part of the operations in block 806, the processor may perform any or all of the operations illustrated in blocks 808-814 in FIG. 8B. For example, the processor may determine whether the query relates to the present or future in determination block 808. For example, the processor may analyze the content and context of the received query to determine whether the information sought relates to current trends or future projections. The processor may determine that the query relates to the present in response to, for example, determining that the content of received query includes "what are the current trending makeup products among Generation Z?" The processor may determine that the query does not relate to the present in response to, for example, determining that the content of received query includes "what makeup trends are expected to emerge in the next season?".

In response to determining that the query relates to the present (i.e., determination block 808="Yes"), the processor may select and use the current feature space graph in block 810. For example, the processor may access a feature space/graph that compiles and organizes up-to-date information on makeup products and trends (e.g., recent customer reviews, social media buzz, influencer endorsements, trending lipstick shades, most talked-about foundation formulas, etc.).

In response to determining that the query does not relate to the present (i.e., determination block 808="No"), the processor may generate a future feature space graph in block 812 and select and use the future feature space graph in block 814. For example, the processor may compile data from past makeup trends, forecasts from professional cosmetologists, emerging fashion influences, etc. to predict future trends in the makeup industry to generate future-oriented feature space/graph that identifies potential shifts in makeup preferences (e.g., rise of eco-friendly makeup products, a renewed focus on chemical free makeup products, etc.).

With reference to FIG. 8A, in block 816, the processor may query the feature space/graph. For example, in block 816 the processor may retrieve data about the most reviewed makeup items, analyze sentiment in customer reviews, identify trending makeup brands, and perform other similar operations to identify patterns and correlations in product popularity, customer demographics, purchasing behaviors, etc. The processor may also extract data about particular product attributes (e.g., ingredients, price points, packaging styles, etc.) that are currently popular with consumers. In some embodiments, the processor may use the query filters to focus the search within the feature space/graph to specific data (e.g., data related to specific makeup products, etc.). The filters may include categories such as product type (e.g., lipstick, foundation, etc.), customer ratings, timeframes (e.g., recent reviews in the past month, etc.), or specific keywords mentioned in reviews (e.g., "long-lasting," "natural," etc.). In some embodiments, as part of the operations in block 816, the processor may perform any or all of the operations in blocks 818-830 in FIG. 8C.

In block 818, the processor may determine media content details (e.g., a media content record 202, etc.) that need to be evaluated based on the nature of the media content, the focus of the query, and the determined query filters. The media content details may include specific characteristics or attributes of the content that are relevant to the scope and purpose of the query. The media content details may include the textual content within articles or posts, visual elements in images or videos, audio components in podcasts or music tracks, and metadata associated with each media item, such as the publication date, creator, source platform, and engagement metrics (e.g., likes, shares, comments, etc.). The media content details may also include thematic tags or categories (e.g., sports, fashion, technology, etc.), audience demographics (age, gender, location, etc.), language or tone of the content, product mentions, brand associations, sentiment expressed towards a topic, etc. The media content details may also include audio and/or video details such as duration, format, quality, presence of specific scenes or keywords, etc. The processor may identify and isolate the relevant media content details using the established query filters as a guide to focus the analysis and ensure the retrieved data is highly relevant to the query.

In some embodiments, the media content details may include a media content record (e.g., media content record 202, etc.) or any or all of its elements, attributes, attribute data types, values, etc. In some embodiments, as part of the operations in block 818, the processor may narrow the search space to isolate the most pertinent information from the database that includes media content, media creator, and media publisher records. For example, the processor may analyze the media content title, publication date, creator, publisher, and engagement metrics from the media content record in conjunction with the media content creator's details (e.g., name, location, platform presence, etc.) to extract data on product mention frequency, discussion tone, and visual representation.

In some embodiments, the type of details extracted in block 818 may depend on the type of media content (e.g., haptic data, text, intonation, sounds, gestures, faces, and objects may all be extracted from video media content, but gestures, faces, and objects may not be present in audio media content). The processor may convert the audio media content to text (e.g., using a speech-to-text converter). The processor may identify gestures, faces (of multiple people), and objects in video media content using machine learning techniques (e.g., using a CNN). If the processor extracts objects, and if the extracted objects contain text, then the processor may perform character recognition to extract the text associated with the objects.

In some embodiments, as part of the operations in block 818, the processor may efficiently and quickly identify and analyze specific media content (e.g., review videos, blog posts, social media threads about eco-friendly skincare products, etc.) by focusing on query filter defined parameters (e.g., makeup tutorial videos featuring organic products and specific application techniques, etc.), searching for content that aligns with particular attributes or parameters (e.g., keywords, timeframes, product types, user demographics, etc.), and isolating and extracting only the most relevant information (e.g., data on product mention frequency, discussion tone, visual representation, etc.).

The operations in block 818 may allow the processor to hone in on the most pertinent information within the database, taking into account media content attributes such as title, publication date, creator, publisher, and engagement metrics, alongside the creator's details. This holistic approach involves evaluating product mention frequency, discussion tone, and visual representation, all of which significantly assist in reducing the search space.

In determination block 820, the processor may determine whether there are unprocessed media content details (e.g., a media content record 202, etc.). For example, the processor may evaluate the media content records to identify any elements, attributes, or data types that have not been analyzed or processed in accordance with the determined query filters. In some embodiments, the processor may be configured to determine whether there is recently ingested content that has not yet been analyzed, to identify segments within existing content that have not been fully processed, to monitor to detect new or updated information in the media content creator and publisher records that could impact the analysis (e.g., updates in the popularity details such as recent views or comments, etc.), and/or perform other similar operations to determine whether there are unprocessed media content details.

In response to determining that there are unprocessed media content details (i.e., determination block 820="Yes"), the processor may retrieve media content details from feature space/graph in block 822. For example, the processor may access the relevant sections of the database to obtain the latest data from media content records (e.g., newly added or recently updated entries, etc.), extract updated engagement metrics (e.g., views, likes, etc.), newly added comments, or any recent changes in the publication details. In some embodiments, the processor may retrieve additional details from media content creator and publisher records (e.g., new information about the media creator, changes in the distribution channels, etc.).

In block 824, the processor may determine the segment details associated with media content details (e.g., a media content record 202, etc.) that need to be evaluated based on the query filters. For example, the processor may analyze specific segments of media content (e.g., individual scenes in a video, specific sections in an audio recording, etc.) that are directly relevant to the scope and purpose of the query (e.g., scenes in which particular products or techniques are mentioned, etc.). As part of these operations, the processor may identify segments in which specific keywords are mentioned, determine the context in which products or topics are discussed, use the query filters to isolate parts of the content that have garnered significant audience engagement (or feature specific brands, product types, etc.), and/or evaluate segment-specific attributes such as the tone, sentiment, or thematic category of each segment. Such granular analysis may allow the processor to extract nuanced insights from the media content for a more comprehensive evaluation that is closely aligned with the specific objectives of the query.

In determination block 826, the processor may determine whether there are unprocessed segment details. For example, the processor may scan through the isolated segments to determine whether any additional data extraction or analysis is required. As a more detailed example, the processor may scan through the video frames and determine that there are unprocessed segment details in response to determining that there are unprocessed image frames in which a specific product is used to demonstrate a new makeup blending technique. As another example, the processor may review the segments within the media content that have been flagged for further analysis but have not yet been examined in detail. The processor may check for segments that contain specific keywords or topics that align with the query filters but have not been fully evaluated for context, sentiment, audience engagement, etc. The processor may also check for new or recently updated segments in the media content (e.g., newly added scenes in a video, etc.).

In response to determining that there are unprocessed segment details (i.e., determination block 826="Yes"), the processor may retrieve segment details from feature space/graph in block 828. For example, the processor may extract data regarding viewer engagement during a specific segment (e.g., increases in view counts or likes, a large number of new comments when a specific makeup brand is featured, etc.). As another example, the processor may access and analyze specific segments or specific components of the media content that have been identified but not yet fully examined. As part of these operations, the processor may extract segments from videos, audio files, or text documents that include keywords, phrases, or topics that are relevant to the query, retrieve detailed data about the segments (e.g., duration of a video clip, the time stamp of a particular section in an audio file, the location of a paragraph within a product review article, etc.), and/or determine whether the sentiment, tone, thematic relevance, etc. of the segments align with the scope and purpose of the query.

In response to determining that there are no unprocessed segment details (i.e., determination block 826="No"), the processor may aggregate segment details in block 830. For example, the processor may compile and aggregate data from different components of the same segment (e.g., audio component, video component, text component, etc.) and/or from multiple different segments to generate a more robust, holistic, cohesive, or comprehensive view of each segment (e.g., how different makeup products or techniques are perceived and discussed across different user demographics). As part of these operations, the processor may merge insights and analysis results from different components of the same segment (e.g., audio component, video component, text component, etc.) and/or from multiple segments to identify themes or patterns (e.g., common sentiments, prevalent topics, recurring keywords across the media content, etc.), determine aggregate metrics (e.g., average sentiment scores, the total number of mentions of specific products or topics, audience engagement statistics over multiple segments, etc.), and/or determine or generate other similar information.

The processor may repeatedly perform the operations in blocks 820-830 until the processor determines that there are no unprocessed media content details (i.e., determination block 820="No"). For example, the processor may continue to process and analyze different components of the media content (e.g., audio component, video component, text component, etc.) and different aspects of the media content (e.g., viewer sentiment, frequency of brand mentions, etc.) until all relevant data has been extracted and analyzed.

The processor may commence performing the operations in block 832 in response to determining that there are no unprocessed media content details (i.e., determination block 820="No"). In block 832, the processor may generate a query response. For example, the processor may generate a detailed query response based on the generated analysis information (e.g., the most popular makeup products or techniques featured in the videos, audience reactions, engagement metrics, etc.). In some embodiments, the processor may generate a contextualized query response that has been augmented with additional contextual data or metadata to improve the relevance and specificity of information contained therein.

Figure 8D:
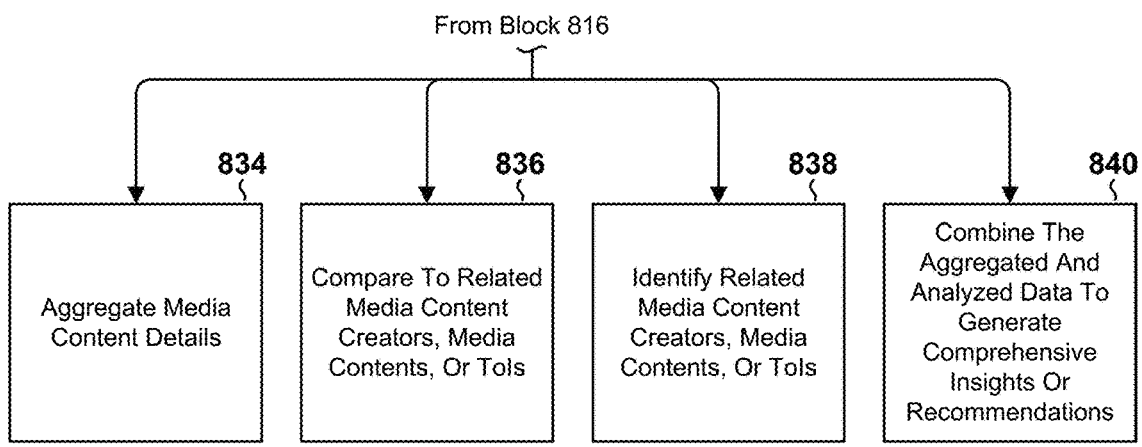

As part of the operations in block 832, the processor may perform any or all of the operations in blocks 834-840 in FIG. 8D sequentially or in parallel. In block 834, the processor may aggregate media content details and generate or update the query response based on the aggregated media content details. For example, the processor may compile and combine data different components of the same media content (e.g., audio component, video component, text component, etc.) and/or from multiple media contents (e.g., viewer engagement statistics, frequency of product mentions, sentiment analysis results, etc.), use the compiled/combined data to generate information that characterizes trends and patterns in the media content (e.g., audience reactions to specific makeup products or application techniques, etc.), and generate the query response based on and/or to include the information that characterizes trends and patterns in the media content.

In block 836, the processor may compare the generated information to related media content creators, media contents, and/or topics of interest (ToIs) and generate or update the query response based on the comparison results. For example, the processor may analyze similarities and differences between various makeup vloggers, their content styles, and the makeup products they use or recommend, determine the influence of certain vloggers based on their followers' engagement levels, compare the media content to the previous media content from the same creator to determine its authenticity, compare the impact different content creators have on product popularity or consumer preferences, and generate the query response based on and/or to include the comparison results.

In block 838, the processor may identify related media content creators, media contents, and/or ToIs and generate or update the query response based on the identified related media content creators, media contents, and/or ToIs. For example, the processor may identify the influencers and content creators that are strongly associated with specific makeup trends or products (e.g., by identifying vloggers who frequently discuss organic makeup products, have a significant impact on the popularity of specific makeup brands or styles, etc.), and generate the query response based on and/or to include the associated influencers and content creators.

In block 840, the processor may combine the aggregated and analyzed data to create comprehensive insights or recommendations and generate or update the query response based on the comprehensive insights or recommendations. For example, the processor may generate a detailed query that highlights key influences in the makeup industry, trending products, and consumer sentiment towards various brands or makeup techniques.

In block 842, the processor may send the query response. For example, the processor may transmit the generated report to the entity, component, or device that initiated the query to provide them with actionable insights and data-driven conclusions about specific topics of interest.

Figure 8E:
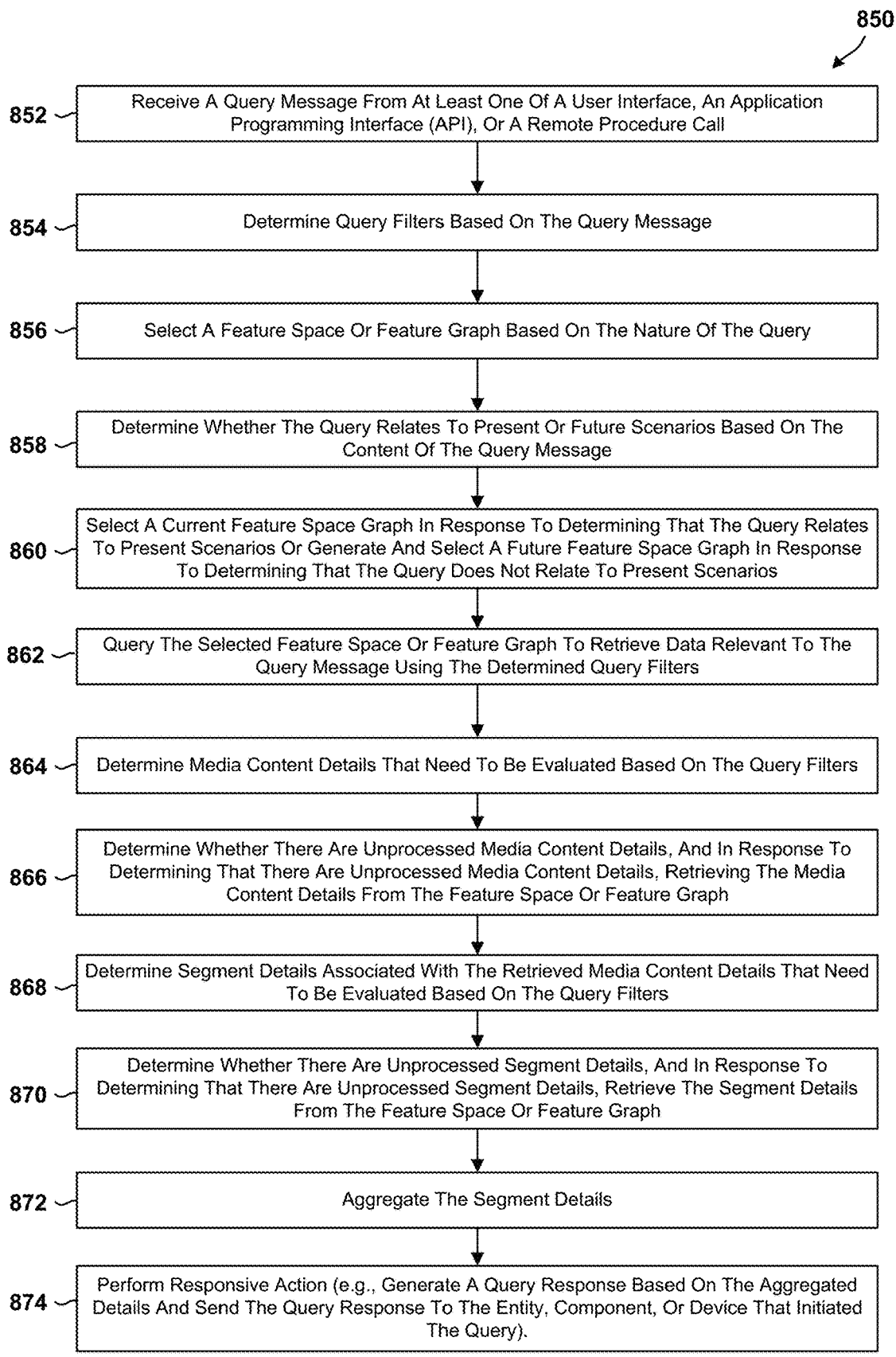
FIG. 8E is a process flow diagram that illustrates another method of querying a media content knowledge repository in a media analytics platform in accordance with some embodiments.

FIG. 8E is a process flow diagram that illustrates a method 850 of querying a media content knowledge repository (e.g., media content knowledge repository 130 illustrated in FIG. 1, etc.) in a media analytics platform in accordance with some embodiments. Method 800 may be performed by a processing system or at least one processor in a computing device that includes or implements all or portions of a media analytics platform (e.g., the media analytics platform 120 illustrated in FIG. 1, etc.).

In block 852, the processor may receive a query message from at least one of a user interface, an application programming interface (API), or a remote procedure call. In some embodiments, the query message may request information about specific media content.

In block 854, the processor may determine query filters based on the query message. In some embodiments, the query filters may include rules, criteria, data parameters, and constraints for data retrieval. In some embodiments, determining the query filters may include analyzing the query message to translate query requirements into actionable data constraints for data retrieval.

In block 856, the processor may select a feature space or feature graph based on the nature of the query. In some embodiments, the feature space or feature graph may be an information structure mapping features of media content in a multidimensional space. In some embodiments, the feature space or feature graph may include one or more of a product mention graph, a sentiment analysis embedding graph, a trend analysis embedding graph, a categorization graph, and an influencer impact graph.

In block 858, the processor may determine whether the query relates to present or future scenarios based on the content of the query message.

In block 860, the processor may select a current feature space graph in response to determining that the query relates to present scenarios or generate and select a future feature space graph in response to determining that the query does not relate to present scenarios.

In block 862, the processor may query the selected feature space or feature graph to retrieve data relevant to the query message using the determined query filters.

In block 864, the processor may determine media content details that need to be evaluated based on the query filters. In some embodiments, the media content details may include attributes of the media content relevant to the scope and purpose of the query. In some embodiments, the media content details may include textual content, visual elements, audio components, and/or metadata associated with each media item.

In block 866, the processor may determine whether there are unprocessed media content details, and in response to determining that there are unprocessed media content details, retrieve the media content details from the feature space or feature graph.

In block 868, the processor may determine segment details associated with the retrieved media content details that need to be evaluated based on the query filters. In some embodiments, the segment details may include specific scenes or sections of the media content directly relevant to the query. In some embodiments, the processor may identify the media content segments in which specific keywords are mentioned or specific products or topics are discussed.

In block 870, the processor may determine whether there are unprocessed segment details, and in response to determining that there are unprocessed segment details, retrieve the segment details from the feature space or feature graph.

In block 872, the processor may aggregate the segment details. In some embodiments, the processor may also aggregate the media content details, compare the aggregated details to related media content creators or topics of interest, and identify related media content creators or topics of interest based on the query.

In block 874, the processor may perform a responsive action, such as generating a query response based on the aggregated details and sending the query response to the entity, component, or device that initiated the query. In various embodiments, the processor may perform, initiate, or trigger any or all of the responsive actions discussed in this application (e.g., responsive actions discussed with reference to block 446 in FIG. 4D, etc.).

FIG. 9A-9C illustrate example table information structures 900, 930, 960 that include concise, query-centric insights that may be used for strategic decision-making by entities and/or the media analytic platform in accordance with some embodiments. For example, a media analytics platform (e.g., media analytics platform 120 illustrated in FIG. 1, etc.) may be configured to use the table information structures 900, 930, 960 as a decision-making tool to guide various stakeholders (e.g., media content creator 106 or product owner 118 illustrated in FIG. 1, etc.) to derive actionable insights based on specific queries related to media content.

In some embodiments, the media analytics platform may include a processing system or at least one processor configured to generate and use the table information structures 900, 930, 960 to generate nuanced query-centric information that allows stakeholders to make informed decisions based on current trends, content consistency, market impact, sentiment analysis, etc. The queries in the table information structure 900 may be used for inspirational content creation, advertisement placement strategies, authenticity checks of content creators, and media impact score assessment. The queries in the table information structure 930 may be used for identifying potential collaboration opportunities, evaluating consistency in content creation, gauging and predicting media impact scores, and finding similar media content creators for partnerships or diversifying collaboration portfolios. The queries in the table information structure 960 may be used for identifying partnership opportunities, managing stock levels based on media content features, understanding public sentiment, countering negative opinions, leveraging positive media content, and addressing inappropriate topic associations.

In the examples illustrated in FIGS. 9A-9C, the table structures 900, 930, and 960 are segmented into multiple rows that are each identified by a unique row ID and labelled to categorize the content type. With reference to FIG. 9A, the row with ID 902 is labelled "General Media Content" and includes a query (in row ID 904) asking, "What media content currently has a high media impact score?" This query may aid media content creators in gaining inspiration for their content creation activities and/or may assist product owners in making informed decisions about advertisement placements.

The entry with row ID 916 is labelled "Specific Media Content" and includes multiple entries with distinct row IDs (918, 920, and 922), each including a unique query.

The entry with row ID 918 includes the query "Is media content X consistent with media content created by media content creator Y?" This query may be particularly useful for determining whether a content creator is genuinely behind the content production or if an external source (e.g., ghost writing, generative AI, etc.) is being used.

The entry with row ID 920 includes the query "What is media content X's media impact score?." This query may be particularly useful for product owners in strategizing advertisement placement.

The entry with row ID 922 includes the query "What media content is similar to media content X?". This query may be particularly useful for informing product owners about the distinctiveness of media content and other factors important for marketing and brand positioning.

With reference to FIG. 9B, the entry with row ID 932 is labelled "General Media Content Creator" includes row ID 934 with the query "Which media content creators create media content relating to product, brand, or product owner z?" This query may be particularly useful for media content creators seeking collaboration opportunities. For example, creators may explore potential partnerships or joint ventures by identifying peers working on similar products, brands, or with specific product owners.

The entry with row ID 946 is labelled "Specific Media Content Creator" includes row IDs 948, 950, 952, and 954.

The entry with row ID 948 includes the query "Is media content creator Y consistent?" This query may be particularly useful for product owners who want to establish a long-running commercial relationship.

The entry with row ID 950 includes the query "What is media content creator Y's current media impact score?" This query may be particularly useful for media content creators to gauge their performance and market impact.

The entry with row ID 952 includes the query "What is media content creator Y's predicted media impact score at future time t?" This query may help media content creators in strategizing for future content creation and performance improvement and/or may assist product owners in identifying rising stars or upcoming media content creators for potential collaborations or endorsements.

The entry with row ID 954 includes the query "Which media content creators are similar to media content creator Y?" This query may be useful for media content creators for identifying peers with similar styles or audience reach for potential collaborations. This query may also provide alternatives for partnership to product owners so that they may diversify their collaboration portfolio, etc.

With reference to FIG. 9C, the entry with row ID 962 is labelled "General Product/Brand/Product Owner" and includes row ID 964 that includes the query "What Product/Brand/Product Owner current has a high media impact score?" This query may be useful for product owners to identify other product owners to establish partnerships in order to diversify their collaboration portfolio.

The entry with row ID 976 is labelled "Specific Product/Brand/Product Owner" includes row IDs 978, 980, 982, 984, and 986.

The entry with row ID 978 includes the query "Is the media impact score for product, brand, or product owner Z currently above a threshold?" This query may be useful for product owners to automatically manage stock levels (e.g., an increased amount of stock can be manufactured, bought, or distributed if the product is featuring in a lot of media content, etc.).

The entry with row ID 980 includes the query "Which media content creators are currently creating media content relating to a product, brand, or product owner z?" This query may be useful for product owners to understand what is being said about a specific product, brand or product owner (e.g., their own or a competitors). This query may also be useful for product owners to identify promotional opportunities (e.g., by automatically commenting on the media content, etc.).

The entry with row ID 982 includes the query "Is there any current media content with a negative sentiment that relates to a product, brand, or product owner z?" This query may be useful for product owners to counter negative opinions (e.g., by sending free samples to the media content creator for a more complete review, by engaging with another media content creator in order to generate positive sentiment, etc.).

The entry with row ID 984 includes the query "Is there any current media content with a positive sentiment that relates to a product, brand or product owner Z?' This query may be useful for product owners to identify partners, identify promotional opportunities (e.g., by sending different samples to the media content creator for review, by donating competition prizes to the media content creator, etc.), and identify promotional material that may be reused (e.g., by re-posting or re-sharing it using its own media content publisher, etc.).

The entry with row ID 986 includes the query "Is there any current media content associated with an inappropriate topic that relates to a product, brand, or product owner Z?" This query may be useful for product owners to automatically issue takedown requests.

In some embodiments, the processor may be configured to analyze sentiments associated with ToIs (e.g., products such as soap, skin cream, etc.) referenced in media content by receiving a plurality of media content identifiers, retrieving corresponding media content from an online source for each of the received media content identifiers, extracting details (e.g., text, intonation, sounds, gestures, faces, objects, etc.) from the retrieved media content, generating and/or storing metadata associated with the extracted details (e.g., locations in text where speaker intonation changes, times in audio media content when a product or topic is mentioned, and times in video media content when the product is shown, etc.), and identifying ToIs based on the metadata and/or the extracted details. In some embodiments, the ToIs may include products discussed or shown in the media content. In some embodiments, the processor may identify the ToIs by analyzing text for ToI attributes (e.g., names, descriptions, etc.), applying image recognition to identify ToIs in the media content, using external identifiers for unambiguous identification of the ToIs (e.g., when the ToI is a consumer product, etc.), assigning internal ToI identifiers if external identifiers are unavailable, etc. The processor may determine a sentiment for each identified ToI based on the extracted details (e.g., extracted text details, intonation from audio content, sounds including known sound clips, music, and song lyrics, gestures and facial details from video content, etc.), aggregate the determined sentiments to determine an overall sentiment for all of the ToIs referenced in media content, and store the media content metadata, extracted details, parts of the media content, ToI details, media content publisher details, and sentiments in a ToI knowledge repository.

Figure 10A:
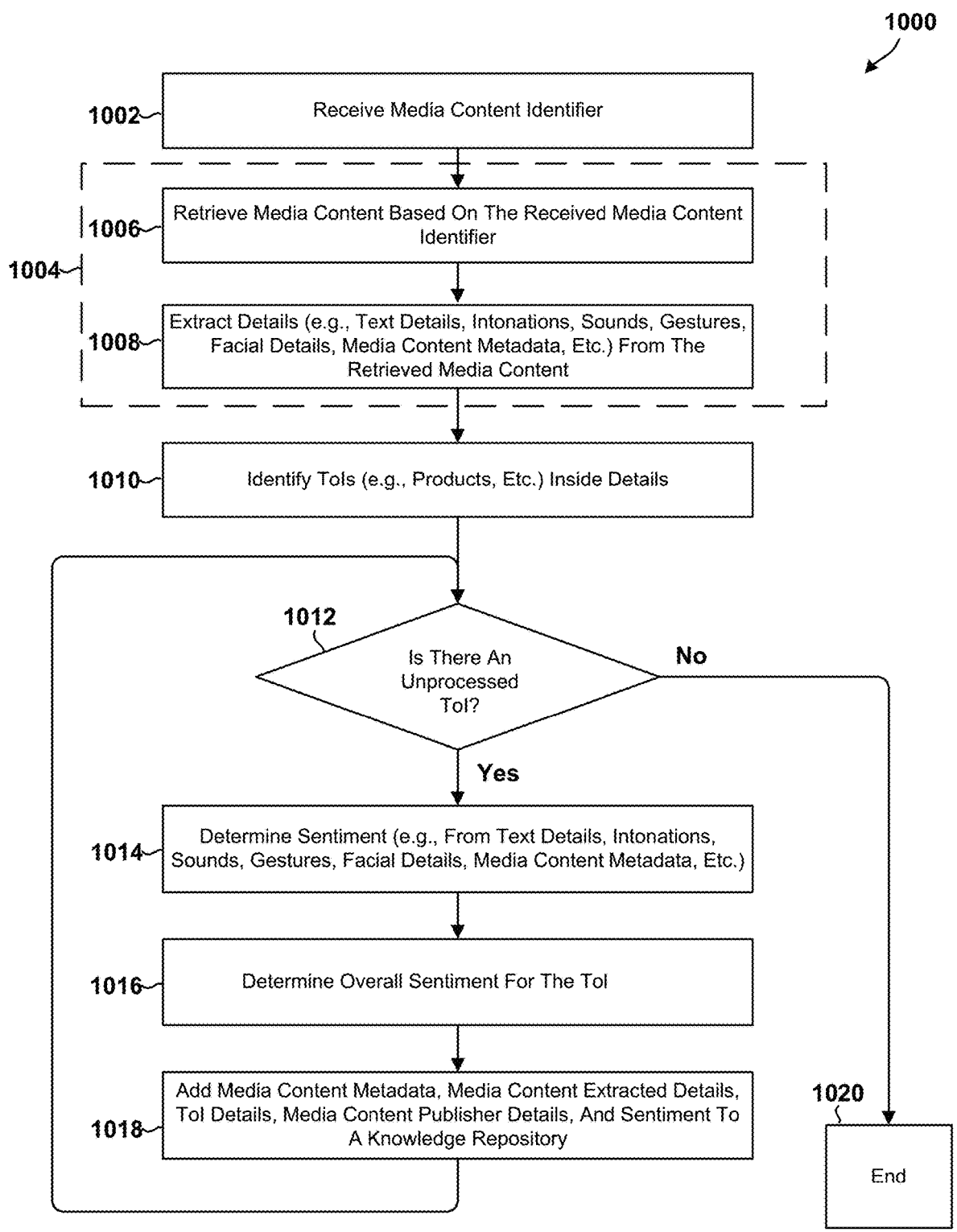
FIGS. 10A and 10B are process flow diagrams illustrating methods of determining the sentiments for products referenced in a media content in accordance with some embodiments.

FIG. 10A is a process flow diagram illustrating a method 1000 of determining the sentiments for products referenced in a media content in accordance with some embodiments. Method 1000 may be performed by a processing system or at least one processor in a computing system that implements all or portions of a media analytics platform (e.g., media analytics platform 120 illustrated in FIG. 1, etc.). In various embodiments, any or all of the operations in method 1000 may be performed as part of, or in lieu of, any or all of the operations discussed above with reference to FIGS. 8A-8D.

In block 1002, the processor may receive a media content identifier, such as a URL or another identifier of media content. For example, the processor may receive a list of URLs from a user input or an automated system that aggregates trending content from various online platforms.

In block 1004, the processor may retrieve and extract media content. In some embodiments, as part of the operations in block 1004, the processor may perform any or all of the operations in block 1006 and 1008. For example, in block 1006, the processor may retrieve the media content from a server operating on the Internet (e.g., by downloading it using a web browser). In block 1008, the processor may extract details from the media content. The type of details extracted may depend on the type of media content (e.g., text, intonation, sounds, gestures, faces, and objects may all be extracted from video media content, but gestures, faces, and objects may not be present in audio media content). The processor may convert the audio media content to text (e.g., using a speech-to-text converter). The processor may identify gestures, faces (of multiple people), and objects in video media content using machine learning techniques (e.g., using a CNN). If the processor extracts objects, and if the extracted objects contain text, then the processor may perform character recognition to extract the text associated with the objects.

The processor may store metadata associated with the extracted details (e.g., the locations in the text when the intonation of the speaker changed, the times in the audio media content when the product is mentioned, the times in the video media content when the product is shown). The metadata associated with all of the extracted details may be shared or correlated (e.g., a single time may identify both when a product is mentioned in the audio video content and shown in the video media content).

In some embodiments, in block 1004 the processor may access the received URL to download the corresponding webpage or video and extract textual content, audio streams, and visual elements from the downloaded webpage or video. In some embodiments, the processor may extract different types of details depending on the media content or format (e.g., text, audio, video, etc.). In some embodiments, the processor may apply different analytic techniques to each media type. For example, the processor may use speech-to-text conversion techniques to convert audio to text, use machine learning techniques (e.g., convolutional neural networks (CNNs), etc.) to identify gestures, faces, objects, etc. in video content, perform character recognition to extract text from images, objects, etc. The processor may also store the extracted details and metadata such as speaker intonation changes, product mention times in audio and video, etc. In some embodiments, the processor may store time stamps of key moments in the media content (e.g., when a product is mentioned or shown, when a speaker's tone changes significantly, etc.) that may be used for detailed sentiment analysis.

In block 1010, the processor may identify the ToIs (e.g., products, etc.) that are contained (e.g., discussed, shown) in the extracted details. The processor may analyze one or more of the extracted details (e.g., by determining that the product name is contained in the extracted text, or by determining that one of the extracted objects is the product). The processor may also perform character recognition to identify objects as products (e.g., a bottle of "River Fresh Water" will have its name displayed prominently on it, etc.).

ToIs such as products may be identified using an external product identifier that is a recognized standardized identifier (e.g., SKU, GTIN, ASIN, etc.) or an identifier for a brand or manufacturer. This type of external product identifier may unambiguously identify the product and may be used to associate the product with all of its product attributes. However, if the processor is unable to identify the product using an external product identifier (e.g., because there is no product with similar product attributes in the product knowledge repository), then the processor may assign an internal product identifier to the product. This is beneficial, because it enables the processor to proceed with determining a sentiment for the product. Further, if the processor identifies the product again using the internal product identifier (e.g., in another media content), then it may update and complete the existing product information in the product knowledge repository.

The processor may be able to convert the internal product identifier for a product to an external product identifier at some future time (e.g., as a result of receiving additional extracted product details, if the product knowledge repository is updated).

In some embodiments, in block 1010 the processor may analyze the extracted details to identify products, use character recognition for object identification, use external product identifiers for unambiguous identification, and assign or update internal identifiers (e.g., if external ones are unavailable, etc.). For example, the processor may analyze text for product names or descriptions, apply image recognition to identify products in videos or photos, and match the identified products with known product identifiers (e.g., SKU, GTIN, ASIN, etc.) from a database.

In block 1012, the processor may determine whether there is an unprocessed ToI in the extracted details. That is, the processor may check for ToIs in the extracted details that have not yet been processed or determine unprocessed ToIs. For example, the processor may maintain a queue of identified ToIs and systematically process each ToI included in the queue until all of the identified ToIs are evaluated.

In response to determining that there is an unprocessed ToI in the extracted details (i.e., determination block 1012="Yes"), in block 1014 the processor may determine a sentiment for the unprocessed ToI.

In some embodiments, the processor may be configured to determine the importance, relative importance, and/or relevance of each extracted detail and prioritize the analysis of ToI based on their significance within the media content. For example, the processor may analyze the frequency and context of ToI mentions in the media content and assign higher importance to the instances in which the ToI is repeatedly referenced or featured prominently in key segments.

In an embodiment, the processor may identify and use the times in the media content when the ToI is mentioned or shown to determine the importance of the extracted details. For example, the facial details may be only considered if they occur within 15 seconds of the ToI being mentioned or shown. As another example, the processor may focus on segments in which the ToI is centrally featured or discussed at length (e.g., a makeup product being applied in a tutorial video, etc.) and prioritize the details extracted from these segments in the sentiment analysis (e.g., compared to passing mentions or background appearances of the ToI, etc.).

In some embodiments, the processor may determine a sentiment for the unprocessed ToI based on the extracted text details. For example, the processor may evaluate customer reviews, comments, or descriptions within the media content, determine whether the language used is positive, negative, or neutral, and/or use sentiment analysis algorithms to evaluate the tone and emotional context of the text in which the ToI is mentioned. In some embodiments, the processor may query an LXM or use a natural language processing techniques to determine what types of words are being used to describe the unprocessed ToI.

In some embodiments, the processor may determine a sentiment for the unprocessed ToI based on the extracted intonation. For example, the processor may analyze the tonal variations in the voice of a speaker discussing the ToI. Changes in pitch, volume, and rhythm may be indicative of different emotions and attitudes, which the processor may use to determine the sentiment toward the product.

In some embodiments, the processor may determine a sentiment for the unprocessed ToI based on the extracted sounds. These sounds may include well known sound clips that are used to express satisfaction (e.g., applause) or dissatisfaction (booing). These sounds may also include music and songs. Some songs are known to be associated with positive sentiment (e.g., "The Best," sung by Tina Turner) and other songs are known to be associated with negative sentiment (e.g., "Remember (Walking In The Sand)," sung by The Shangri-Las). Additionally, the lyrics may be extracted from the music clip, and sentiment analysis may be performed on them as described in block 1016. The tempo of the song may also be used to infer a sentiment.

In some embodiments, the processor may determine a sentiment for the unprocessed ToI based on the extracted gestures (if the media content contained video). For example, the processor may use advanced image analysis algorithms to interpret body language and hand gestures in the video content, which may include evaluating the expressiveness, frequency, and nature of gestures made by individuals when they interact with or talk about the ToI. Positive sentiments may be inferred from open, welcoming gestures, while negative sentiments might be associated with closed or dismissive body language. The processor may integrate these visual cues into the overall sentiment analysis to provide a more nuanced understanding of how the ToI is perceived.

In some embodiments, the processor may determine a sentiment for the unprocessed ToI based on the facial details (if the media content contained video). For example, the processor may use facial recognition and emotion detection technologies to analyze the expressions of individuals in the video when they interact with or discuss the ToI, which may include evaluating subtle facial movements (e.g., smiles, frowns, furrowed brows, etc.) to determine emotions such as happiness, skepticism, or displeasure. The processor may analyze these facial expressions in the context of the ToI mentions or appearances in the video and update overall sentiment score based on the analysis results.

In some embodiments, the processor may determine a sentiment for the unprocessed ToI based on the media content metadata (e.g., the number of times that the media content was accessed, the size of the positive reaction that the media content received, etc.).

In some embodiments, in block 1014 the processor may determine the sentiment for each unprocessed ToI. For example, the processor may apply sentiment analysis algorithms to the text, analyze voice tones for emotional inflections, and interpret visual cues (e.g., gestures and facial expressions, etc.) to gauge sentiment. As further examples, the processor may determine and evaluate sentiment based on intonations, sounds (e.g., known sound clips, music, song lyrics, tempo, etc.), gestures, and facial details in video content, based on media content metadata (e.g., access frequency, audience reactions, etc.), by using an LXM or natural language processing to analyze the extracted text, etc.

In the various embodiments, the processor may perform any or all of the above-described operations sequentially, in parallel, or a combination thereof. In addition, it should be understood that the processor may determine sentiment in block 1014 by performing any of a variety of other or additional types of sentiment analysis and determination operations.

In block 1016, the processor may determine an overall sentiment for the unprocessed ToI based on the individually determined sentiments (e.g., blocks 1016-1014). As part of this determination, the processor may adjust some of the determined sentiments by considering them in a holistic way based on the stored metadata (e.g., negative facial details may be dismissed if they are not expressed by the person who is discussing the ToI the most, negative statements in the extracted text details may be discarded if the extracted intonation indicates that the negative statements were said sarcastically, etc.).

In an embodiment, the processor may determine an overall sentiment for the unprocessed ToI based on a weighted combination of the individually determined sentiments. In an alternative embodiment, the processor may determine an overall sentiment for the unprocessed ToI using a machine learning algorithm or by querying a local or remote LXM.

In some embodiments, in block 1016, the processor may aggregate the sentiment scores from different content types and apply a weighted algorithm that accounts for factors such as the prominence of the ToI (e.g., product, etc.) in the content and the reliability of the sentiment indicators. In some embodiments, the processor may combine individual sentiments (e.g., from text, intonation, sounds, gestures, facial details, etc.) into an overall sentiment and adjust individual sentiments based on a holistic consideration of stored metadata. In some embodiments, the processor may use a weighted combination, machine learning algorithm, LXM, etc. to combine the individual sentiments.

In block 1018, the processor may store the media content metadata (e.g., the date when the media content was published, the source of the media content), media content extracted details, parts of the media content (e.g., a subportion of the audio media content, a frame from video media content), ToI details (e.g., brand, manufacturer, categories), media content publisher details, and sentiment in a ToI knowledge repository.

In some embodiments, in block 1018, the processor may store any or all of the received or generated information (e.g., metadata, extracted details, parts of the media content, ToI details, publisher details, sentiment data/assessments, etc.) in the ToI knowledge repository in a structured format that allows for easy retrieval and analysis for future queries or trend analysis.

In response to determining that there are no unprocessed ToIs in the extracted details (i.e., determination block 1012="No"), the process may exit, end, terminate, or finish in block 1020.

Figure 10B:
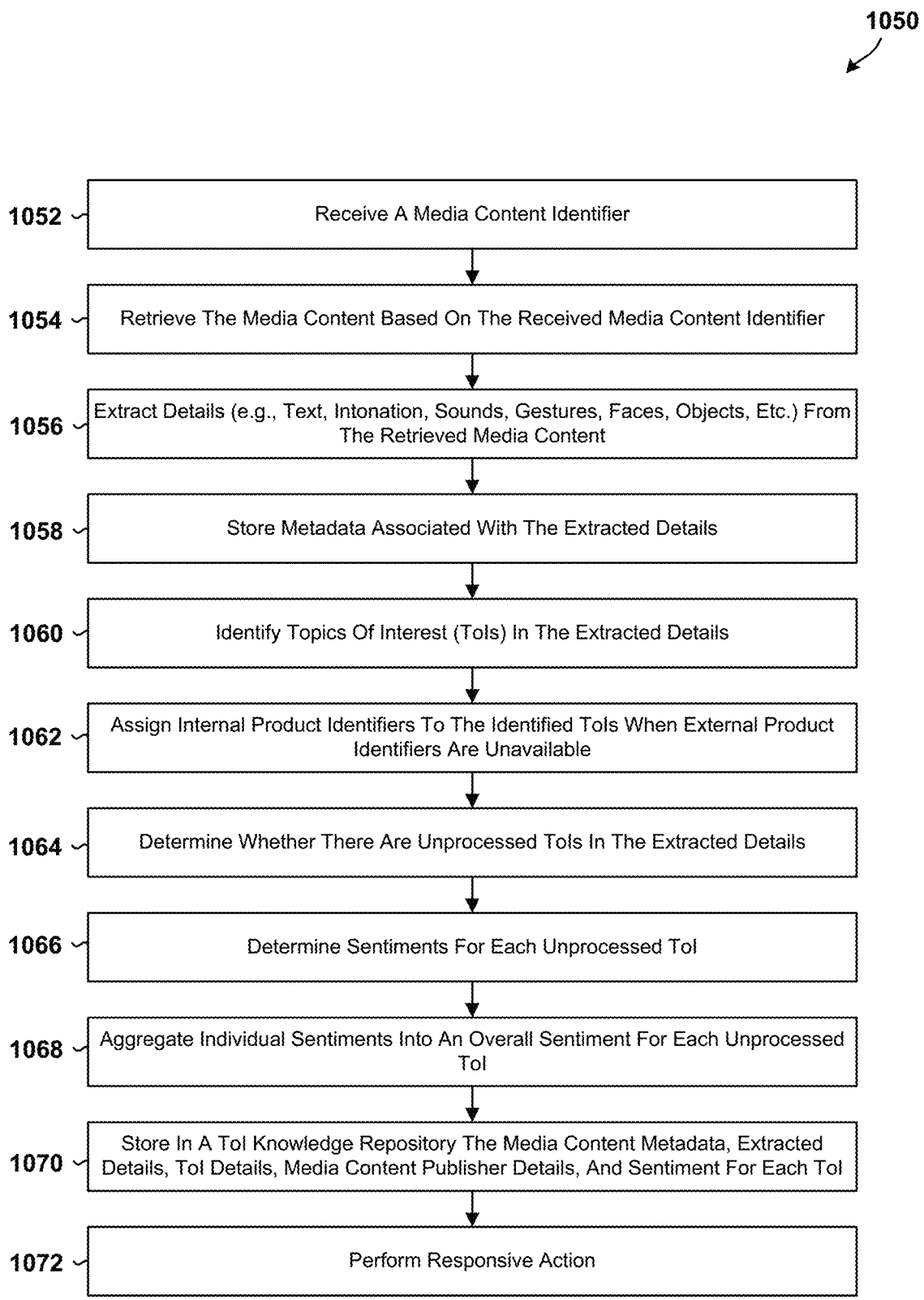

FIG. 10B is a process flow diagram illustrating another method 1050 of determining the sentiments for TOIs or products referenced in a media content in accordance with some embodiments. Method 1050 may be performed by a processing system or at least one processor in a computing system that implements all or portions of a media analytics platform (e.g., media analytics platform 120 illustrated in FIG. 1, etc.).

In block 1052, the processor may receive a media content identifier. In some embodiments, the media content identifier may include at least one of a URL or another identifier of media content.

In block 1054, the processor may retrieve the media content based on the received media content identifier.

In block 1056, the processor may extract details from the retrieved media content. In some embodiments, the details may include at least one of text, intonation, sounds, gestures, faces, or objects. In some embodiments, extracting details from the retrieved media content may include using speech-to-text conversion techniques for audio media content, using machine learning techniques including convolutional neural networks (CNNs) for identifying gestures, faces, and objects in video media content, and/or performing character recognition to extract text associated with objects.

In block 1058, the processor may store metadata associated with the extracted details. In some embodiments, the metadata may include at least one of locations in text where speaker intonation changes, times in audio media content when a product is mentioned, and times in video media content when a product is shown.

In block 1060, the processor may identify Topics of Interest (ToI s) in the extracted details. In some embodiments, the ToIs may include products discussed or shown in the media content. In some embodiments, identifying ToIs in the extracted details may include using external product identifiers for unambiguous identification of the products.

In block 1062, the processor may assign internal product identifiers to the identified ToIs if external product identifiers are unavailable.

In block 1064, the processor may determine whether there are unprocessed ToIs in the extracted details.

In block 1066, the processor may determine sentiments for each unprocessed ToI. In some embodiments, the sentiments may be based on extracted text, intonation, sounds, gestures, facial details, and/or media content metadata. In some embodiments, determining sentiments for each unprocessed ToI further may include evaluating customer reviews, comments, or descriptions within the media content for language sentiment, analyzing tonal variations in the voice of a speaker discussing the ToI, interpreting body language and hand gestures in video content related to the ToI, and using facial recognition and emotion detection technologies to analyze expressions related to the ToI.

In block 1068, the processor may aggregate individual sentiments into an overall sentiment for each unprocessed ToI. In some embodiments, aggregating individual sentiments into an overall sentiment for each unprocessed ToI may include adjusting individual sentiments based on a holistic consideration of stored metadata.

In block 1070, the processor may store in a ToI knowledge repository, the media content metadata, extracted details, ToI details, media content publisher details, and sentiment for each ToI. In some embodiments, storing the data in the ToI knowledge repository may include structuring the data for easy retrieval and analysis for future queries or trend/trust analysis. The processor may terminate the method in response to determining that there are no unprocessed ToIs.

In block 1072, the processor may perform, initiate, or trigger any or all of the responsive actions discussed in this application (e.g., responsive actions discussed with reference to block 446 in FIG. 4D, etc.).

FIGS. 11A-11G are component diagrams that illustrate object extraction and ToI identification in video media contents in accordance with some embodiments. In some embodiments, the object extraction operations may be performed as part of block 1008 of FIG. 10 and the ToI identification operations may be performed as part of block 1010 of FIG. 10. In some embodiments, the object extraction and ToI identification operations may be performed as part of the operations in block 434 and/or 708.

Figure 11A:
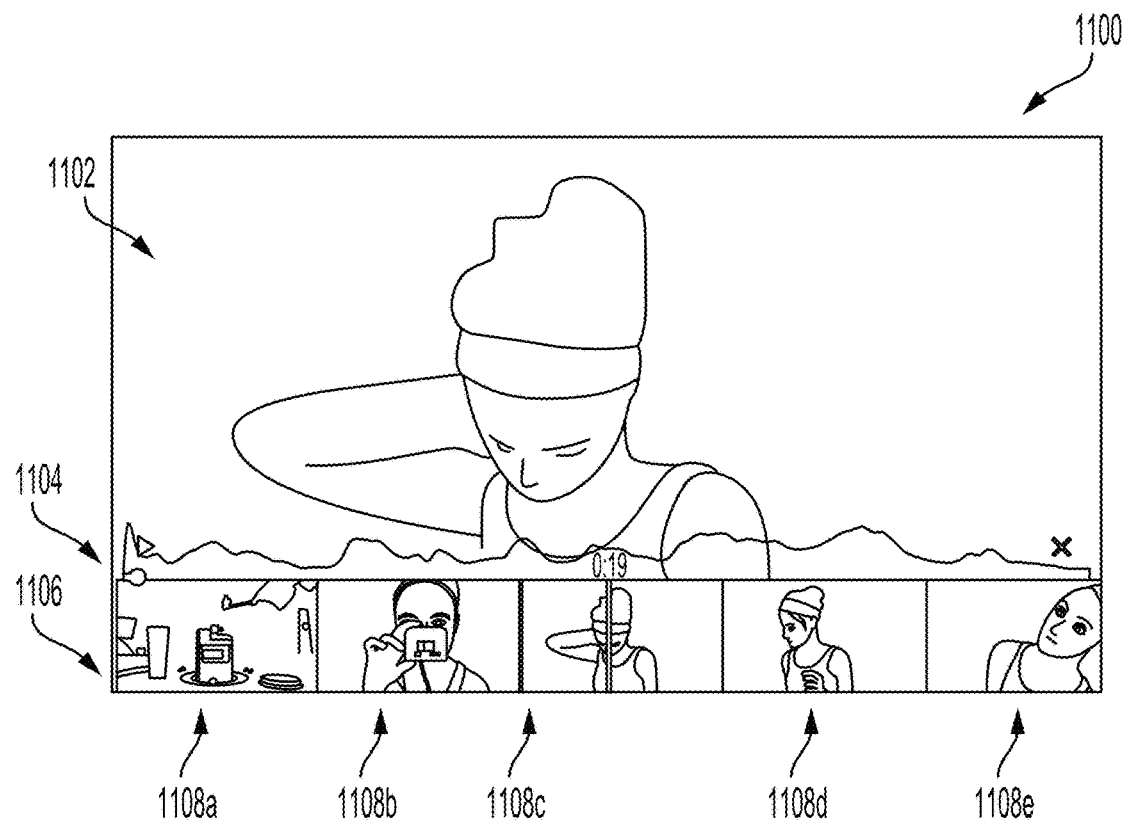
FIGS. 11A-11G are component diagrams that illustrate object extraction and topic of interest (ToI) identification in video media contents in accordance with some embodiments.

FIG. 11A illustrates an extracted detail 1100 from a video media content social media vlog. In the example illustrated in FIG. 11A, the extracted detail 110 includes the main video media content 1102, a views timeline 1104, and a frame timeline 1106. The views timeline 1104 shows how many people viewed each part of the video media content (e.g., viewers may rewind and forward the video as they are watching it). The frame timeline 1106 segments the video media content into scenes and displays a representative frame 1108a-1108e for each scene.

In an embodiment, the amount of processing required to perform object extraction may be reduced by only analyzing a small subset of frames from each scene, rather than analyzing every frame in the scene. The processor may determine the scenes in the video media content, or it may be able to obtain the scene information as part of the media content retrieved from the server (e.g., as part of operation 1006).

Figure 11B:
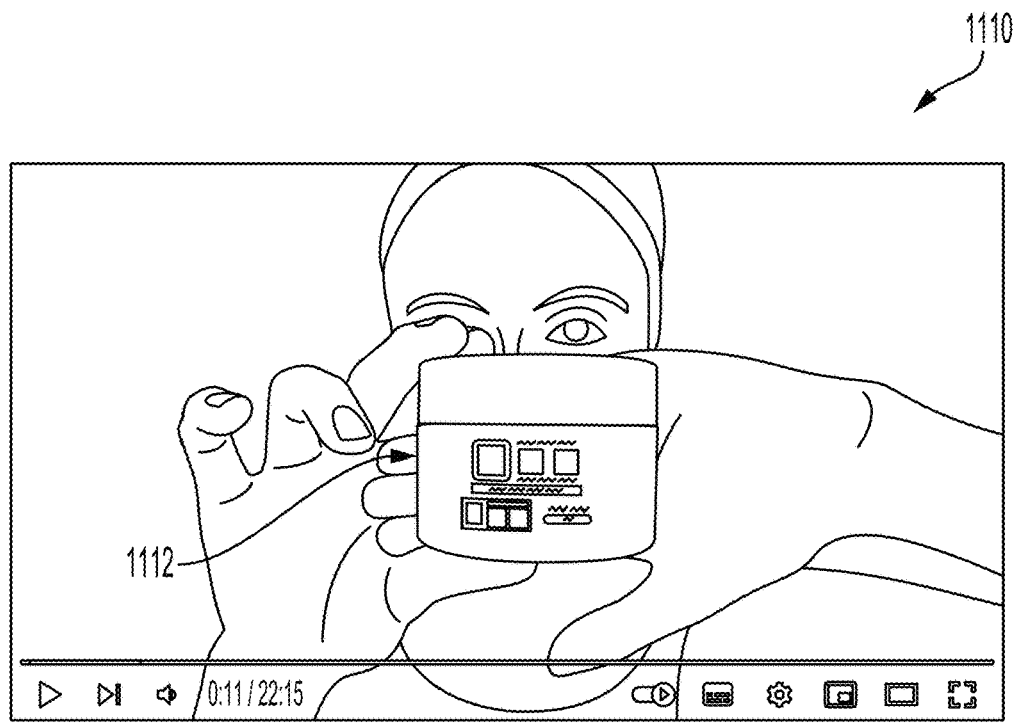

FIG. 11B illustrates a frame 1110 extracted from the video media content. In the example illustrated in FIG. 11B, the frame 1110 includes a vlog presenter holding a tub 1112 of face-cream.

Figure 11C:
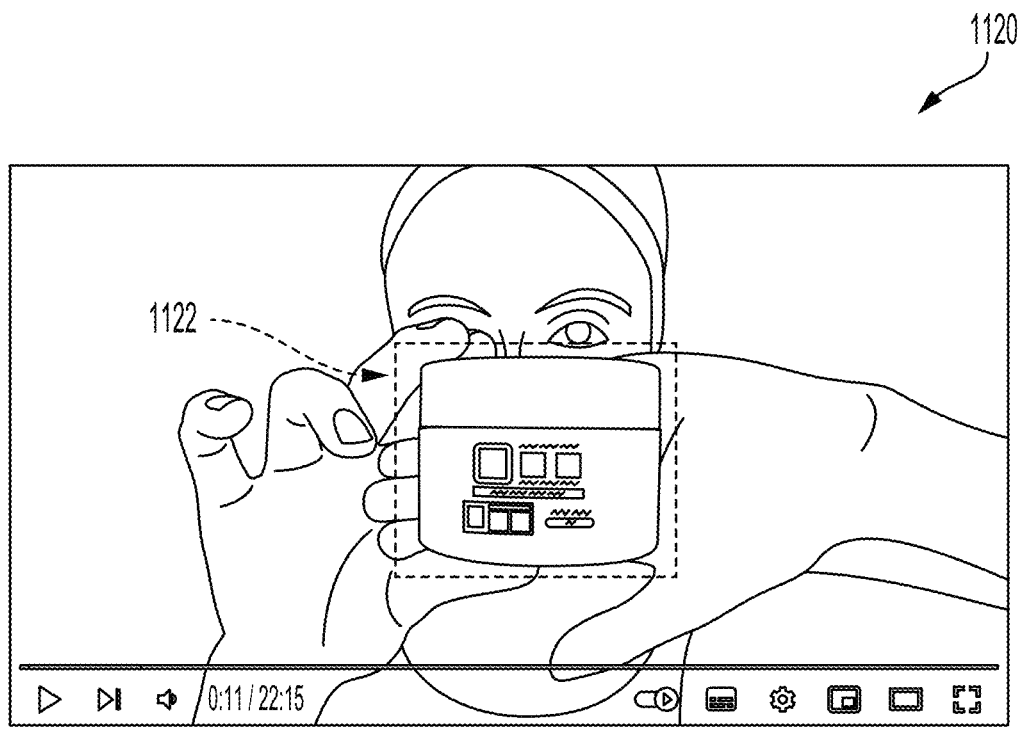

FIG. 11C illustrates a frame 1120 that includes frame 1110 (illustrated in FIG. 11B) and a bounding box 1122 overlaid on the image around the tub 1112 of face-cream.

In an embodiment, the amount of processing required to perform text extraction may be reduced by only analyzing the portion of the frame 1120 contained within the bounding box 1122 for the object (or objects). This approach may also produce more accurate results because the extracted text may be associated with the object. Further, the amount of processing required to identify the ToI may be further reduced by considering the attributes of the ToI (e.g., its color, its shape, the type of packaging).

Figure 11D:
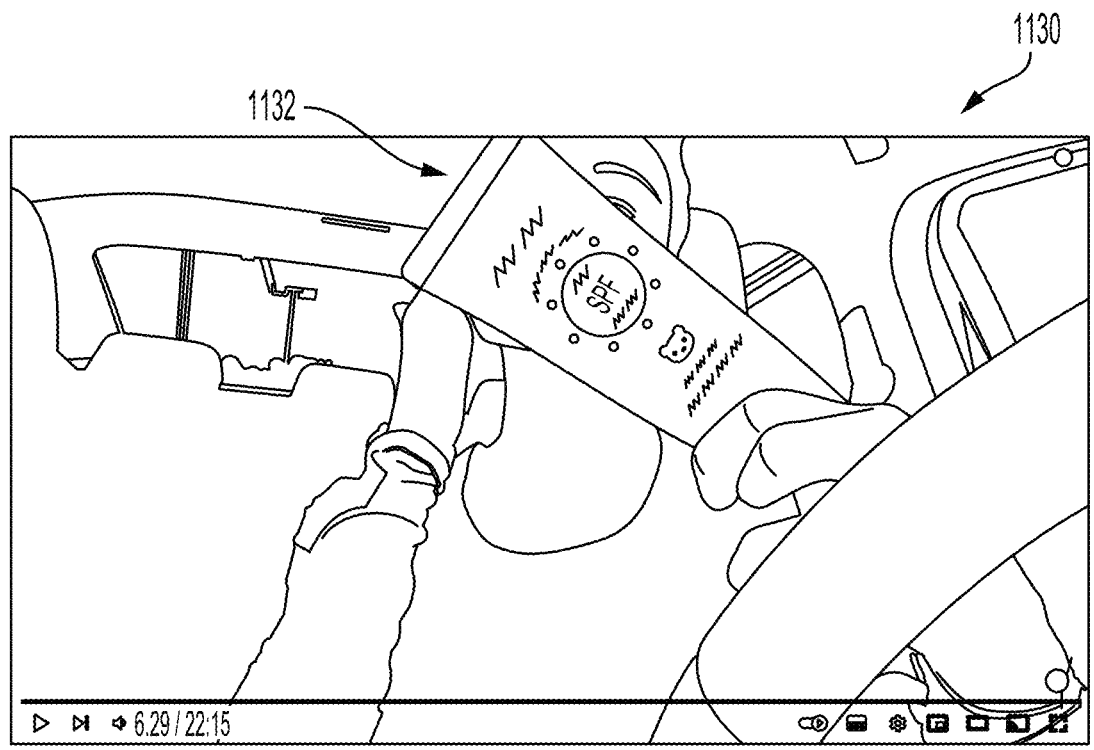

FIG. 11D illustrates another frame 1130 extracted from the video media content. In the example illustrated in FIG. 11D, the frame 1130 includes vlog presenter holding a tube 1132 of sun-cream. The processor may identify the tube 1132, perform text extraction (e.g., "SPF," "UV"), and then use a combination of the tube attributes and the extracted text to identify the ToI in the ToI knowledge repository. If the processor cannot identify the ToI, it may still add it to the ToI knowledge repository as part of a grouping of similar ToIs (e.g., as part of a suncreams grouping within a hierarchy) using an internal identifier.

Figure 11E:
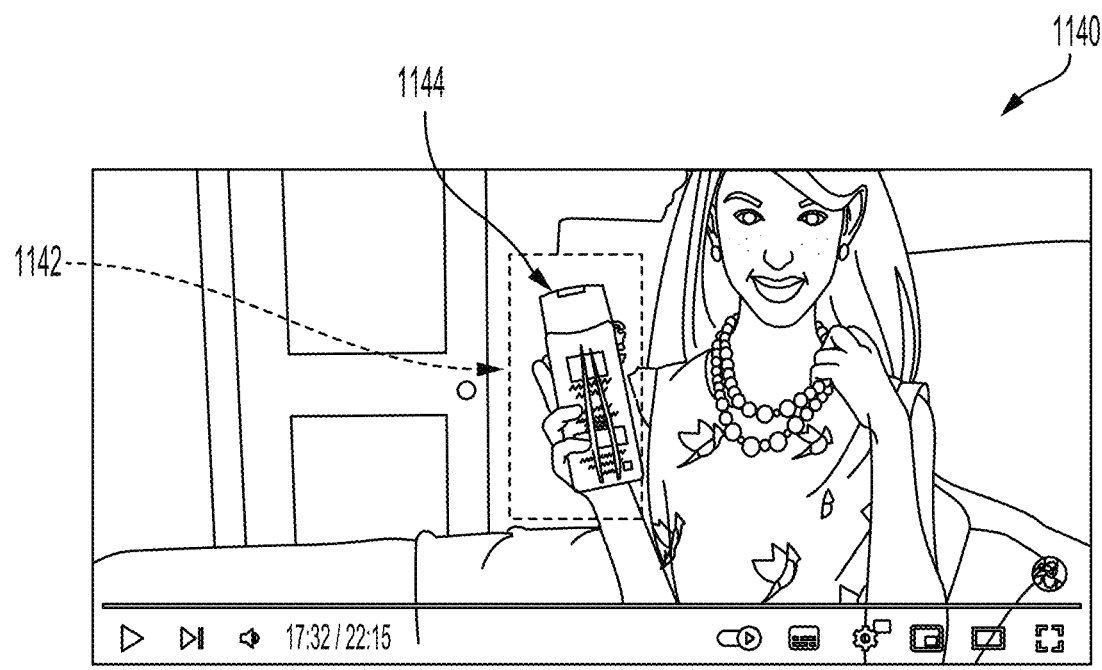

FIG. 11E illustrates another frame 1140 extracted from the video media content. In the example illustrated in FIG. 11E, the frame 1140 includes vlog presenter holding a container 1144 of shower gel that is contained within a bounding box 1142. In this example, the presenter's finger is covering the brand name (e.g., only "rogena" of "Neutrogena®" may be visible, etc.). As such, the processor may not be able to perform full text extraction due to the glare on the product and the presenter's finger covering the brand name. In some embodiments, the processor may be configured to use a combination of the container attributes and the extracted text in order to identify the ToI (i.e., Neutrogena® shower gel) in the ToI knowledge repository (e.g., in response to determining that full text extraction is not available, etc.).

In an embodiment, the processor may use predictive text and/or word completion techniques on extracted text that is incomplete. In some embodiments, the processor may be configured to use a combination of the partial word plus the object surrounding the object, or in proximity to the object to reduce search-space and identify the full-text by combining multiple vector embeddings to predict the closest match.

Figure 11F:
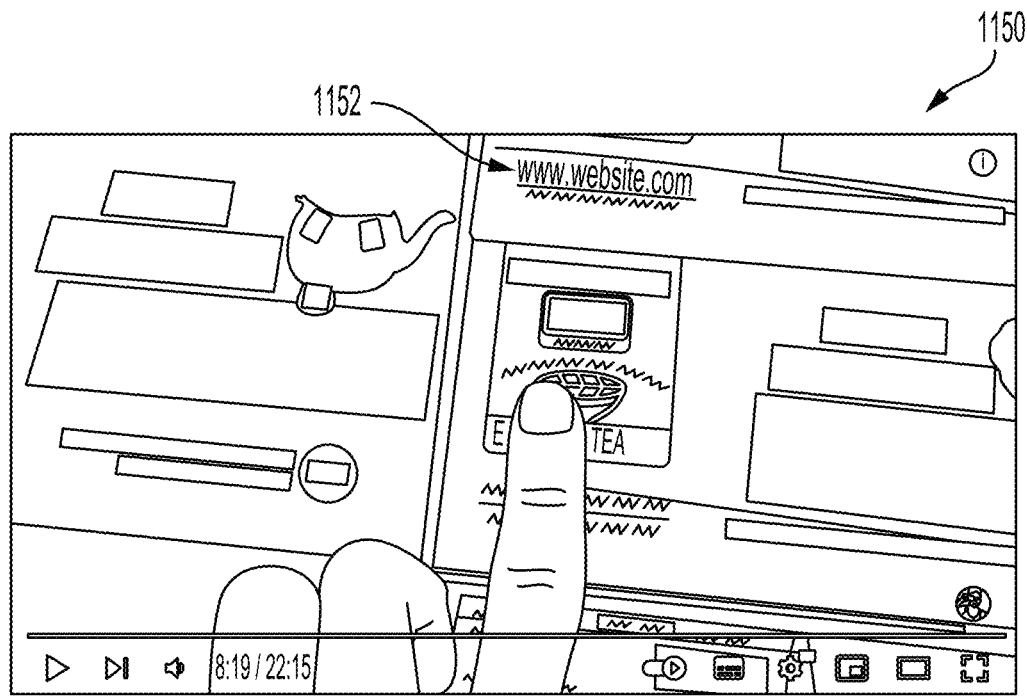

FIG. 11F illustrates another frame 1150 extracted from the video media content. In the example illustrated in FIG. 11F, the frame 1150 includes the vlog presenter pointing to a product containing non-Latin characters. Again, the processor may not be able to perform full-text extraction due to the presenter's finger covering the product name (i.e., only "E TEA" is visible). As such, the processor may use a combination of the packaging attributes and the extracted text to identify the product in the product knowledge repository.

In the example illustrated in FIG. 11F, the extracted text includes an eCommerce website address 1152. As such, the processor may retrieve webpages from the eCommerce website, find the ToI (e.g., using the packaging attributes and the extracted text), obtain the full ToI name (e.g., product name, etc.), and add the ToI details to the ToI knowledge repository in response to determining that it cannot find the ToI in the ToI knowledge repository. In some embodiments, the processor may perform these steps using the methods described in U.S. Patent Application No. 17/867,358, entitled "System and Method for Efficiently Identifying and Segmenting Product Webpages on an eCommerce Website" filed Jul. 18, 2022, the entire contents of which are hereby incorporated by reference for all purposes.

Figure 11G:
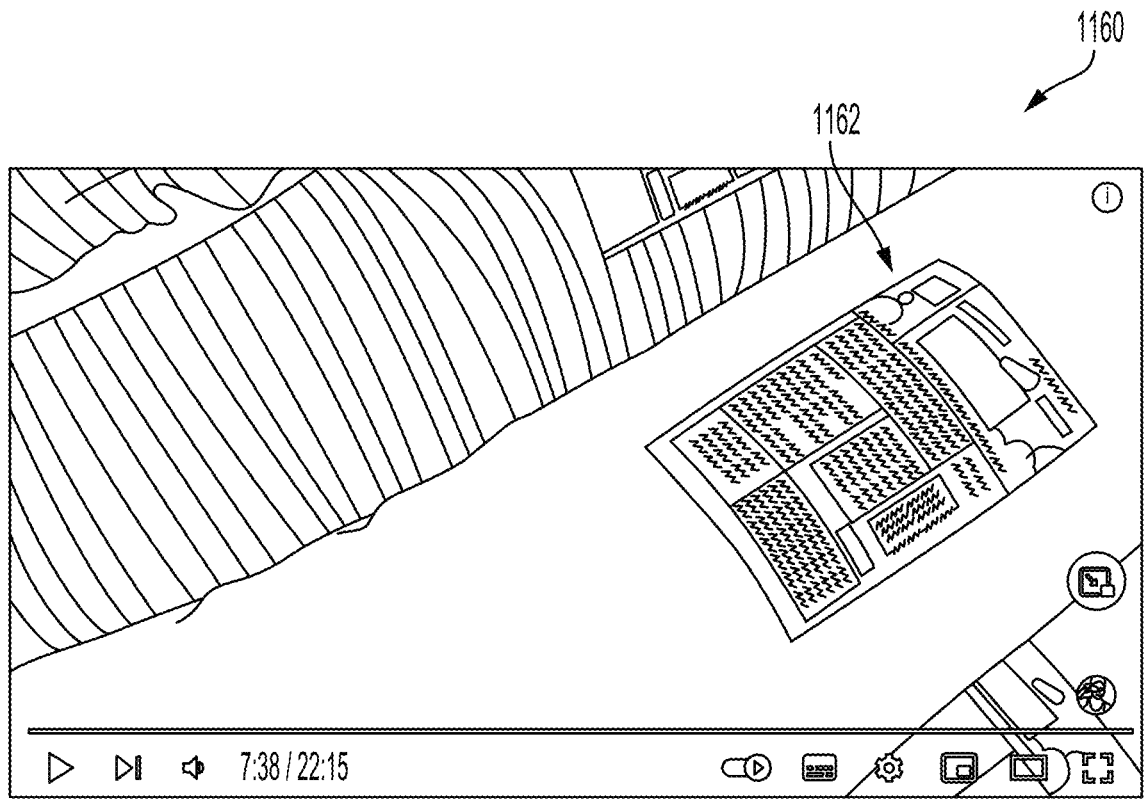

FIG. 11G illustrates another frame 1160 extracted from the video media content. In the example illustrated in FIG. 11G, the ToI is a product that includes a label 262 that contains only non-Latin characters. The processor may determine whether it is able to perform text extraction to identify the product. In response to the processor determining that it cannot identify the product using text extraction, the processor may generate a signature for the label that may remain constant despite variations in the label (e.g., size, orientation, color, distortion). The processor may then use this signature to search the ToI knowledge repository. The signature may be associated with an internal product identifier.

Figure 11H:
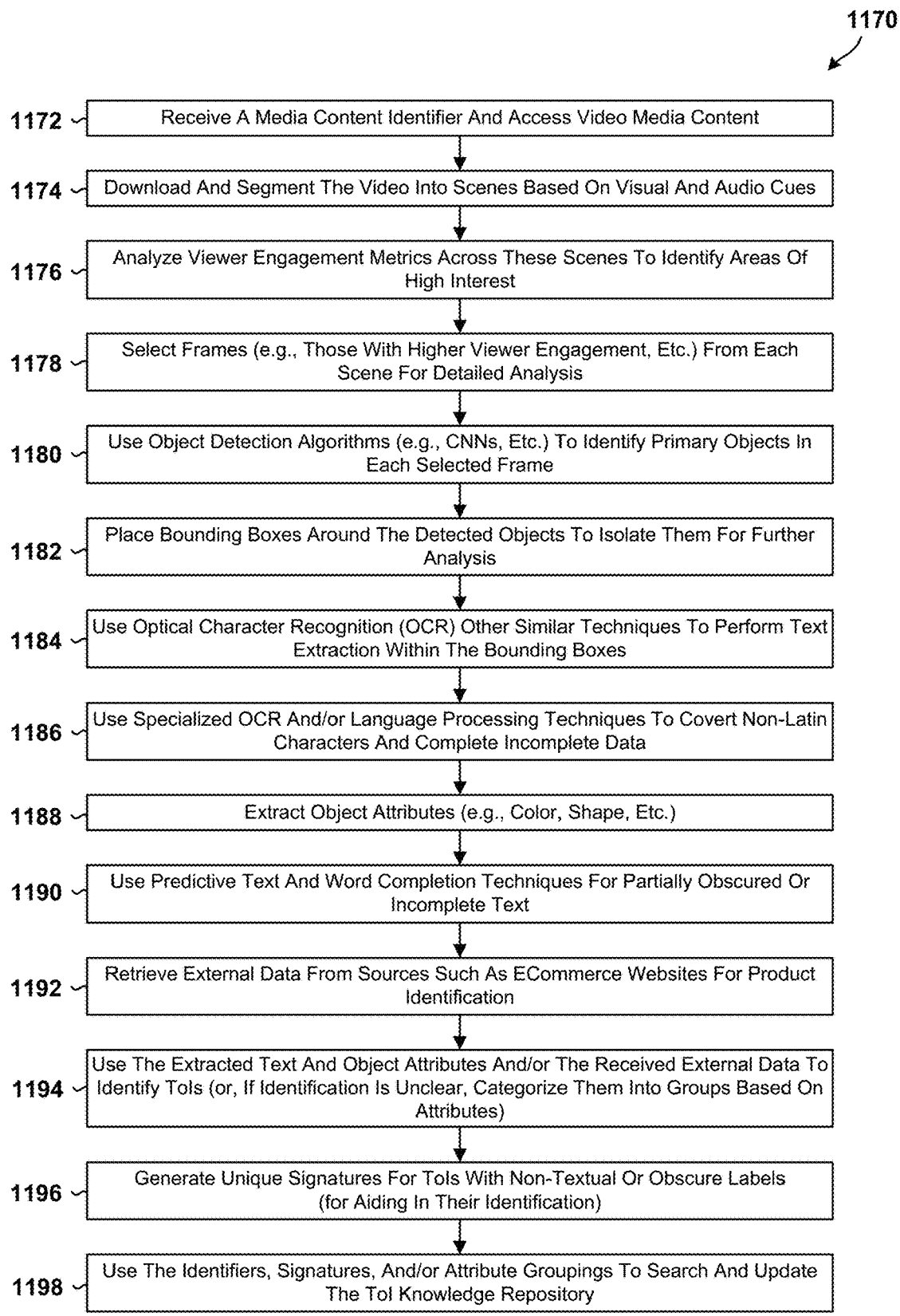
FIG. 11H is a process flow diagram illustrating a method of efficiently searching and updating the ToI knowledge repository to reduce the search space and improve device response times in accordance with some embodiments.

FIG. 11H is a process flow diagram illustrating a method 1170 of searching and updating the ToI knowledge repository in accordance with some embodiments. Method 1170 may be performed by a processing system or at least one processor in a computing system that implements all or portions of a media analytics platform (e.g., media analytics platform 120 illustrated in FIG. 1, etc.).

In block 1172, the processor may receive a media content identifier and access video media content. In block 1174, the processor may receive (e.g., download, etc.) and segment the video into scenes based on visual and audio cues. In block 1176, the processor may analyze viewer engagement metrics across these scenes to identify areas of high interest. In block 1178, the processor may select frames (e.g., those with higher viewer engagement, etc.) from each scene for detailed analysis. In block 1180, the processor may use object detection algorithms (e.g., CNNs, etc.) to identify primary objects in each selected frame. In block 1182, the processor may place bounding boxes around the detected objects to isolate them for further analysis. In block 1184, the processor may use optical character recognition (OCR) other similar techniques to perform text extraction within the bounding boxes. In block 1186, the processor may use specialized OCR and/or language processing techniques to covert non-Latin characters and complete incomplete data. In block 1188, the processor may extract object attributes (e.g., color, shape, etc.). In block 1190, the processor may use predictive text and word completion techniques for partially obscured or incomplete text. In block 1192, the processor may retrieve external data from sources such as eCommerce websites for product identification. In block 1194, the processor may use the extracted text and object attributes and/or the received external data to identify ToIs (or, if identification is unclear, categorize them into groups based on attributes). In block 1196, the processor may generate unique signatures for ToIs with non-textual or obscure labels (for aiding in their identification). In block 1198, the processor may use the identifiers, signatures, and/or attribute groupings to search and update the ToI knowledge repository. The processor may also store all extracted details, metadata, and ToI information in a structured format (e.g., in a media content 202 record, etc.) for future reference and use (e.g., for future queries, trend analysis, etc.). In some embodiments, as part of the operations in block 1198, the processor may perform, initiate, or trigger any or all of the responsive actions discussed in this application (e.g., responsive actions discussed with reference to block 446 in FIG. 4D, etc.).

In some embodiments, the processor may be configured to extract objects (e.g., woman, hairband, tub, etc.), object attributes or features (e.g., smiling, in relation to the woman; blue, in relation to the tub, etc.), and object actions (e.g., rubbing, in relation to the woman and the face-cream, etc.) from media content for more comprehensive analysis of the content, sentiment analysis, contextual advertising, etc.

In some embodiments, the processor may be configured to determine source servers, determine processing servers, calculate media content sub-portion size, assign media content sub-portions, and retrieve media content sub-portions. For example, the processor may identify the number of source servers hosting the media content (e.g., by evaluating various factors such as redundancy, geographic distribution, integration with a content distribution network (CDN), etc.), determine the available processing servers for detail extraction from the media content, determine the total size of the media content, and determine the size of sub-portions of the media content to be distributed among the processing servers based on the total size of the media content and the number of processing servers. The processor may assign a source server and a sub-portion of the media content to each available processing server (i.e., in response to determining that the media content is not fully processed) and use range requests to efficiently retrieve specific sub-portions from the assigned source server.

The processor may extract text from audio, extract intonation details from the audio, extract sound details from the audio, extract gesture details from video, extract facial details from the video, extract object details from the video, extract scene details from the video, and store the extracted details (e.g., intonation types, object identities, timings, etc.) in the ToI knowledge repository. The processor may repeat the above operations for each sub-portion until all of the sub-portions are evaluated.

Figure 12A:
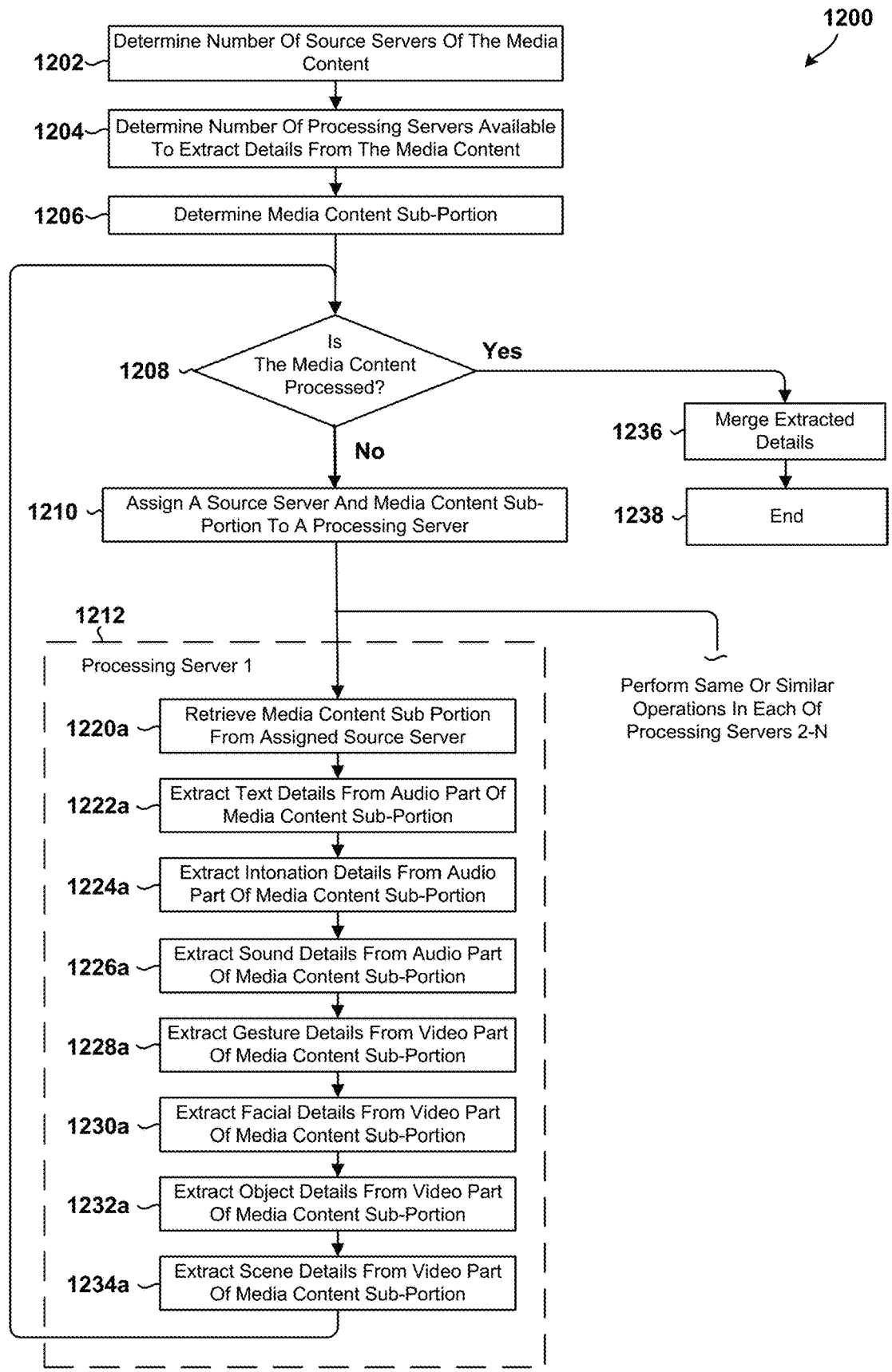
FIGS. 12A and 12B are process flow diagrams illustrating methods of retrieving media content and extracting details from the retrieved media content in accordance with some embodiments.

FIG. 12A is a process flow diagram illustrating a method 1200 of retrieving media content and extracting details from the retrieved media content. Any or all of the operations in method 1200 may be performed as part of any or all of the operations in method 400, 600, 700, and/or 1000 (e.g., as part of block 1004). Method 1200 may be performed by a processing system or at least one processor in a computing system that implements all or portions of a media analytics platform (e.g., media analytics platform 120 illustrated in FIG. 1, etc.).

In block 1202, the processor may determine the number of source servers of the media content (e.g., received as part of block 1002 with reference to FIG. 10, etc.). There may be multiple source servers for redundancy purposes, serving different geographical areas, or as part of a CDN.

In block 1204, the processor may determine the number of processing servers that are available to extract details from the media content. For example, the processor may determine the number of servers based on the availability within an on-premises solution in which the physical infrastructure limits the processing capabilities. In a cloud-based or hyperscaler environment, the processor may select the number of servers based on the maximum budget allocated for scaling to more servers. The processor may also determine the number of servers based on the processing power required to handle large datasets or complex media content, such as high-resolution videos or extensive audio files. The processor may also determine the number of servers based on the need for specialized servers equipped with specific hardware or software capabilities, such as graphical processing units (GPUs) for intensive video processing or specialized neural network accelerators for AI-based media analysis.

In some embodiments, the processor may determine the number of servers that are available to extract details from the media content in block 1204 based on the number of processing servers required to process the data within a specific time frame to adhere to a pre-agreed customer delivery Service Level Agreement (SLA). For example, the processor may allocate additional servers to expedite the process if a client requires rapid turnaround for media analysis. The processor may select and use fewer resources to reduce costs for less time-sensitive tasks.

In block 1206, the processor may determine a media content sub-portion size. The processor may subsequently split the media content into portions of this size and distribute them between the available processing servers. For example, if the media content is 120 MB, it is only available from a single source server, and it may be processed by 8 processing servers, then the media content sub-portion size may be calculated to be 15 MB (i.e., 120 MB/8). Thus, each processing server will extract details from a different 15 MB media content sub-portion from the single source server. As another example, if the media content is 600 MB, it is available from three source servers, and it may be processed by 12 processing servers, then the media content sub-portion size may be calculated to be 50 MB (i.e., 600 MB/12). Thus, each processing server will extract details from a different 50 MB media content sub-portion, and each group of four processing servers will receive (e.g., download, etc.) their respective media content sub-portions from a different source server. In an alternative embodiment, the media content sub-portion size may be configured statically.

In an embodiment, the combination of the number of processing servers and the media content sub-portion size may be such that some of the processing servers need to process two or more media content sub-portions sequentially.

In an embodiment, the processing servers may be subdivided so that they are specialized for specific types of extraction tasks (e.g., a server may be specialized for extracting text from audio).

In block 1208, the processor may determine whether the media content is processed (i.e., if all of the media content sub-portions are processed).

In response to determining that the media content is not processed (i.e., determination block 1208="No"), in block 1210 the processor may assign a source server and media content sub-portion to an available processing server.

For the sake of brevity, FIG. 12 illustrates one processing server (i.e., processing server 1 performing block 1212). Further, only the blocks 1220a-1234a within block 1212 are shown in detail for the sake of brevity, but it should be understood that their analogous blocks (i.e., blocks 1220n-1234n) are present and performed as part of method 1200.

In block 1220a, the processor may retrieve media content sub-portion from the assigned source server (as described with reference to block 1006 in FIG. 10). If the source server is a HTTP server, and if it supports range requests (e.g., indicated using the "Accept-Ranges" HTTP header), then the web browser in the processor may use these range requests to receive (e.g., download, etc.) only the required media content sub-portion. If the source server is a HTTP server, and if it does not support range requests (e.g., indicated by the absence of the "Accept-Ranges" HTTP header), then the processor may receive the media content and assign media content sub-portions to other processing servers as the media content sub-portions are received. In some embodiments, the processing servers may store the retrieved media content sub-portions in memory (rather than writing them to disk) in order to improve their processing speeds.

In some embodiments, the processor may determine that the server does not support accept-range or similar. In response, the processor may stream the remote data and discard the data up until the point that it contains the relevant portions, and only then capture the portion or sub-range for analysis to reduce processing times and resource consumption.

In block 1222a, the processor may extract text details from the audio part of media content sub-portion (as described with reference to block 1008 in FIG. 10). The processor may first extract the audio media content from the media content (if the media content contained audio and video content). The processor may then use a speech-to-text converter to convert the audio media content to text. In an enhanced embodiment, the processor may select a speech-to-text converter from a multitude of speech-to-text converters so that it selects the speech-to-text converter that is most suited to the audio media content (e.g., a speech-to-text converter that specializes in converting American accented English speech may be selected for audio media content published by an American media content publisher).

In block 1224a, the processor may extract intonation details from the audio part of the media content sub-portion (as described with reference to block 1008 in FIG. 10). In block 1226a, the processor may extract sound details from the audio part of the media content sub-portion (as described with reference to block 1008 in FIG. 10). In block 1228a, the processor may extract gesture or pose details (e.g., a thumbs-up, a thumbs-down, etc.) from the video part of the media content sub-portion (e.g., similar to that described with reference to block 1008 in FIG. 10). In block 1230a, the processor may extract facial details (e.g., a smile, a frown) from the video part of the media content sub-portion (as described with reference to block 1008 in FIG. 10). In block 1232a, the processor may extract object details from the video part of the media content sub-portion (as described with reference to block 1008 in FIG. 10).

In block 1234a, the processor may extract scene details from the video part of the media content sub-portion (e.g., if scene information was not obtained as part of block 1220a). The scene details may include the time within the media content when the scene started, the time within the media content when the scene ended, and metadata about the scene (e.g., the type of location where the scene was recorded). The scene details may be used to create a frame timeline (e.g., frame timeline 1106 with reference to FIG. 11A).

In the various embodiments, the processor may store details that were extracted in blocks 1222a-1234a (e.g., the type of intonation in the associated sub-portion of the audio media content, and the time within the media content when the sub-portion of the audio media content starts, in block 1224a; the identity of the object detected within the frame, the time within the media content when the frame occurs, and the duration for which the object continuously remains in the video media content, in block 1232a). The extracted details may be stored in the ToI knowledge repository (e.g., as part of block 1018 with reference to FIG. 10).

In the various embodiments, the processor may extract part of the media content in blocks 1222a-1234a if it is significant (e.g., a sub-portion of the audio media content may be extracted from audio or video media content if it contains significant intonation details in block 1224a or significant sound details in block 1226a; a frame may be extracted from video media content when an object is detected in block 1232a). The extracted media content may be stored with its associated details in the ToI knowledge repository (e.g., as part of block 118 with reference to FIG. 1).

Storing the extracted details (and optionally the associated extracted parts of the media content) enables the processor to quickly and efficiently retrieve them again without needing the media content (e.g., the processor can determine what a vlog presenter said in the 30 seconds before and after giving a thumbs-up gesture by retrieving the extracted details associated with blocks 1222a and 1228a from the ToI knowledge repository). This may save significant time and resources due to not needing to retrieve (e.g., download) and process the media content again.

Further, storing the extracted details (and optionally the associated extracted parts of the media content) enables a user to quickly and efficiently move between extracted details using a graphical user interface (GUI), as is described in more detail further below.

In the various embodiments, the processor may not perform some of the blocks 1222a-1234a (e.g., due to the media content type), and the order of the blocks 1222a-1234a may be changed. Further, block 1212 may contain additional blocks for performing additional types of details extraction.

In the various embodiment, the output of one or more of the blocks 1222a-1234a may be used as input to one or more of the blocks 1222a-1234a (e.g., the extracted text details from block 1222a may be used as input to block 1232a in order to determine a smaller sub-portion of the video media content to be analyzed (e.g., +/−15 seconds from the time when the ToI was mentioned); the processor may extract gesture details in block 1228a only for the scenes containing only a specific person (e.g., the media content publisher)).

In response to determining that the media content is processed (i.e., determination block 1208="Yes"), the processor may merge all of the extracted details (i.e., the details extracted by each processing server for each media content sub-portion) in block 1236. Some of the extracted details may be merged by simply grouping them together because they are all independent (e.g., the text details extracted as part of blocks 1222a-1222n), whereas some of the extracted details may need to be merged by combining them to create new extracted details (e.g., the time when a scene started may be identified in block 1234a, but the time when the scene ended may be identified in block 1234b (not illustrated separately in FIG. 12), and therefore new scene information needs to be created that combines the scene information from blocks 1234a and 1234b).

As part of block 1236, the processor may extract or determine further details by processing the merged details together (e.g., the processor may use the extracted text details from blocks 1222a-1222n and the extracted object details from blocks 1232a-1232n in order to determine the main/focus topic of each scene identified in blocks 1224a-1224n; the processor may use the extracted object details from blocks 1232a-1232n in order to identify people, and these people may then be associated with each scene identified in blocks 1224a-1224n). In block 1238, the process may exit, end, terminate, or finish.

Figure 12B:
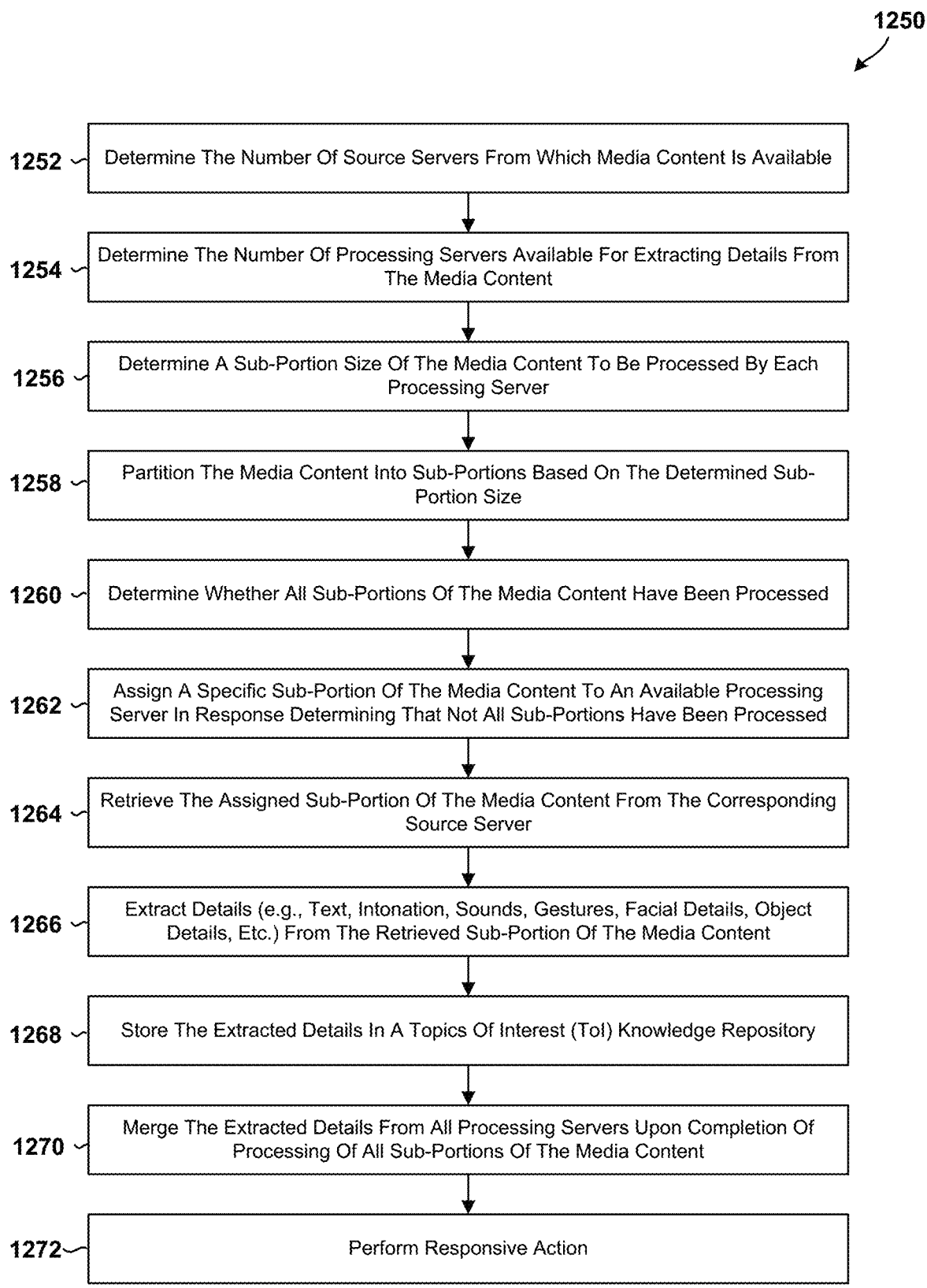

FIG. 12B is a process flow diagram illustrating another method 1250 of retrieving media content and extracting details from the retrieved media content in accordance with some embodiments. Method 1250 may be performed as part of method 1000 (e.g., as part of block 1004). Method 1250 may be performed by a processing system or at least one processor in a computing system that implements all or portions of a media analytics platform (e.g., media analytics platform 120 illustrated in FIG. 1, etc.).

In block 1252, the processor may determine the number of source servers from which media content is available. In block 1254, the processor may determine the number of processing servers available for extracting details from the media content. In block 1256, the processor may determine a sub-portion size of the media content to be processed by each processing server. In some embodiments, determining the sub-portion size of the media content may include calculating the size based on the total size of the media content and the number of processing servers.

In block 1258, the processor may partition, divide, or split the media content into sub-portions based on the determined sub-portion size. In block 1260, the processor may determine whether all sub-portions of the media content have been processed. In block 1262, the processor may assign a specific sub-portion of the media content to an available processing server in response to determining that not all sub-portions have been processed. In block 1264, the processor may retrieve the assigned sub-portion of the media content from the corresponding source server. In some embodiments, retrieving the assigned sub-portion of the media content from the corresponding source server may include using HTTP range requests (when supported by the source server).

In block 1266, the processor may extract details from the retrieved sub-portion of the media content. In some embodiments, the extracted details may include at least one of text, intonation, sounds, gestures, facial details, or object details. In some embodiments, extracting details from the retrieved sub-portion of the media content may include extracting text from the audio part of the media content using a speech-to-text converter, extracting intonation details from the audio part of the media content, extracting sound details from the audio part of the media content, extracting gesture details from the video part of the media content using image analysis algorithms, extracting facial details from the video part of the media content using facial recognition and emotion detection technologies, extracting object details from the video part of the media content, and/or extracting scene details from the video part of the media content.

In block 1268, the processor may store the extracted details in a ToI knowledge repository. In some embodiments, storing the extracted details in the ToI knowledge repository may include organizing and structuring the details for efficient future retrieval and analysis. In block 1270, the processor may merge the extracted details from all processing servers upon completion of processing all sub-portions of the media content. In some embodiments, merging the extracted details may include combining independent details and creating new extracted details by combining related details from different processing servers. In block 1272, the processor may perform, initiate, or trigger any or all of the responsive actions discussed in this application (e.g., responsive actions discussed with reference to block 446 in FIG. 4D, etc.). The processor may exit the method in response to determining that all sub-portions of the media content have been processed.

In some embodiments, the processor may be configured to determine a media impact score for a topic of interest (ToI) in media content. The processor may receive a ToI identifier, retrieve ToI details from a ToI knowledge repository (the details including media content metadata, extracted media content details, ToI details, media content publisher details, and/or associated sentiments for each media content referencing the ToI), optionally generate sentiment profile, and determine media impact score, which may include determining a trend score and/or determining a trust score. In some embodiments, the processor may determine sentiment-based media impact score, determine a media impact score based on the number of associated publishers, determine a media impact score based on contextual distances, determine a media impact score based on media impact scores of publishers, determine a media impact score based on metadata, and determine overall media impact score based on any or all of the determined media impact scores.

For example, in some embodiments the processor may be configured to receive an identifier for a ToI that is specific to a product, category, or class (e.g., "electric cars" or "wireless mouse."), query the ToI knowledge repository and apply received query filters to retrieve a focused set of relevant ToI details, and determine a media impact score for the ToI based on the retrieved ToI details. The media impact score may include a numerical value or structured metric that evaluates the current popularity and authenticity of the media content relative to similar content. In some embodiments, the processor may determine a trend score and/or a trust score as part of the media impact score. The trend score may reflect overall public sentiment toward the ToI and the trust score may evaluate the authenticity and consistency of sentiments associated with the ToI across different media contents.

In some embodiments, the processor may be configured to generate sentiment profile information structure that include sentiments related to the ToI that are categorized into positive, negative, or neutral, sentiment scores, frequency counts, average sentiment, sentiment trends, distribution, categorical data, and/or other similar data.

In some embodiments, the processor may be configured to determine a sentiment-based media impact score by evaluating sentiments related to the ToI (e.g., by analyzing tone, language, and emotional expressions in media content, etc.), determine a publisher number-based media impact score based on the number of publishers discussing the ToI, determine a contextual distance-based media impact score by analyzing the contextual distances of media content related to the ToI, determine a publisher media impact score-based media impact score based on the media impact scores associated with the publishers that are discussing the ToI or producing content about the ToI, and/or determine a metadata-based media impact score based on the metadata associated with the media content. The processor may determine an overall media impact score for the ToI based on a weighted combination of any or all of the sentiment-based media impact score, publisher number-based media impact score, contextual distance-based media impact score, publisher media impact score-based media impact score, and/or metadata-based media impact score.

Figure 13:
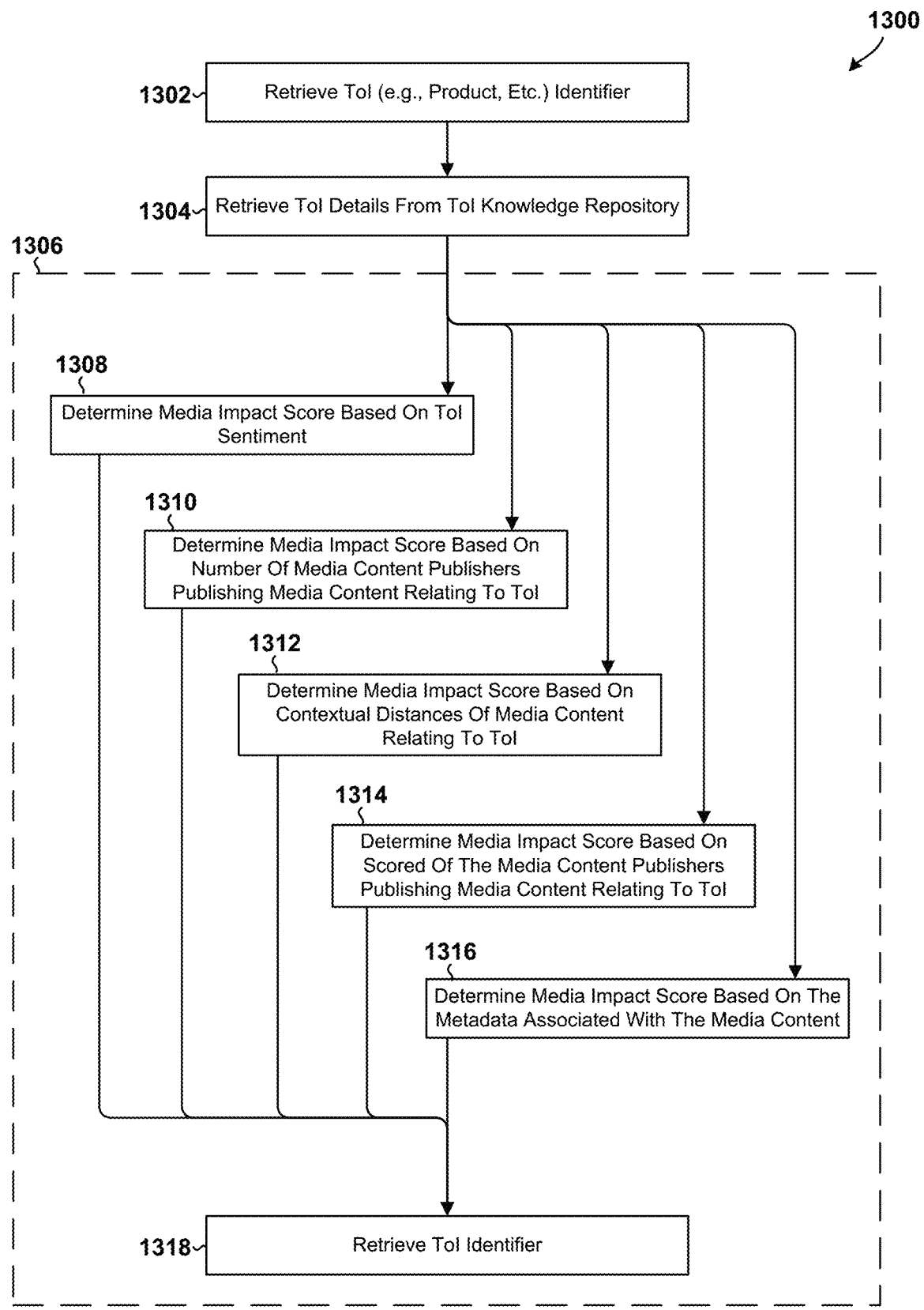
FIG. 13 is a process flow diagram illustrating a method of determining a media impact score for a topic of interest (ToI) in accordance with some embodiments.

FIG. 13 is a process flow diagram illustrating a method 1300 of determining a media impact score (e.g., a trend score, etc.) for a ToI (e.g., a product, etc.). Method 1300 may be performed by a processing system or at least one processor in a computing system that implements all or portions of a media analytics platform (e.g., media analytics platform 120 illustrated in FIG. 1, etc.).

In block 1302, the processor may receive an identifier for a ToI. The received identifier may be a specific name, category, or class of a ToI (e.g., "electric cars," "World Cup final," etc.). In embodiments in which the ToI is a product, the received identifier may be a SKU, GTIN, ASIN, or an identifier for a brand or manufacturer, or a category or class of the product (e.g., "wireless mouse"). In some embodiments, the processor may also receive various query filters that include constraints (e.g., temporal constraints, geographical constraints, etc.).

In block 1304, the processor may retrieve the ToI details from the ToI knowledge repository (which may have been placed there in block 1018 discussed above with reference to FIG. 10, etc.). The processor may also use the filters received in block 1302 to narrow down the retrieval of ToI details from the knowledge repository. The ToI details may include media content metadata, media content extracted details, ToI details, media content publisher details, and the associated sentiment for each media content that referred to the ToI. Each sentiment may be a metric or relative score for a ToI that indicates how much the ToI is "liked" or the degree to which the ToI is regarded positively or negatively in the media content (e.g., by the media content publisher who is reviewing the product).

In block 1306, the processor may determine a media impact score for the ToI. The media impact score may be a numerical value or structured metric that provides a robust assessment of the current popularity and authenticity of the media content relative to similar content. In some embodiments, the media impact score may include sub-scores such a trend score and/or a trust score. In some embodiments, the media impact score may include a weighted combination of any or all of the parameters in the segment 208 record (illustrated in FIG. 2A), aggregated over the media content 202 record (illustrated in FIG. 2A), aggregated over the knowledge base (e.g., for a ToI, etc.).

In block 1308, the processor may determine a media impact score based on the sentiments related to the ToI. For example, the processor may calculate the media impact score by assessing the tone, language, and emotional expressions in media content, categorizing sentiments into positive, negative, or neutral, compiling these findings into a sentiment profile, and translating qualitative data into a numerical trend score and/or trust score that reflects the positivity or negativity of the sentiments towards the ToI.

A sentiment profile may be a comprehensive representation of the collective attitudes, opinions, and emotions expressed in media content regarding the ToI. In some embodiments, the sentiment profile may include sentiment scores, frequency counts, average sentiment, sentiment trends, sentiment distribution, and categorical data. The sentiment scores may be numerical values that represent the sentiment of individual pieces of content. The sentiment scores may be normalized, for example, on a scale of 0 to 100 or from −1 (extremely negative) to +1 (extremely positive), with 0 representing neutral sentiment. The frequency counts may be numerical values that represent the number of times certain sentiments are expressed. The average sentiment may be an sentiment score value that represents the overall sentiment toward the ToI. The sentiment trends may include temporal data that indicates how sentiments change over time and time-series data that may be used to track sentiment evolution. The sentiment distribution may include statistical data that represents the distribution of different sentiment categories (positive, negative, neutral). The categorical data may include information categorizing the content source (e.g., social media, news outlet, blog, etc.) and/or which otherwise provides context to the sentiment score.

In some embodiments, determining the media impact score in block 1308 may include the processor determining a trend score for the ToI based on the sentiments related to the ToI. For example, the processor may analyze the sentiment data from various media sources to calculate a composite score that reflects the overall public sentiment toward the ToI. As part of these operations, the processor may examine the frequency, intensity, and context of both positive and negative sentiments, use advanced analytics to weigh the more recent sentiments more heavily (since recent sentiments may more accurately reflect current trends), and generate a trend score that corresponds to the overall weighted average sentiment.

In some embodiments, determining the media impact score in block 1308 may include the processor determining a trust score based on the sentiments related to the ToI. For example, the processor may evaluate the authenticity and consistency of sentiments associated with the ToI across different media contents based on, for example, whether the sentiments align with the established patterns or typical perceptions of the ToI. The processor may assign a high trust score (e.g., 0.8, 80, etc.) if the sentiments in newer media contents closely match those in earlier or related content (which may be a strong indicator of a consistent perception of the ToI over time and across different sources). The processor may assign a lower trust score if there is a significant deviation in sentiment from established patterns (which may indicate potential anomalies or changes in perception towards the ToI).

In block 1310, the processor may determine a media impact score based on the number of media content publishers that are publishing media content relating to the ToI. In some embodiments, the processor may determine the media impact score in block 1310 by determining a trend score based on the number of media content publishers that are publishing media content relating to the ToI (e.g., the trend score may be high if there are many media content publishers that are publishing media content relating to ToI).

In some embodiments, the processor may determine a trust score based on the number of media content publishers that are publishing media content relating to the ToI. For example, the processor may evaluate the quantity, the credibility, and the reputation of the publishers involved, and assign a high trust score in response to determining that the ToI is frequently mentioned by a large number of publishers with a history of reliability and authenticity in their content. The processor may assign a low trust score in response to determining that the ToI is not mentioned frequently, not mentioned by a large number of publishers, or mainly mentioned by publishers that do not have a history of accuracy, reliability, or authenticity.

In block 1312, the processor may determine a media impact score based on the contextual distances of the media content relating to the ToI. The contextual distance may be metric or value that quantifies the similarity between two pieces or segments of media content.

In some embodiments, the processor may determine the media impact score in block 1312 by determining a trend score based on the contextual distances of the media content relating to the ToI. For example, the processor may analyze the temporal proximity of the media contents and assign higher weights to those published more recently (since they may indicate current relevance and engagement with the topic and are more indicative of the current trend). Similarly, the processor may assign higher weights to media contents published in in geographically close regions (e.g., within the geographic limits specified in block 1302, etc.), which may suggest regional relevance and a concentrated interest in the ToI within specific areas.

In some embodiments, the processor may determine a trust score based on the contextual distances of the media content relating to the ToI. For example, the processor may determine the consistency and authenticity of the content by analysing the geographical and temporal proximity of similar content. The processor may assign a high trust score if similar sentiments or facts about the ToI are echoed across geographically diverse regions or sustained over a prolonged period, which may suggest that the ToI is perceived similarly in different locations and maintains its reputation over time. The processor may assign a lower trust score if there are significant disparities in the portrayal or discussion of the ToI across different contexts, which may indicate potential controversies or inconsistencies in how the ToI is represented by different sources of media content.

In block 1314, the processor may determine a media impact score based on the media impact scores of the media content publishers publishing media content relating to the ToI. For example, the processor may aggregate and analyze the individual media impact scores assigned to each publisher who has produced content about the ToI. In some embodiments, as part of these operations, the processor may evaluate the credibility, influence, and market presence of the publishers. The processor may also consider various factors such as the historical reliability, audience size, engagement levels, and frequency of content publication related to the ToI. A high media impact score from these publishers may indicate that the ToI is widely recognized and positively regarded in the media. The processor may combine these individual scores to form an overall media impact score for the ToI that reflects the combined influence and credibility of all content publishers discussing it.

In some embodiments, the processor may determine a trend score based on the trend scores of the media content publishers publishing media content relating to the ToI. Discussion of the ToI by media content publishers having high trend scores may indicate that the ToI is currently popular or gaining traction in the market. The processor may aggregate and analyze trend scores from multiple media content publishers, considering factors such as the volume of content produced, audience engagement levels (e.g., views, likes, reposts, etc.), and the timeliness of the content. The processor may assign a high trend score to the ToI in response to determining that there is a high aggregate trend score associated with the media content publishers.

In some embodiments, the processor may determine a trust score based on the trust scores of the media content publishers publishing media content relating to the ToI. For example, the processor may analyze the historical reliability and authenticity of the publishers who have produced content about the ToI. As part of these operations, the processor may evaluate each publisher's track record for accuracy, consistency in content style and themes, and adherence to established quality standards over time. The processor may assign a higher trust score to the ToI if these publishers have high trust scores, which may indicate a history of producing credible and consistent content. This assessment may be based on the premise that content from publishers with a history of reliability and authenticity contributes to the overall trustworthiness of the current information about the ToI.

In block 1316, the processor may determine a media impact score based on the metadata associated with the media content. In some embodiments, the processor may determine a trend score based on the metadata associated with the media content (e.g., the trend score for the ToI may be high if the number of times that the media content was accessed is high, if the size of the positive reaction that the media content received is high, etc.). For example, the processor may analyze publication dates, viewer engagement metrics, content length, the type or format of the media, and distribution of media content types. For example, a ToI predominantly featured in videos or on popular social media platforms may suggest a different level of market awareness compared to one mostly discussed in traditional news articles.

In the various embodiments, blocks 1308-1316 may occur sequentially or in parallel. Further, block 1306 may contain additional blocks for performing additional types of media impact score (e.g., a trend score, etc.) determinations.

In block 1318, the processor may determine an overall media impact score for the ToI based on the individually determined media impact scores (e.g., blocks 1308-1316). As part of this determination, the processor may adjust some of the determined media impact scores by considering them in a holistic way (e.g., the processor may only use ToI sentiments that are associated with media content that was published recently). In an embodiment, the processor may determine an overall media impact score for the ToI based on a weighted combination of the individually determined media impact scores. The processor may store the determined media impact score in the ToI knowledge repository.

In some embodiments, the processor may be configured to determine a media impact score for a media content publisher. For example, the processor may receive a media content publisher identifier, retrieve media content publisher details, determine unprocessed publisher details, determine a ToI from media content, and determine a media impact score. In some embodiments, the processor may be configured to consider previous a media impact scores, determine a media impact score based on contextual distance, determine a media impact score based on ToI sentiments, determine a media impact score based on scores of other publishers, determine a media impact score based on metadata, determine an overall media impact score, and/or store the determined overall media impact score in memory.

As a further example, the processor may be configured to receive an identifier (e.g., a URL, a social media handle, etc.) for a media content publisher, receive applicable query filters, retrieve details of the media content publisher from the ToI knowledge repository (applying the query filters), determine whether there are details of the media content publisher that have not yet been processed, determine one or more ToIs based on the media content details (a single content piece may include multiple ToI s), evaluate various factors such as the number of other publishers referring to the same ToI, engagement of other publishers with the ToI, contextual distances, sentiments, metadata, and historical media impact scores to generate a media impact score for the media content publisher that reflects the influence, credibility, and market relevance of the content publisher within the media landscape. In various embodiments, the processor may determine the media impact score of the media content publisher based on historical media impact scores of both the subject publisher and others, the contextual distances of related content from other publishers, sentiments associated with the ToI in content from other publishers, the media impact scores of other publishers who have produced content related to the ToI, and/or metadata associated with the media content. The processor may determine an overall media impact score based on any or all of the individual media impact score discussed above and store any or all of determined media impact scores in the ToI knowledge repository.

Figure 14A:
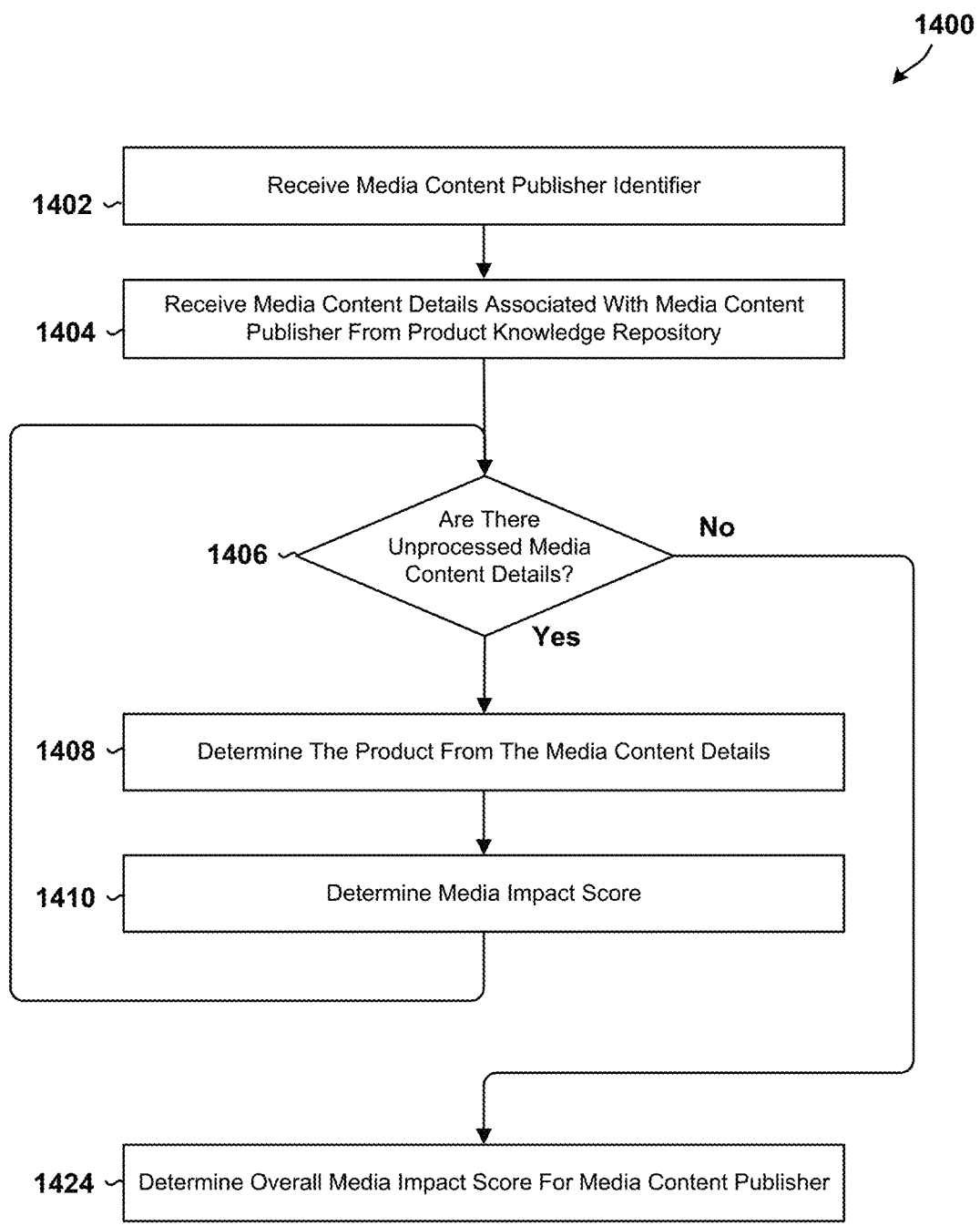
FIGS. 14A and 14B are process flow diagrams illustrating a method of determining a media impact score for a media content publisher in accordance with some embodiments.
Figure 14B:
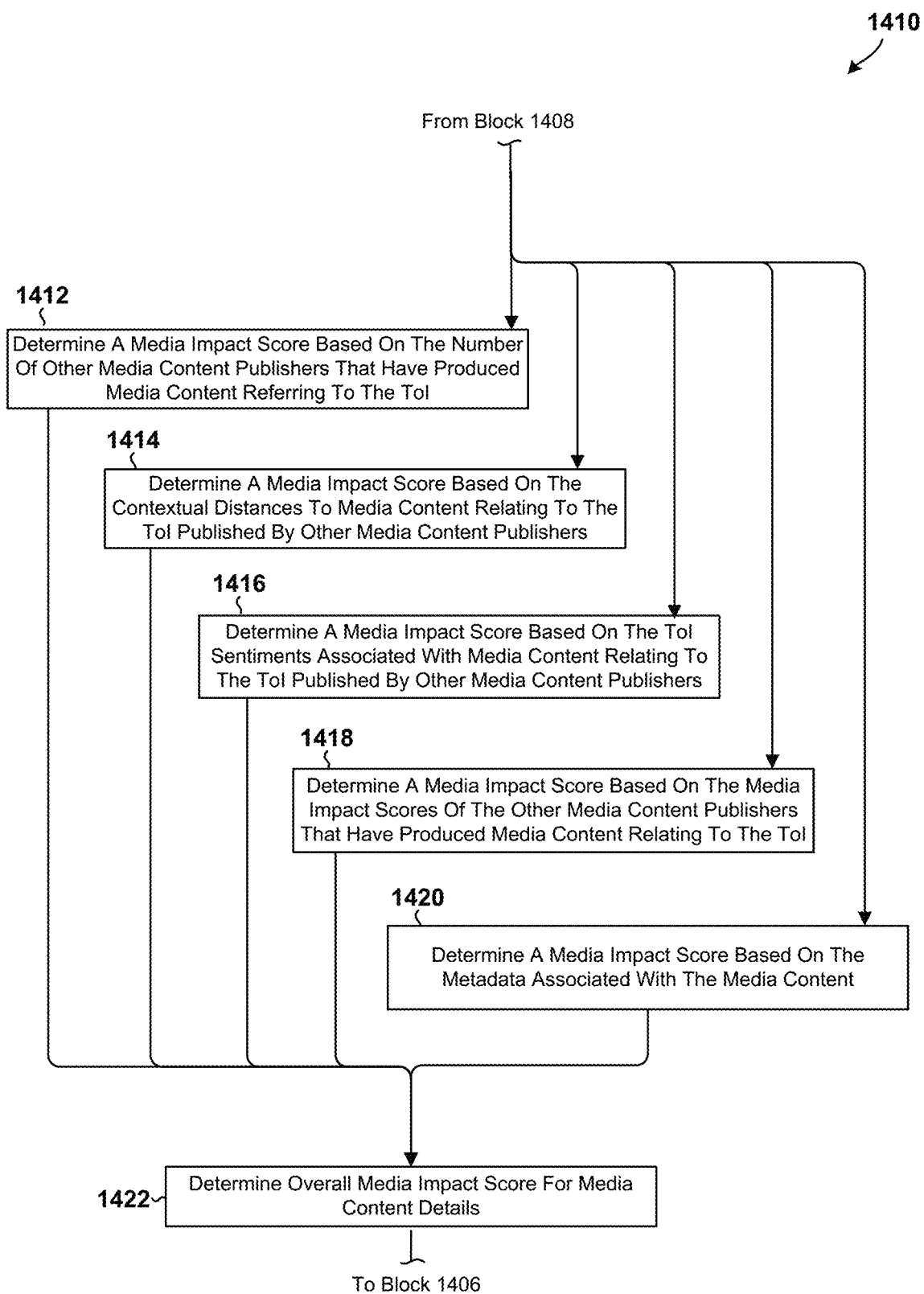

FIGS. 14A and 14B are process flow diagrams illustrating a method 1400 of determining a media impact score (e.g., a trend score, etc.) for a media content publisher in accordance with some embodiments. Method 1400 may be performed by a processing system or at least one processor in a computing system that implements all or portions of a media analytics platform (e.g., media analytics platform 120 illustrated in FIG. 1, etc.).

With reference to FIG. 14A, in block 1402, the processor may receive an identifier for a media content publisher (e.g., a URL, an Instagram name, a YouTube channel name). The processor may also receive limits or filters that may be applied as part of method 1400 (e.g., temporal limits, geographical limits).

In an alternative embodiment, the processor may perform the method at fixed intervals, or upon certain events happening (e.g., the ToI knowledge repository being updated as part of block 1018 with reference to FIG. 10), rather than receiving an identifier for a media content publisher (i.e., as part of block 1402).

In block 1404, the processor may retrieve the media content publisher details from the ToI knowledge repository (which may have been placed there in block 1018 with reference to FIG. 10). These details may include media content metadata, media content extracted details, ToI details, media content publisher details, and the associated sentiment for each media content that referred to the ToI. The processor may use the limits or filters received in block 1402 to limit or filter the media content publisher details that are retrieved from the ToI knowledge repository.

In block 1406, the processor may determine whether there are unprocessed media content publisher details. In response to determining that there are unprocessed media content publisher details (i.e., determination block 1406="Yes"), in block 1408 the processor may determine the ToI from the media content details. In some scenarios, there may be more than one ToI associated with a single media content (e.g., a reviewer may perform a side-by-side comparison of two cars). In block 1410, the processor may determine a media impact score for the media content publisher.

With reference to FIG. 14B, in block 1412, the processor may determine a media impact score based on the number of other media content publishers that have produced media content referring to the ToI (e.g., if there are many media content publishers that have produced media content referring to the ToI, then the media impact score may be high).

In an embodiment, the processor may consider previous media impact scores for the requested media content publisher and the other media content publishers. This may be useful because a low number of other media content publishers that have produced media content referring to the ToI may be because the requested media content publisher is ahead of the other media content publishers (in which case the media impact score should be higher for the requested media content publisher) or because the requested media content publisher is publishing media content that is not of interest to the other media content publishers (in which case the media impact score should be lower for the requested media content publisher).

In block 1414, the processor may determine a media impact score based on the contextual distances to media content relating to the ToI published by other media content publishers (e.g., if the media content is similar to media content published by other media content publishers "recently" then the media impact score may be higher than if the media contents were published over a longer period of time, if the media content publishers are geographically "close" then the media impact score may be higher).

In block 1416, the processor may determine a media impact score based on the ToI sentiments associated with media content relating to the ToI published by other media content publishers (e.g., if the ToI sentiments associated with media content relating to the ToI published by other media content publishers are high then the media impact score may be higher).

In block 1418, the processor may determine a media impact score based on the media impact scores of the other media content publishers that have produced media content relating to the ToI (e.g., if the media content publishers that are publishing media content relating to the ToI have high media impact scores then the media impact score for the media content publisher may be high).

In block 1420, the processor may determine a media impact score based on the metadata associated with the media content (e.g., if the number of times that the media content was accessed is high then the media impact score for the media content publisher may be high, if the size of the positive reaction that the media content received is high then the media impact score for the media content publisher may be high).

In the various embodiments, blocks 1412-1420 may occur sequentially or in parallel. Further, block 1410 may contain additional blocks for performing additional types of media impact score determinations.

In block 1422, the processor may determine an overall media impact score for the media content details based on the individually determined media impact scores (e.g., blocks 1412-1420). Thus, a media content that refers to multiple ToIs may have a high media impact score even if the portion of the media content that refers to a ToI may have had a low media impact score if it was considered in isolation. As part of this determination, the processor may adjust some of the determined media impact scores by considering them in a holistic way. In an embodiment, the processor may determine an overall media impact score for the media content details based on a weighted combination of the individually determined media impact scores.

With reference to FIG. 14A, in response to determining that the media content is processed (i.e., determination block 1406="No"), the processor may merge all of the media impact scores for the media content details in block 1424 in order to determine an overall media impact score for the media content publisher. In an embodiment, the processor may determine an overall media impact score for the media content publisher based on a weighted combination of the individually determined media content details media impact scores. In an embodiment, the processor may determine an overall media impact score for the media content publisher based on the cadence of the media content that is published by the media content publisher (e.g., if the media content publisher publishes media content more frequently or more regularly then the media impact score for the media content publisher may be higher). The processor may store the determined media impact score in the ToI knowledge repository.

In some embodiments, the processor may be configured to generate new media content for a ToI by identifying relevant existing content with high media impact scores, using the identified content to generate a script that accentuates the features and benefits of the ToI, and using various technologies to convert the script into an engaging new media format that could potentially expand the reach and influence of the ToI in the media landscape. For example, in some embodiments, the processor may be configured to receive a ToI identifier, receive a media impact score threshold, retrieve relevant media content details, generate a text-based script based on the received/retrieved information, and execute the script to generate new media content. As a further example, the processor may be configured to receive an identifier for a ToI or product (e.g., an SKU, GTIN, ASIN, etc.), receive a media impact score threshold value, retrieve from the ToI knowledge repository media content details related to the identified ToI and associated with media impact scores that exceed the received media impact score threshold value, use machine learning algorithms, LXMs, and/or the retrieved media content details to generate a text-based script that highlights features and benefits of the ToI, and convert the text-based script into new media content. In some embodiments converting the text-based script into the new media content may include using text-to-speech technology for audio content, creating synthetic media (e.g., AI-generated videos, deep fake videos, etc.) or using avatars in virtual environments to present the script.

Figure 15A:
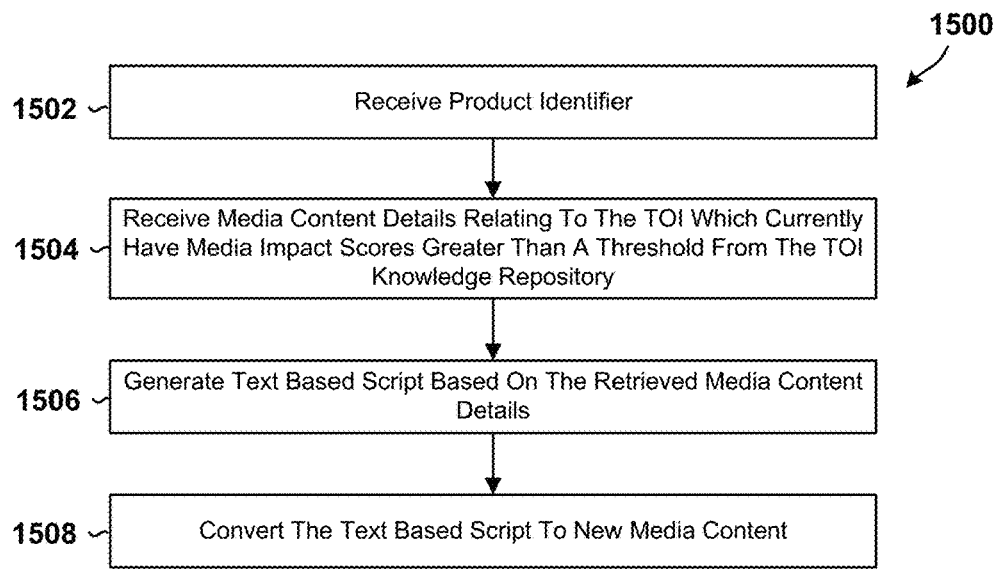
FIGS. 15A and 15B are process flow diagrams illustrating methods of generating new media content for a product or topic of interest (ToI) in accordance with some embodiments.

FIG. 15A is a process flow diagram illustrating a method 1500 of generating new media content for a ToI in accordance with some embodiments. Method 1500 may be performed by a processing system or at least one processor in a computing system that implements all or portions of a media analytics platform (e.g., media analytics platform 120 illustrated in FIG. 1, etc.).

In block 1502, the processor may receive an identifier for a TOI or product (e.g., SKU, GTIN, ASIN, etc.) and/or an identifier for a brand or manufacturer. Alternatively, the processor may receive a type, category, or class of ToI. The processor may also receive a media impact score threshold that may be applied as part of method 1500.

In block 1504, the processor may retrieve media content details relating to the identified ToI (e.g., the same type, category, or class of ToI) that currently have media impact scores that are greater than the media impact score threshold from the ToI knowledge repository.

In block 1506, the processor may generate a text based script based on the retrieved media content details (e.g., by describing the features of the ToI that were described in the retrieved media content, by identifying the benefits of the ToI that were identified in the retrieved media content). In an alternative embodiment, the processor may generate a text based script using a machine learning algorithm on the retrieved media content details.

In block 1508, the processor may convert the text based script to new media content (e.g., the processor may use a text-to-speech converter to create audio media content for a blog, the processor may use machine learning techniques to create a "deep fake" video of a person reviewing the ToI, the processor may request an avatar in the metaverse to present the text based script).

Figure 15B:
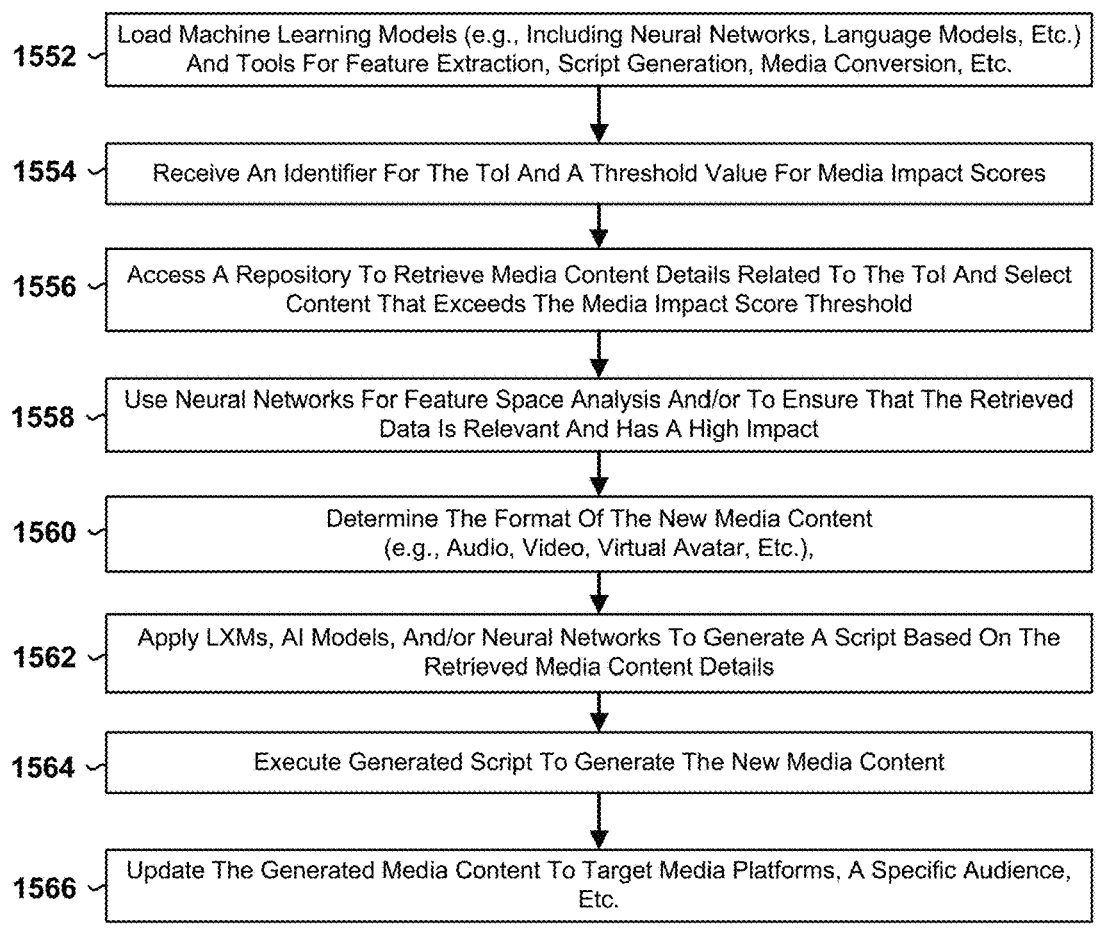

FIG. 15B is a process flow diagram illustrating another method 1550 of generating new media content for a ToI in accordance with some embodiments. Method 1500 may be performed by a processing system or at least one processor in a computing system that implements all or portions of a media analytics platform (e.g., media analytics platform 120 illustrated in FIG. 1, etc.).

In block 1552, the processor may load machine learning models (e.g., including neural networks, language models, etc.) and tools for feature extraction, script generation, and media conversion. In block 1554, the processor may receive an identifier for the ToI and a threshold value for media impact scores. In block 1556, the processor may access a repository to retrieve media content details related to the ToI and select content that exceeds the media impact score threshold. In block 1558, the processor may use neural networks for feature space analysis and/or to ensure the retrieved data is relevant and high impact data.

In block 1560, the processor may determine the format of the new media content (e.g., audio, video, virtual avatar, etc.). In block 1562, the processor may apply LXMs, AI models and/or neural networks to generate a script based on the retrieved media content details and determined format. In some embodiments, the processor may generate the script so that it emphasizes the patterns, characteristics, features, and benefits of the ToI. In block 1564, the processor may execute the generated script to generate the new media content. For example, the processor may use text-to-speech technology for audio content, AI or synthetic media technology to create AI-generated video content, etc. In some embodiments, in block 1566, the processor may review and refine the generated media content for quality and relevance and make necessary adjustments to optimize the content for target media platforms and the audience.

Figure 16A:
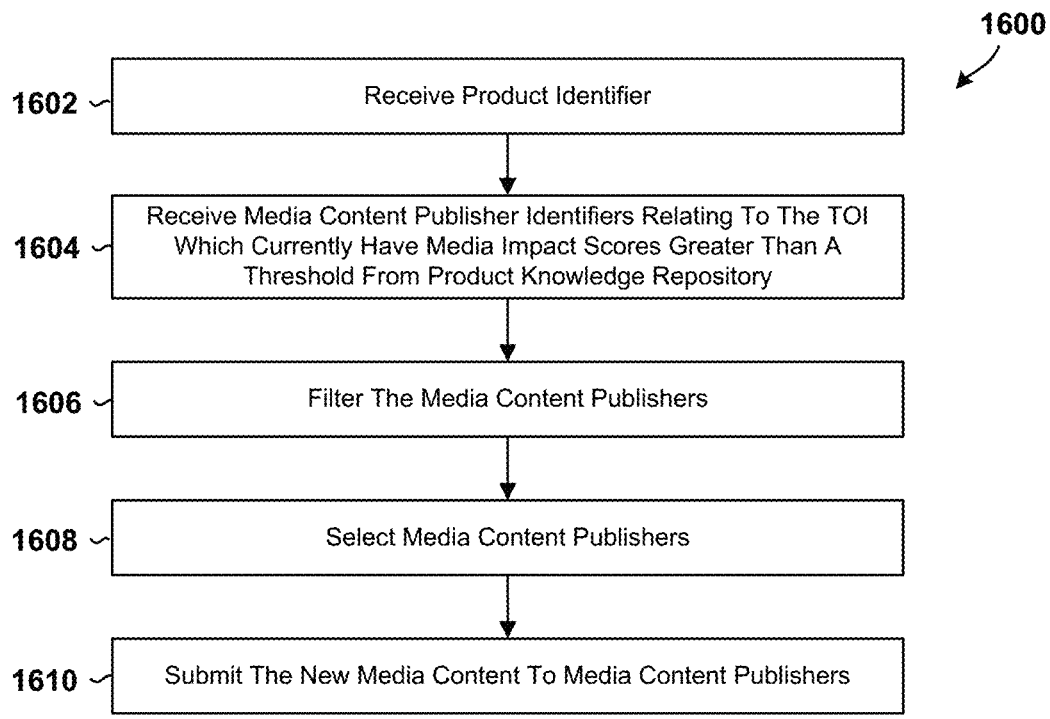
FIGS. 16A and 16B are process flow diagrams illustrating methods of selecting media content publishers and subsequently using them to publish new media content in accordance with some embodiments.

FIG. 16A is a process flow diagram illustrating a method 1600 of selecting media content publishers and subsequently using them to publish new media content in accordance with some embodiments. The new media content may be generated automatically (e.g., as described in method 1500, 1550 with reference to FIGS. 15A and 15B), or it may be static content (e.g., and image based advertisement). Method 1600 may be performed by a processing system or by at least one processor in a computing system that implements all or portions of a media analytics platform (e.g., media analytics platform 120 illustrated in FIG. 1, etc.).

In block 1602, the processor may receive an identifier for a ToI (e.g., SKU, GTIN, ASIN) or an identifier for a brand or manufacturer. Alternatively, the processor may receive a type, category, or class of ToI. The identifier may be the same identifier that was received in block 1502 with reference to FIG. 15. The processor may also receive a media impact score threshold, a set of filters, and publishing criteria that may be used as part of method 1600.

In block 1604, the processor may retrieve media content publisher identifiers relating to the identified ToI (e.g., the same type, category, or class of ToI) that currently have media impact scores greater than the threshold from the ToI knowledge repository.

In block 1606, the processor may filter the retrieved media content publisher identifiers based on their attributes and the set of filters (e.g., media content publishers may be filtered out if they are affiliated with a competitor of the identified ToI manufacturer, media content publishers may be filtered out if they have previously produced media content that contained personal details of people associated with a company, media content publishers may be filtered out if they are associated with inappropriate topics).

Inappropriate topics may include topics that would be appropriate in other circumstances (e.g., profanity, political opinions, or religious opinions) and topics that are never appropriate (e.g., racism, homophobia, animal cruelty, hatred, extremism, factually incorrect conspiracy theories, state sponsored propaganda).

In block 1608, the processor may select one or more media content publishers. This selection process may be based on multiple factors, and it may use the publishing criteria (e.g., the media content publisher with the highest media impact score, the media content publisher with the largest audience). The selection process may also be used to determine whether a media content publisher has a higher media impact score at certain times, and consequently the processor may determine the most appropriate time to use a media content publisher (e.g., a social media influencer associated with a Christmas themed song will have a higher media impact score at Christmas time).

In an embodiment, the publishing criteria may contain a maximum budget, and each media content publisher may have different rates. Thus, the processor may select one or more media content publishers such that there combined costs are less than the maximum budget.

In block 1610, the processor may submit the new media content to the selected media content publishers (e.g., using an API). The selected media content publishers may publish the submitted media content as a standalone media content (e.g., a vlog) or as a sidecar or supplementary media content (e.g., as an advertisement shown below some other media content).

Figure 16B:
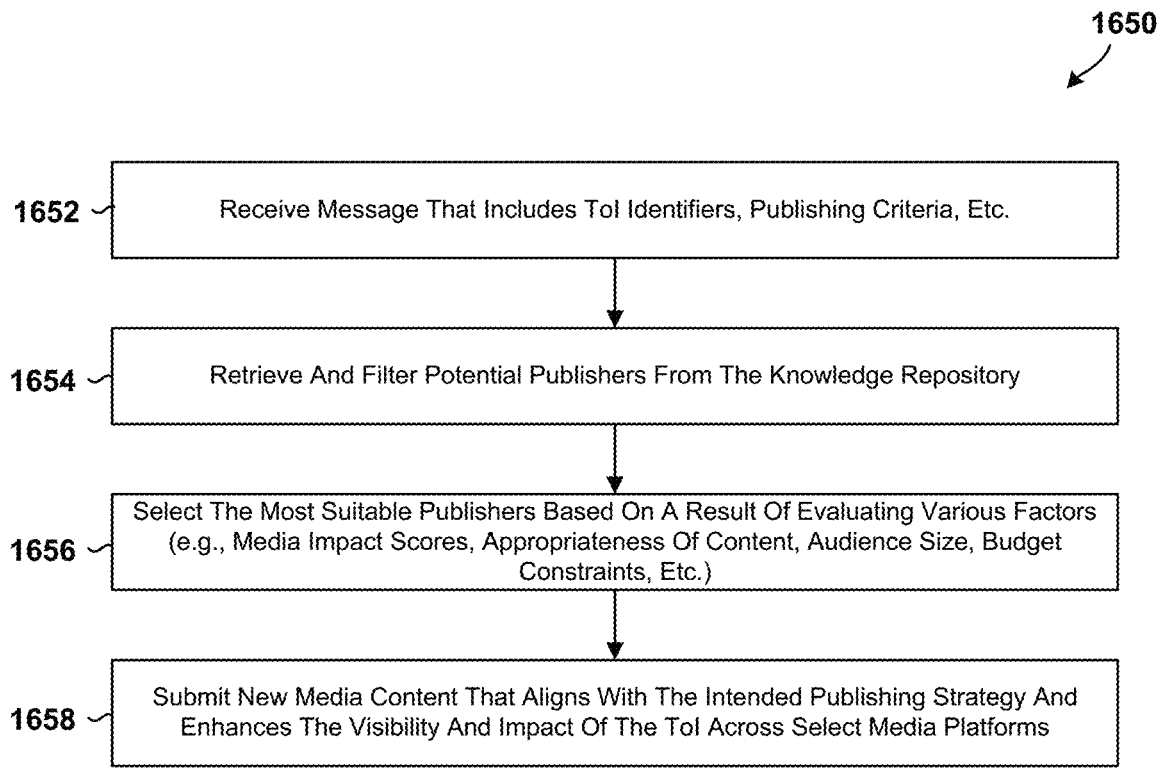

FIG. 16B is a process flow diagram illustrating another method 1650 of strategically selecting media content publishers to distribute new media content in accordance with some embodiments. The new media content may be generated automatically (e.g., as described in method 1500, 1550 with reference to FIGS. 15A and 15B), or it may be static content (e.g., and image based advertisement). Method 1650 may be performed by a processing system or by at least one processor in a computing system that implements all or portions of a media analytics platform (e.g., media analytics platform 120 illustrated in FIG. 1, etc.).

In block 1652, the processor may receive a detailed message that includes ToI identifiers and publishing criteria. In some embodiments, the processor may be configured to receive a ToI identifier (or brand, etc.), media impact score threshold, filters, and publishing criteria in block 1652. In block 1654, the processor may retrieve and filter potential publishers from the knowledge repository. For example, the processor may retrieve from the ToI knowledge repository identifiers for media content publishers that are related to the identified ToI and associated with media impact scores that exceed the received media impact score threshold value, and filter the retrieved media content publisher identifiers based on various attributes and the received set of filters (e.g., exclude publishers affiliated with competitors, those associated with inappropriate content, those not aligning with specific standards or topics, etc.), In block 1656, the processor may select the most suitable publishers based on a result of evaluating various factors (e.g., publishing criteria, audience size, the timing of content release to maximize impact, media impact scores, appropriateness of content, budget constraints, etc.). In block 1658, the processor may submit or coordinate the submission of new media content to ensure that it aligns with the intended publishing strategy and maximizes the visibility and impact of the ToI across select media platforms. For example, the processor may submit the new media content to the selected media content publishers using an API. The processor may also publish the new media content as standalone material or as supplementary content (e.g., an advertisement, etc.) based on the nature of the media and the chosen publishers.

Figure 17A:
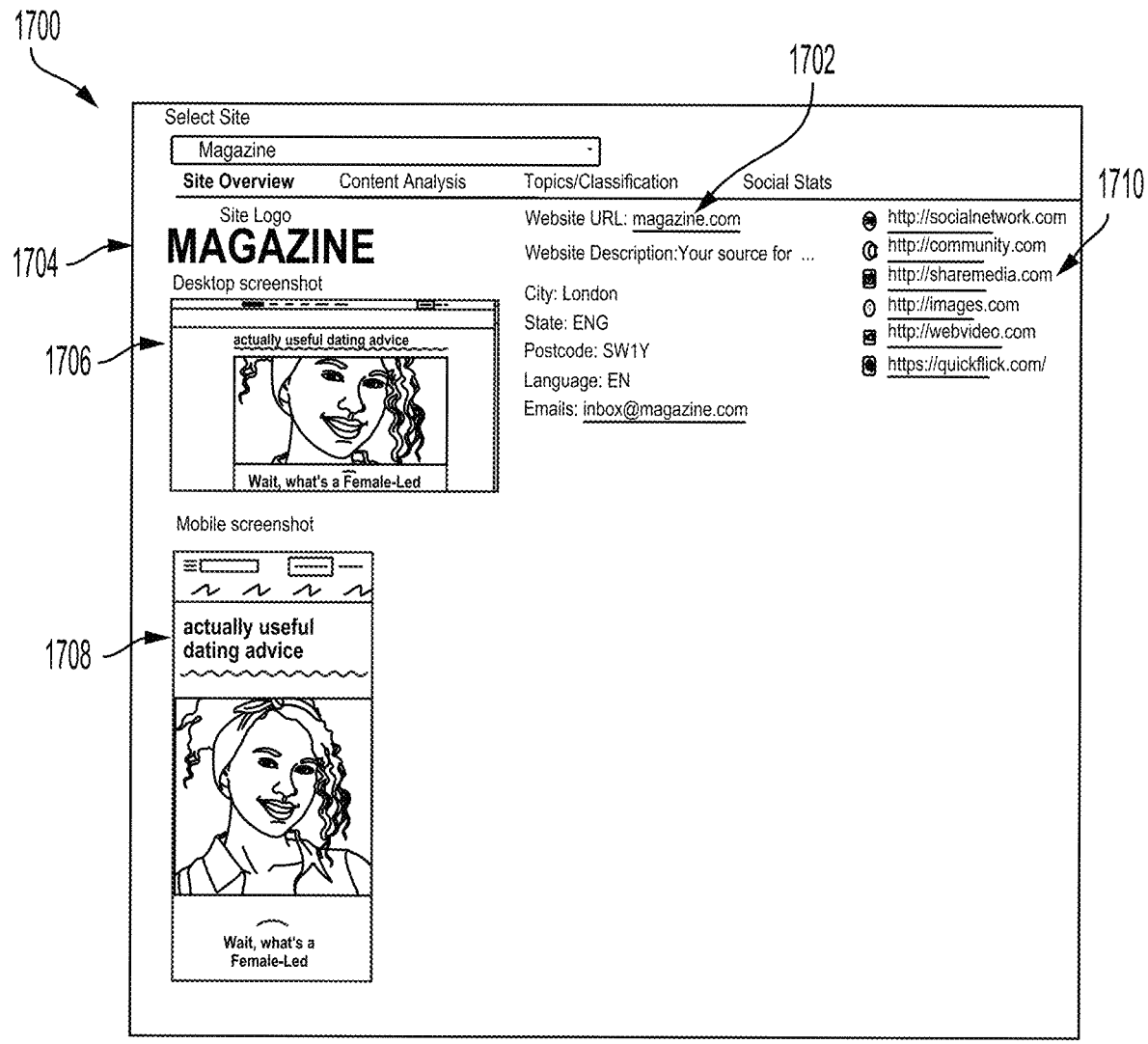
FIGS. 17A and 17B are component diagrams that illustrate various media content analysis reports for an eCommerce website in accordance with some embodiments.
Figure 17B:
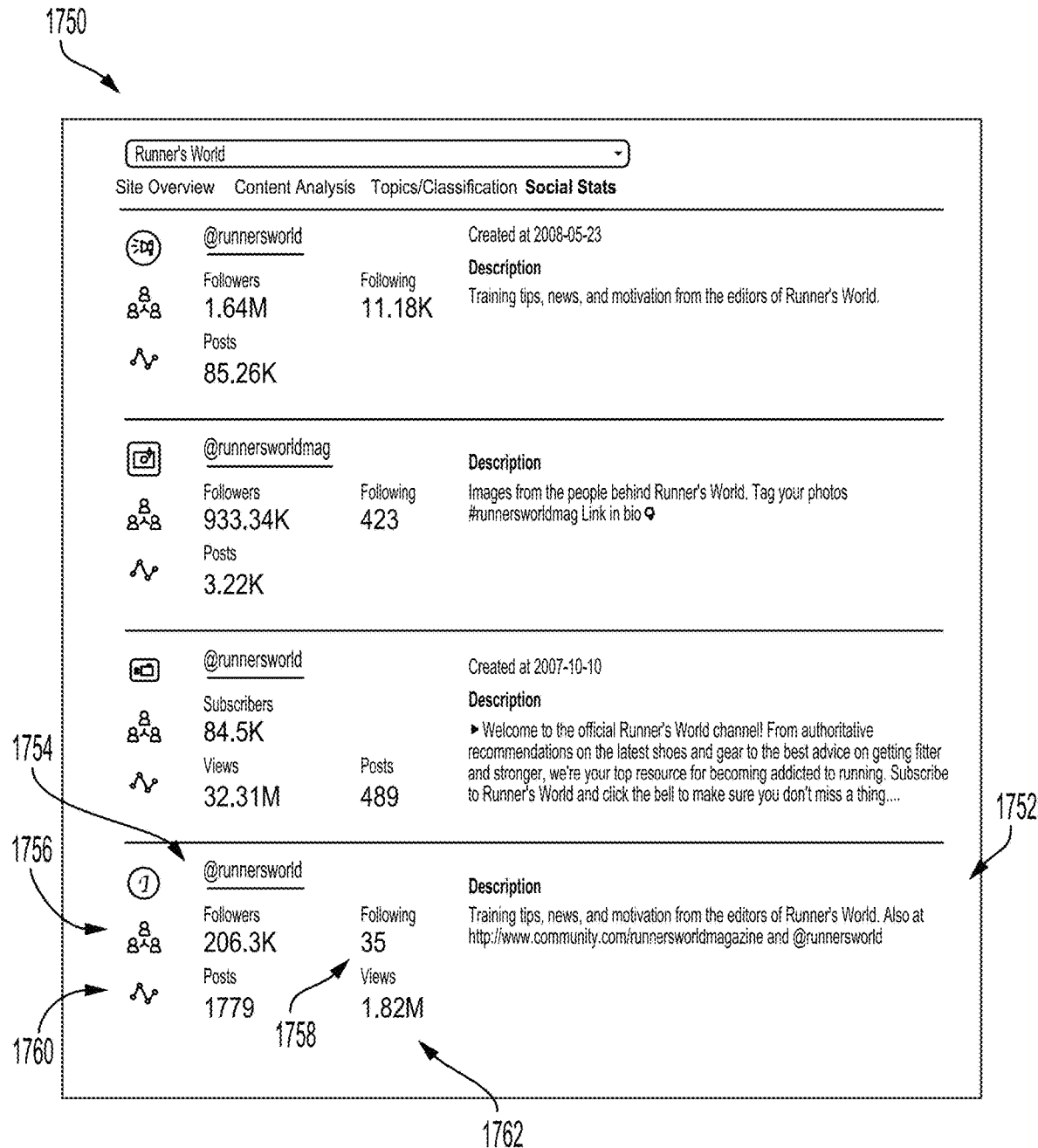

FIGS. 17A and 17B are component diagrams that illustrate various influencer integrity reports or media content analysis reports 1700, 1750 for an eCommerce website in accordance with some embodiments. In some embodiments, the media content analysis reports 1700, 1750 may be generated, for example, as part of the output generated in method 400, 450, 800, 850, etc.

Specifically, FIG. 17A illustrates an overview report 1700 of an eCommerce website that contains media content. Component 1702 indicates the URL of the eCommerce website, component 1704 indicates the logo associated with the eCommerce website, component 1706 shows how the landing webpage looks on a typical desktop web browser, and component 1708 shows how the landing webpage looks on a typical mobile phone web browser. Component 1710 identifies the third party social media platforms that are used by the eCommerce website to publish media content (i.e., Twitter, Facebook, Instagram, Pinterest, YouTube, TikTok).

FIG. 17B illustrates a report 1750 that contains more details on some of the social media platforms that are used by the eCommerce website. For example, component 1752 represents details of one social media platform. It contains the identifier 1754 used on the social media platform, the number of users who are followers 1756, the number of users being followed 1758, the number of posts (or media contents published) 1760 on the social media platform, and the total number of viewers of the posts 1762.

In an embodiment, the values of the components shown in report 1700 and report 1750 may have been obtained from the eCommerce website and the social media platforms using methods 400, 450, 800, 850, etc. or the methods described in U.S. Patent Application No. 17/867,358, entitled "System and Method for Efficiently Identifying and Segmenting Product Webpages on an eCommerce Website" filed Jul. 18, 2022, the entire contents of which are hereby incorporated by reference for all purposes.

Figure 18A:
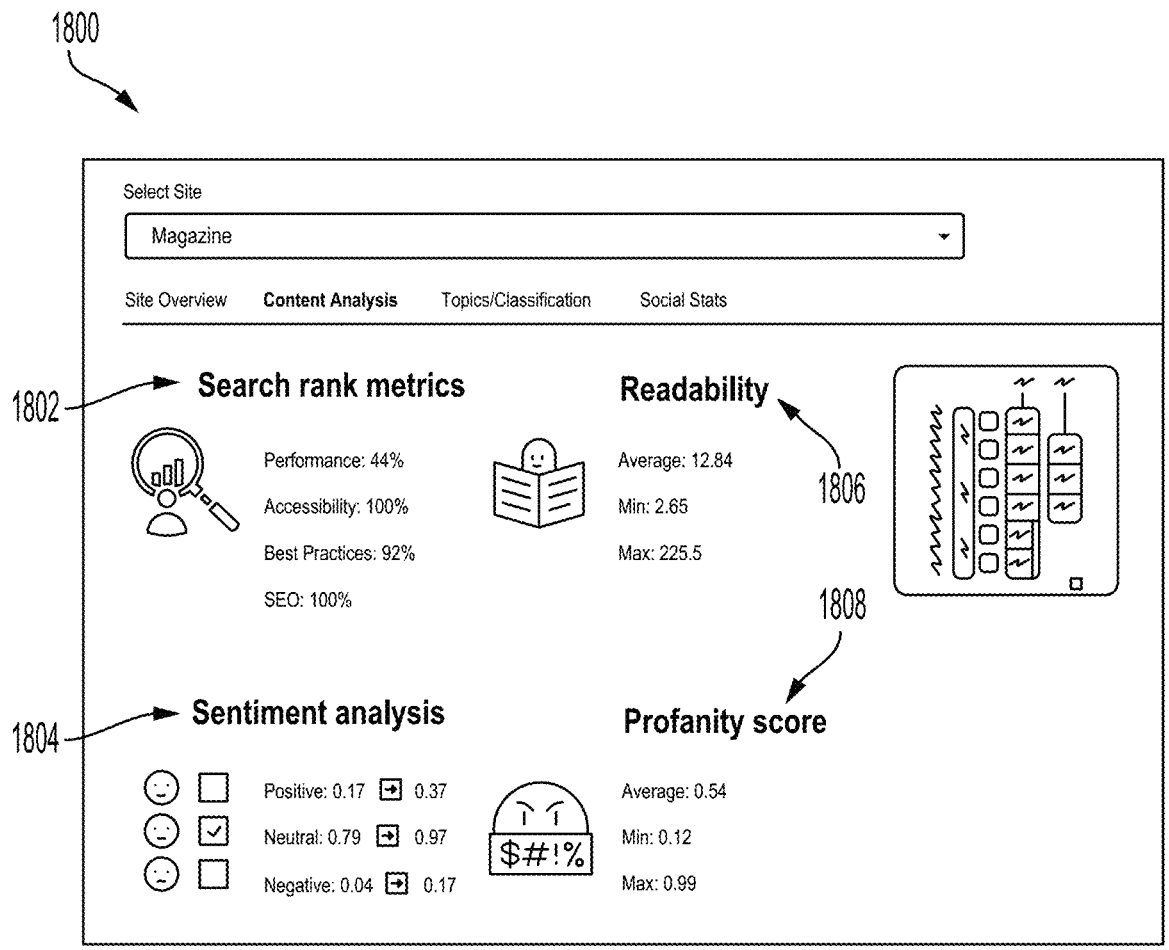
FIGS. 18A and 18B are component diagrams that illustrate media content analysis for media content published by an eCommerce website in accordance with some embodiments.
Figure 18B:
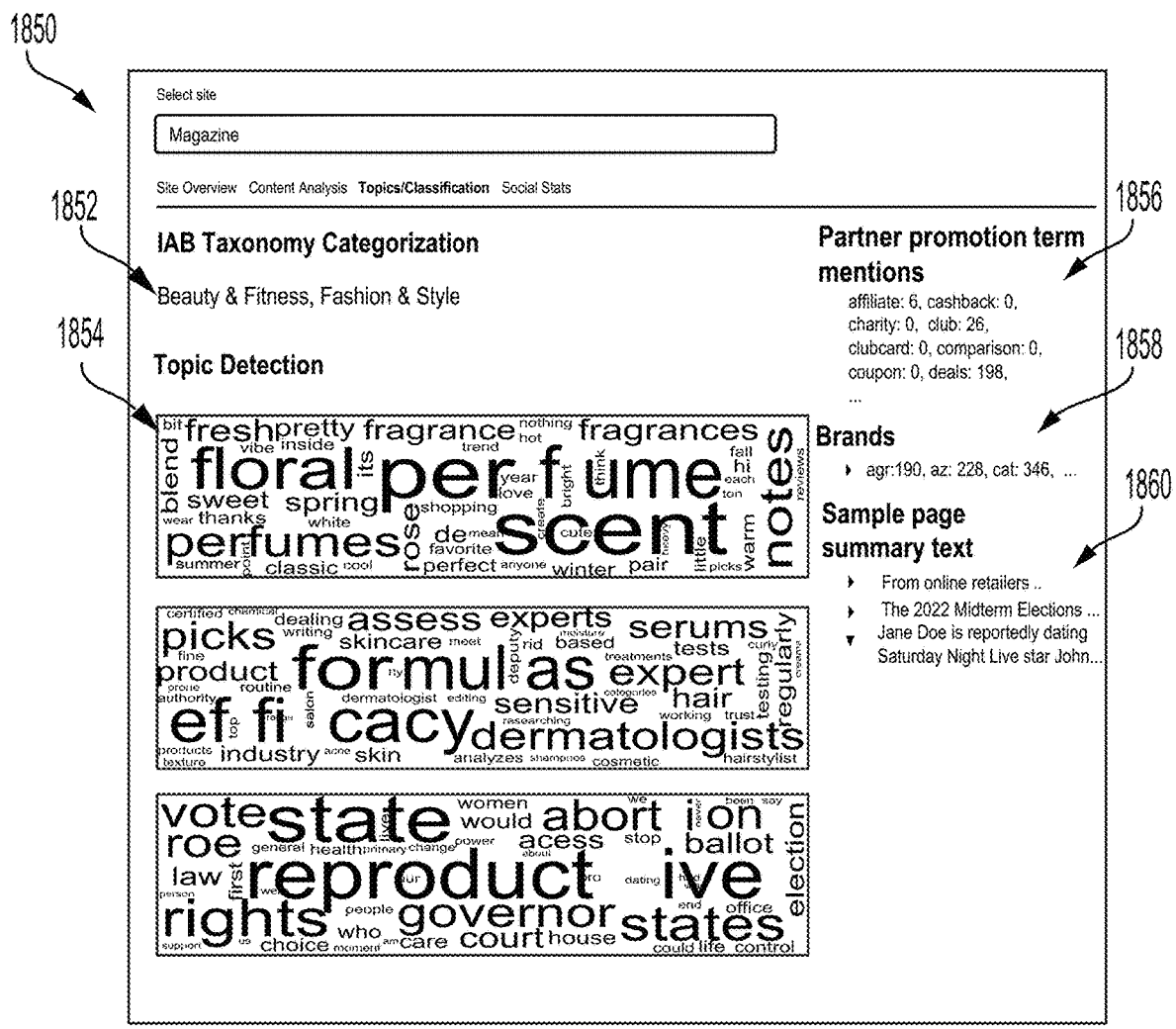

FIGS. 18A and 18B are component diagrams that illustrate media content analysis for media content published by an eCommerce website (e.g., on one of the social media platforms identified in component 1710 with reference to FIG. 17A) in accordance with some embodiments.

Specifically, FIG. 18A illustrates an overview report 1800 of the media content published on one of the social media platforms. Component 1802 contains search rank metrics, component 1804 contains sentiment analysis, component 1806 contains readability scores, and component 1808 contains profanity scores relating to inappropriate topics. Each of these components may be an aggregation of the same components that were determined for the individual media contents (e.g., component 1804 may be the aggregation of the sentiment analysis for all of the individual media contents as determined as part of method 1000 with reference to FIG. 10).

FIG. 18B illustrates a report 1850 that contains more details of the media content published on one of the social media platforms. Component 1852 identifies one or more categories that describe the media content. These categories may be from an independent categorization system or taxonomy (e.g., IAB). Component 1854 contains a "word cloud" (also known as a "tag cloud"), where the font size used for the word is proportionate to the usage frequency of the word, for each topic that has been identified across all of the media content published on the social media platform.

Component 1856 identifies all of the partner or promotion terms that are used across all of the media content published on the social media platform. Component 1854 and component 1856 may group or cluster words if they are semantically equivalent (e.g., if they are synonyms of each other). Component 1858 identifies all of the brands that are used across all of the media content published on the social media platform. In an embodiment, the brands may be filtered to remove any brands associated with the media content publisher. Component 1860 contains some examples of the text details that were extracted from the media content (e.g., as part of block 1008 with reference to FIG. 10).

In an embodiment, the individual reports of the media content published on the social media platforms (e.g., report 1800, report 1850) may be aggregated to produce a single report covering all of the social media platforms.

Figure 19A:
FIGS. 19A and 19B are component diagrams that illustrate various comparisons between media contents in accordance with some embodiments.
Figure 19B:
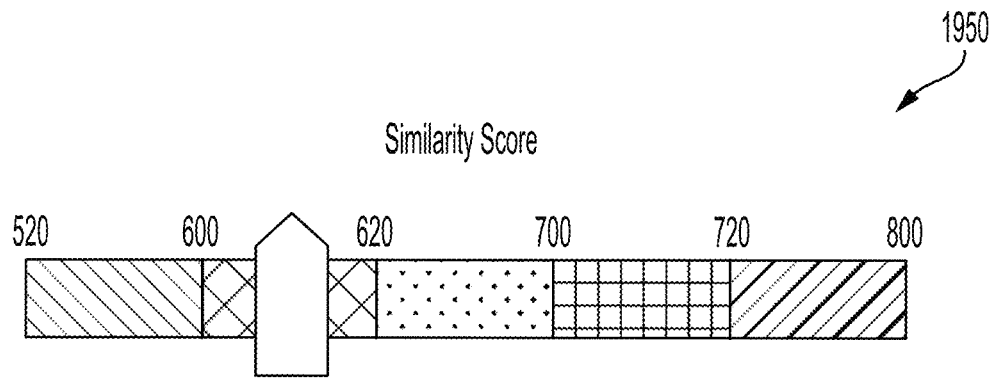

FIGS. 19A and 19B are component diagrams that illustrate various comparisons between media contents in accordance with some embodiments. These comparisons may be included as part of a report of the media content published on social media platforms.

Specifically, FIG. 19A illustrates a comparison 1900 of two word clouds 1902, 1904 associated with media content. Word cloud 1902 may be associated with webpages on an eCommerce website and word cloud 1904 may be associated with media content published on a social media platform (e.g., Instagram) by the owner of the eCommerce website. Alternatively, word cloud 1902 may be associated with media content published on a first social media platform (e.g., Instagram) by a first media content publisher and word cloud 1904 may be associated with media content published on a second social media platform (e.g., TikTok) by the same media content publisher. Thus, these word clouds may give a visual indication of how consistent a media content publisher is being across different platforms (e.g., its website, social media platforms).

Word cloud 1902 may be associated with media content published on a first social media platform (e.g., Instagram) by a first media content publisher and word cloud 1904 may be associated with media content published on a the same social media platform by a second media content publisher that is a competitor of the first media content publisher. Thus, these word clouds may give a visual indication of how a media content publisher compares to its competitor.

FIG. 19B illustrates a simple graphical comparison 1950 of two media contents (e.g., media content published on Instagram versus media content published on TikTok by the same media content publisher).

Figure 20:
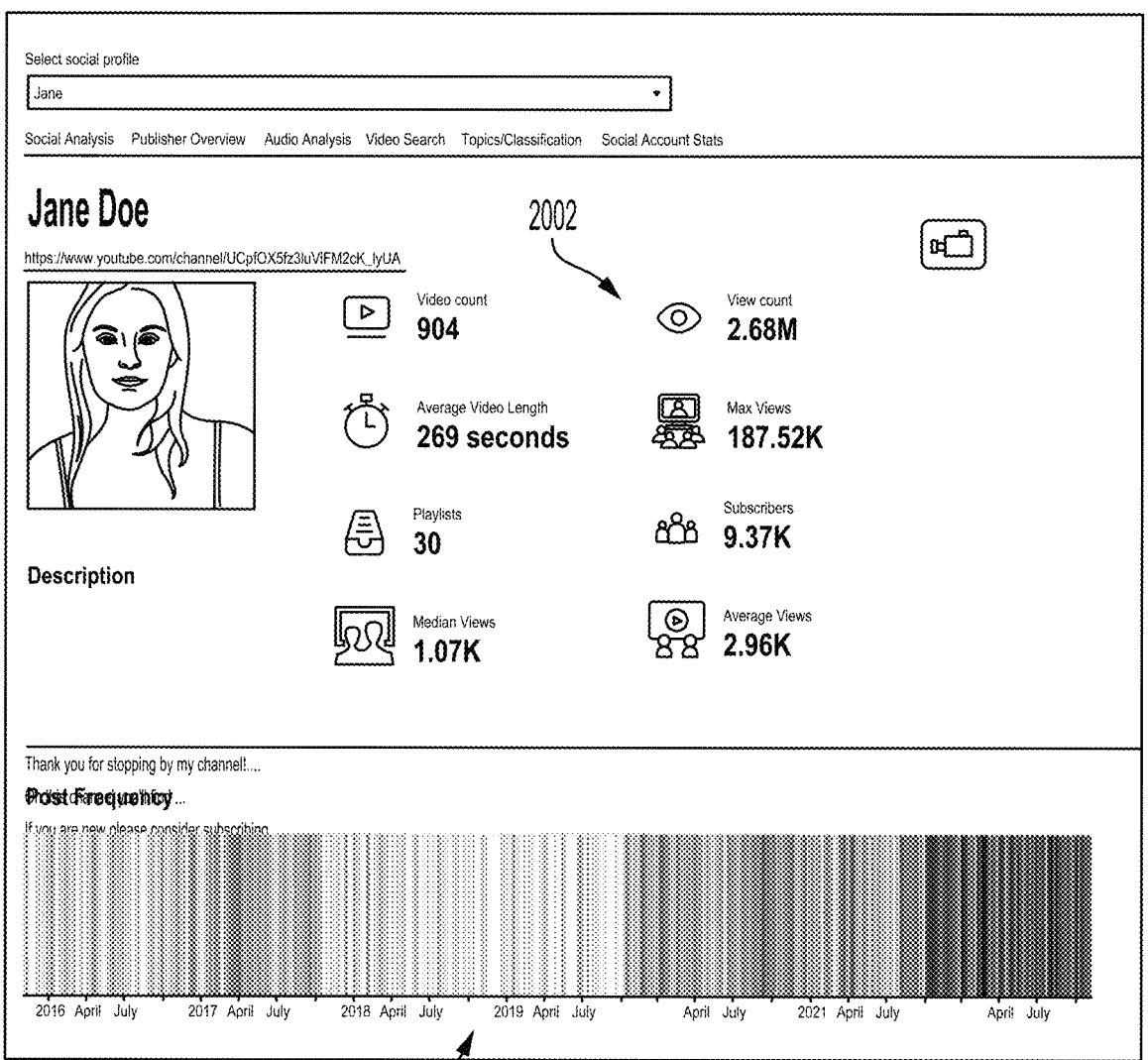
FIG. 20 is a component diagram that illustrates a media content analysis report for media content published by a media content publisher in accordance with some embodiments.

FIG. 20 is a component diagram that illustrates a media content analysis report 2000 for media content published by a media content publisher in accordance with some embodiments. It contains many of the components 2002 previously described (e.g., the identifier used on the social media platform, the number of users who are followers, the number of users being followed, the number of posts (or media contents published) on the social media platform, and the total number of viewers of the posts). Additionally, it contains a timeline (or histogram) 2004 that indicates when new media content was published. This may be useful for identifying significant events and seasonal trends.

Figure 21A:
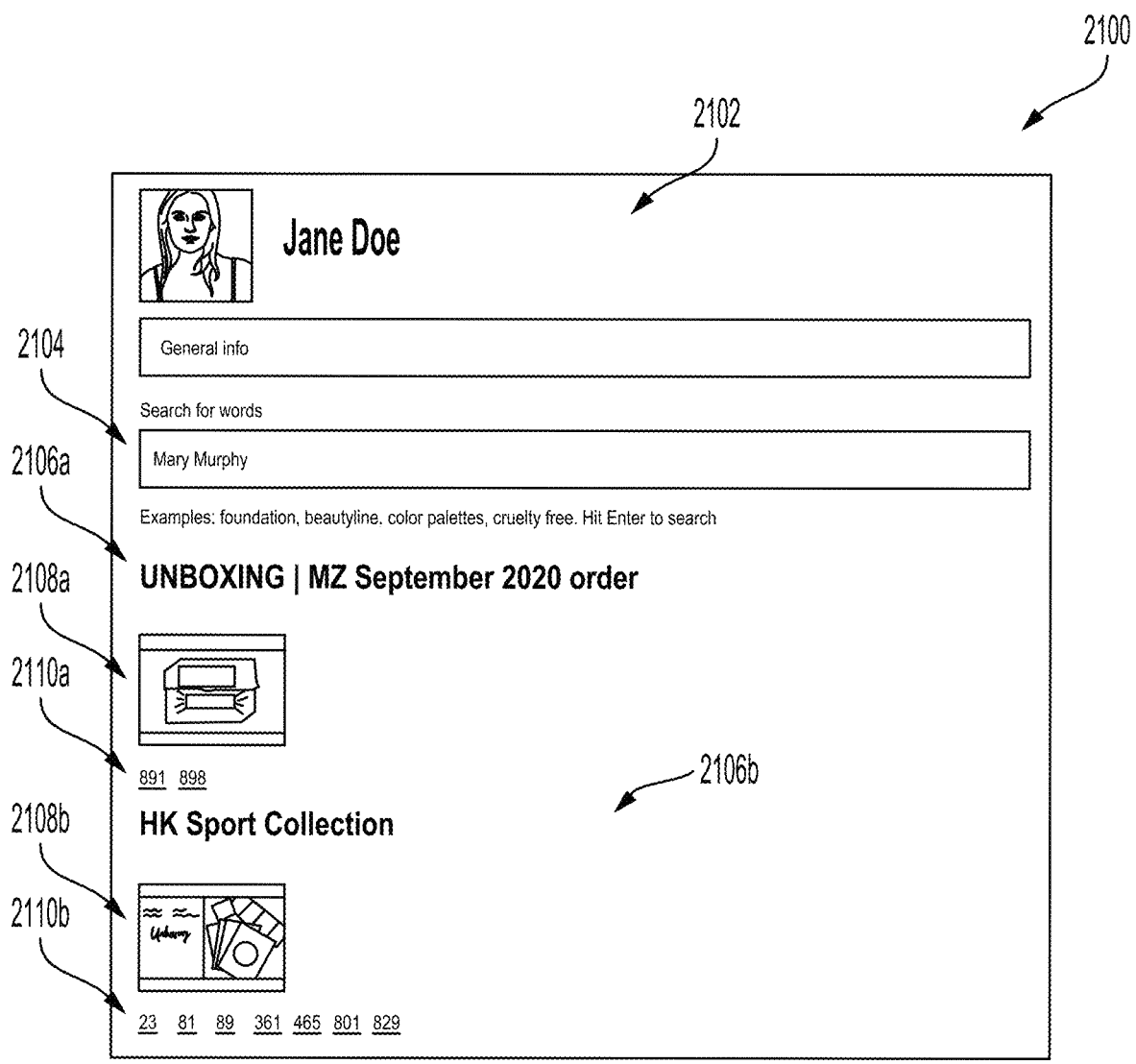
FIGS. 21A and 21B are component diagrams that illustrate search results within media content published by a media content publisher in accordance with some embodiments.
Figure 21B:

FIGS. 21A and 21B are component diagrams that illustrate search results within media content published by a media content publisher in accordance with some embodiments. The search results may have been generated by one of the methods described herein (e.g., method 400, 450, 800, 850, etc.) operating on the ToI knowledge repository.

Specifically, FIG. 21A illustrates the results 2100 of a search across all of the media content published by a media content publisher on a social media platform. Component 2102 identifies the media content publisher as "Jane Doe" and the search was performed across the video media content on a social media platform. The search term is shown in component 2104 as "Mary Murphy" who is a book author. The search was performed on the extracted details of the video media content that are contained within the ToI knowledge repository (e.g., details extracted as part of method 400, 450, 700, 800, 850, etc., the extracted text details 1222*a*, the extracted object details 1232*a*, etc.), and two video media contents were found to contain the search term 2104. The titles of the matching video media contents are shown in components 2106*a* and 2106*b*. Further, frames 2108*a* and 2108*b* from the video media contents are shown. These frames may be related to the search term (e.g., they may have been extracted from the part of the video media content where the search terms is mentioned in the corresponding extracted text). Components 2110*a* and 2110*b* are hyperlinks that show the time in the video media content (in seconds) when the search term is referenced (e.g., the search term is referenced twice in 2110*a* and seven times in 2110*b*).

FIG. 21B illustrates the result of clicking on, or interacting with, one of the hyperlinks in components 2110*a* and 2110*b*. Specifically, it shows the video media content 2150 at the time when the search term 2104 was referenced. In this example, the search term "Mary Murphy" was literally contained in the extracted text, and the book 2152 was identified as a book written by "Mary Murphy" based on the extracted object details (e.g., as part of block 1010 with reference to FIG. 10).

FIGS. 22A-22G are component diagrams that illustrate search results and media content analysis in accordance with some embodiments. The search results and media content analysis may have been generated by one of the methods described herein operating on the ToI knowledge repository.

Figure 22A:
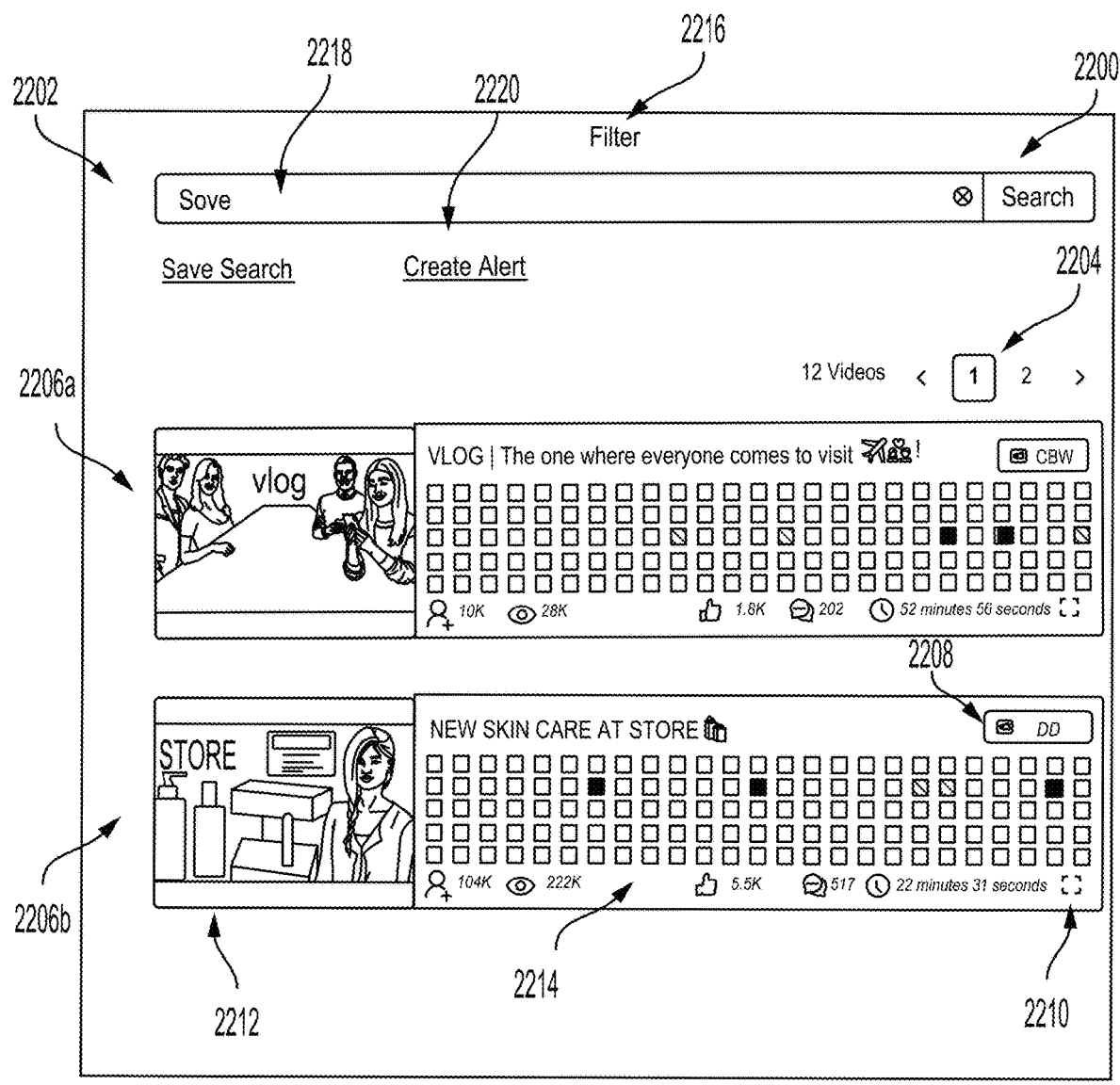

FIG. 22A illustrates the results 2200 of a search for a ToI (i.e., the product "Sove" 2202) across all media content published on eCommerce websites and social media platforms. Many of the components in FIG. 22A are either the same as, or analogous to, the components in FIG. 21A. Component 2204 indicates that there were 12 video media contents containing the search term, and these are paginated across three pages. For brevity, only the first two search results (i.e., components 2206*a*, 2206*b*) are shown in FIG. 22A.

The search result 2206*b* contains details about the media content (e.g., title, social media platform where it is published) and media content publisher (e.g., "DD") 2208. It also contains details 2210 specific to the media content (e.g., duration, views, likes, comments). An image 2212 that is representative of the media content may also be included if it is available. This image may be a logo or photograph associated with the media content publisher in the case of audio media content, a representative frame in the case of video media content, or an avatar in the case of media content presented by an avatar in the metaverse.

The grid 2214 represents a timeline of the media content, and the colored squares represent a time in the media content when the product was mentioned. The grid 2214 may be generated so that it is always a constant pre-determined size (e.g., 40×4=160 squares) irrespective of the duration of the media content. Thus each square represents a variable sub-duration of the media content (e.g., if the media content has a duration of 160 seconds, then each square will represent a 1 second sub-duration of the media content, whereas if the media content has a duration of 2 hours and 40 minutes, then each square will represent a 1 minute sub-duration of the media content). In an embodiment, the user may be able to zoom in and out of the grid so that a single sub-duration can be further disaggregated or aggregated. Each square in the grid may be a hyperlink, and clicking on, or interacting with, any square in the grid may cause the media content associated with the sub-duration to be displayed or played (e.g., as shown in FIG. 21B).

Alternative embodiments may use different visual representations (of fixed or variable size) in order to represent the duration of the media content and the times in the media content when the product was mentioned.

Further, different colors may be used within the grid to represent the sentiment associated with the product being mentioned (e.g., green represents a positive sentiment, blue represents a neutral sentiment, and red represents a negative sentiment). Clicking on, or interacting with, any square in the grid may cause additional details associated with the sentiment associated with the sub-duration to be displayed (e.g., the factors that were used to determine the sentiment). The intensity of the color may be used to indicate the strength of the sentiment. In an alternative embodiment, the timeline and sentiments may be represented using different graphical representations and visual indicators (e.g., shapes, icons, animations).

FIGS. 22B-22G illustrate further media content analysis for the search results 2206b in FIG. 22A. They may be displayed as a result of clicking on, or interacting with, the search results 2206b in FIG. 22A. Many of the components in FIGS. 22B-22G are either the same as, or analogous to, the components in FIGS. 17A-17B, 18A-18B, and 20.

Figure 22B:
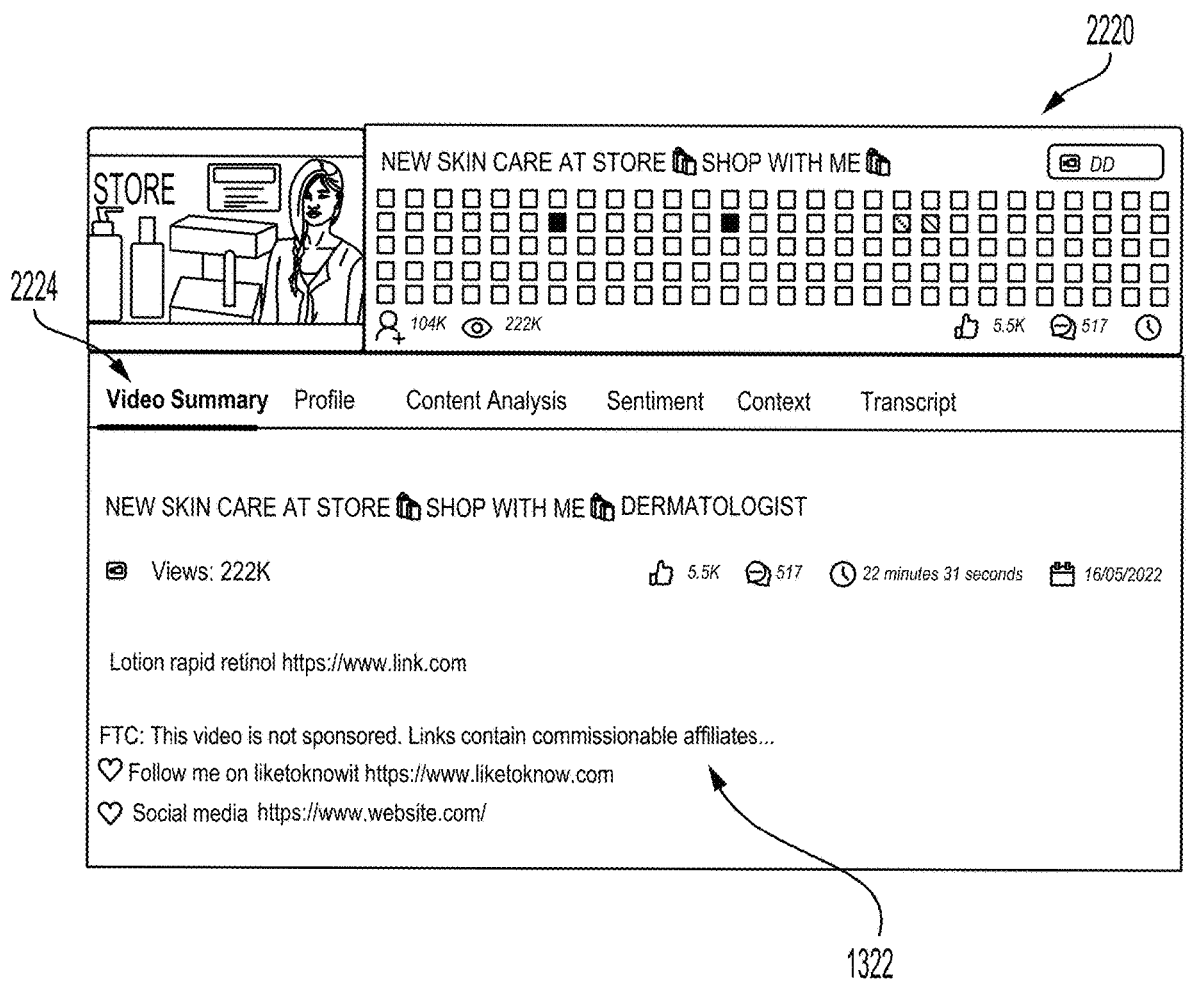

FIG. 22B illustrates a media content analysis report summary 2220 containing further summary details 2222 of the media content (e.g., a content summary, social media identifiers used on other platforms, sponsorship and affiliate information). The media content analysis report may also contain a menu 2224 that may be used to navigate to the parts of the media content analysis report illustrated in FIGS. 22C-22G.

Figure 22C:
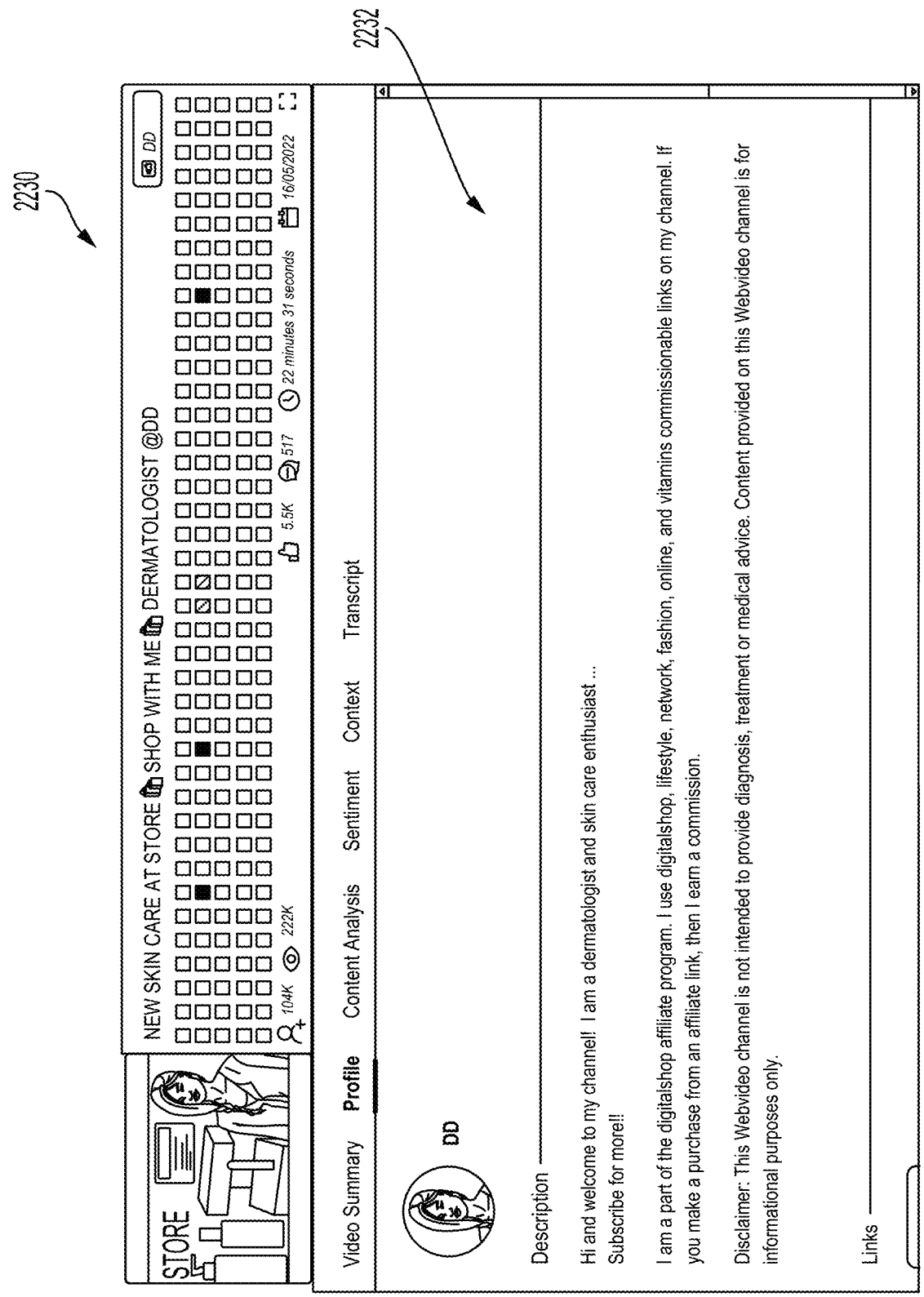

FIG. 22C illustrates a profile summary 2230 containing information 2232 about the media content publisher.

Figure 22D:
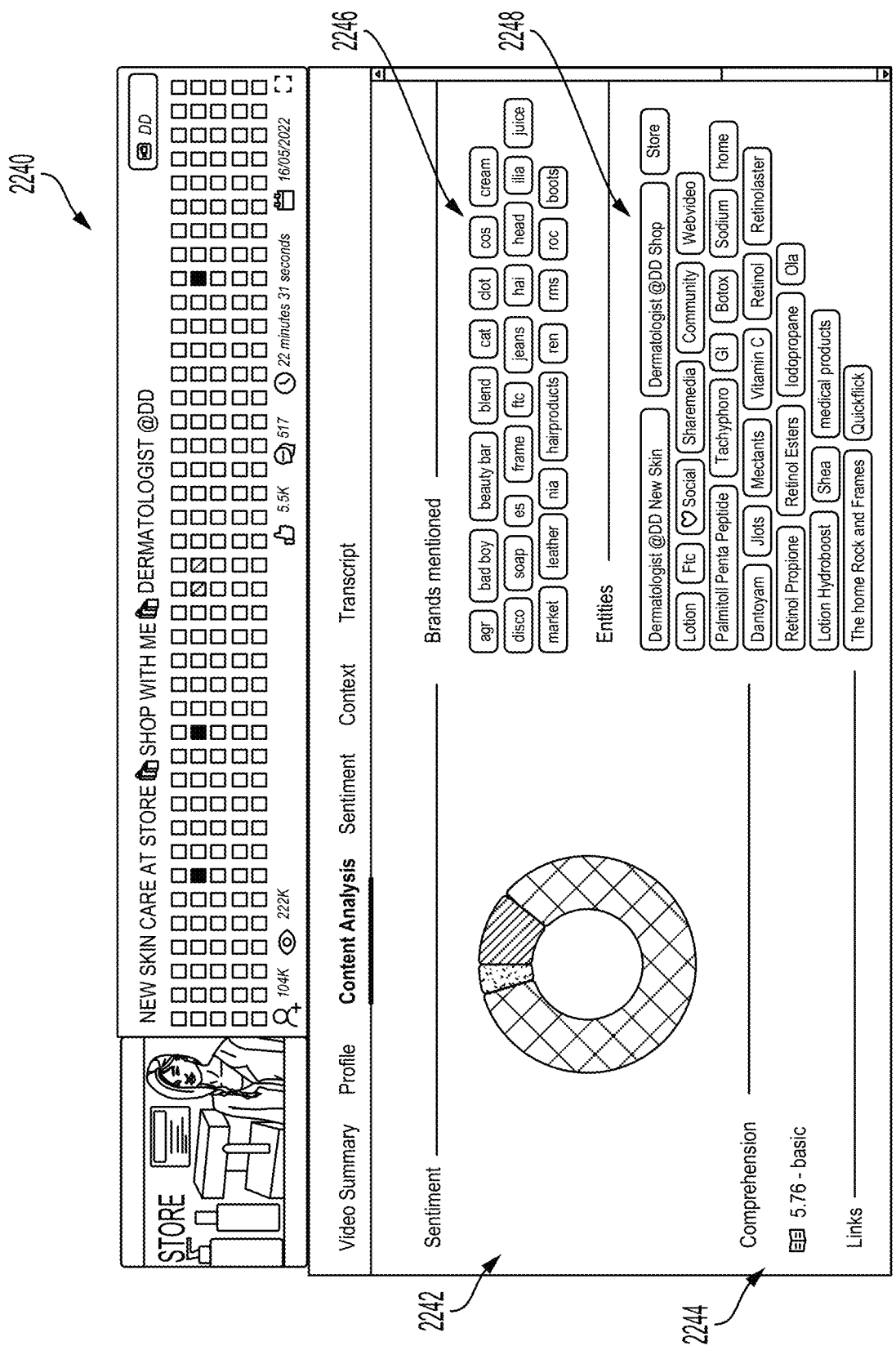

FIG. 22D illustrates a media content analysis report summary 2240 containing summary details of the media content. The donut chart 2242 illustrates the overall breakdown of the sentiments expressed in the media content. In an embodiment, the sentiment summary may be toggled between general sentiments expressed within the media content and sentiments specific to the searched product within the media content. This overall breakdown may be represented using different visual representations in alternative embodiments. The comprehension score 2244 indicates how easy it is to understand the media content, and this may be useful when considering the capabilities of the intended media content audience (e.g., English media content for an audience that does not natively speak English should be more easily understandable). The comprehension score is related to the readability scores 1806 with reference to FIG. 18A. Component 2246 lists all of the brands that are mentioned in the media content, and component 2248 lists all of the other entities that are mentioned in the media content.

Figure 22E:
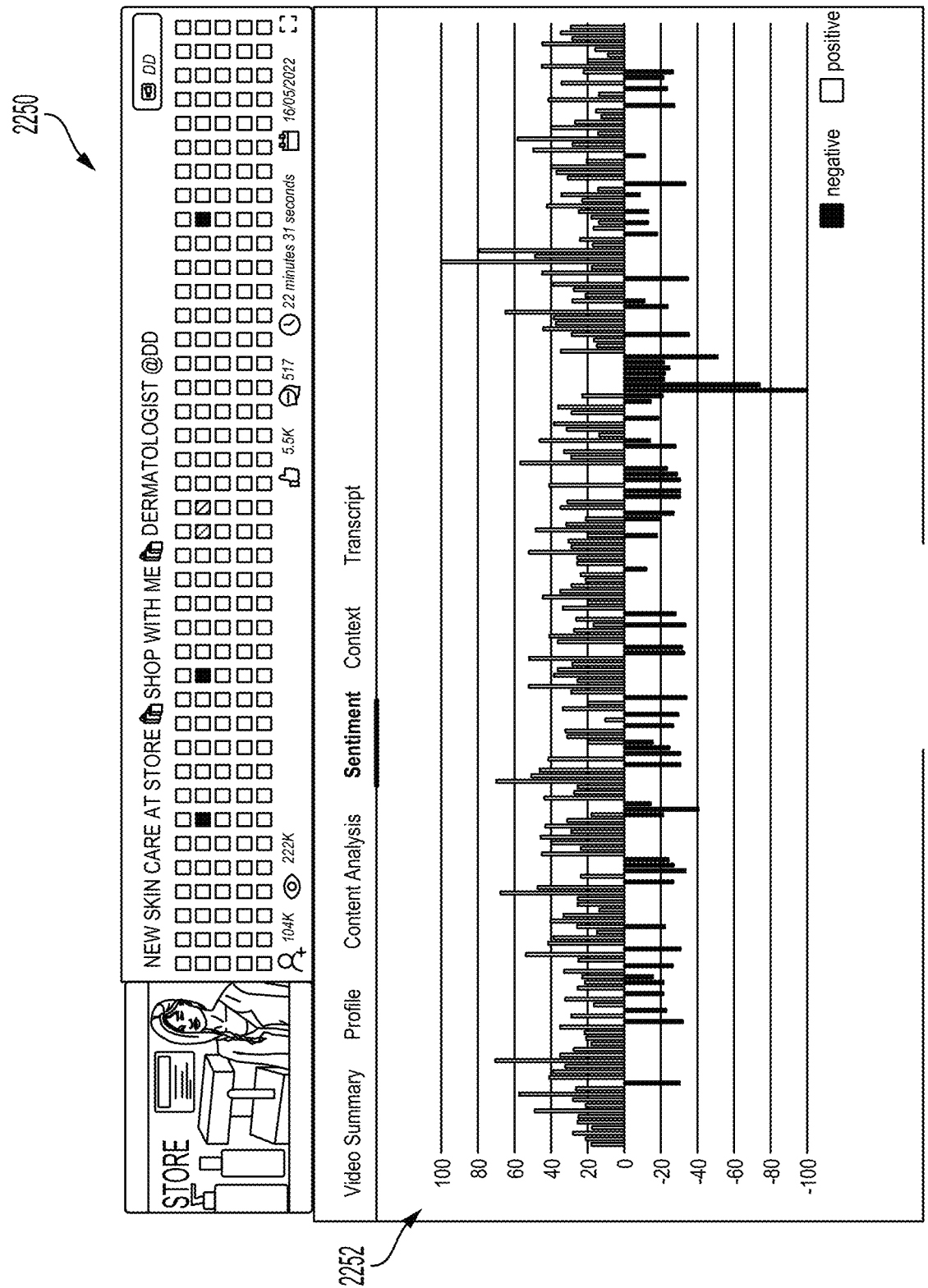

FIG. 22E illustrates media content analysis sentiment details 2250. In an embodiment, the sentiment details may be toggled between general sentiments expressed within the media content and sentiments specific to the searched product within the media content. Component 2252 illustrates when the sentiment is expressed within the media content along the x axis, the type of sentiment expressed (i.e., positive or negative) using both color and direction on the y axis, and the strength of the sentiment using the magnitude on the y axis. In an embodiment, the bars in the bar chart may link directly to the associated part of the media content.

FIG. 22F illustrates media content contextual details 2260 relating to the searched product. Specifically, components 2262a-2262f identify the time in the media content when the searched product was mentioned, the type of sentiment expressed, and the extracted text containing the searched product. These details may have been retrieved from the product knowledge repository.

Figure 22G:
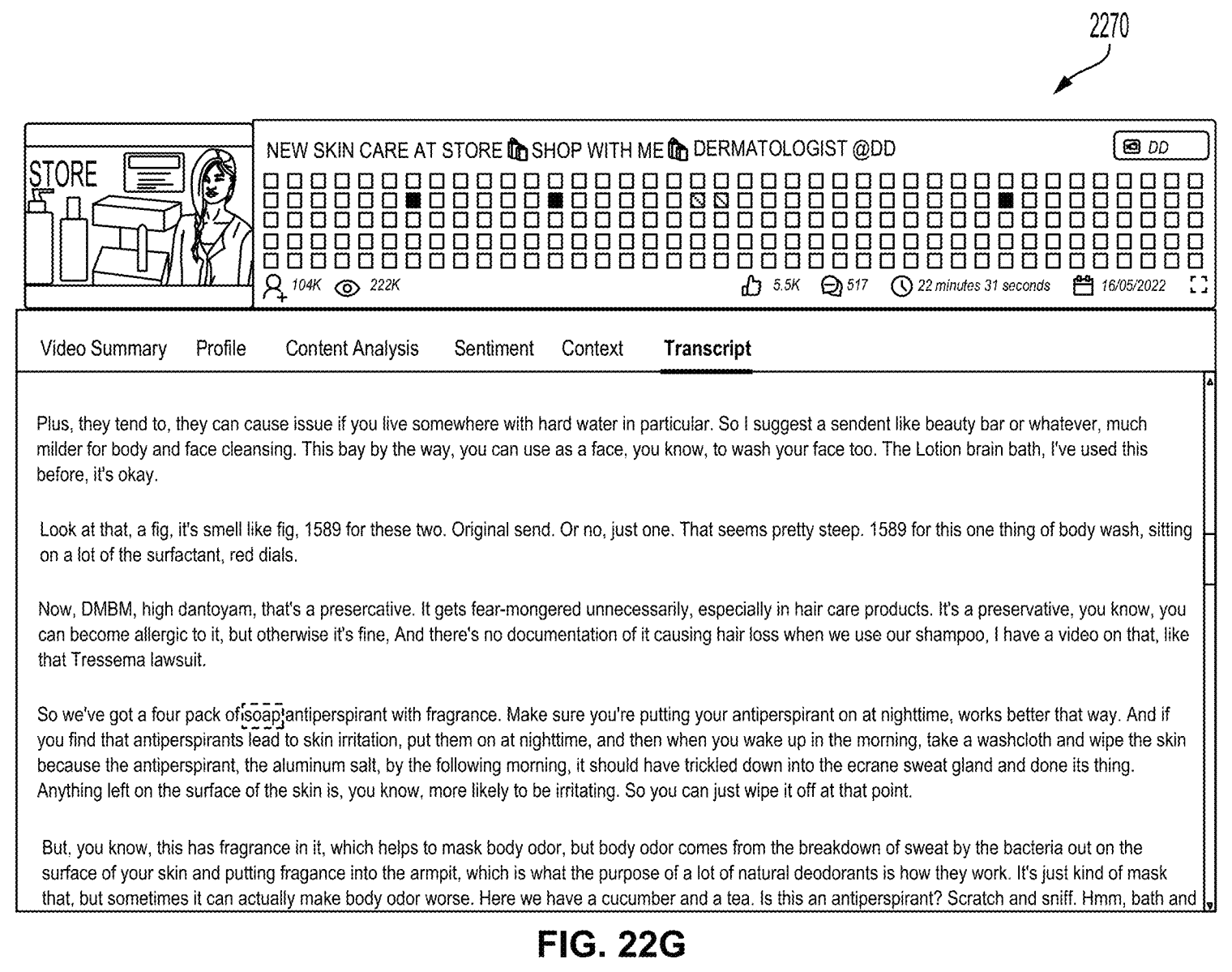

FIG. 22G illustrates a complete transcript 2270 of the media content, and all occurrences of the searched product are highlighted within the transcript.

FIGS. 22A-22G illustrate the results of a search for a tangible product, using its product name, across all media content published on eCommerce websites and social media platforms.

Figure 23:
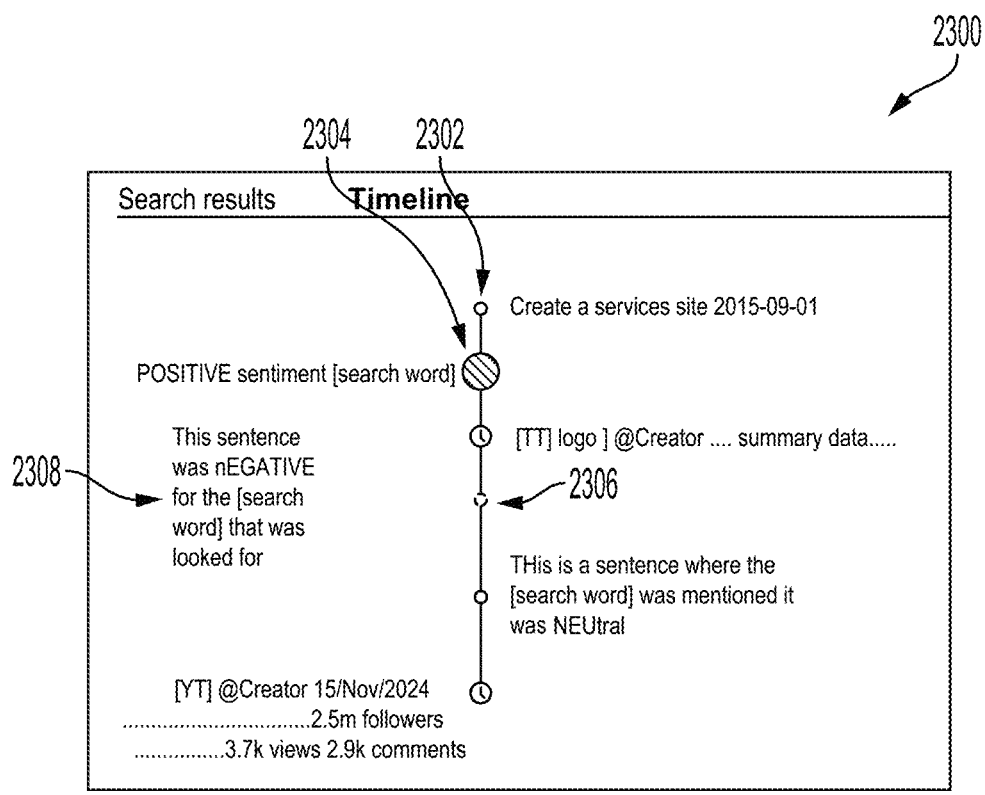
FIG. 23 is a block diagram that illustrates a timeline view of a search result across all media content published on eCommerce websites and social media platforms.

FIG. 23 illustrates a timeline view 2300 of a search result across all media content published on eCommerce websites and social media platforms. The timeline view combines all references by all media content publishers to the product that was searched for on a single timeline 2302. The references appear on the timeline in chronological order, and the spacing between references on the timeline indicates how close the references occurred to each other in time. The timeline may include visual indicators to represent the type of the sentiment associated with the product being referenced (e.g., component 2304 may represent a positive sentiment, component 2306 may represent a negative sentiment, etc.). The timeline may include visual indicators to represent the strength of the sentiment associated with the product being referenced (e.g., the size of component 2304 is greater than the size of the component 2306 indicating that the sentiment associated with component 2304 is greater than the sentiment associated with component 2306). Component 2308 contains the extracted text associated with the sentiment for the product being referenced. Clicking on, or interacting with, any point on the timeline may cause additional details associated with the sentiment and/or media content to be displayed (e.g., as shown in FIG. 21B and FIGS. 22B-22G). The timeline view illustrated in FIG. 23 may be used as an alternative to the view illustrated in FIG. 22A.

Figure 24A:
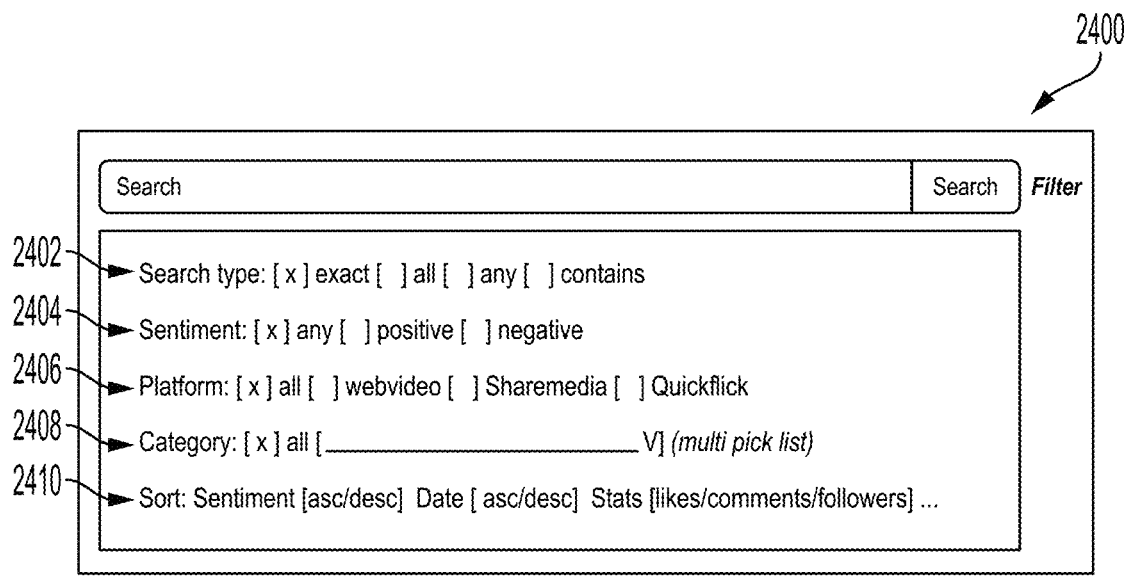
FIGS. 24A and 24B are component diagrams that illustrate filters and aggregations that may be applied when searching media content in accordance with some embodiments.
Figure 24B:
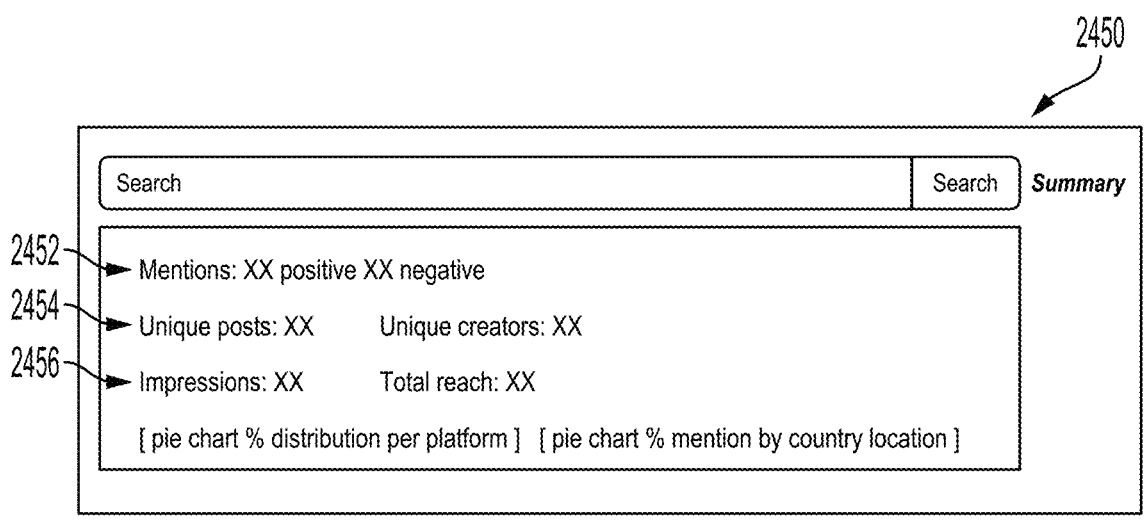

FIGS. 24A and 24B are component diagrams that illustrate graphical outputs 2400, 2450 filters and aggregations that can be applied when searching media content in accordance with some embodiments (e.g., by clicking on, or interacting with, component 2216 with reference to FIG. 22A). The graphical outputs 2400, 2450 may be generated as part of, for example, the outputs from method 800, 850 illustrated and described with reference to FIGS. 8A-8E. The filters and aggregations may be applied before a search is performed and/or on the results of an existing search.

Specifically, FIG. 24A illustrates how a user may be able to limit the scope of the search (e.g., based on the search type 2402, to only positive or negative sentiments 2404, to media content published within a specific time period, to media content that has had a minimum number of views, to a specific type of media content, to media content published on a specific social media platform 2406, to media published by a specific media content publisher, to specific categories of media content selected from a pre-populated drop-down list 2408). Further, the user may be able to specify how the search results should be sorted 2410 (e.g., by sentiment, by date, by likes, views, number of comments).

FIG. 24B illustrates how a user may be able to aggregate the results of the search (e.g., based on the number of positive or negative references 2452, the number of unique media contents and/or the number of unique media content publishers 2454, the number of views, likes, comments 2456).

Further, the search may be for a single word (e.g., a generic product name, a product name specific to a manufacturer, a brand) or multiple words. The multiple words may contain descriptive words that would narrow the search (e.g., "organic moisturizer," "fair trade coffee, "electric cars"). Alternatively, the input to the search may be non-textual (e.g., an image of a product captured using the camera on a smart phone, an audio clip of a newly released song, a video clip from a film). The input to the search could itself be a product in the context of the metaverse (e.g., an avatar could pick-up, or point to, an object in the metaverse and request a search to be performed on that object in order to learn what is being said about the object in the metaverse.

The various embodiments may enable a user to login, create a profile, and subsequently create and save searches and alerts. Saving a search means that the user may not need to repeatedly create the same search, and the search may be performed without the user having to initiate it (e.g., it may be run at regular intervals, it may be run when the product knowledge repository is updated). Creating an alert enables a user to define how the search results (e.g., resulting from a saved search being initiated) should be communicated to the user. The user may be able to limit the number of alerts that are sent in relation to a single media content (e.g., one alert may be sufficient).

FIGS. 25A and 25B are component diagrams that illustrate how searches may be saved, and alerts created, in accordance with some embodiments (e.g., by clicking on, or interacting with, components 2218 and 2220 with reference to FIG. 22A).

Specifically, FIG. 25A illustrates 2500 how a user may save a search. Component 2502 enables the user to assign a meaningful name to the search, and component 2504 enables the user to add arbitrary notes to the saved search.

FIG. 25B illustrates how a user may create an alert 2550 that defines how the search results should be communicated to the user. Field 2552 enables the user to assign a meaningful name to the alert, and field 2554 enables the user to add arbitrary notes to the alert. Component 2556 enable the user to specify one or more types of alerts that he/she wants to receive (e.g., using different communications platforms), and component 2558 enables a user to specify when he/she should receive the alert (e.g., immediately, daily, weekly). The various embodiments may contain summaries or complete details of the search results in the alerts.

The various embodiments may enable a user to create rules that are subsequently executed based on the media content, without the user having to initiate them (e.g., they may be run at regular intervals, they may be run when the product knowledge repository is updated). These rules may be created in numerous ways, and each rule may contain a rule condition that determines when the rule should be applied, and a rule action that determines what should happen when the rule is applied.

Figure 26A:
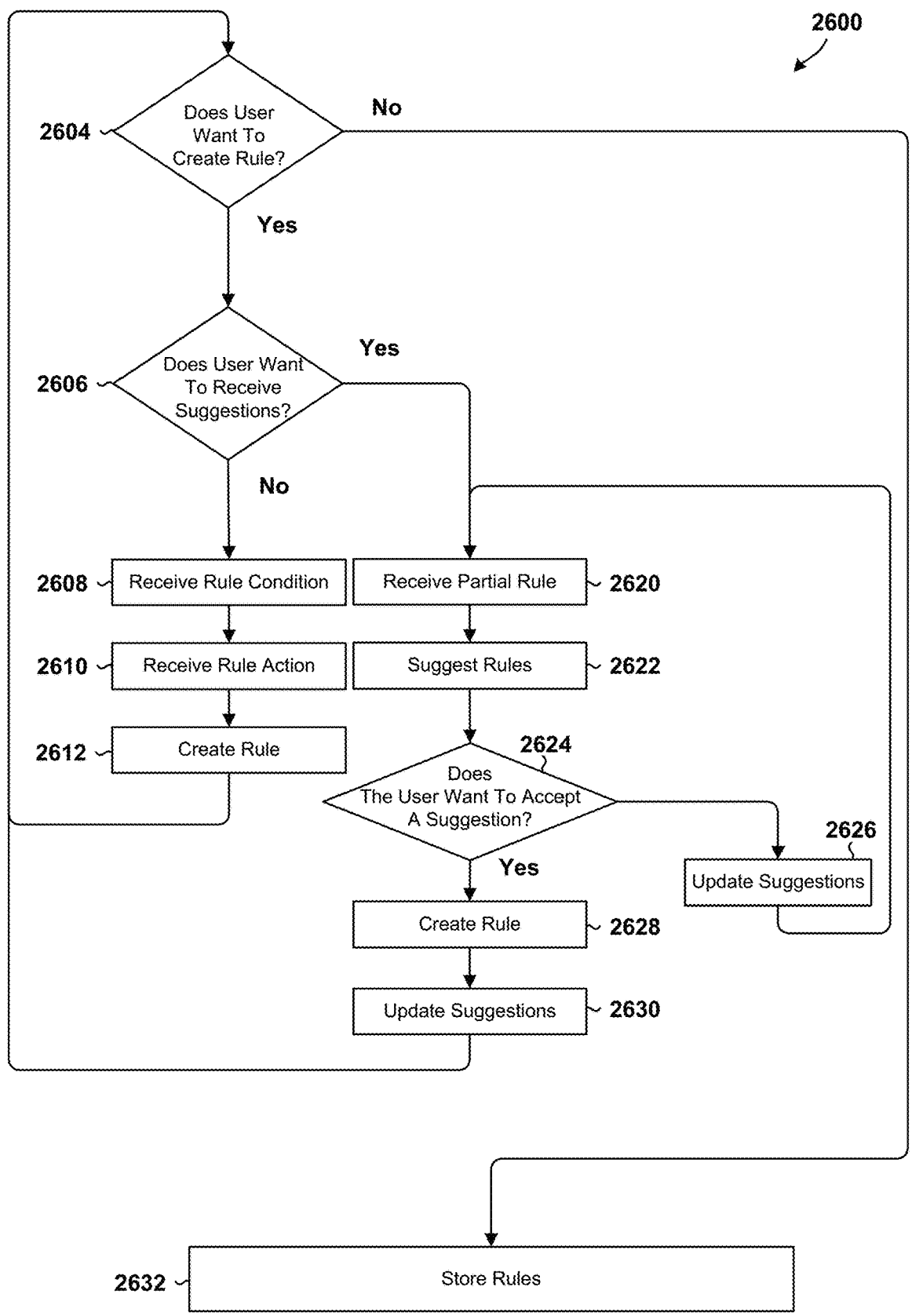
FIGS. 26A, 26B and 26C are process flow diagrams illustrating methods of creating rules relating to media content in accordance with some embodiments.

FIG. 26A is a process flow diagram illustrating a method 2600 of creating rules relating to media content. Method 2600 may be performed by a processing system or at least one processor in a computing system that implements all or portions of a media analytics platform (e.g., media analytics platform 120 illustrated in FIG. 1, etc.). In some embodiments, method 2600 may include the user logging into the system, which may be necessary so that the rules can be associated with the user.

In block 2604, the processor may determine whether the user wants to create a rule. In response to determining that the user wants to create a rule (i.e., determination block 2604="Yes"), in block 2606 the processor may determine whether the user wants to receive suggestions for creating the rule. In response to determining that the user does not want to receive suggestions for creating the rule (i.e., determination block 2606="No"), in block 2608 the processor may receive a rule condition from the user (e.g., using a graphical user interface, using a structured text file). The rule conditions may relate to any attributes in the product knowledge repository (e.g., product name, media content publisher, media impact score), and they may use logic operators (e.g., and, or) to form complex rule conditions.

In block 2610, the processor may receive a rule action from the user (e.g., using a graphical user interface, using a structured text file). Blocks 2608 and 2610 may be performed together as a single block (e.g., as part of a single graphical user interface). In block 2612, the processor may create the rule by binding the rule condition and the rule action together. In an embodiment, the user may be able to independently create rule conditions and rule actions. This may be useful if the user only has a limited number of rule actions, but these rule actions are repeatedly used with many different rule conditions.

In response to determining that the user does want to receive suggestions for creating the rule (i.e., determination block 2606="Yes"), in block 2620 the processor may receive a partial rule from the user (e.g., using a graphical user interface, using a structured text file). The partial rule may consist of part of a rule condition and/or part of a rule action. In block 2622, the processor may suggest one or more complete rules based on the partial rule. The processor may complete the rule by adding more values to an existing rule condition field, adding more rule condition fields, adding more actions to an existing rule action, and adding a new rule action. The processor may use a machine learning algorithm that has been trained on the rules received from other users of the system and the information in the product knowledge repository. The suggested rule actions may be actions that the processor can perform, or they may be actions that the user can perform (e.g., contact the media content publisher and negotiate a commercial sponsorship agreement).

In block 2624, the processor may determine whether the user wants to accept one of the suggested rules (e.g., using a graphical user interface). In response to determining that the user does not want to accept one of the suggested rules (i.e., determination block 2624="No"), in block 2626 the processor may update the rule suggestions based on the user not accepting any of the rule suggestions (e.g., the processor may retrain the machine learning algorithm). In response to determining that the user wants to accept one of the suggested rules (i.e., determination block 2624="Yes"), in block 2628 the processor may create the rule by combining the received partial rule with the suggested rule. In block 2630, the processor may update the rule suggestions with the rule that was accepted by the user (e.g., the processor may retrain the machine learning algorithm).

In an embodiment, the user may be able to provide additional feedback that may be used to update the rule suggestions as part of blocks 2626 and 2630 (e.g., the user may score, rank, rate, or vote up/down one or more rule suggestions, and this feedback may be provided to the machine learning algorithm).

In an embodiment, the user may be shown a list of current search results based on the current rule condition, and this list of current search results may change dynamically as the user modifies the rule condition. The list of current search results may contain additional information that also updates dynamically (e.g., the total number of results). This enables the user to visually confirm that the rule condition is providing the intended results.

In response to determining that the user does not want to create a rule (i.e., determination block 2604="No"), in block 2632 the processor may store the rules.

Figure 26B:
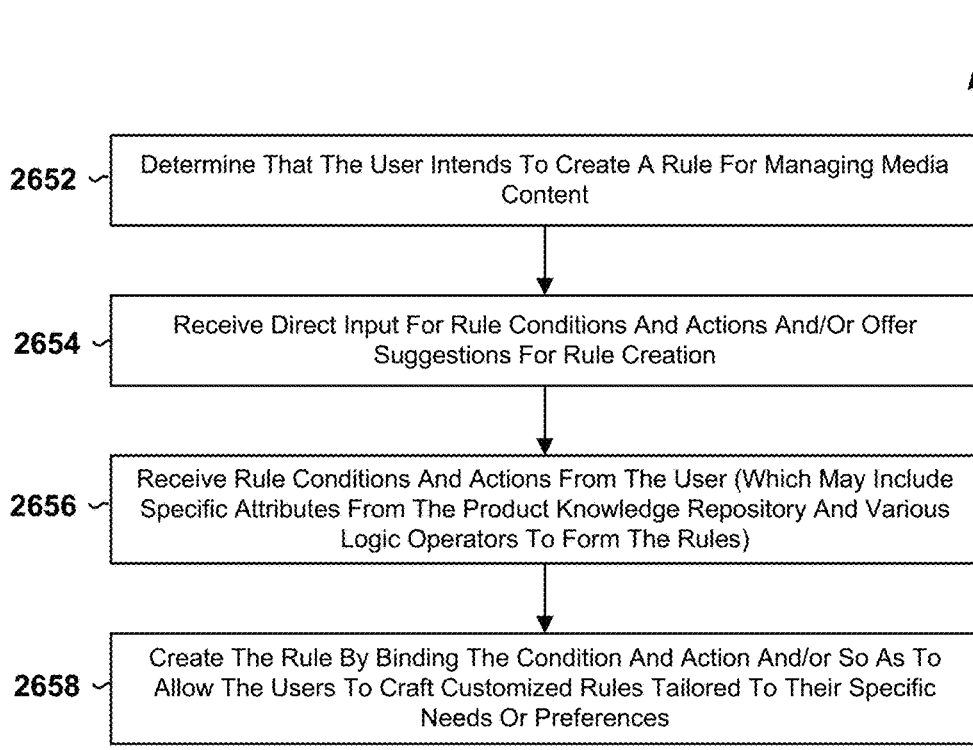
Figure 26C:
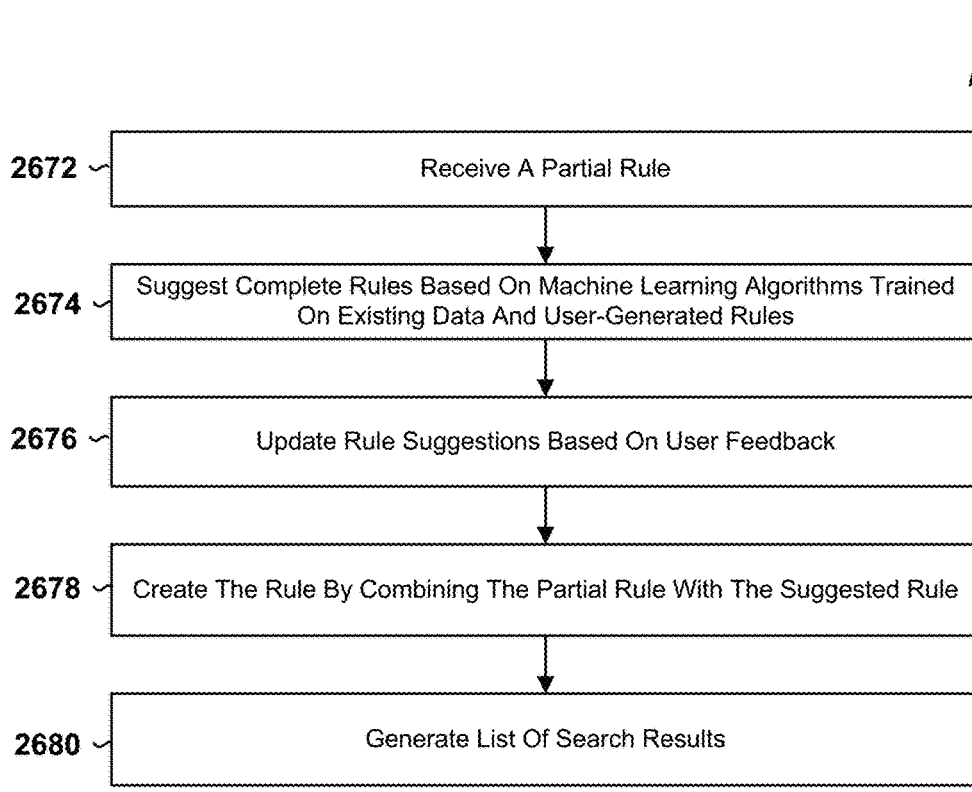

FIGS. 26B and 26C are process flow diagrams illustrating other methods 2650, 2670 of creating rules relating to media content. Methods 2650, 2670 may be performed by a processing system or at least one processor in a computing system that implements all or portions of a media analytics platform (e.g., media analytics platform 120 illustrated in FIG. 1, etc.). In some embodiments, methods 2650, 2670 may include the processor facilitating user login for personalized rule association.

With reference to FIG. 26B, in block 2652 the processor may determine whether the user intends to create a rule for managing media content. In block 2654, the processor may assist users in creating rules by either receiving direct input for rule conditions and actions or by offering suggestions for rule creation. In block 2656, the processor may receive rule conditions and actions from the user (which may include specific attributes from the product knowledge repository and various logic operators to form the rules). In block 2658, the processor may create the rule by binding the condition and action and/or so as to allow the users to craft customized rules tailored to their specific needs or preferences.

With reference to FIG. 26C, in block 2672 the processor may receive a partial rule and then in block 2674 suggest complete rules based on machine learning algorithms trained on existing data and user-generated rules if the user opts for suggestions in creating rules. The processor may determine whether the user wishes to accept the suggested rules, update the suggestions based on user feedback in block 2676 and/or create the rule in block 2678 by combining the partial rule with the suggested rule. In block 2680, the processor may further update rule suggestions based on user feedback, retrain machine learning algorithms, and provide a dynamic list of search results to visually confirm the effectiveness of rule conditions.

FIGS. 27A and 27B are component diagrams that illustrate the creation of various rules relating to media content in accordance with some embodiments.

Specifically, FIG. 27A illustrates a partial graphical user interface 2700 that a user may use to enter rule conditions according to an embodiment. The partial graphical user interface contains six fields: field 2702 contains one or more brand names or product names; field 2708 contains a list of topics that are of interest to the user; field 2710 contains a list of territories and/or regions that are of interest to the user; field 2712 contains a list of competitors; field 2714 contains a list of inappropriate topics with which the user does not want to be associated; and field 2716 contains a list of values which are important to the user. The various embodiments may enable users to leave some fields empty and to populate additional fields not shown in FIG. 27A.

In an embodiment in which the user does not want to receive suggestions, the user may manually populate one or more of the fields for brand names or product names 2702, topics that are of interest to the user 2708, territories and/or regions that are of interest to the user 2710, list of competitors 2712, list of inappropriate topics with which the user does not want to be associated 2714, and list of values which are important to the user 2716 (e.g., as part of block 2608 with reference to FIG. 26).

In an embodiment in which the user wants to receive suggestions, the processor may suggest values to populate the fields for brand names or product names 2702, topics that are of interest to the user 2708, territories and/or regions that are of interest to the user 2710, list of competitors 2712, list of inappropriate topics with which the user does not want to be associated 2714, and list of values which are important to the user 2716 (e.g., as part of block 2622 with reference to FIG. 26). For example, if the user selected the brand family in component 2704 (e.g., using a text input box with predictive completion), then the processor would populate the field 2706 with the product names that form part of the brand family. Once the brand names or product names field 2702 is populated, the processor may then make suggestions for populating the remaining fields.

In general, when the user starts to populate any field, then the processor may make suggestions for further populating that field and one or more other fields (e.g., if the user started by adding "Skin care" to the topics that are of interest field 2708, then the processor may suggest adding "Dermatology," "Dry skin," and "Healthcare" to the same field, as well as suggesting adding "Peta" and "Animal cruelty" to the list of inappropriate topics with which the user does not want to be associated field 2714). Further, the user may be able to reassign suggested field values from one field to another (e.g., the user may reassign a suggested product from the list of competitors field 2712 to the field for brand names or product names 2702 by interacting with the graphical user interface if the product is considered complementary rather than competitive).

FIG. 27B illustrates a partial graphical user interface 2750 that may be displayed to a user while creating rules according to an embodiment in which the user wants to receive suggestions (e.g., as part of block 2622 with reference to FIG. 26). Component 2752 illustrates the fields as they are currently populated.

Table 2754 contains a dynamic grouping or clustering of media content publishers that meet most or all of the requirements of the fields in component 2752. This grouping may change as the user changes the field parameters.

FIG. 27B illustrates four groupings 2756 (i.e., "Strength", "Weakness", "Opportunity", "Threat"), but there could be any number. In an embodiment, the user may be able to specify the number of groups required.

Component 2754 may contain a representative example of a media content 2758 that is contained within each group (i.e., for "Strength," "Weakness," "Opportunity," "Threat"). These groups may assist the user to define rule actions.

In an enhanced embodiment, the processor may suggest a rule action for each group of media content publishers.

It is important to note that some of the fields may be important to the user in a negative way (e.g., field 2714 with reference to FIG. 27A), but these fields may still be important to determine appropriate rule actions.

In some embodiments, the processor may be configured to execute rules related to media content. For example, the processor may be configured to load and evaluate rules, select rules, search the ToI knowledge repository, determine whether a condition of the selected rule has been satisfied, check the rule action time period, execute corresponding rule actions based on the properties of the media content and publisher perform rule actions, engage with media content, perform promotional activities, promote social media content, create a promotional order, and/or manage ads based on content publisher behavior.

Figure 28A:
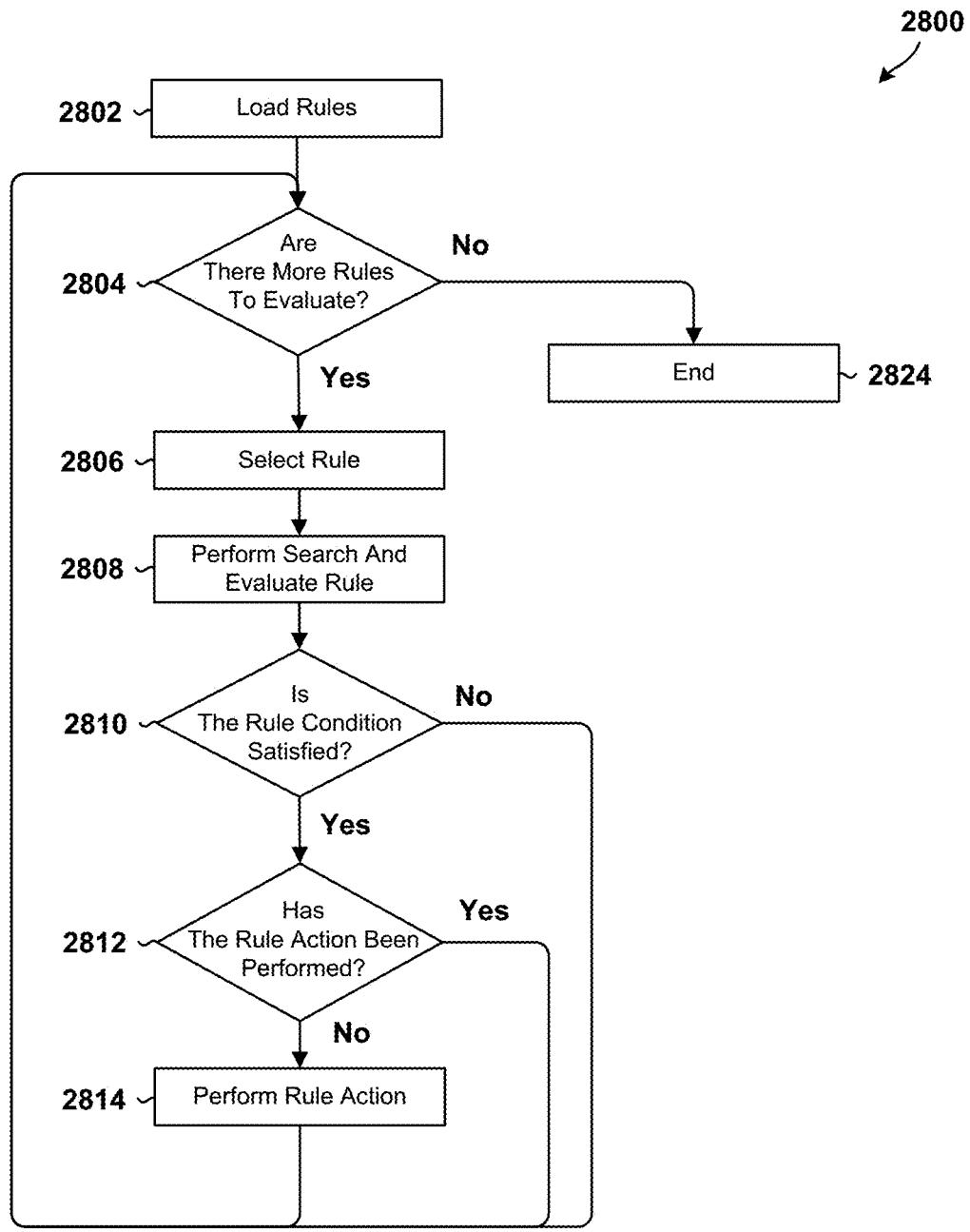
FIGS. 28A and 28B are process flow diagrams illustrating methods of executing rules relating to media content.

FIG. 28A is a process flow diagram illustrating a method 2800 of executing rules relating to media content. Method 2800 may be performed by a processing system or at least one processor in a computing system that implements all or portions of a media analytics platform (e.g., media analytics platform 120 illustrated in FIG. 1, etc.). Method 2800 may be performed periodically (once every hour, once every day), or it may be performed when one or more rules are updated (e.g., as a result of block 2632 with reference to FIG. 26).

In block 2802, the processor may load the rules (e.g. that were stored as part of block 2632 with reference to FIG. 26). In block 2804, the processor may determine whether there are more rules to evaluate. In response to determining that there are more rules to evaluate (i.e., determination block 2804="Yes"), in block 2806 the processor may select the next rule which has not yet been evaluated. In block 2808, the processor may search the product knowledge repository using the fields contained in the rule condition. In an optimized embodiment, the processor may only search for media content that has been added to the product knowledge repository since a search using the rule was last performed.

In block 2810, the processor may determine whether there are any results from the product knowledge repository (e.g., media content publishers) that satisfy the rule condition. In an embodiment, the rule condition may be satisfied based on a threshold value.

In response to determining that there are results from the product knowledge repository that satisfy the rule condition (i.e., determination block 2810="Yes"), in block 2812 the processor may determine whether the rule action has already been performed within a time period (e.g., within the previous 30 days, ever). This time period may be a global value, or it may be specific to the rule action and contained within the rule. This feature is necessary in order to limit the frequency with which the rule action is performed.

In response to determining that the rule action has not been performed within the time period (i.e., determination block 2812="No"), in block 2814 the processor may perform the rule action. There may be 0-N different rule actions performed.

The extent to which the processor performs the rule action may vary based on the number of rule conditions that were satisfied and/or the properties of the media content and/or the media content publisher (e.g., it may be desirable to spend more money on advertising with a social media content publisher that has a larger audience).

In some embodiments, in block 2814 the processor may engage (e.g., like, comment) with some of the media content. In an embodiment, the processor may use a machine learning algorithm to select the appropriate type of engagement (e.g., the comments added to a social media post containing video media content may relate to the topic that was discussed in the video media content).

In some embodiments, in block 2814 the processor may cause another system associated with the user to promote the social media content (e.g., the processor may re-post the social media content on the user's social media timeline, the processor may add the social media content to the user's blog, the processor may add a description and link for the social media content to a monthly email newsletter that is distributed by the user).

In some embodiments, in block 2814 the processor may create a free promotion order of the product or service to be sent to the media content publisher (e.g., by invoking an API provided by an order management system or an online sales system). This may be useful in cases where as media content publisher has created a vlog reviewing a competitor's product with lots of positive sentiment, so the user would like the media content publisher to review the user's product or service.

In some embodiments, in block 2814 the processor may create, update, or remove some of the advertisements that the user places with media content publishers or advertising agencies (e.g., using an API). For example, if a media content publisher creates a podcast with positive sentiments that explains the benefits of using a certain type of product using a generic product name (i.e., without naming any product names that are specific to manufacturers), the manufacturer who creates such products may want to pay to have audio advertisements for its specific product inserted into the podcast. Similar, if a media content publisher, that previously referenced the user's products in a positive way, starts to publish media content containing inappropriate topics, then the user may want to immediately stop all advertising on the platform used by the media content publisher.

In response to determining that there are no results from the product knowledge repository that satisfy the rule condition (i.e., determination block 2810="No"), or in response to determining that the rule action has been performed within the time period (i.e., determination block 2812="Yes"), then in block 2804 the processor may determine whether there are more rules to evaluate.

In response to determining that there are no more rules to evaluate (i.e., determination block 2804="No"), in block 2824 the process may exit, end, terminate, or finish.

Figure 28B:
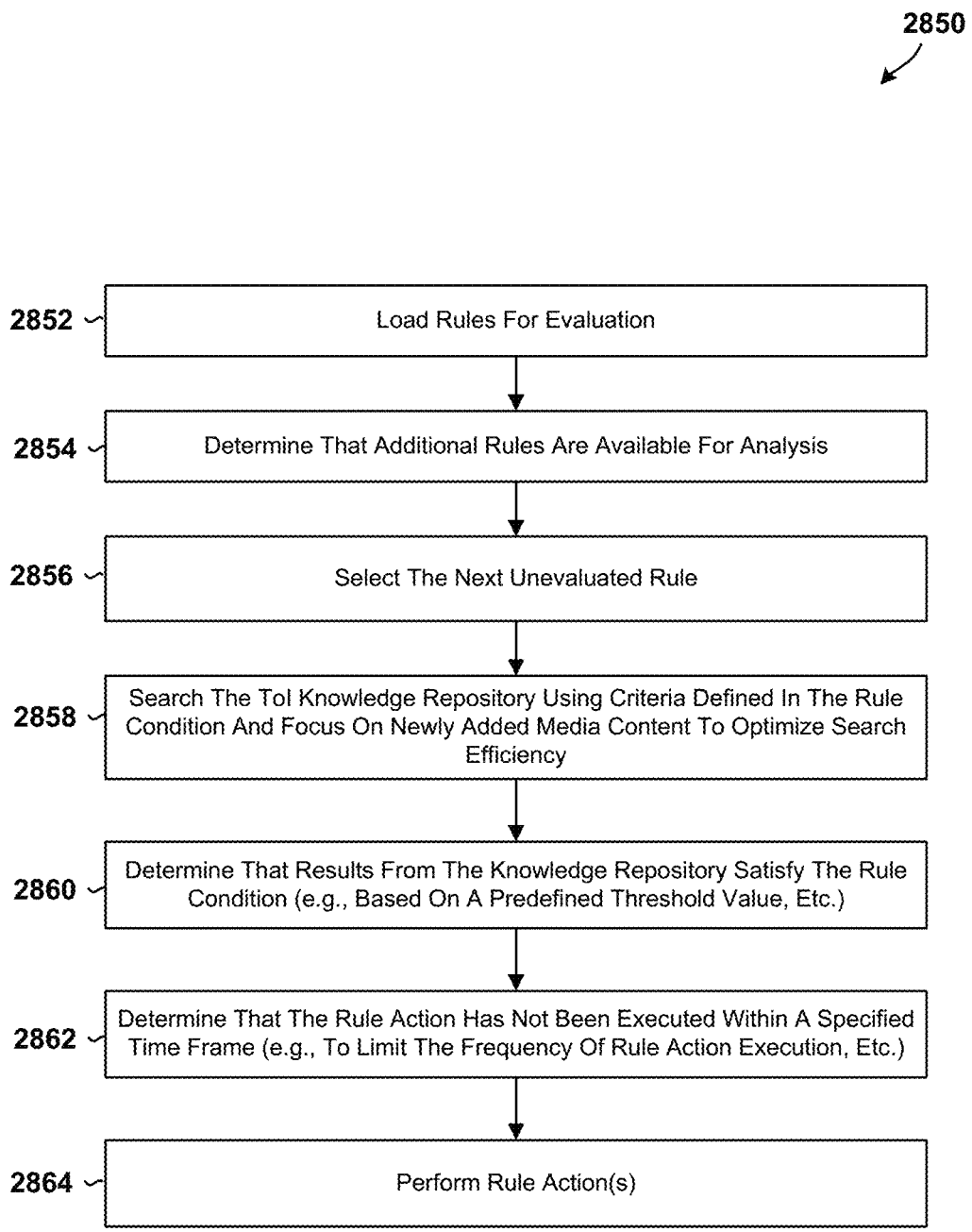

FIG. 28B is a process flow diagram illustrating a method 2850 of executing rules relating to media content. Method 2850 may be performed by a processing system or at least one processor in a computing system that implements all or portions of a media analytics platform (e.g., media analytics platform 120 illustrated in FIG. 1, etc.). Method 2850 may be performed periodically (once every hour, once every day), or it may be performed when one or more rules are updated (e.g., as a result of block 2632 with reference to FIG. 26).

In block 2852, the processor may load rules for evaluation. In block 2854, the processor may determine whether additional rules are available for analysis. In block 2856, the processor may select the next unevaluated rule. In block 2858, the processor may search the ToI knowledge repository using criteria defined in the rule condition and focus on newly added media content to optimize search efficiency. In block 2860, the processor may determine whether results from the knowledge repository satisfy the rule condition (e.g., based on a predefined threshold value, etc.). In block 2862, the processor may determine whether the rule action has been executed within a specified time frame (e.g., to limit the frequency of rule action execution, etc.).

In block 2864, the processor may perform various rule actions and/or responsive actions. The extent of the rule actions may vary based on the number of satisfied rule conditions and properties of the media content or publisher. Actions may range from engaging with media content to promoting content on user systems or creating promotional orders. The processor may select appropriate engagement types and engage with the media content (e.g., comment or like posts related to the content topic, etc.). The processor may promote social media content on behalf of the user. For example, the processor may re-post on timelines, add to blogs, or feature in newsletters. In some embodiments, the processor may be configured to create orders for free product promotions to be sent to content publishers, particularly when competitor products are reviewed positively. The processor may update advertisement placements with publishers or agencies and adapt to changes in content publisher behavior, such as starting or stopping ad campaigns in response to shifts in content quality or appropriateness. In response to either satisfying rule conditions or executing rule actions, the processor may reassess if more rules need evaluation or terminate the process if all rules have been addressed.

Figure 29:
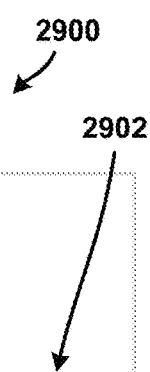
FIG. 29 is a component diagram that illustrates the creation of various rule actions relating to media content in accordance with some embodiments.

FIG. 29 is a component diagram that illustrates the creation of various rule actions relating to media content in accordance with some embodiments. Specifically, FIG. 29 illustrates a partial graphical user interface 2900 that may be displayed to a user while creating rule actions according to an embodiment in which the user wants to receive suggestions (e.g., as part of block 2622 with reference to FIG. 26). FIG. 29 illustrates the same groupings 1856 (i.e., "Strength" "Weakness" "Opportunity" "Threat") that are illustrated in FIG. 27B and their representative examples. The processor may suggest a rule action 2902 for each of these groupings. The processor may suggest these rule actions 2902 as part of block 2622 with reference to FIG. 26, and the processor may perform these rule actions as part of block 2814 with reference to FIG. 28.

Figure 30:
FIG. 30 is a component diagram that illustrates a report containing the results of executing rules relating to media content in accordance with some embodiments.

FIG. 30 is a component diagram that illustrates a report containing the results of executing rules relating to media content in accordance with some embodiments. Specifically, FIG. 30 illustrates a partial report 3000 that may be presented to a user (e.g., using a graphical user interface) after executing rules (as part of process 2800 with reference to FIG. 28) relating to media content (e.g., that the user specified as part of process 2600 with reference to FIG. 26).

Report 3000 contains a table consisting of columns for the suggested groupings 3002, the media content publisher 3004, the suggested priority for taking a rule action (because the user may have limited budget resources to perform rule actions) 3006, some of all of the rule conditions that were satisfied 3008, representative examples of the media content 3010 (each representative example may be a hyperlink, and clicking on, or interacting with, any representative example may cause the media content associated with the representative example to be displayed or played as shown in FIG. 30B), and the suggested rule actions 3012.

In an enhanced embodiment, the processor may correlate rule actions executed (e.g., as part of process 2800 with reference to FIG. 28) with future media content analysis (e.g., if the processor caused a promotion order of the product to be sent to the media content publisher, then the processor may determine whether the media content publisher created media content with a positive sentiment relating to the product).

In an alternative embodiment, the search may be performed for an alternative reason, such as ensuring that all media content that references a product does this in compliance with the relevant requirements (as may be described in more detail later with reference to FIG. 32). In this embodiment, the results of the search may be displayed similarly to the results displayed in FIG. 22A. In this embodiment, the colored squares in the grid 2214 may represent a time in the media content when the media content is not in compliance with the relevant requirements, and the colors may be used to indicate the type or severity of the non-compliance. Clicking on, or interacting with, any square may cause the media content associated with the sub-duration represented by the square to be displayed or played (e.g., similarly to FIG. 21B). Further, clicking on, or interacting with, any square may enable the processor to attempt to modify the media content, block the media content, or send an alert regarding the media content.

Figure 31:
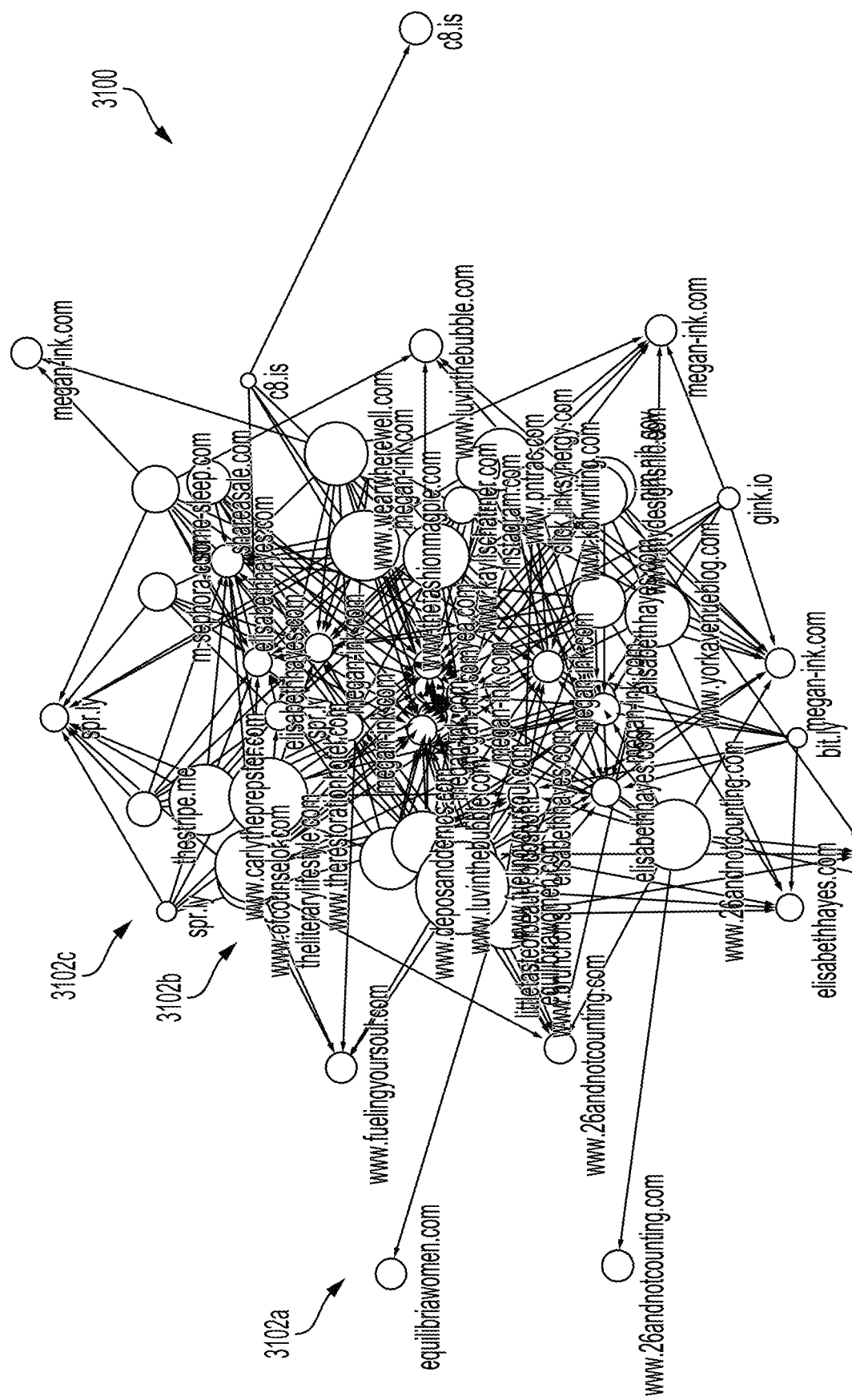
FIG. 31 is a component diagram that illustrates a graph representing all of the links to external websites from the media content published by a media content publisher in accordance with some embodiments.

FIG. 31 is a component diagram that illustrates a graph 3100 representing all of the links to external websites from the media content published by a media content publisher in accordance with some embodiments. Graph 3100 may form part of the product knowledge repository (e.g., the ExternalWebsite attribute in the Segment 208 record, etc.). The vertices in the graph (e.g., 3102a, 3102b, 3102c) represent external websites, and the size of each vertex represents the number of links from the media content to the external website (e.g., there are more links to 3102b than to either 3102a or 3102c). The links may be verbal links (e.g., spoken as part of a podcast), visual links (e.g., displayed as part of a vlog), or associated links (e.g., appearing when the media content is actuated in a metaverse environment). In an enhanced embodiment, there may be similar graphs for each media content.

Figure 32:
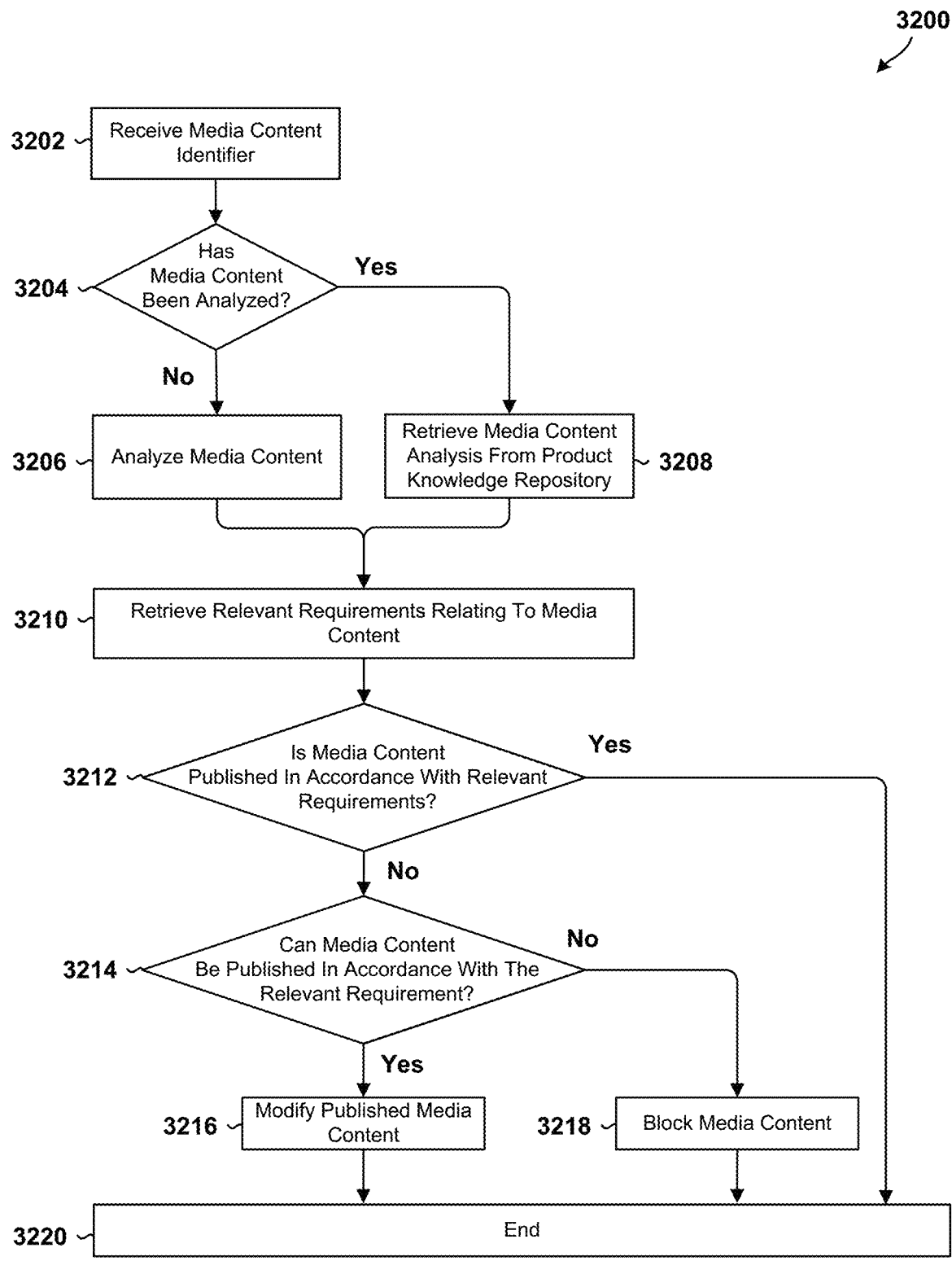
FIG. 32 is a process flow diagram illustrating a method of determining if a media content is published in compliance with the relevant requirements.

FIG. 32 is a process flow diagram illustrating a method 3200 of determining if a media content is published in compliance with the relevant requirements. Method 3200 may be performed by a processing system or at least one processor in a computing system that implements all or portions of a media analytics platform (e.g., media analytics platform 120 illustrated in FIG. 1, etc.).

The relevant requirements may be voluntary industry specific requirements (e.g., not advertising alcoholic drinks on websites that contain content of interest to children, affiliates and sponsors must be explicitly declared) or mandatory legislative requirements (e.g., it is illegal to advertise products containing tobacco in many countries, the potential side effects of a medication must be included as part of any promotion of the medication).

The relevant requirements may be specific to a product owner (e.g., not wanting to be associated with a competitor or an inappropriate topic, always stating the importance of only using genuine ink when referring to a desktop printer).

Method 3200 may be used multiple times as part of a loop within a larger method. The larger method may receive a product identifier (e.g., block 1302 with reference to FIG. 13), and then repeatedly use method 3200 to determine that all media content relating to the product identifier is published in compliance with the relevant requirements. This may be particularly useful to product owners. Alternatively, the larger method may receive a media content publisher identifier (e.g., block 1402 with reference to FIG. 14), and then repeatedly use method 3200 to determine that all media content published by the media content publisher is published in compliance with the relevant requirements. This may be particularly useful to media content publishers and third parties who use media content publishers.

In block 3202, the processor may receive an identifier for media content (e.g., a URL). In block 3204, the processor may determine whether the media content associated with the received identifier has already been analyzed (e.g., by querying the product knowledge repository). In response to determining that the media content associated with the received identifier has not already been analyzed (i.e., determination block 3204="No"), in block 3206 the processor may analyze the media content (e.g., with reference to method 400 illustrated in FIGS. 4A-4D, in blocks 1004-1010 in FIG. 10, etc.).

In response to determining that the media content associated with the received identifier has already been analyzed (i.e., determination block 3204="Yes"), in block 3208 the processor may retrieve the media content analysis from the product knowledge repository. In block 3210, the processor may retrieve the relevant requirements relating to the media content (e.g., from an external source, from the product knowledge repository). In block 3212, the processor may determine whether the media content is published in accordance with the relevant requirements. This determination may be based on a threshold (e.g., up to three associations with competitors may be allowed, but no inappropriate topics are allowed).

In response to determining that the media content is published in accordance with the relevant requirements (i.e., determination block 3212="Yes"), the process may exit, end, terminate, or finish in block 3220. In response to determining that the media content is not published in accordance with the relevant requirements (i.e., determination block 3212="No"), in block 3214 the processor may determine whether it can publish the media content in accordance with the relevant requirements. In response to determining that the processor can publish the media content in accordance with the relevant requirements (i.e., determination block 3214="Yes"), in block 3216 the processor may update or modify the media content (e.g., by adding notices, overlays, or links to the media content, the webpage containing it, or to the metadata associated with the media content using an API provided by the media content publisher).

In response to determining that the processor cannot publish the media content in accordance with the relevant requirements (i.e., determination block 3214="No"), in block 3218 the processor may block the media content (e.g., by removing links to it from an eCommerce website, by disabling it using an API provided by the media content publisher). Additionally, the processor may generate an alert or log entry as part of blocks 3212-3218. The process may exit, end, terminate, or finish in block 3220.

Figure 33B:
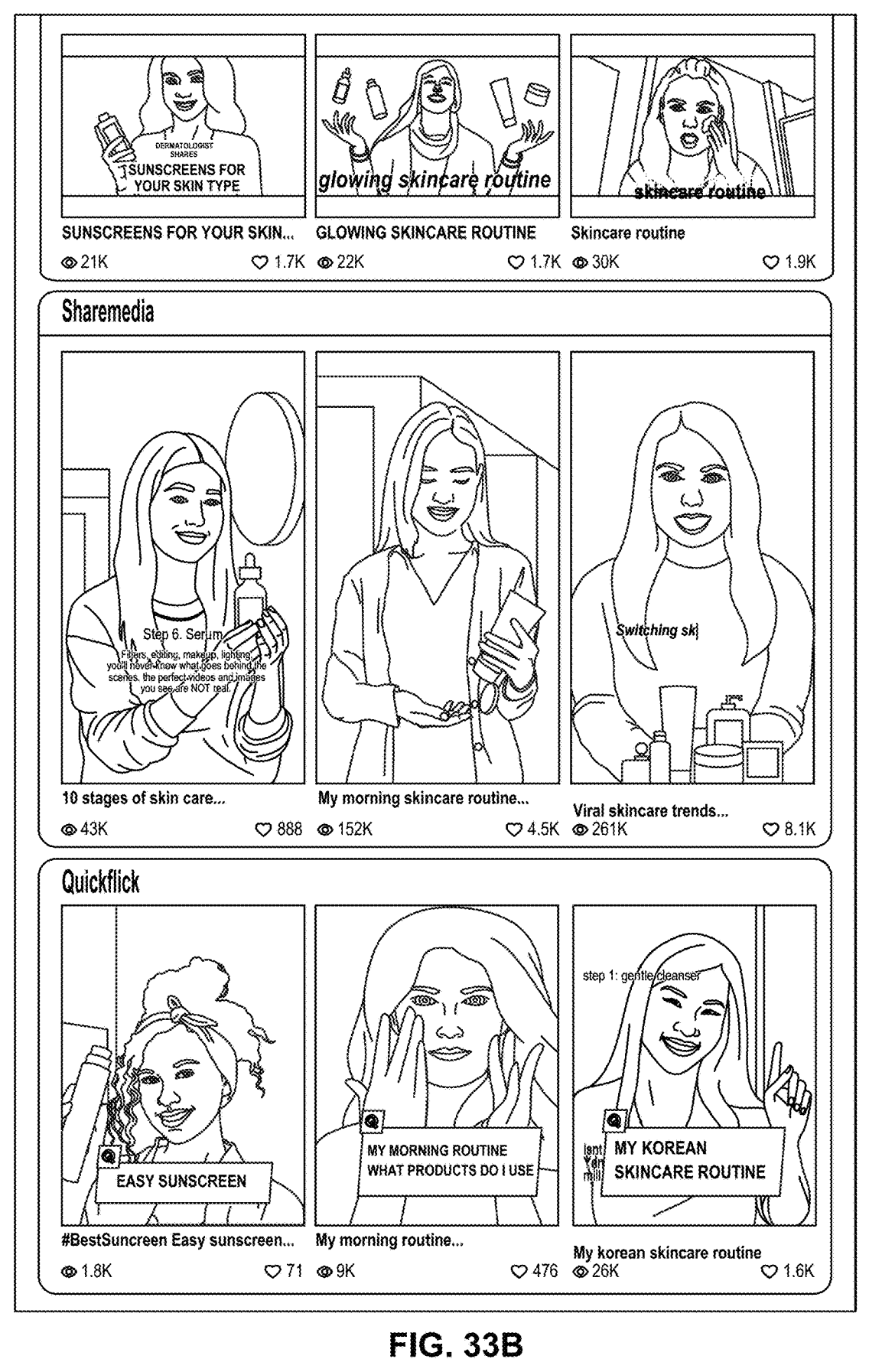
Figure 33I:
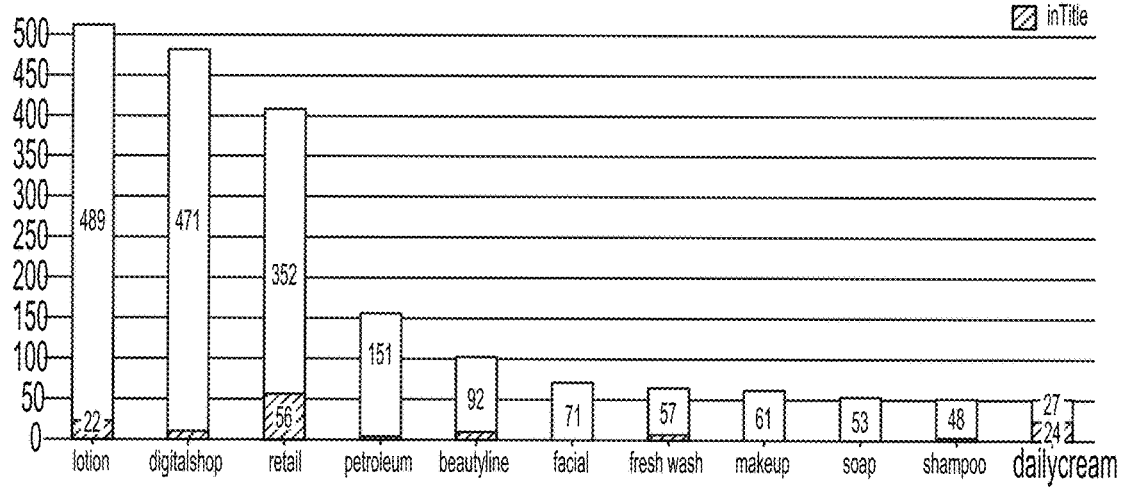
FIGS. 33A-33P are block diagrams that illustrate graphical user interface screens that render the analysis results generated by media analytics platform in accordance with some embodiments.
Figure 33J:
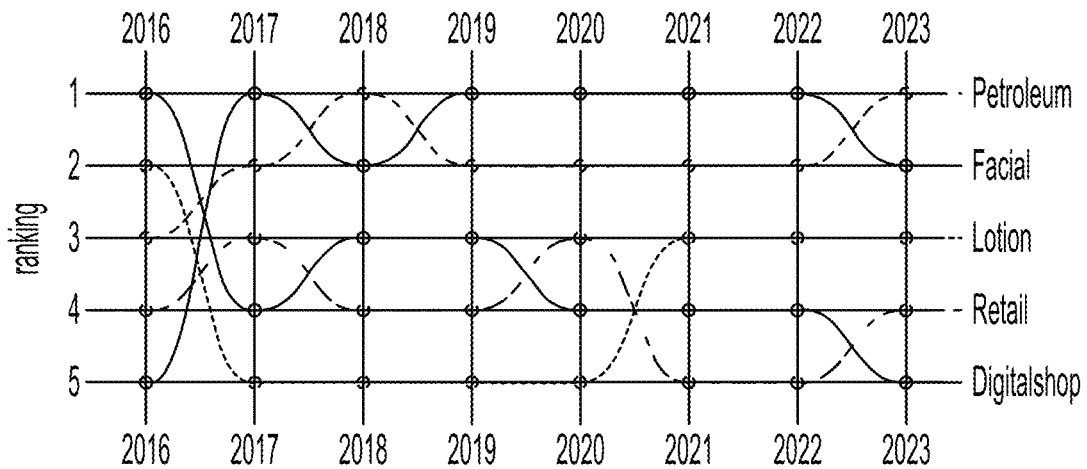
Figure 33K:
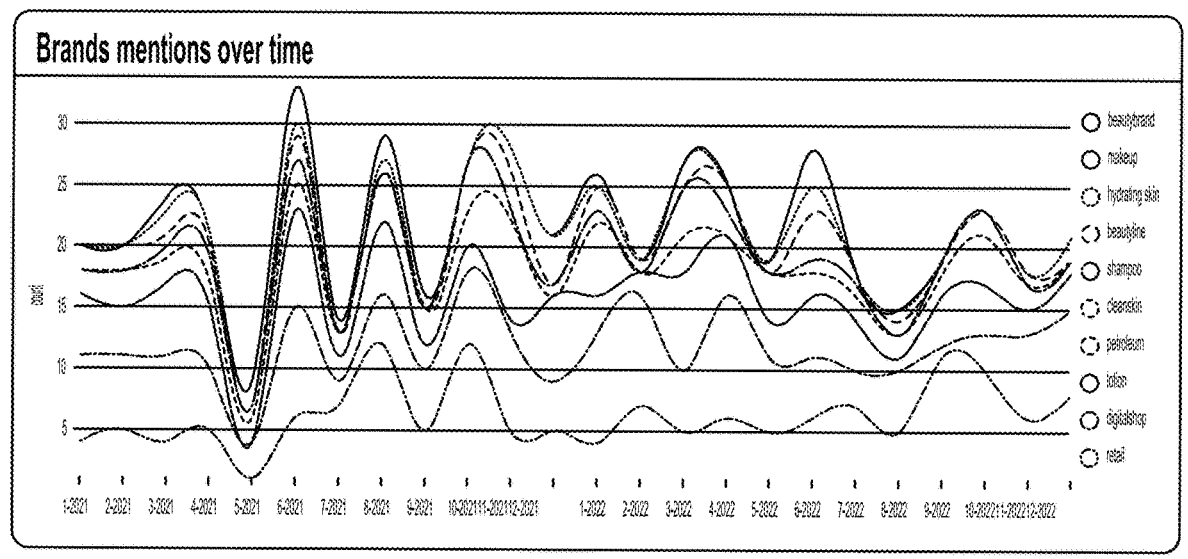
Figure 33L:
Figure 33N:
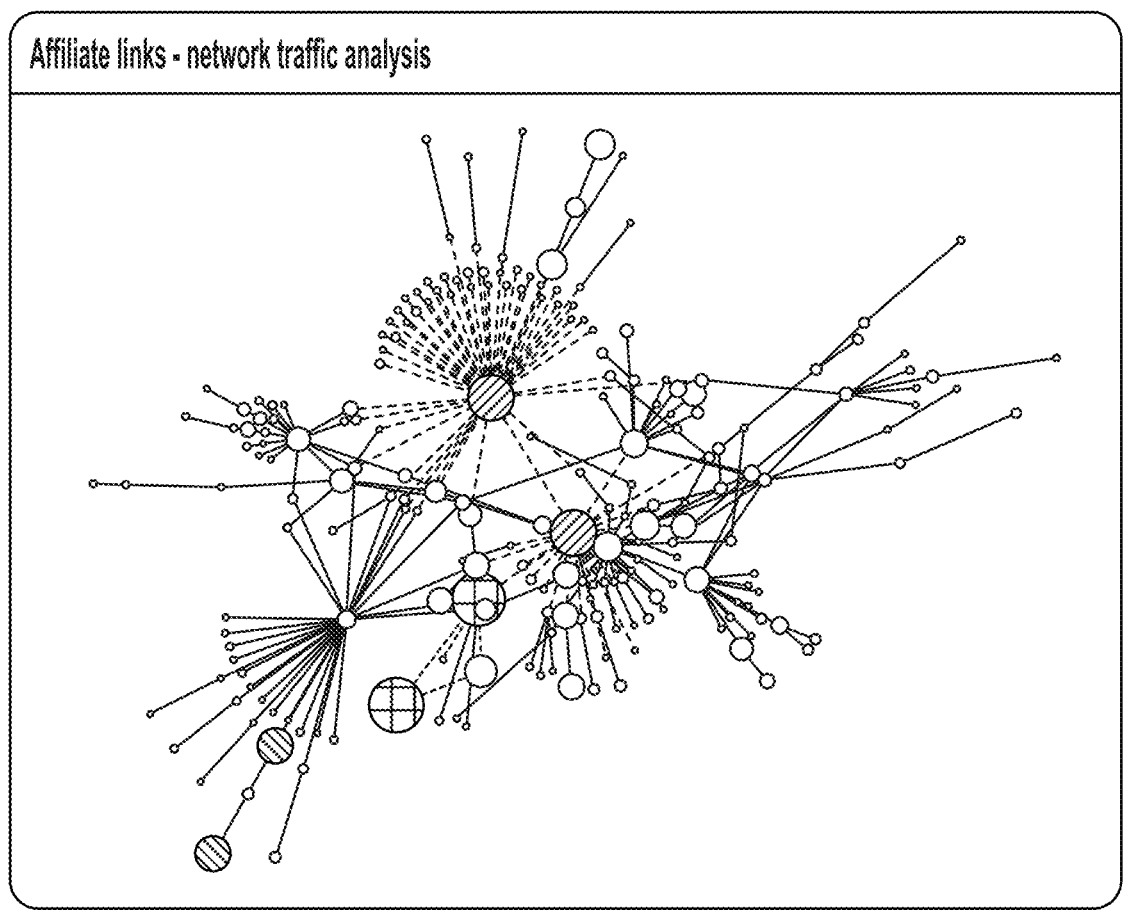
Figure 33P:
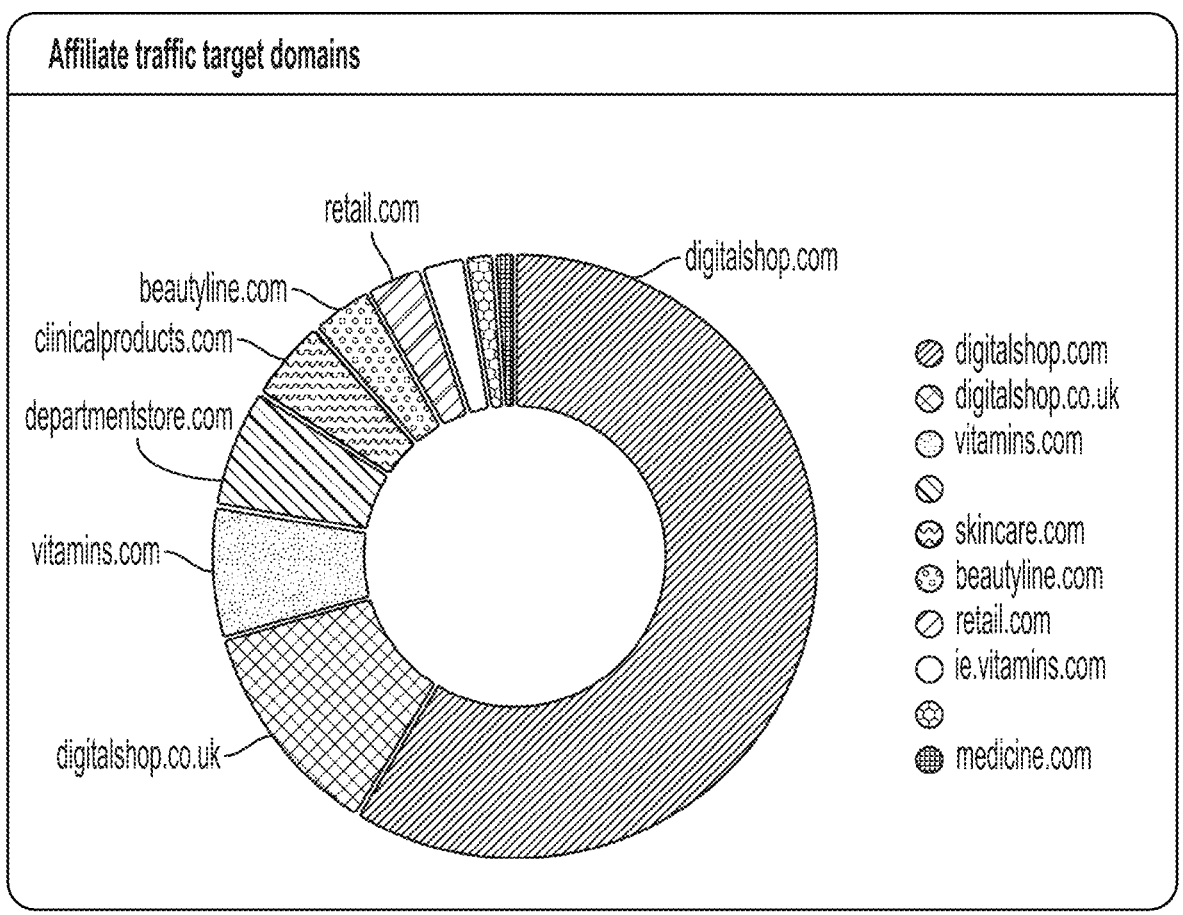

FIGS. 33A-33P are block diagrams that illustrate graphical outputs that render the analysis results generated by media analytics platform (e.g., as part of the operations in method 800, 850 illustrated in FIGS. 8A-8E, etc.) in accordance with some embodiments. In various embodiments, the processor may be configured to perform responsive actions that include generating any or all of the graphical outputs illustrated FIGS. 33A-33P.

Figure 34:
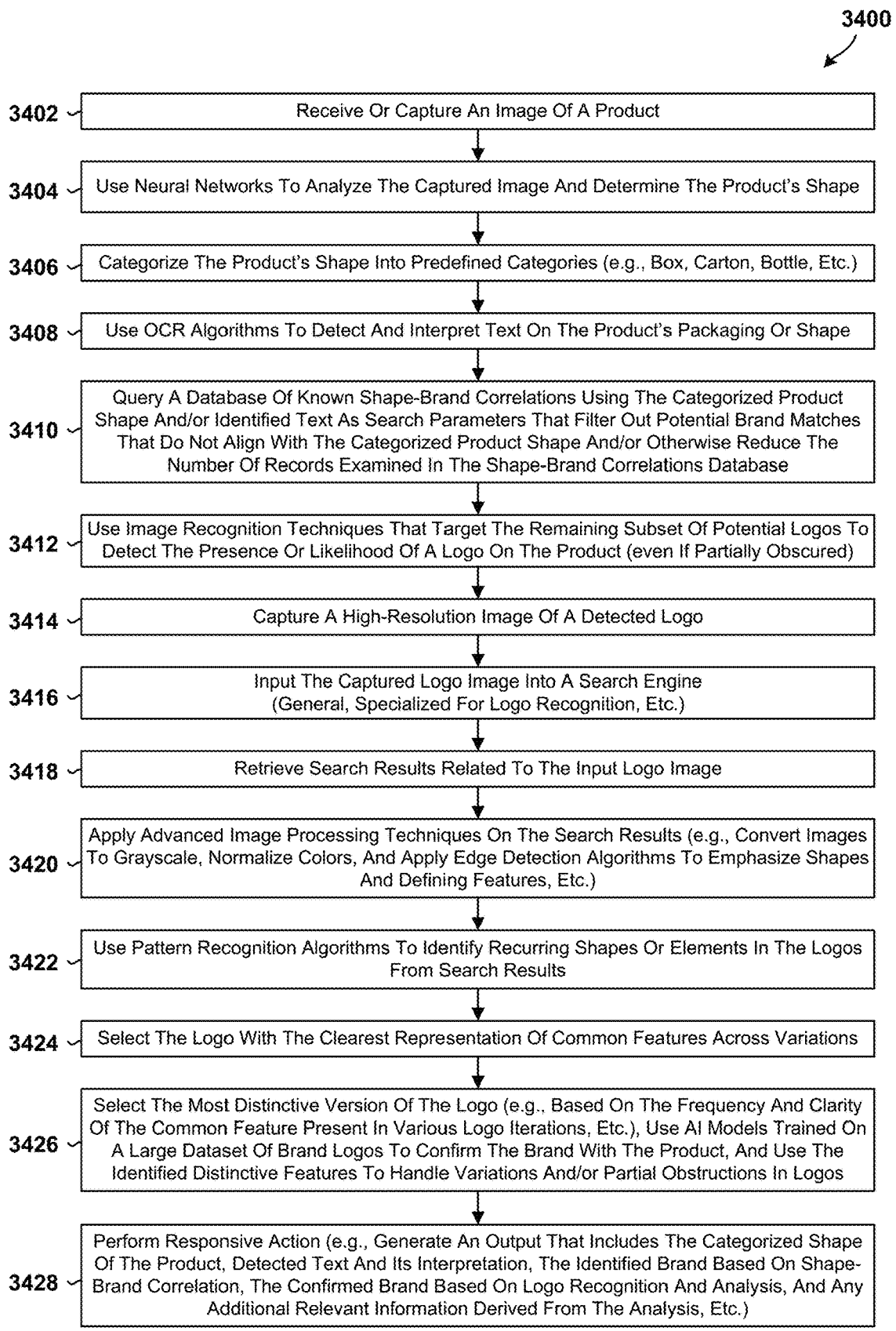
FIG. 34 is a process flow diagram that illustrates a method of analyzing products to recognize logos and identify brands in accordance with some embodiments.

FIG. 34 is a process flow diagram that illustrates a method 3400 of analyzing products to recognize logos and identify brands in accordance with some embodiments. Method 3400 may be performed by a processing system or at least one processor in a computing system that implements all or portions of a media analytics platform (e.g., media analytics platform 120 illustrated in FIG. 1, etc.).

In block 3402, the processor may receive or capture an image of a product. In block 3404, the processor may use neural networks, such as convolutional neural networks (CNNs), to analyze the captured image and determine the product's shape. In block 3406, the processor may categorize the product's shape into predefined categories (e.g., box, carton, bottle, etc.). In block 3408, the processor may use optical character recognition (OCR) algorithms to detect and interpret text on the product's packaging or shape. In block 3410, the processor may query a database of known shape-brand correlations using the categorized product shape and/or identified text as search parameters that filter out potential brand matches that do not align with the categorized product shape and/or otherwise reduce the number of records examined in the shape-brand correlations database. In block 3412, the processor may use image recognition techniques that target the remaining subset of potential logos to detect the presence or likelihood of a logo on the product (even if partially obscured). In block 3414, the processor may capture a high-resolution image of a detected logo. In block 3416, the processor may input the captured logo image into a search engine (general or specialized for logo recognition). In block 3418, the processor may retrieve search results related to the input logo image. In block 3420, the processor may apply advanced image processing techniques on the search results (e.g., convert images to grayscale, normalize colors, and apply edge detection algorithms to emphasize shapes and defining features, etc.). In block 3422, the processor may use pattern recognition algorithms to identify recurring shapes or elements in the logos from search results. In block 3424, the processor may select the logo with the clearest representation of common features across variations. In block 3426, the processor may select the most distinctive version of the logo (e.g., based on the frequency and clarity of the common feature present in various logo iterations, etc.), use AI models trained on a large dataset of brand logos to confirm the brand associated with the product, and use the identified distinctive features to handle variations and/or partial obstructions in logos. In block 3428, the processor may perform a responsive action. For example, the processor may generate an output that includes the categorized shape of the product, detected text (if any) and its interpretation, the identified brand based on shape-brand correlation, the confirmed brand based on logo recognition and analysis, and any additional relevant information derived from the analysis.

In some embodiments, in block 3406, the processor may use image recognition techniques (pattern recognition, geometric analysis, etc.) to compare the observed shape of the product against a predefined list of shapes and/or categorize the basic form of the product into a predefined shape. Examples of the predefined shapes include, but are not limited to, a bell, bottle, box, capsule, carton, cone, cube, cylinder, diamond, ellipsoid, heart, heptagon, hexagon, horseshoe, octagon, parallelogram, pentagon, pyramid, rhombus, sphere, trapezoid, triangle (e.g., isosceles, equilateral, right, acute, obtuse, etc.), animal shapes (e.g., fish, bird, cat, etc.), furniture shapes (e.g., chair, table, lamp), and vehicle shapes (e.g., car, airplane, ship, etc.).

In some embodiments, the processor may be configured to query a database (e.g., in block 3410, etc.) of known shape-brand correlations that catalogs correlations between specific product shapes and their associated brands, such as beverage brands known for uniquely shaped bottles or electronics brands with characteristic box designs. The processor may use the shape and/or text identified on the product as search criteria, effectively filtering out irrelevant brand matches that do not align with these parameters. Such filtering may allow for targeted querying that allows for focusing solely on the records that are linked to brands associated with identified product shapes. Such targeted querying may significantly reduce the search space and allow a more efficient and accurate identification of potential brand matches by concentrating on a narrower and more pertinent set of database entries.

In some embodiments, the processor may be configured to apply advanced image processing techniques (e.g., in block 3414, etc.) to the query and/or search results. These image processing techniques may include performing grayscale conversion, color normalization, and edge detection algorithms that adjust image characteristics to emphasize shapes and defining features of the logos and enhance the logo's distinctive and/or distinguishing features for more accurate comparison. In some embodiments, the processor may be configured to use pattern recognition algorithms to identify recurring shapes or elements in the logos obtained from search results and select the logo with the clearest representation of common features across variations.

In some embodiments, the processor may be configured to select the most distinctive version of the logo (e.g., in block 3424, etc.) based on the frequency and clarity of the common feature(s) present in multiple logo iterations (e.g., included in the search results, etc.). In some embodiments, the selection of the most distinctive version of the logo may include analyzing the consistency of a common feature in multiple logo iterations. In some embodiments, the processor may be configured to use AI models that are trained on a large dataset of brand logos to identify, confirm, and differentiate logos.

Figure 35:
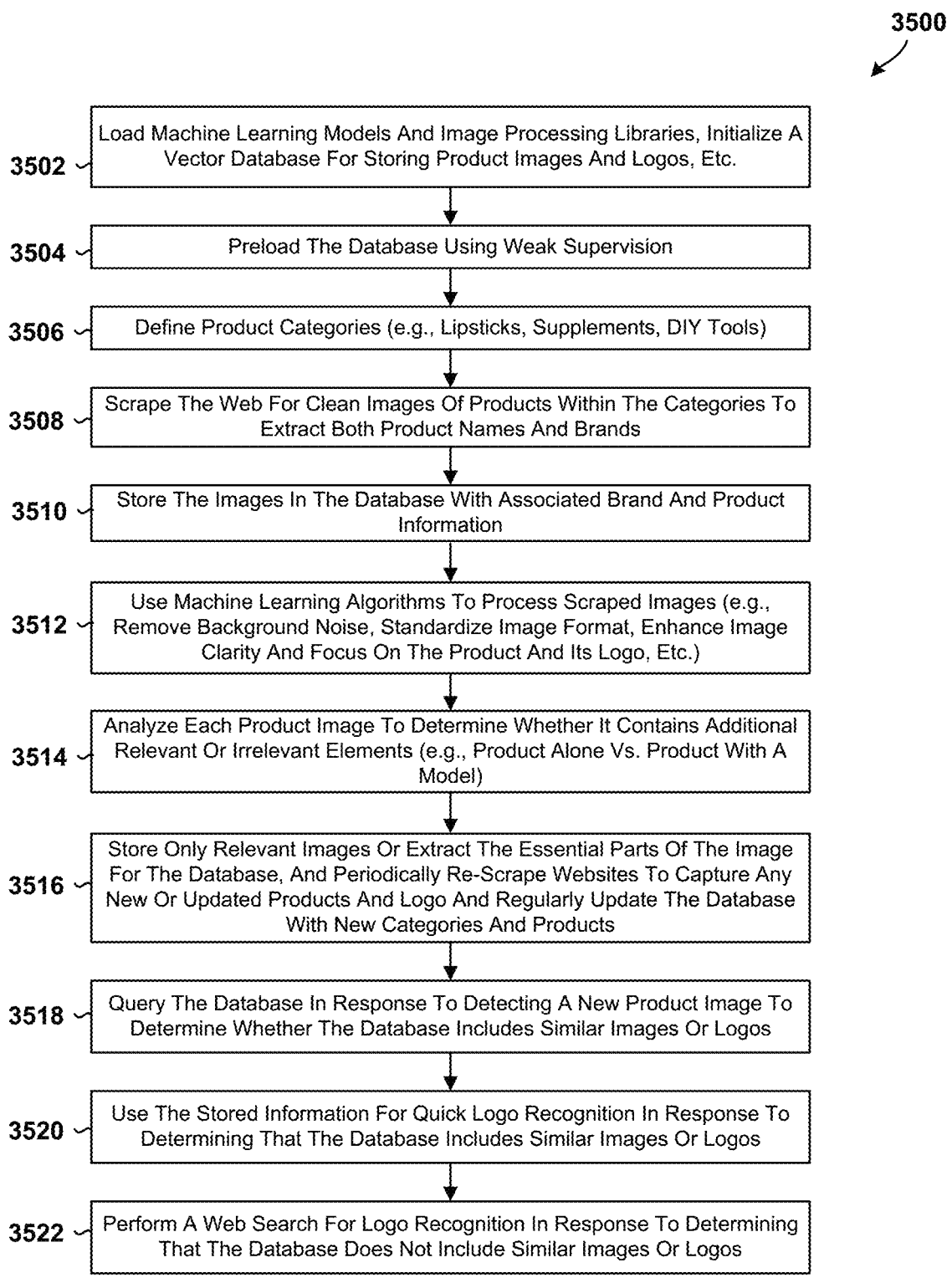
FIG. 35 is a process flow diagram that illustrates a method of using weak supervision techniques for enhanced logo recognition operations in accordance with some embodiments.

FIG. 35 is a process flow diagram that illustrates a method 3500 of using weak supervision techniques for enhanced logo recognition operations in accordance with some embodiments. Method 3500 may be performed by a processing system or at least one processor in a computing system that implements all or portions of a media analytics platform (e.g., media analytics platform 120 illustrated in FIG. 1, etc.). In some embodiments, method 3500 may include the processor combining weak supervision with proactive data retrieval and AI techniques to reduce web searches and emphasize distinctive product features to more efficiently identify and categorize logos and brands across a wide range of product types and categories.

In block 3502, the processor may load machine learning models and image processing libraries, initialize a vector database for storing product images and logos. In block 3504, the processor may preload the database using weak supervision. Preloading the database with a wide spectrum of clean, well-defined images of various products and their associated brands may reduce the necessity for frequent web searches and substantially reduce the search space. In some embodiments, the processor may be configured to populate the database using web scraping techniques, which may include systematically collecting product names and brands from specific categories on websites (e.g., lipsticks, iron tablets, DIY tools, etc.). Examples of such web scraping techniques are described in U.S. Patent Application No. 17,867,358, entitled "System and Method for Efficiently Identifying and Segmenting Product Webpages on an eCommerce Website" filed Jul. 18, 2022, the entire contents of which are hereby incorporated by reference for all purposes.

In block 3506, the processor may define product categories (e.g., lipsticks, supplements, DIY tools). In block 3508, the processor may scrape the web for clean images of products within the categories to extract both product names and brands. In block 3510, the processor may store the images in the database with associated brand and product information. In block 3512, the processor may use machine learning algorithms to process scraped images (e.g., remove background noise, standardize image format, enhance image clarity and focus on the product and its logo, etc.). In block 3514, the processor may analyze each product image to determine whether it contains additional relevant or irrelevant elements (e.g., product alone vs. product with a model). In block 3516, the processor may store only relevant images or extract the essential parts of the image for the database, and periodically re-scrape websites to capture any new or updated products and logo and regularly update the database with new categories and products. In block 3518, the processor may query the database in response to detecting a new product image to determine whether the database includes similar images or logos. In block 3520, the processor may use the stored information for quick logo recognition in response to determining that the database includes similar images or logos. In block 3522, the processor may perform a web search for logo recognition in response to determining that the database does not include similar images or logos.

In some embodiments, the processor may be configured to analyze the packaging or container of the product for distinctive features and use these features as additional data points for narrowing down the search and improving recognition accuracy.

In some embodiments, the processor may be configured to perform retrieval augmentation operations for categories with insufficient data. For example, the processor may automatically scrape and process images from the web to retrieve and clean high-quality images for inclusion in the database.

In some embodiments, the processor may be configured to generate an output report that includes the identified logo, brand name, and other relevant information and update the database with any new findings for future reference.

In some embodiments, the processor may be configured to continuously monitor system performance and accuracy and update machine learning models and scraping parameters based on feedback and new data trends.

In some embodiments, the processor may be configured to store the scraped and processed images in a vector database (e.g., known shape-brand correlation database, etc.) that serves as a comprehensive repository and a primary reference for future logo recognition operations. Since the scraped images are not manually labeled with the same precision as in traditional datasets, the ability to learn from this broad range of less structured data is a form of weak supervision.

In some embodiments, the processor may be configured to use AI techniques to improve the quality of the product images and enhance the efficacy of subsequent image analysis operations. For example, the processor may be configured to use AI techniques to eliminate cluttered backgrounds from product images (a common occurrence on online retail platforms) to ensure that products are displayed against a clean, uniform background.

In some embodiments, the processor may be configured to differentiate between relevant product images and extraneous content. The processor may use AI techniques to determine whether additional products are relevant or unrelated to the product being evaluated. Such differentiation may be particularly useful in complex product presentations (e.g., a makeup palette accompanied by images demonstrating the makeup application, etc.).

In some embodiments, the processor may be configured to perform retrieval augmentation operations that include integrating automatically scraped and processed images into the database to proactively retrieve and augment data in categories in which the database is determined to be deficient.

In some embodiments, the processor may be configured to analyze features other than logos and brand names. For example, as mentioned above, the processor may be configured to evaluate the packaging or container of the product to recognize distinctive packaging shapes and styles and use the packaging shapes and styles to further reduce the search space.

Figure 36:
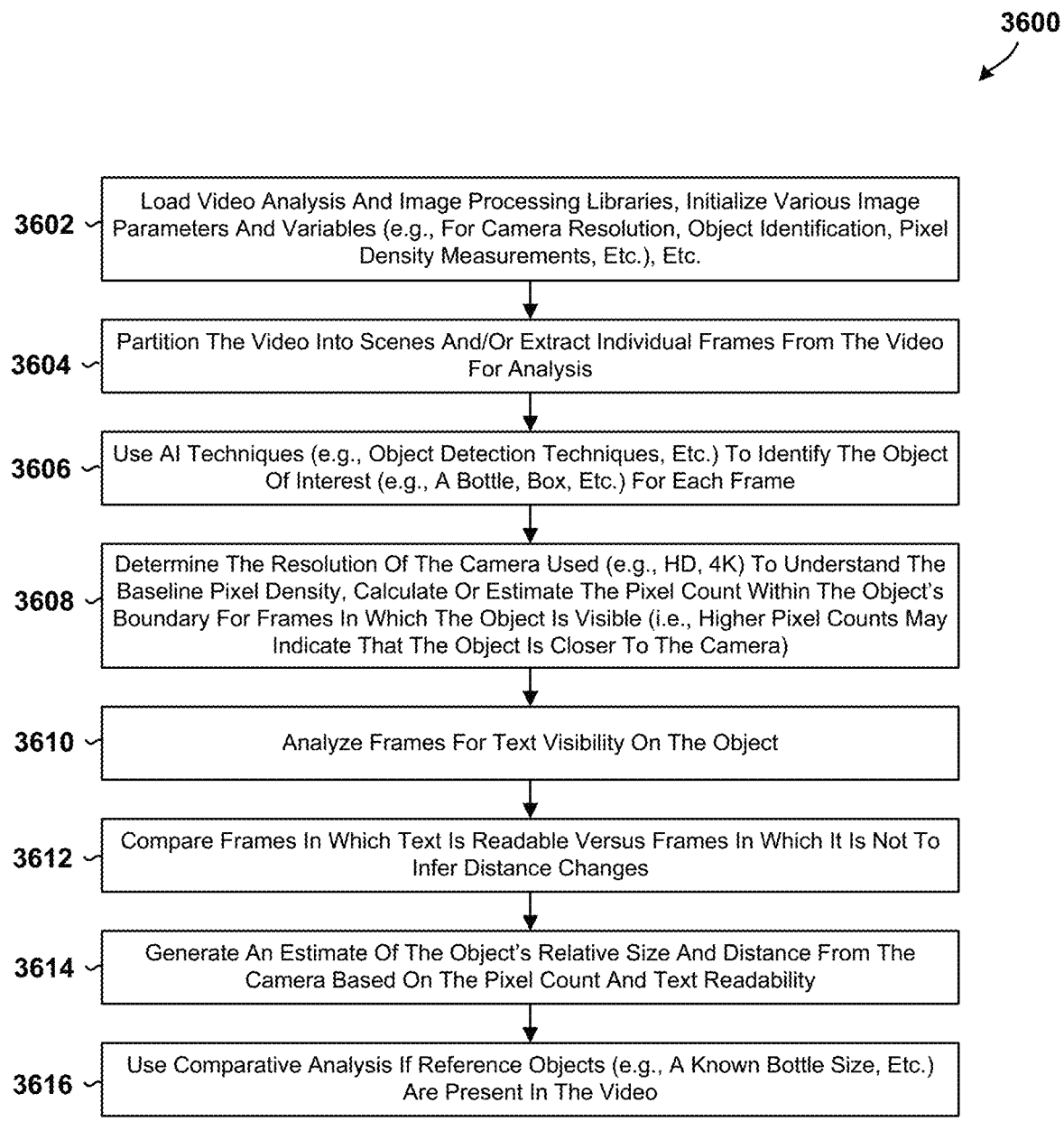
FIG. 36 is a process flow diagram that illustrates a method of using image analysis techniques and parameters (e.g., resolution data, pixel count, text readability, etc.) to estimate the size and distance of objects in a video (or other media such as XR, etc.) in accordance with some embodiments.

FIG. 36 is a process flow diagram that illustrates a method 3600 of using image analysis techniques and parameters (e.g., resolution data, pixel count, text readability, etc.) to estimate the size and distance of objects in a video (or other media such as XR, etc.) in accordance with some embodiments. Method 3600 may be performed by a processing system or at least one processor in a computing system that implements all or portions of a media analytics platform (e.g., media analytics platform 120 illustrated in FIG. 1, etc.).

In block 3602, the processor may load video analysis and image processing libraries, initialize various image parameters and variables (e.g., for camera resolution, object identification, pixel density measurements, etc.), etc. In block 3604, the processor may partition the video into scenes and/or extract individual frames from the video for analysis.

In block 3606, the processor may use AI techniques (e.g., object detection techniques, etc.) to identify the object of interest (e.g., a bottle, box, etc.) for each frame.

In block 3608, the processor may determine the resolution of the camera used (e.g., HD, 4K) to understand the baseline pixel density, calculate or estimate the pixel count within the object's boundary for frames in which the object is visible (i.e., higher pixel counts may indicate that the object is closer to the camera). In block 3610, the processor may analyze frames for text visibility on the object. In block 3612, the processor may compare frames in which text is readable versus frames in which it is not to infer distance changes. In block 3614, the processor may estimate the object's relative size and distance from the camera based on the pixel count and text readability. In block 3616, the processor may use comparative analysis if reference objects (e.g., a known bottle size, etc.) are present in the video.

In some embodiments, the processor may be configured to use additional context information (e.g., known room dimensions or other reference objects) to refine the size and distance estimates.

In some embodiments, the processor may be configured to generate a report identifying the estimated size and distance of the object in various frames and the associated confidence scores or ranges for the estimated size and distance.

Figure 37:
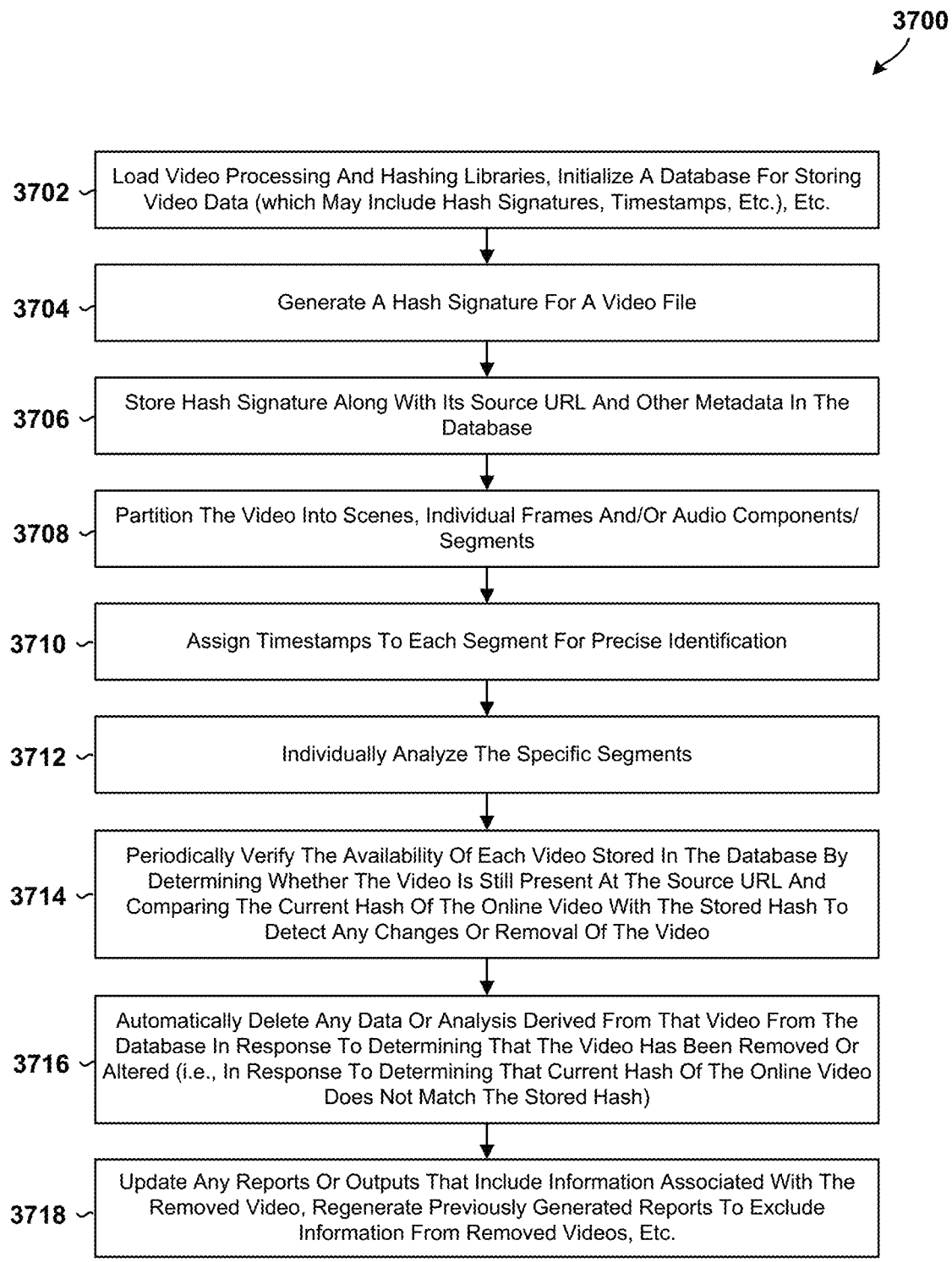
FIG. 37 is a process flow diagram that illustrates a method of maintaining privacy in video (or other media such as XR, etc.) analysis to comply with various digital privacy and "right to be forgotten" laws, rules, or regulations in accordance with some embodiments.

FIG. 37 is a process flow diagram that illustrates a method 3700 of maintaining privacy in video (or other media such as XR, etc.) analysis to comply with various digital privacy and "right to be forgotten" laws, rules, or regulations in accordance with some embodiments. Method 3700 may be performed by a processing system or at least one processor in a computing system that implements all or portions of a media analytics platform (e.g., media analytics platform 120 illustrated in FIG. 1, etc.). In some embodiments, method 3700 may include the processor using hashing for video tracking and periodic checks to ensure the removal of data that is no longer publicly available.

In block 3702, the processor may load video processing and hashing libraries, initialize a database for storing video data (which may include hash signatures, timestamps, etc.), etc. In block 3704, the processor may generate a hash signature for a video file. In block 3706, the processor may store hash signature along with its source URL and other metadata in the database. The hash signature may capture the entirety of the video's content in a single hash value that may be used to ensures that any change in any part of the video, including variations in Quality of Service (QOS) that may affect the video's integrity, will result in a different hash.

In block 3708, the processor may partition the video into scenes, individual frames and/or audio components/segments. In block 3710, the processor may assign timestamps to each segment for precise identification. In block 3712, the processor may individually analyze the specific segments. In block 3714, the processor may periodically verify the availability of each video stored in the database by determining whether the video is still present at the source URL and comparing the current hash of the online video with the stored hash to detect any changes or removal of the video.

In block 3716, the processor may automatically delete any data or analysis derived from that video from the database in response to determining that the video has been removed or altered (i.e., in response to determining that current hash of the online video does not match the stored hash). In block 3718, the processor may update any reports or outputs that include information associated with the removed video. In some embodiments, the processor may be configured to regenerate previously generated reports to exclude information from removed videos.

Figure 38:
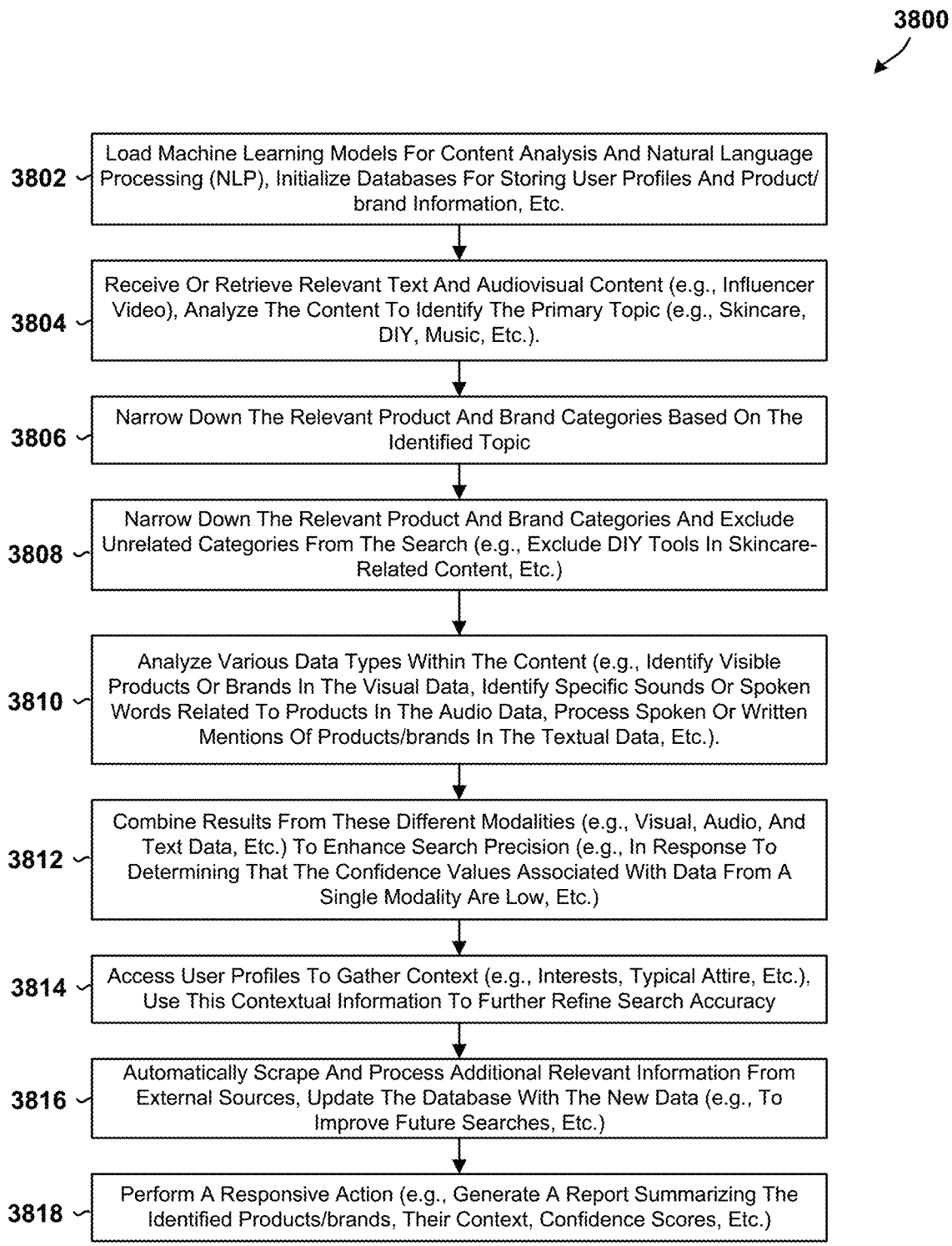
FIG. 38 is a process flow diagram that illustrates a method of using contextual relevance, multimodality, and user profiling to reduce the search space for content analysis involving product and brand mentions in accordance with some embodiments.

FIG. 38 is a process flow diagram that illustrates a method 3800 of using contextual relevance, multimodality, and user profiling to reduce the search space for content analysis involving product and brand mentions in accordance with some embodiments. Method 3800 may be performed by a processing system or at least one processor in a computing system that implements all or portions of a media analytics platform (e.g., media analytics platform 120 illustrated in FIG. 1, etc.).

In block 3802, the processor may load machine learning models for content analysis and natural language processing (NLP), initialize databases for storing user profiles and product/brand information, etc. In block 3804, the processor may receive or retrieve relevant text and audiovisual content (e.g., influencer video), analyze the content to identify the primary topic (e.g., skincare, DIY, music, etc.). In block 3806, the processor may narrow down the relevant product and brand categories based on the identified topic. In block 3808, the processor may narrow down the relevant product and brand categories and exclude unrelated categories from the search (e.g., exclude DIY tools in skincare-related content, etc.). In block 3810, the processor may analyze various data types within the content (e.g., identify visible products or brands in the visual data, identify specific sounds or spoken words related to products in the audio data, process spoken or written mentions of products/brands in the textual data, etc.). In block 3812, the processor may combine results from these different modalities (e.g., visual, audio, and text data, etc.) to enhance search precision (e.g., in response to determining that the confidence values associated with data from a single modality are low, etc.). In block 3814, the processor may access user profiles to gather context (e.g., interests, typical attire, etc.), use this contextual information to further refine search accuracy. In block 3816, the processor may automatically scrape and process additional relevant information from external sources, update the database with the new data (e.g., to improve future searches, etc.). In block 3818, the processor may perform responsive action (e.g., generate a report summarizing the identified products/brands, their context, confidence scores, etc.). In some embodiments, the processor may be configured to regularly update machine learning models, user profiles, product databases, etc. based on recent trends and results of the content analysis.

Figure 39:
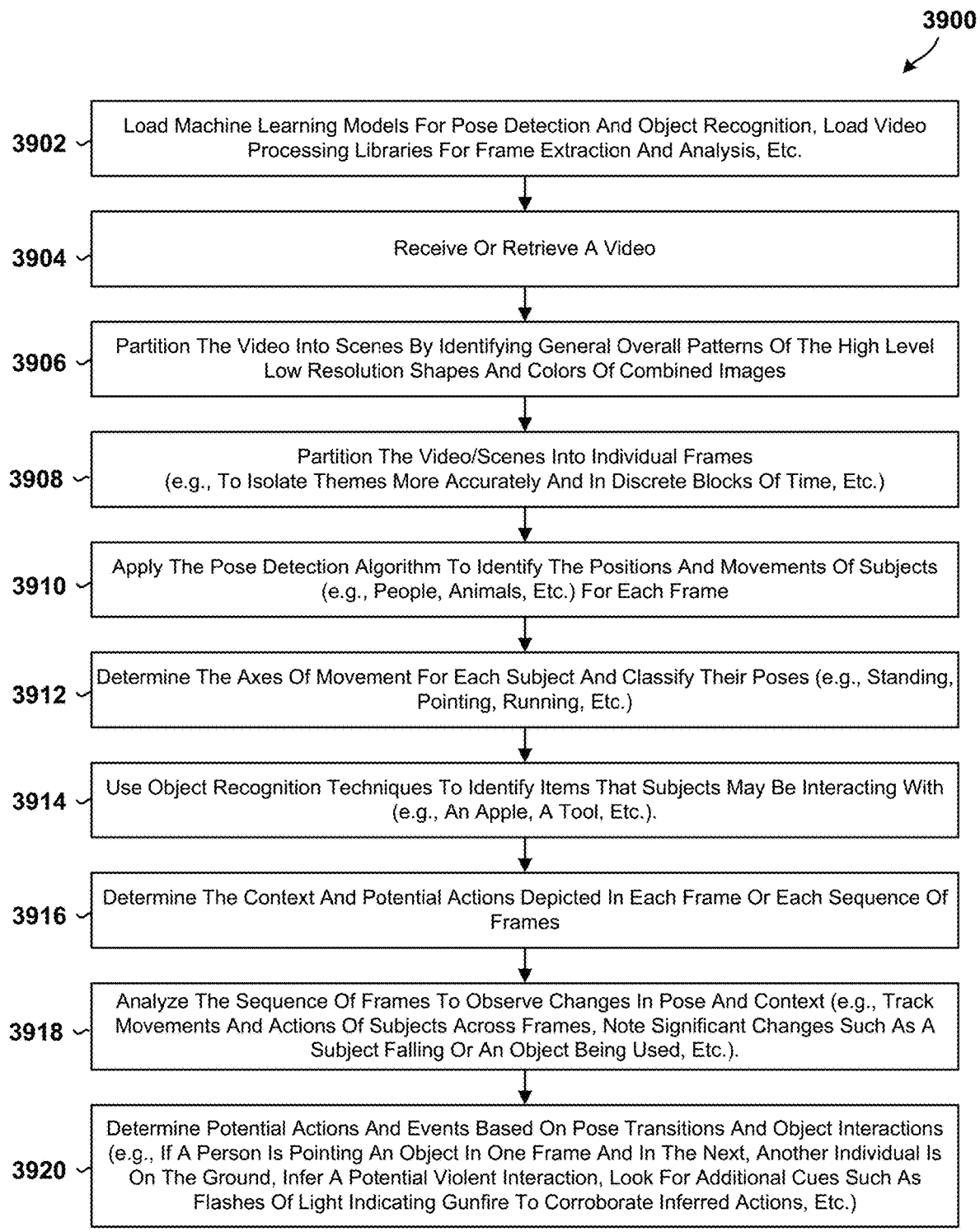
FIG. 39 is a process flow diagram that illustrates a method of using pose detection in video (or other media such as XR, etc.) analysis to identify specific actions, objects, and/or events in accordance with some embodiments.

FIG. 39 is a process flow diagram that illustrates a method 3900 of using pose detection in video (or other media such as XR, etc.) analysis to identify specific actions, objects, and/or events in accordance with some embodiments. Method 3900 may be performed by a processing system or at least one processor in a computing system that implements all or portions of a media analytics platform (e.g., media analytics platform 120 illustrated in FIG. 1, etc.).

In block 3902, the processor may load machine learning models for pose detection and object recognition, load video processing libraries for frame extraction and analysis, etc. In block 3904, the processor may receive or retrieve a video. In block 3906, the processor may partition the video into scenes by identifying general overall patterns of the high level low resolution shapes and colors of combined images. In block 3908, the processor may partition the video/scenes into individual frames to isolate themes more accurately and in discrete blocks of time. In block 3910, the processor may apply the pose detection algorithm to identify the positions and movements of subjects (e.g., people, animals, etc.) for each frame. In block 3912, the processor may determine the axes of movement for each subject and classify their poses (e.g., standing, pointing, running, etc.). In block 3914, the processor may use object recognition techniques to identify items that subjects may be interacting with (e.g., an apple, a gun, a tool, etc.). In block 3916, the processor may determine the context and potential actions depicted in each frame or each sequence of frames. In block 3918, the processor may analyze the sequence of frames to observe changes in pose and context (e.g., track movements and actions of subjects across frames, note significant changes such as a subject falling or an object being used, etc.). In block 3920, the processor may determine potential actions and events based on pose transitions and object interactions (e.g., if a person is pointing an object in one frame and in the next, another individual is on the ground, infer a potential violent interaction, look for additional cues such as flashes of light indicating gunfire to corroborate inferred actions, etc.). In block 3922, the processor may identify scenes depicting violence or other specific actions for content flagging, filtering or moderation, and generate a report or metadata that include the identified poses, actions, and inferred events within the video as well as timestamps and frame references for precise location of events. In some embodiments, the component may be configured to continuously or repeatedly update the pose detection and object recognition models based on new data, feedback, and analysis outcomes to improve future accuracy.

Figure 40:
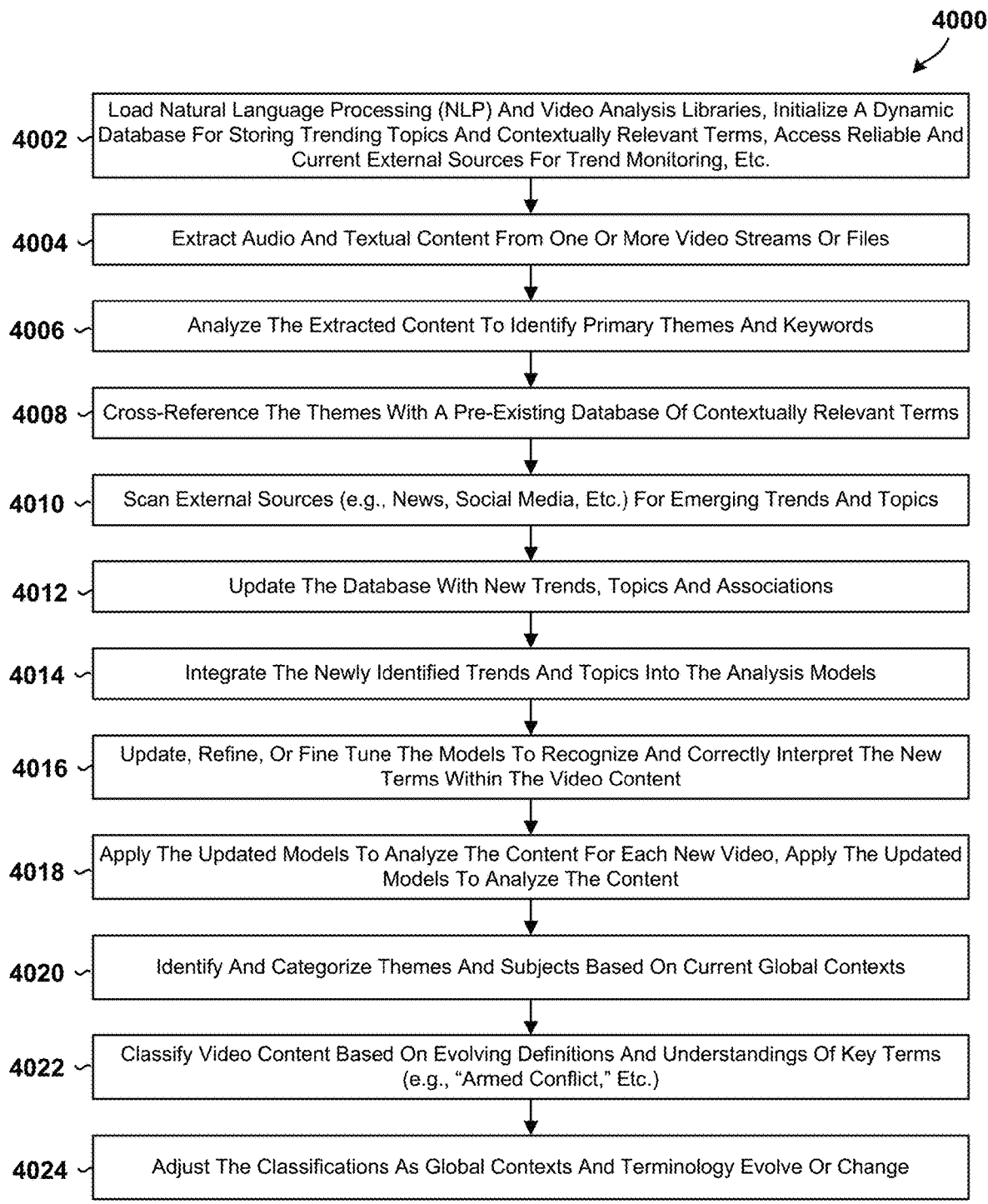
FIG. 40 is a process flow diagram that illustrates a method of dynamically analyzing video content and updating AI models based on changing global contexts and trends in accordance with some embodiments.

FIG. 40 is a process flow diagram that illustrates a method 4000 of dynamically analyzing video content and updating AI models based on changing global contexts and trends in accordance with some embodiments. Method 4000 may be performed by a processing system or at least one processor in a computing system that implements all or portions of a media analytics platform (e.g., media analytics platform 120 illustrated in FIG. 1, etc.).

In block 4002, the processor may load natural language processing (NLP) and video analysis libraries, initialize a dynamic database for storing trending topics and contextually relevant terms, access reliable and current external sources for trend monitoring, etc. In block 4004, the processor may extract audio and textual content from one or more video streams or files. In block 4006, the processor may analyze the extracted content to identify primary themes and keywords. In block 4008, the processor may cross-reference these themes with a pre-existing database of contextually relevant terms. In block 4010, the processor may scan external sources (e.g., news, social media, etc.) for emerging trends and topics. In block 4012, the processor may update the database with new trends, topics and associations. In block 4014, the processor may integrate the newly identified trends and topics into the analysis models. In block 4016, the processor may update, refine, or fine tune the models to recognize and correctly interpret the new terms within the video content. In block 4018, the processor may apply the updated models to analyze the content for each new video, apply the updated models to analyze the content. In block 4020, the processor may identify and categorize themes and subjects based on current global contexts. In block 4022, the processor may classify video content based on evolving definitions and understandings of key terms (e.g., "armed conflict," etc.). In block 4024, the processor may adjust the classifications as global contexts and terminology evolve or change.

In some embodiments, the processor may be configured to generate reports or summaries of the analyzed video content highlighting key themes and contextually relevant information. In some embodiments, the processor may be configured to implement and use a feedback system to evaluate the accuracy of video analysis and/or to further refine and update the models based on user-generated feedback. In some embodiments, the processor may be configured to continuously or repeatedly tune the models based on updates from global trends and emerging topics and/or otherwise ensure the models remain relevant and exclude outdated information.

Figure 41:
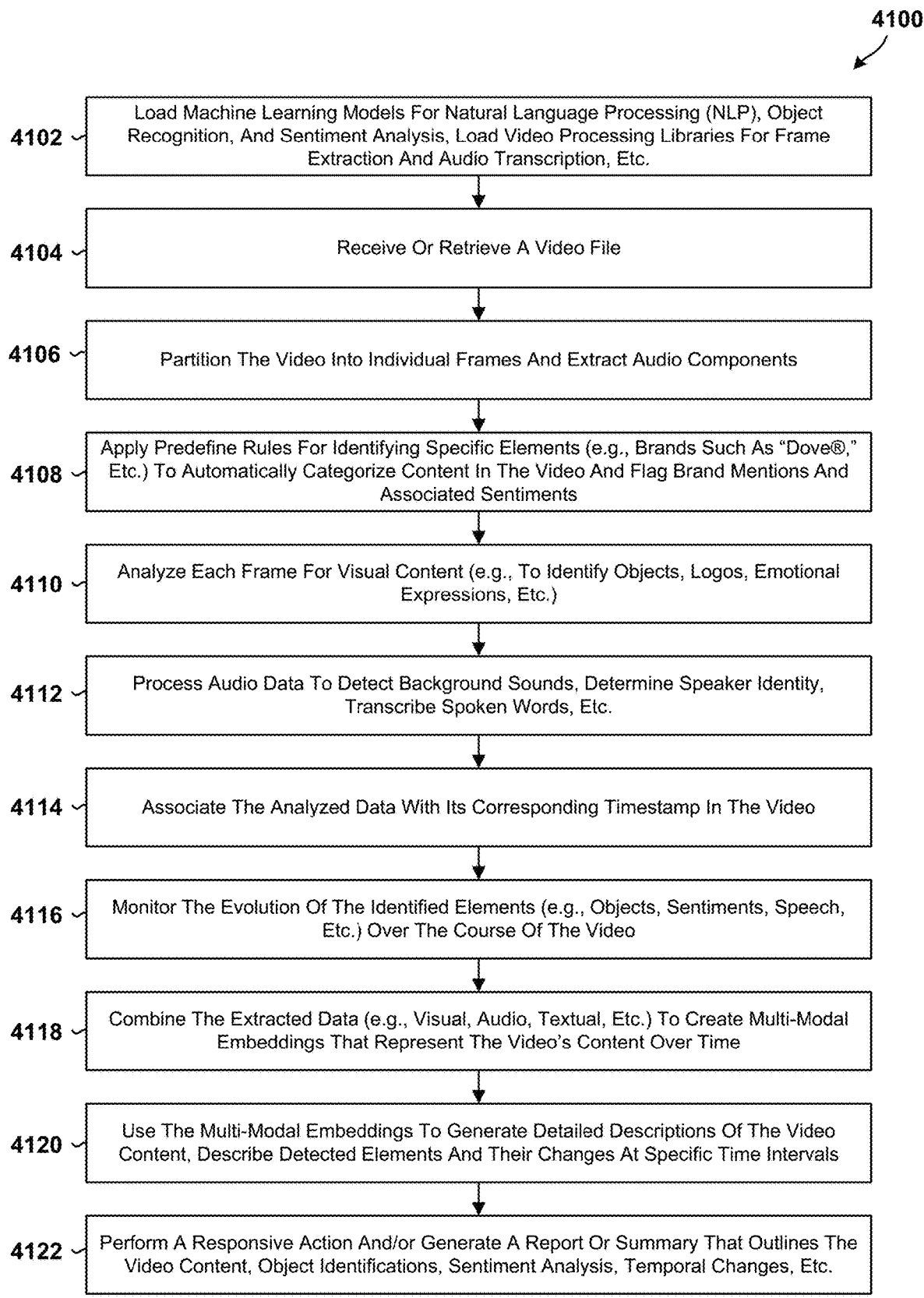
FIG. 41 is a process flow diagram that illustrates a method of using automated content categorization, multimodal data processing, temporal analysis, and/or weak supervision in machine learning for robust video analysis in accordance with some embodiments.

FIG. 41 is a process flow diagram that illustrates a method 4100 of using automated content categorization, multimodal data processing, temporal analysis, and weak supervision in machine learning for comprehensive video analysis in accordance with some embodiments. Method 4100 may be performed by a processing system or at least one processor in a computing system that implements all or portions of a media analytics platform (e.g., media analytics platform 120 illustrated in FIG. 1, etc.).

In block 4102, the processor may load machine learning models for natural language processing (NLP), object recognition, and sentiment analysis, load video processing libraries for frame extraction and audio transcription, etc. In block 4104, the processor may receive or retrieve a video file. In block 4106, the processor may partition the video into individual frames and extract audio components. In block 4108, the processor may apply predefine rules for identifying specific elements (e.g., brands such as "Dove®," etc.) to automatically categorize content in the video and flag brand mentions and associated sentiments. In block 4110, the processor may analyze each frame for visual content (e.g., to identify objects, logos, emotional expressions, etc.). In block 4112, the processor may process audio data to detect background sounds, determine speaker identity, transcribe spoken words, etc. In block 4114, the processor may associate the analyzed data with its corresponding timestamp in the video. In block 4116, the processor may monitor the evolution of the identified elements (e.g., objects, sentiments, speech, etc.) over the course of the video. In block 4118, the processor may combine the extracted data (e.g., visual, audio, textual, etc.) to create multi-modal embeddings that represent the video's content over time. In block 4120, the processor may use the multi-modal embeddings to generate detailed descriptions of the video content, describe detected elements and their changes at specific time intervals. In block 4122, the processor may perform a responsive action and/or generate a report or summary that outlines the video content, object identifications, sentiment analysis, temporal changes, etc.

In some embodiments, the processor may be configured to use the analyzed patterns and elements to predict or generate similar content (e.g., creative content generation or predictive modeling based on the video's theme.

In some embodiments, the processor may be configured to continuously or repeatedly update the rules and models based on new data and trends to maintain accuracy and relevance, incorporate feedback to refine the weak supervision operations, etc.

The systems and methods of the various embodiments described herein have generally been described in terms of simple products that are represented using a product name that is specific to the manufacture. However, the products may be represented using generic product names, types of products, objects, services, topics, celebrities, events, or information in any media format.

The systems and methods of the various embodiments described herein may provide significant technical advancements above and beyond the current state of the art. They may determine media impact scores for products and/or media content publishers. Thus, they may be used to determine when, where, and how products are promoted, and subsequently they can generate and publish media content relating to products. Further, they may be used to compare media content to static content on eCommerce websites and/or other media content.

The systems and methods of the various embodiments described herein may use techniques that provide significant technical efficiencies above and beyond the current state of the art. For example, media content may be retrieved in sub-portions from multiple sources and the processing can be distributed across multiple servers. Further, contextual information obtained from the media content can be used to reduce the amount and type of processing that needs to be performed on the media content (e.g., there is no need to extract gestures, facial details, or object details from a scene in video media content where the associated extracted text details do not contain any product references). Additionally, search space reduction techniques can be used to reduce the amount and type of processing that needs to be performed on the media content (e.g., product identification can be simplified by only considering a portion of the frame contained within a bounding box; product identification can be enhanced by performing object and text detection on the product's packaging). These technical efficiencies are increasingly necessary to cope with the growth of media content on the Internet.

The various embodiments presented in this application include technological solutions that distinctly enhance the functionality and performance of computing devices, with a specific focus on media analytics. Importantly, some embodiments achieve this by significantly reducing the search space, leading to notable improvements in response times and overall efficiency. These embodiments may have a profound impact on the interpretation of video content, fostering a more nuanced and precise analysis that is instrumental in a multitude of applications. These applications encompass critical fields such as facial recognition, emotion detection, scene analysis, and the comprehensive assessment of facial expressions, body language, and contextual cues within videos. Further, the embodiments extend to the determination of the overall sentiment of the content, including whether it conveys positive, negative, or neutral emotions, thereby providing valuable insights into audience reactions to media content. Additionally, these embodiments hold the potential to facilitate scene analysis, enable geographic targeting, and empower context-aware applications, all of which contribute to improving the performance and functioning of a variety of computing devices used for a variety of different applications.

The disclosed embodiments also offer technical solutions to various tangible technical problems. In the realm of media analytics, the challenge of efficiently processing and comprehending vast volumes of video content is a substantial technical hurdle. These innovations directly address this issue by employing advanced technologies, such as object recognition, facial analysis, and sentiment detection, to streamline and enhance the understanding of video content. By reducing the search space and optimizing data analysis, these solutions effectively mitigate the technical problem of resource-intensive video processing, thereby offering a more efficient and accurate means of extracting valuable information from multimedia content. As such, the embodiments may provide a concrete technical solution to the technical challenge of efficient media analysis and interpretation, elevating the capabilities of computing devices in this domain.

The various embodiments also narrow the search space, which is of paramount importance in various technological applications (e.g., media analytics, etc.). By reducing the scope of data to be analysed or processed, the embodiments not only optimize resource utilization but also dramatically improve computational efficiency. This is particularly important when dealing with vast datasets such as multimedia content. Narrowing the search space effectively streamlines the analysis process, leading to faster response times and improved accuracy. In the context of media analytics, where the goal is to extract meaningful insights from video content, this reduction in search space significantly expedites tasks such as object recognition, facial analysis, and sentiment detection. Ultimately, it leads to more precise and timely results, enabling applications ranging from facial recognition to sentiment analysis to operate more effectively, thereby advancing technological capabilities in various domains.

The importance and impact of narrowing the search space may become even more evident for applications that determine a product or ToI from the media content details. If the product is not initially identified, the embodiments refine the search by delving deeper into the analysis and consolidating various media content details to aid in the search. This approach involves iteratively dissecting media content, identifying ToI components, and continuously refining the ToI repository through search and updates. This iterative and recursive reduction of the search space forms the foundation for an efficient and effective analysis, ultimately improving the precision and speed of operations in various applications and thus the performance and functioning the devices used for such applications.

As further examples, preloading the database with a comprehensive assortment of well-defined images of various products and their associated brands serves to diminish the reliance on frequent web searches and substantially curtails the expansive search space. Some embodiments are configured to evaluate aspects beyond logos and brand names. For example, the processor may scrutinize product packaging, identifying distinctive shapes and styles, which further contributes to search space reduction. Contextual relevance, multimodality, and user profiling are also used to refine the search space in content analysis involving product and brand mentions, which may significantly improve the performance and functioning the devices.

In some embodiments, the processor is also configured to query a database to access known shape-brand correlations. These correlations may catalog the associations between specific product shapes and their respective brands, such as recognizable bottle shapes for beverage brands or characteristic box designs for electronics brands. By utilizing the identified shape and/or text on the product as search criteria, the processor efficiently filters out irrelevant brand matches, concentrating solely on entries linked to brands associated with identified product shapes. This targeted querying approach may substantially narrow the search space, enabling a more efficient and precise identification of potential brand matches. For these and other reasons, the various embodiments disclosed in this application individually and collectively underscore the paramount significance of reducing the search space in optimizing content analysis and identification processes.

Figure 42:
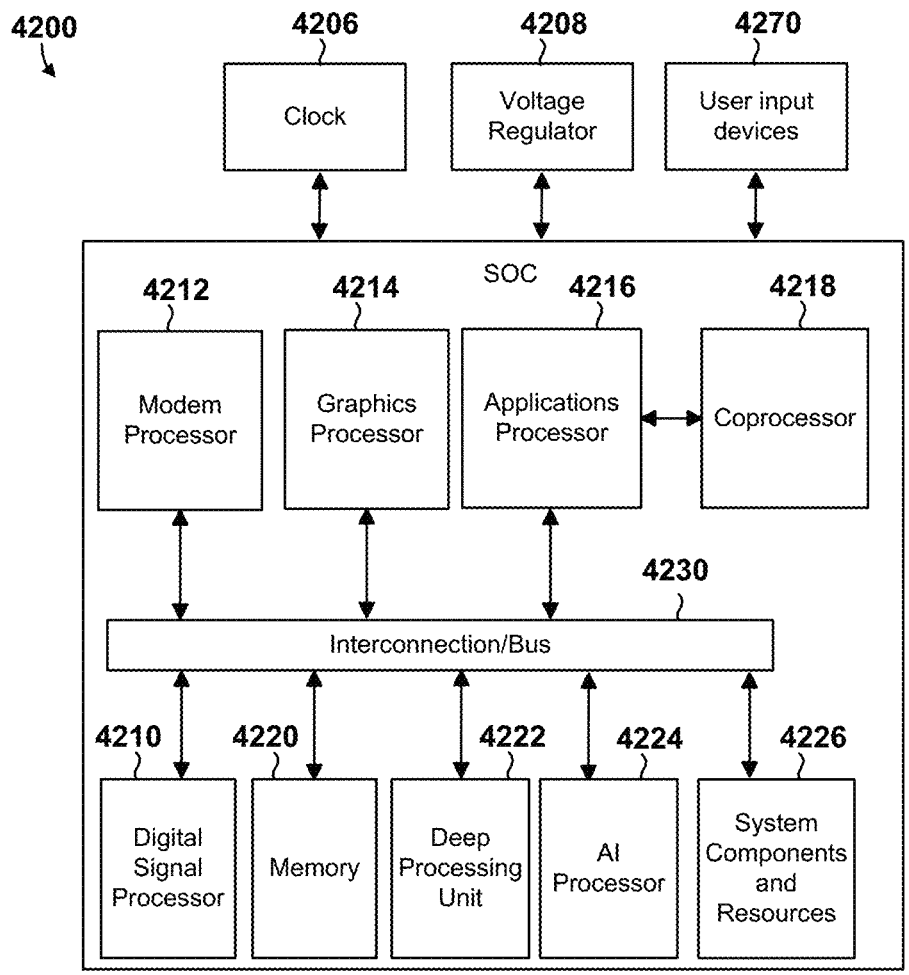
FIG. 42 is a component diagram of system on chip (SOC) suitable for implementing some embodiments.

Various embodiments may be implemented on a number of single-processor and multiprocessor computer systems, including a system-on-chip (SOC) or system in a package (SIP). FIG. 42 illustrates an example computing system or SOC 4200 architecture that may be used in user end devices implementing the various embodiments.

With reference to FIG. 42, the illustrated example SOC 4200 includes a clock 4206, a voltage regulator 4208, and user input devices 4270 (e.g., a touch-sensitive display, a touch pad, a mouse, etc.). The SOC 4200 may communicate via interconnection bus 4230, which may include advanced interconnects such as high-performance networks-on-chip (NOCs) and/or an array of reconfigurable logic gates and/or implement a bus architecture (e.g., CoreConnect, AMBA, etc.). Various processors 4210, 4212, 4214, 4216, 4218, 4222, 4224, may be interconnected to each other and to one or more memory elements 4220, system components and resources 4226, etc. In various embodiments, any, or all of the processors 4210, 4212, 4214, 4216, 4218, 4222, 4224, in the system may operate as the SoC's main processor, central processing unit (CPU), microprocessor unit (MPU), arithmetic logic unit (ALU), etc. One or more of the coprocessors 4218 may operate as the CPU. In some embodiments, the SOC 4200 may operate as the CPU of the computing device that carries out the instructions of software application programs by performing the arithmetic, logical, control and input/output (I/O) operations specified by the instructions.

The SOC 4200 may include a digital signal processor (DSP) 4210, a modem processor 4212, a graphics processor 4214, an application processor 4216, one or more coprocessors 4218 (e.g., vector co-processor, CPUCP, etc.) connected to one or more of the processors, memory 4220, deep processing unit (DPU) 4222 for convolutional neural networks, artificial intelligence processor 4224, system components and resources 4226, an interconnection bus 4230, and various additional processors, such as an applications processor, packet processor, etc.

Each processor 4210, 4212, 4214, 4216, 4218, 4222, 4224 may include one or more cores, and each processor/core may perform operations independent of the other processors/cores. For example, the first SOC 102 may include a processor that executes a first type of operating system (e.g., FreeBSD, LINUX, OS X, etc.) and a processor that executes a second type of operating system (e.g., MICROSOFT WINDOWS 11). In addition, any, or all of the processors 4210, 4212, 4214, 4216, 4218, 4222, 4224 may be included as part of a processor cluster architecture (e.g., a synchronous processor cluster architecture, an asynchronous or heterogeneous processor cluster architecture, etc.).

Any or all of the processors 4210, 4212, 4214, 4216, 4218, 4222, 4224 may operate as the CPU of the mobile computing device. In addition, any, or all of the processors 4210, 4212, 4214, 4216, 4218, 4222, 4224 may be included as one or more nodes in one or more CPU clusters. A CPU cluster may be a group of interconnected nodes (e.g., processing cores, processors, SOCs, SIPs, computing devices, etc.) configured to work in a coordinated manner to perform a computing task. Each node may run its own operating system and contain its own CPU, memory, and storage. A task that is assigned to the CPU cluster may be divided into smaller tasks that are distributed across the individual nodes for processing. The nodes may work together to complete the task, with each node handling a portion of the computation. The results of each node's computation may be combined to produce a final result. CPU clusters are especially useful for tasks that can be parallelized and executed simultaneously. This allows CPU clusters to complete tasks much faster than a single, high-performance computer. Additionally, because CPU clusters are made up of multiple nodes, they are often more reliable and less prone to failure than a single high-performance component.

The SOC 4200 may include various system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources of the SOC 4200 may include power amplifiers, voltage regulators, oscillators, phase-locked loops, peripheral bridges, data controllers, memory controllers, system controllers, Access ports, timers, and other similar components used to support the processors and software clients running on a computing device. The system components and resources may also include circuitry to interface with peripheral devices, such as cameras, electronic displays, wireless communication devices, external memory chips, etc.

The SOC 4200 may further include an input/output module (not illustrated) for communicating with resources external to the SOC, such as the clock, the voltage regulator, user input devices (e.g., a touch-sensitive display, a touch pad, a mouse, etc.), wireless transceiver (e.g., cellular wireless transceiver, Bluetooth transceiver, etc.), a user facing camera, etc. Resources external to the SOC (e.g., clock 4206, voltage regulator 4208, etc.) may be shared by two or more of the internal SOC processors/cores.

In addition to the example SOC 4200 discussed above, various embodiments may be implemented in various computing systems, including a single processor, multiple processors, multicore processors, or any combination thereof.

Figure 43:
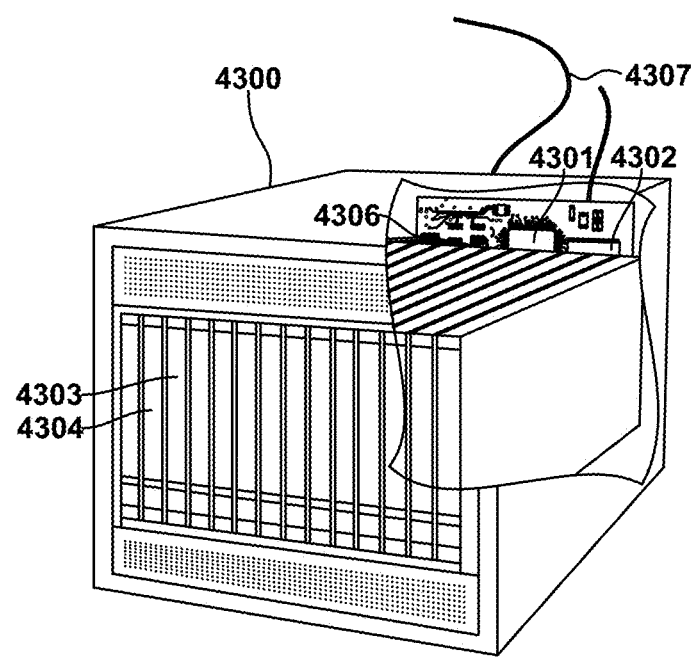
FIG. 43 is a component diagram of server suitable for implementing some embodiments.

The various embodiments may be implemented on any of a variety of commercially available server devices, such as the server 4300 illustrated in FIG. 43. Such a server 4300 typically includes a processor 4301 coupled to volatile memory 4302 and a large capacity nonvolatile memory, such as a solid-state drive (SSD) 4303. The server 4300 may also include additional storage solutions such as a network attached storage (NAS) system. Network access ports 4304 may be connected to the processor 4301 and configured to facilitate data connections with various networks 4305, including local area networks (LANs) and wider internet connections, linking to other network computers and servers.

The processors discussed in this application (e.g., 4210, 4212, 4214, 4216, 4218, 4222, 4224, 4301, etc.) may be any programmable microprocessor, microcomputer, or a combination of multiple processor chips configured by software instructions (applications) to perform diverse functions, including those of the various embodiments described herein. Severs 4300 often include multiple processors, with dedicated processors for specific tasks such as managing cloud computing operations, data analytics, or wireless communication functions. Software applications may be stored in the internal memory (4302, 4303) before being accessed and executed by the processor 4301. Modern processors 4301 may include extensive internal memory, often augmented with fast access cache memory, to efficiently store and process application software instructions.

As used in this application, terminology such as "component," "module," "system," etc., is intended to encompass a computer-related entity. These entities may involve, among other possibilities, hardware, firmware, a blend of hardware and software, software alone, or software in an operational state. As examples, a component may encompass a running process on a processor, the processor itself, an object, an executable file, a thread of execution, a program, or a computing device. To illustrate further, both an application operating on a computing device and the computing device itself may be designated as a component. A component might be situated within a single process or thread of execution or could be distributed across multiple processors or cores. In addition, these components may operate based on various non-volatile computer-readable media that store diverse instructions and/or data structures. Communication between components may take place through local or remote processes, function, or procedure calls, electronic signaling, data packet exchanges, memory interactions, among other known methods of network, computer, processor, or process-related communications.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in a computing device, system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

The foregoing method descriptions and the process flow diagrams are provided merely as illustrative examples and are not intended to require or imply that the blocks of the various aspects must be performed in the order presented. As may be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory server-readable or processor-readable storage medium. The steps of a method or algorithm disclosed herein may be embodied in a processor-executable software module, which may reside on a non-transitory processor-readable or server-readable storage medium. Non-transitory processor-readable and server-readable media may be any available storage media that may be accessed by a computer or a processor of a computing device. By way of example, and not limitation, such non-transitory processor-readable or server-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a server or processor of a server. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory server-readable media. Additionally, the operations of a method or algorithm may reside as one or any combination or set of codes and/or instructions on a non-transitory processor-readable medium and/or non-transitory server-readable medium, which may be incorporated into a computer program product.

The preceding description of the disclosed aspects is provided to enable any person skilled in the art to make or use the present invention. Various modifications to these aspects may be readily apparent to those skilled in the art, and the generic principles defined herein may be applied to other aspects without departing from the scope of the invention. Thus, the present invention is not intended to be limited to the aspects shown herein but is to be accorded the widest scope consistent with the following claims and the principles and novel features disclosed herein.

What is claimed is:

1. A method of reducing a search space by determining attributes in media content, comprising:
   receiving a media content identifier;
   obtaining the media content based on the received media content identifier;
   segmenting the media content into scenes based on visual and audio cues, wherein each of the scenes includes series of images;
   analyzing viewer engagement metrics across the scenes to identify a scene associated with a viewer engagement score that exceeds a threshold;
   selecting video frames from the identified scene;
   identifying primary objects in each selected frame that occur across the timespan of the series of images in the scene;
   adding a bounding box around the identified primary objects in one or more selected frame;
   performing text extraction within the bounding box;
   determining object attributes of the identified primary objects;
   querying a database to identify topics of interest (ToIs) based on the extracted text and the determined object attributes; and
   performing a responsive action in response to identifying the one or more ToIs.

2. The method of claim 1, wherein identifying the primary objects in each selected frame that occur across the timespan of the series of images in the scene comprises:
   using a convolutional neural network (CNN) model to identify the primary objects in each selected frame.

3. The method of claim 1, wherein performing the text extraction within the bounding box comprises:
   using optical character recognition (OCR) to perform text extraction within the bounding box.

4. The method of claim 1, further comprising using a large generative artificial intelligence model (LXM) or another natural language processing (NLP) technique to covert non-Latin characters in the extracted text and complete incomplete data.

5. The method of claim 1, further comprising using predictive text and word completion techniques for a partially obscured or incomplete text in the extracted text.

6. The method of claim 1, further comprising:
   retrieving external data from an external source for product identification,
   wherein querying the database to identify the ToIs based on the extracted text and the determined object attributes comprises querying the database to identify the ToIs based on the extracted text, the determined object attributes, and the retrieved external data.

7. The method of claim 1, further comprising:
   generating signatures for ToIs with non-textual or obscure labels; and
   using signatures to search and update a ToI knowledge repository.

8. A computing device, comprising:
   a processor configured to:
      receive a media content identifier;
      obtain media content based on the received media content identifier;
      segment the media content into scenes based on visual and audio cues, wherein each of the scenes includes series of images;
      analyze viewer engagement metrics across the scenes to identify a scene associated with a viewer engagement score that exceeds a threshold;
      select video frames from the identified scene;
      identify primary objects in each selected frame that occur across the timespan of the series of images in the scene;
      add a bounding box around the identified primary objects in one or more selected frame;
      perform text extraction within the bounding box;
      determine object attributes of the identified primary objects;
      query a database to identify topics of interest (ToIs) based on the extracted text and the determined object attributes; and
      perform a responsive action in response to identifying the one or more ToIs.

9. The computing device of claim 8, wherein the processor is configured to identify the primary objects in each selected frame that occur across the timespan of the series of images in the scene by:
   using a convolutional neural network (CNN) model to identify the primary objects in each selected frame.

10. The computing device of claim 8, wherein the processor is configured to perform the text extraction within the bounding box by:
    using optical character recognition (OCR) to perform text extraction within the bounding box.

11. The computing device of claim 8, wherein the processor is further configured to use a large generative artificial intelligence model (LXM) or another natural language processing (NLP) technique to covert non-Latin characters in the extracted text and complete incomplete data.

12. The computing device of claim 8, wherein the processor is further configured to use predictive text and word completion techniques for a partially obscured or incomplete text in the extracted text.

13. The computing device of claim 8, wherein:
    the processor is further configured to retrieve external data from an external source for product identification; and
    the processor is configured to query the database to identify the ToIs based on the extracted text, the determined object attributes, and the retrieved external data.

14. The computing device of claim 8, the processor is further configured to:
    generate signatures for ToIs with non-textual or obscure labels; and
    use signatures to search and update a ToI knowledge repository.

15. A non-transitory processor-readable medium having stored thereon processor-readable instructions configured to cause a processor in a computing device to perform operations for reducing a search space by determining attributes in media content, the operations comprising:

receiving a media content identifier;

obtaining the media content based on the received media content identifier;

segmenting the media content into scenes based on visual and audio cues, wherein each of the scenes includes series of images;

analyzing viewer engagement metrics across the scenes to identify a scene associated with a viewer engagement score that exceeds a threshold;

selecting video frames from the identified scene;

identifying primary objects in each selected frame that occur across the timespan of the series of images in the scene;

adding a bounding box around the identified primary objects in one or more selected frame;

performing text extraction within the bounding box;

determining object attributes of the identified primary objects;

querying a database to identify topics of interest (ToIs) based on the extracted text and the determined object attributes; and performing a responsive action in response to identifying the one or more ToIs.

\* \* \* \* \*